United States Patent [19]

Markey et al.

[11] 4,009,343

[45] Feb. 22, 1977

[54] SWITCHING AND ACTIVITY COMPRESSION BETWEEN TELEPHONE LINES AND DIGITAL COMMUNICATION CHANNELS

[75] Inventors: Harold G. Markey, Raleigh, N.C.; Lynn P. West, Boulder, Colo.

[73] Assignee: International Business Machines Corporation, Armonk, N.Y.

[22] Filed: Dec. 30, 1974

[21] Appl. No.: 537,211

[52] U.S. Cl. .............................. 179/15 BS; 325/4
[51] Int. Cl.[2] ........................................ H04J 3/06
[58] Field of Search ............... 179/15.55 T, 15 BA, 179/15 A, 15 BV, 15 BW, 15 BS, 15 AT, 15 AQ; 325/4; 343/100 ST; 340/172.5

[56] References Cited
UNITED STATES PATENTS

| | | | |
|---|---|---|---|
| 3,643,031 | 2/1972 | Sasaki et al. | 325/4 |
| 3,665,405 | 5/1972 | Sanders et al. | 179/15 BV |
| 3,811,013 | 5/1974 | Costa et al. | 179/15 BA |
| 3,825,899 | 7/1974 | Haeberle et al. | 179/15 BA |
| 3,829,777 | 8/1974 | Muratani et al. | 325/4 |
| 3,838,221 | 9/1974 | Schmidt et al. | 325/4 |
| 3,848,093 | 11/1974 | Edstrom | 325/4 |
| 3,862,370 | 1/1975 | Kadota | 179/15 BA |
| 3,862,373 | 1/1975 | Cohen et al. | 179/15 BV |
| 3,879,580 | 4/1975 | Schlosser et al. | 325/4 |
| 3,879,581 | 4/1975 | Schlosser et al. | 325/4 |

*Primary Examiner*—Thomas A. Robinson
*Attorney, Agent, or Firm*—Robert Lieber

[57] ABSTRACT

Digital exchange stations linked by earth satellite operate in a coordinately controllable time division switching and communication network system relative to externally attached telephone and data trunks. Modular switching equipment operating in coordination with satellite frames establishes and releases connection paths to trunk stores which interface with time and space domain channels of the system. Circuits through the system utilizing these paths are termed virtual connections because in different frames a circuit may be completed through different channels or even blocked under certain conditions. Telephone speech is converted between analog and digital forms relative to modular groups of 96 ports. Digital switching (slot interchange) equipment serving up to four groups (and cycling in coordination with satellite time division frames) cyclically completes local (intra-station) connections between ports and segments of toll (inter-station) connections between ports and locations in the trunk stores. The trunk stores comprise separate sections for system traffic bound to and from ports of the respective station. A duplicate arrangement of subsections in each section is alternately filled and emptied in successive frames; enabling the station to maintain continuity of communication relative to the system in successive frames. The 192 bit spaces of each location are filled in one frame and emptied in the next frame. Groups of 96 outbound locations are "virtually" associated for transmission with groups of 48 time division transmission channels of said facilities. The association operates by a process of selection termed voice activity compression (abbreviated VAC) based upon activity information developed at the port interface and carried through the switching equipment in positional association with trunk locations. The VAC process assigns only locations (virtual channels) containing activity to up to 46 of the 48 time channels, eliminating any excess of active virtual channels (over 46) in a selective order of priority. VAC mask information transmitted in a separate one of the 48 time channels indicates the virtual-to-real (96-to-46) assignment for the respective group in the respective frame. A bit in the mask for each virtual channel of the group indicates the assignment or elimination of the respective virtual channel. Assigned channels are transmitted in the time order of respective mask bits. Establishment of virtual connections is restricted system-wide by tables stored in the stations. These tables are subject to external modification and may contain path exclusion information enabling the system to remain effectively operational with inoperative elements.

13 Claims, 122 Drawing Figures

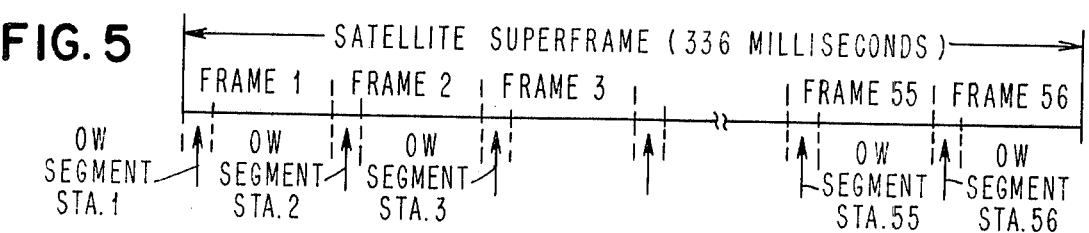
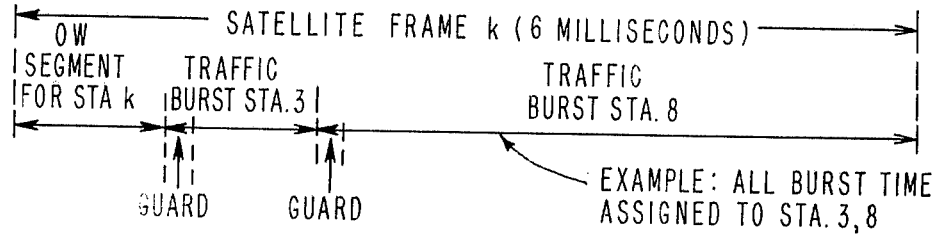
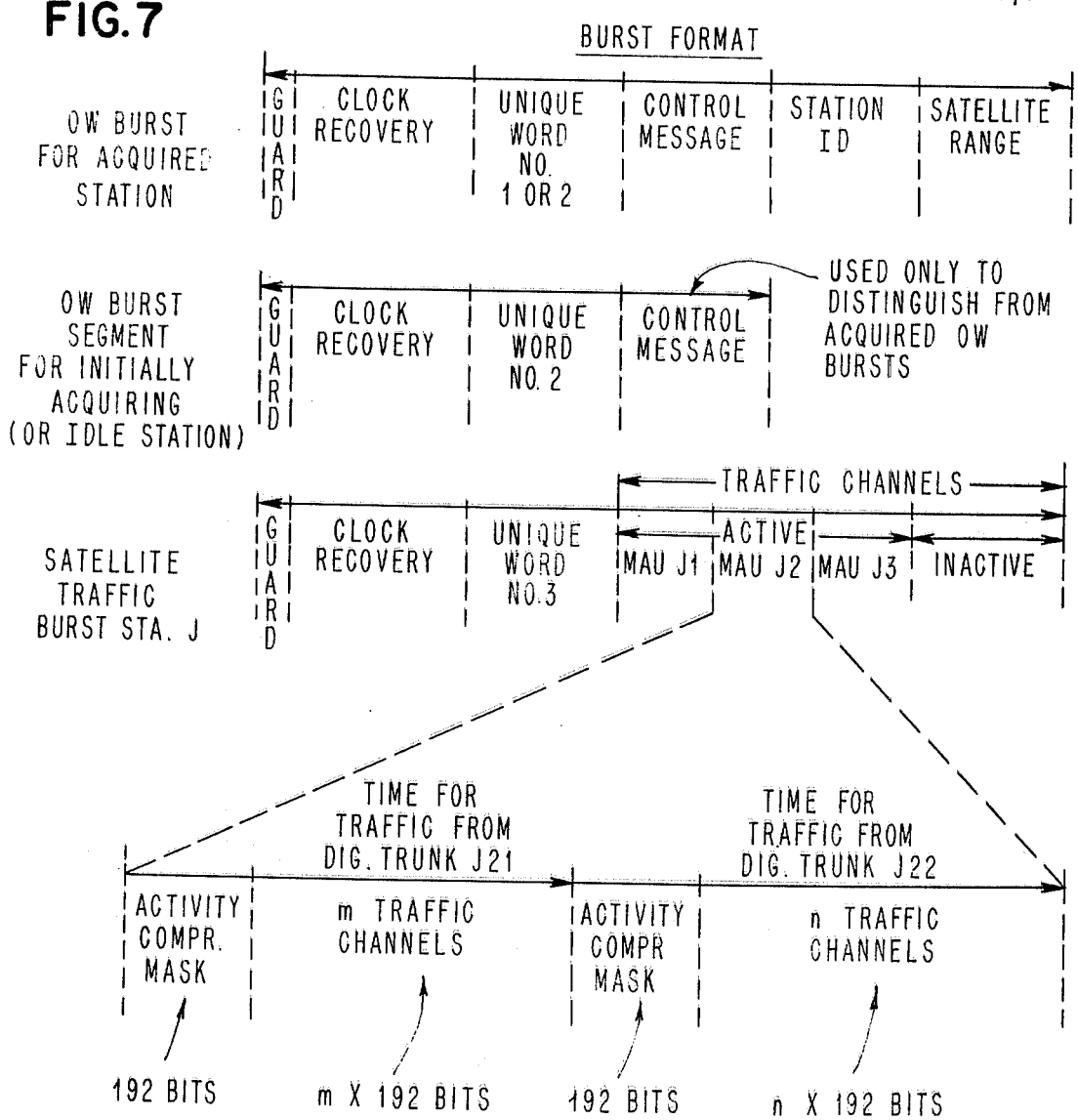

FIG. 11    UP-LINK (UL) CALL HANDLING

DOWN-LINK (DL) CALL HANDLING

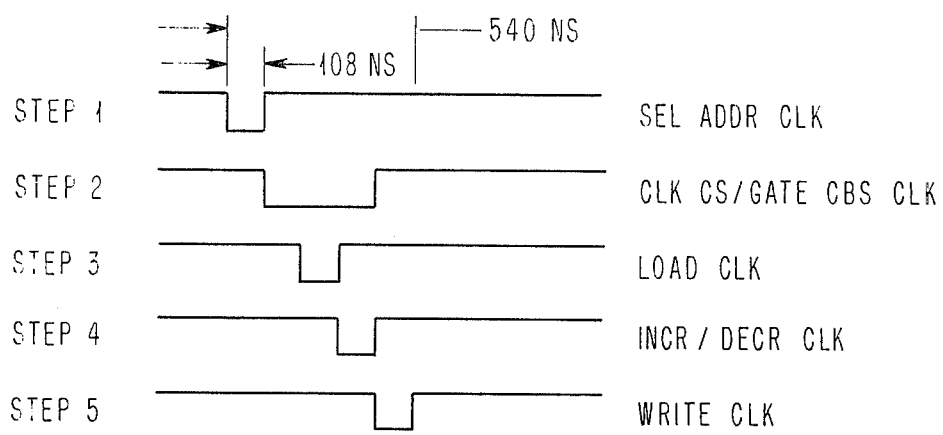
FIG.18a  CONTROL CLOCKS
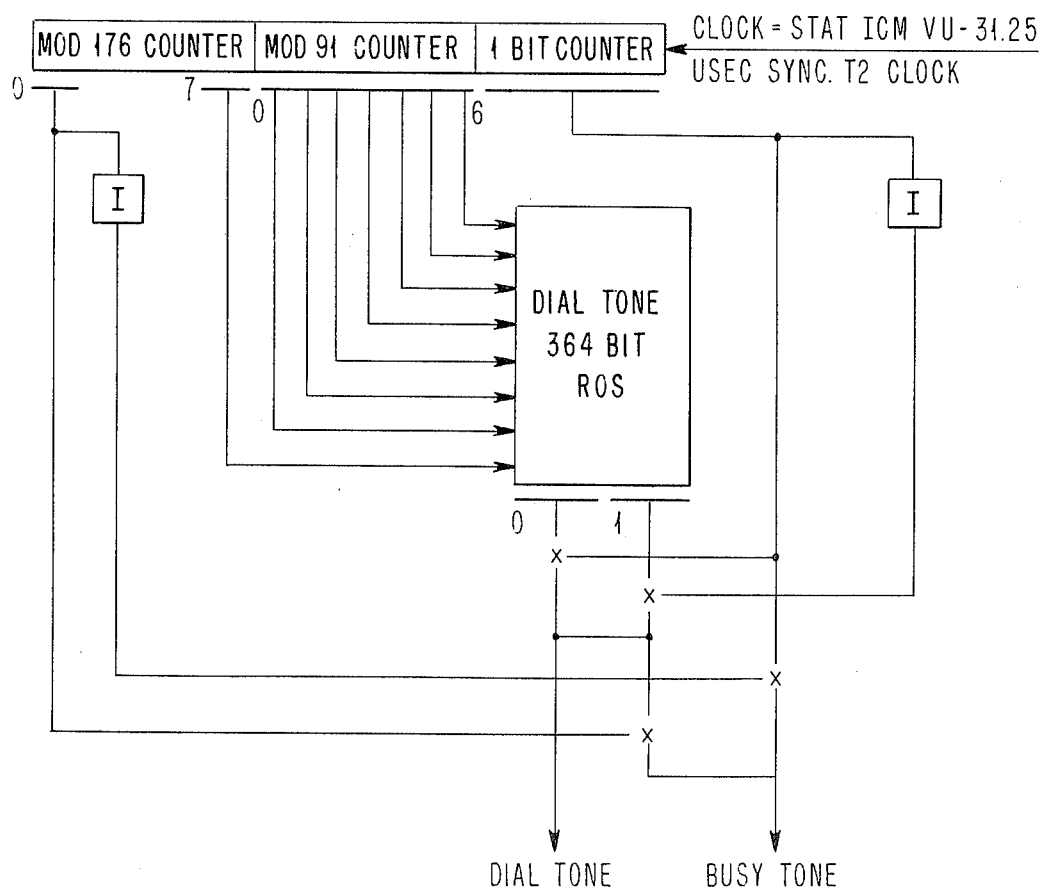
FIG.34
DIAL & BUSY TONE DATA FLOW

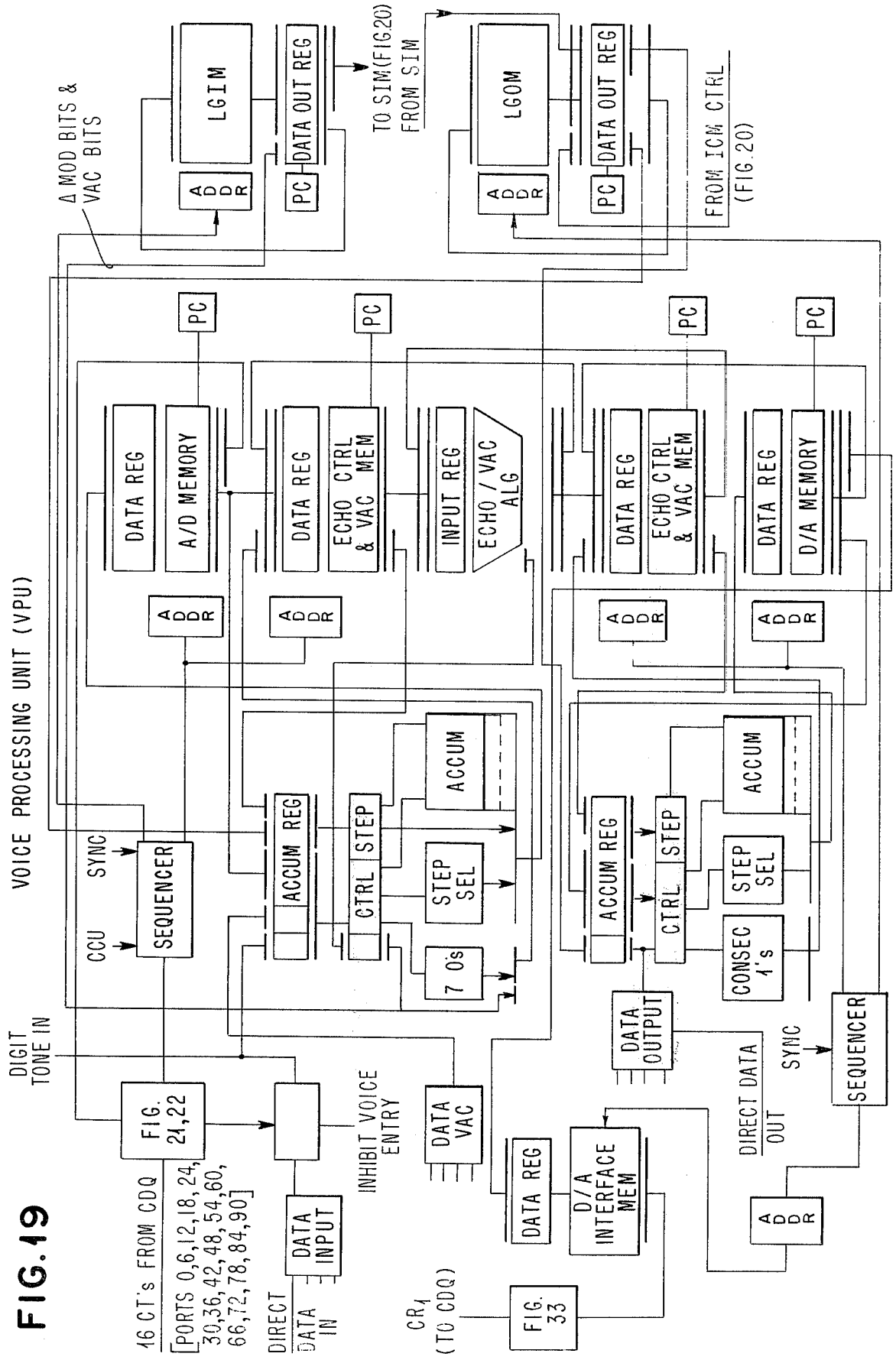

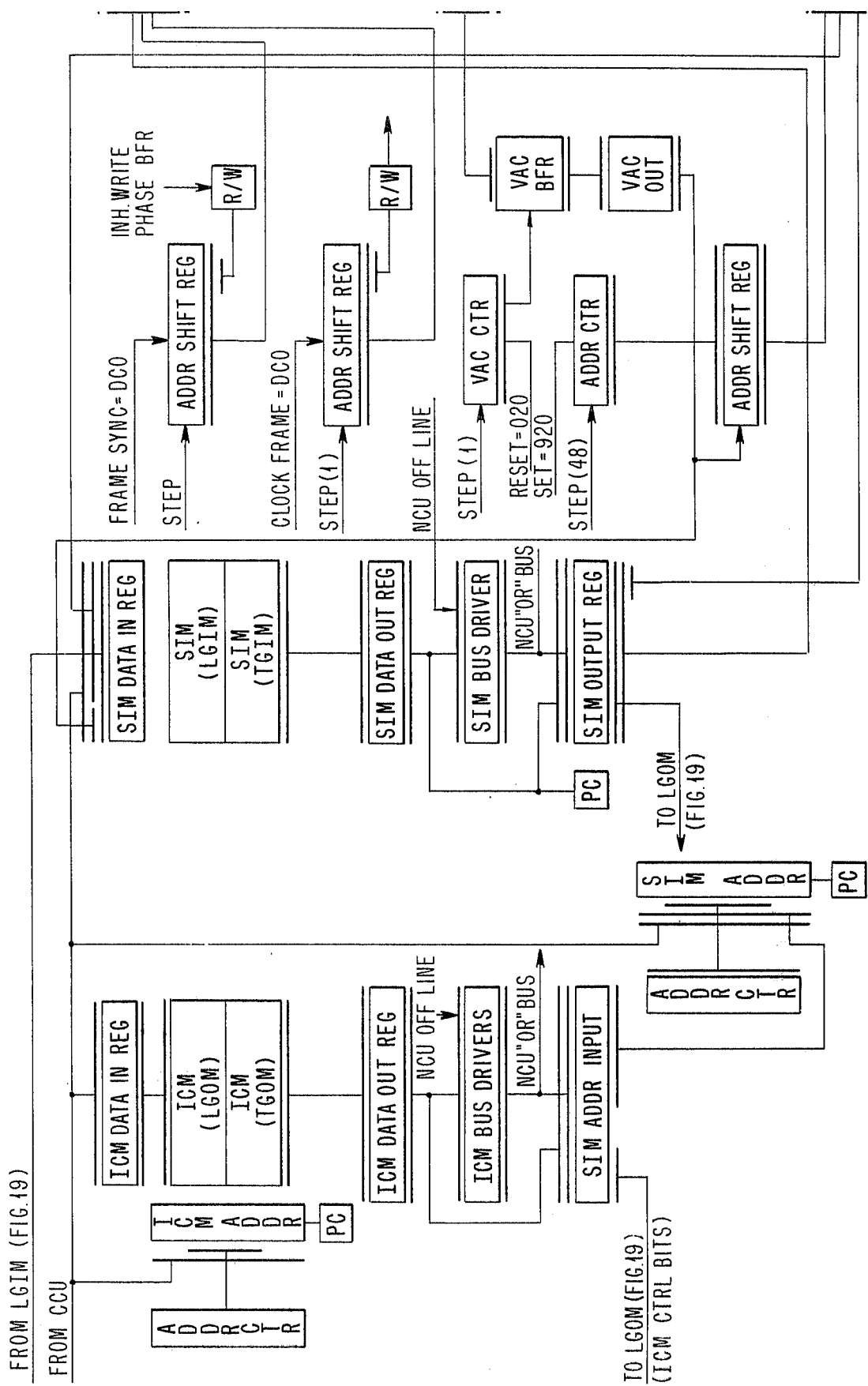

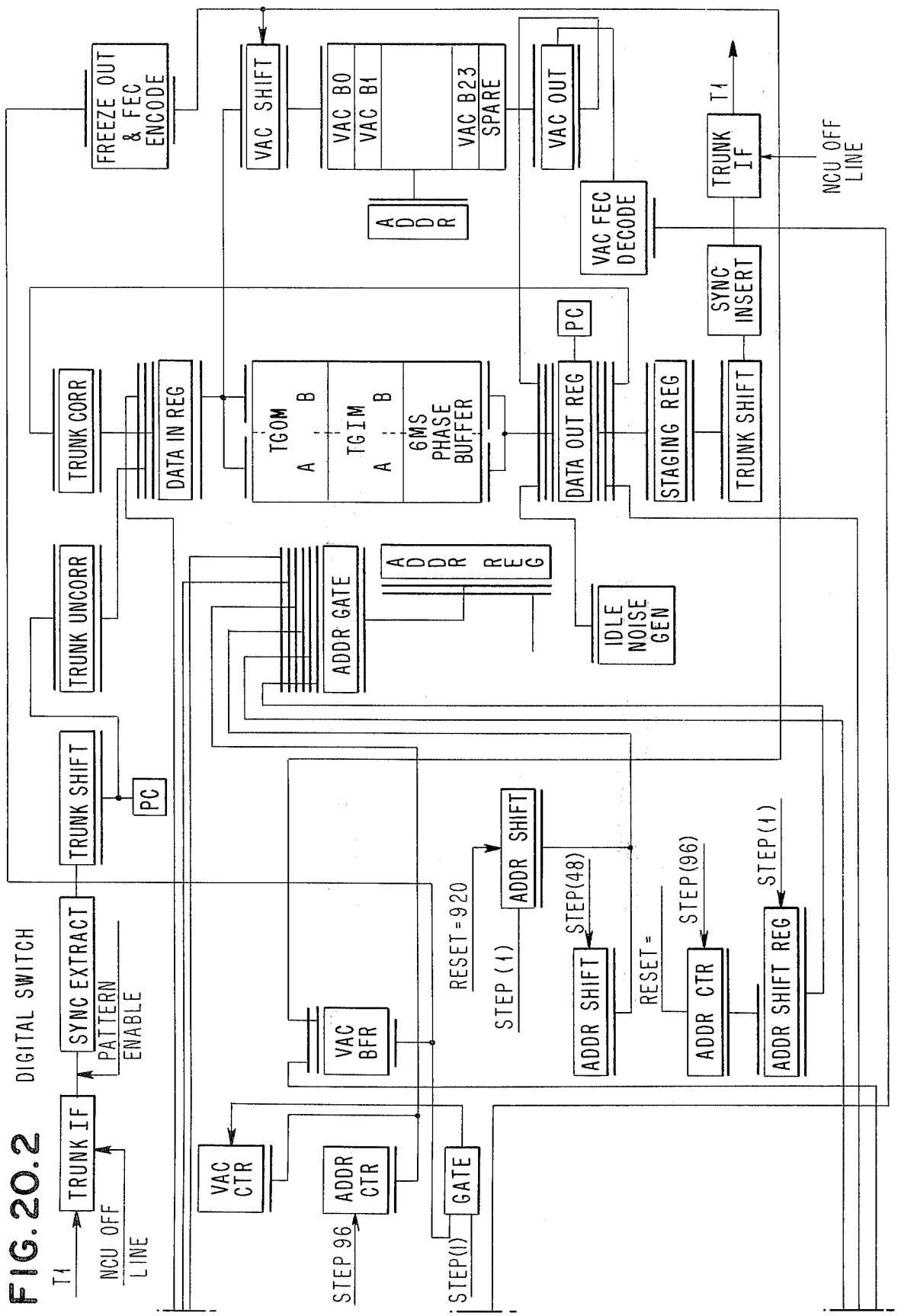
FIG. 20.2 DIGITAL SWITCH

96 PBX PORTS

1CT, 1CR, 2CBS, 2CS

| 0 |—(6)——
...
| 95 |—(6)——

A/D CONVERT CARDS

| CT: 0,6,12, 18,24,30, 36,42, 48,54,60, 66,72, 78,84,90 | 1 |
| CT: 1,7,13,19, 25,31,37, 43,49,55, 61,67,73, 79,85,91 | 2 |
| CT: 2,8,14,20, 26,32,38, 44,50,56, 62,68,74, 80,86,92 | 3 |
| CT: 3,9,15,21, 27,33,39, 45,51,57, 63,69,75, 81,87,93 | 4 |
| CT: 4,10,16,22, 28,34,40,46, 52,58,64, 70,76,82, 88,94 | 5 |
| CT: 5,11,17,23, 29,35,41,47, 53,59,65,71, 77,83,89,95 | 6 |

COMMON ADAPTER INTERFACE LINES

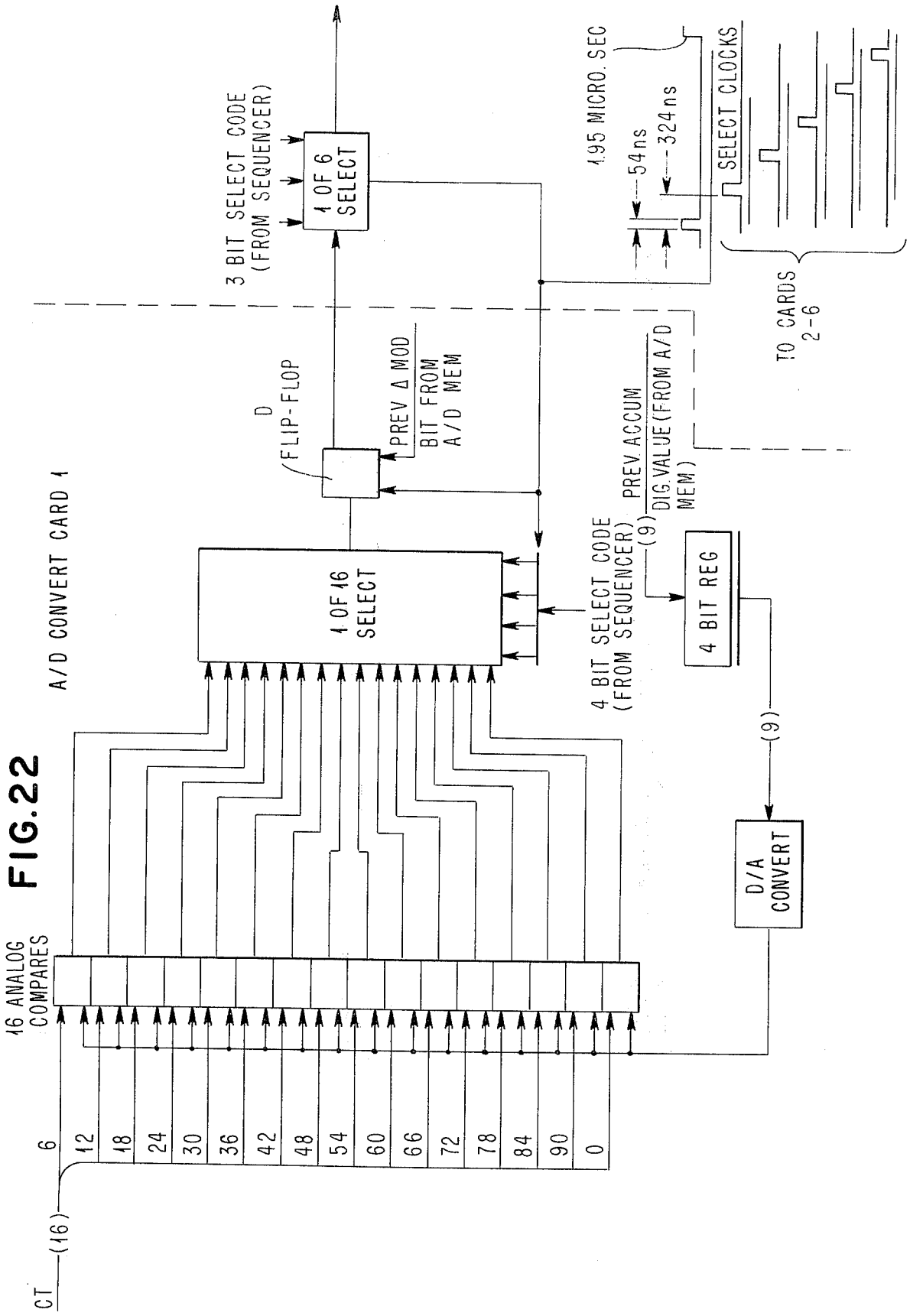

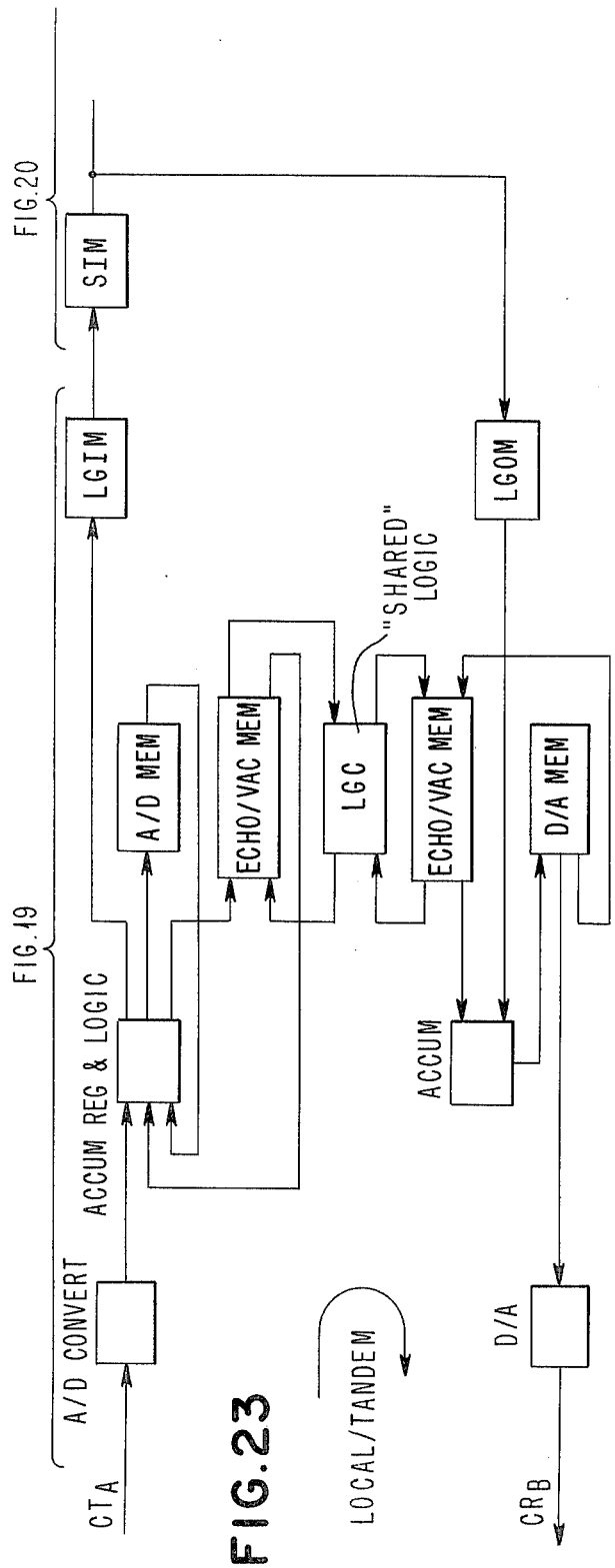

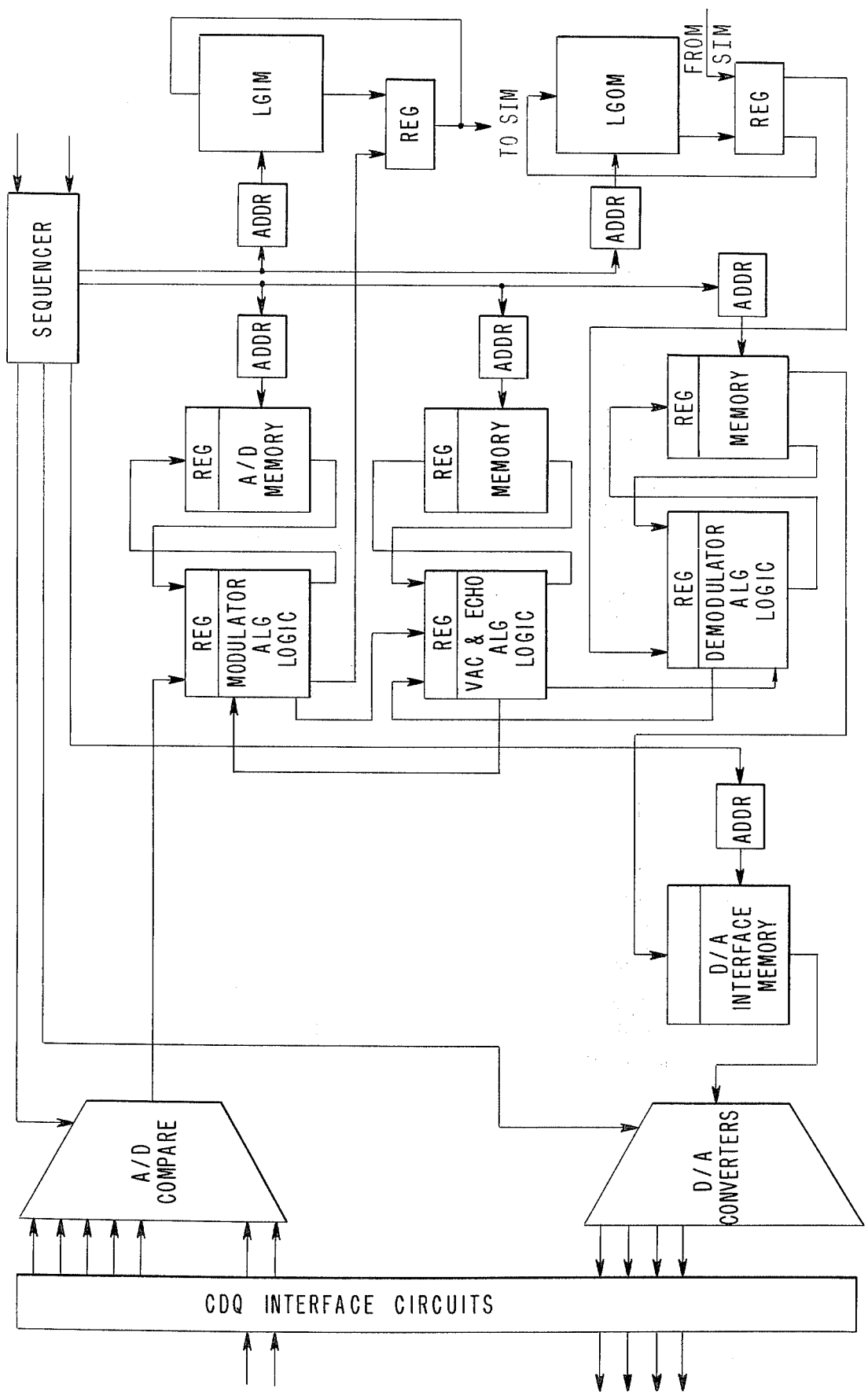
FIG. 24 CONNECTION OF MOD & DEMOD ALGORITHM LOGIC IN VOICE PROCESSING UNIT

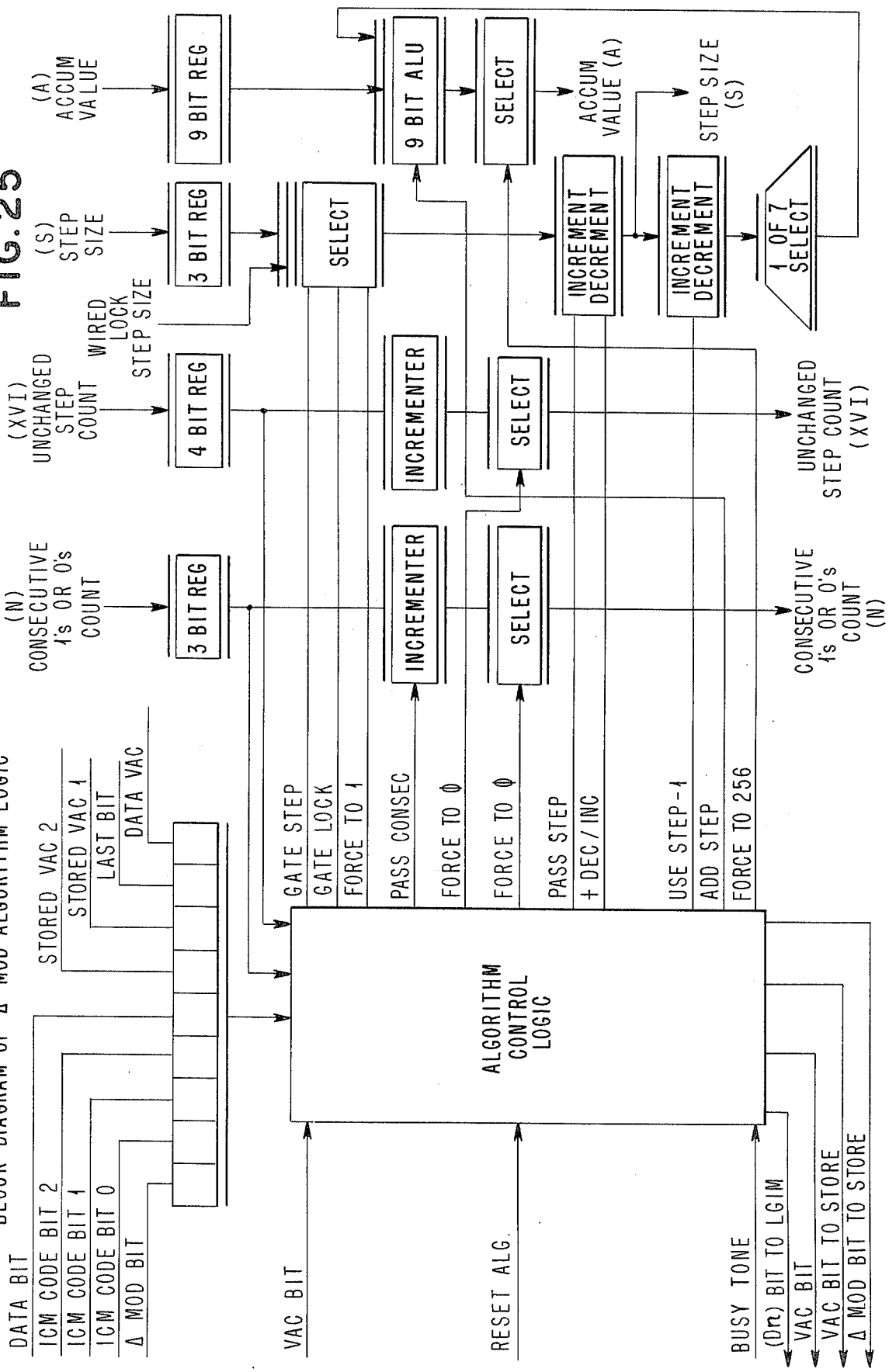

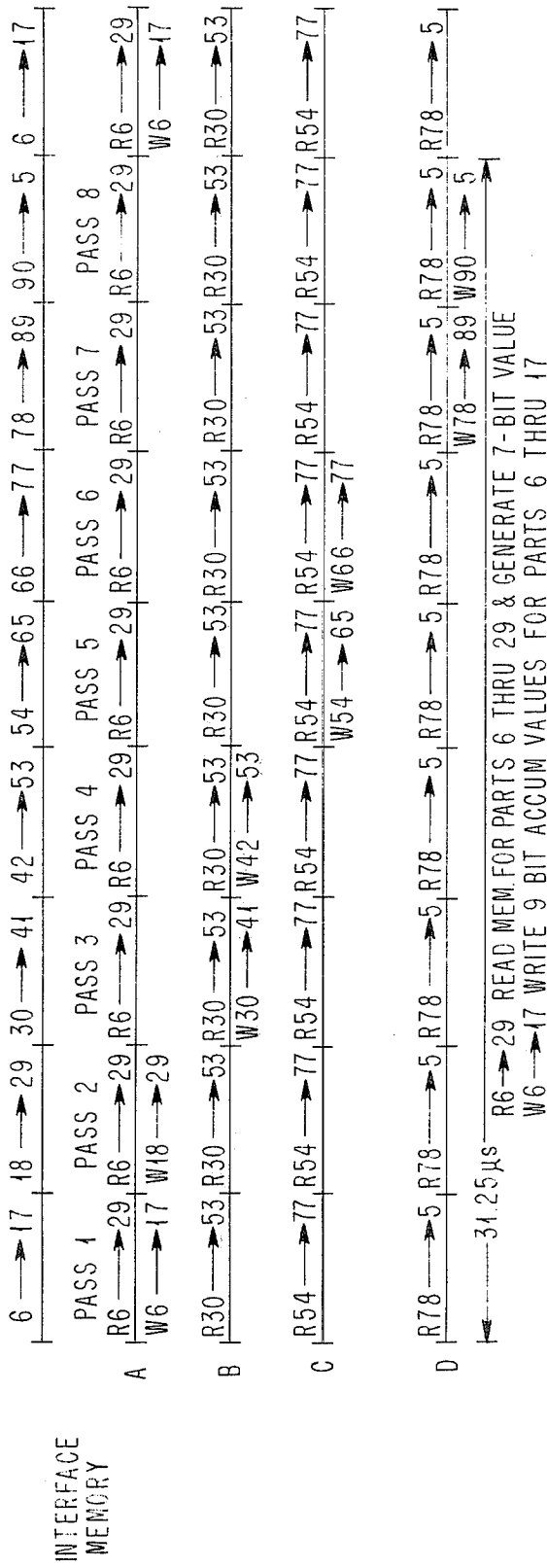

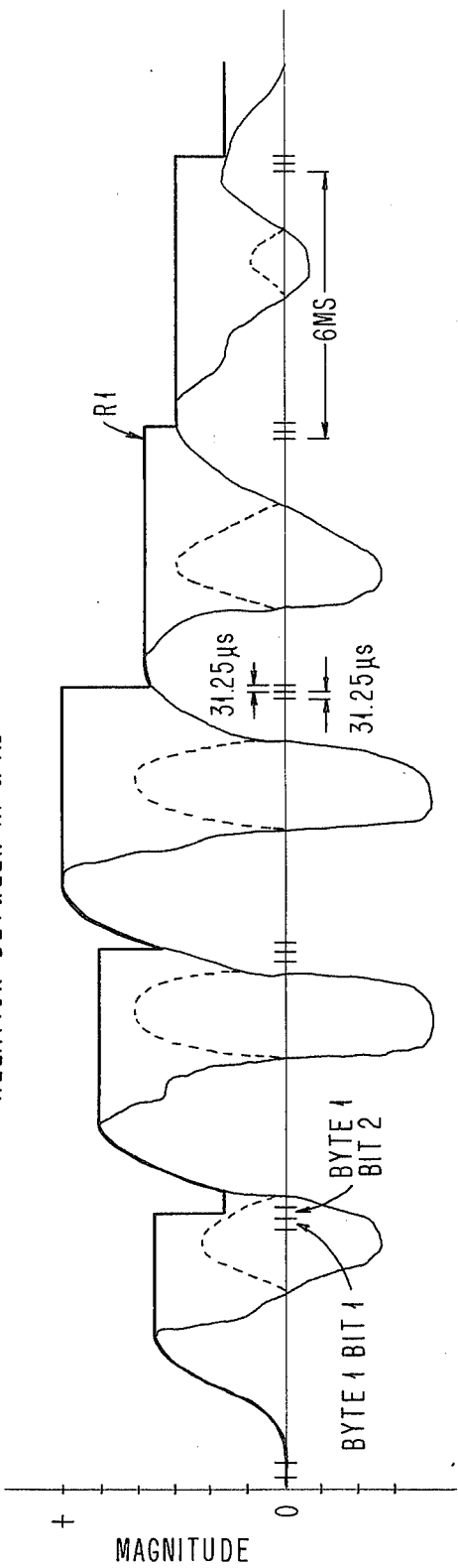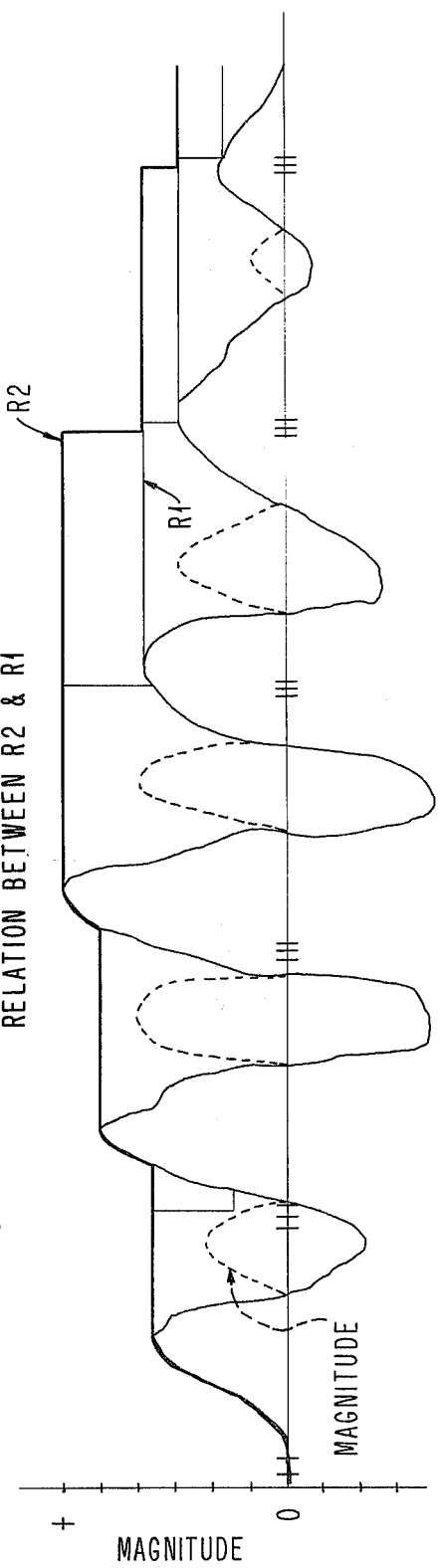

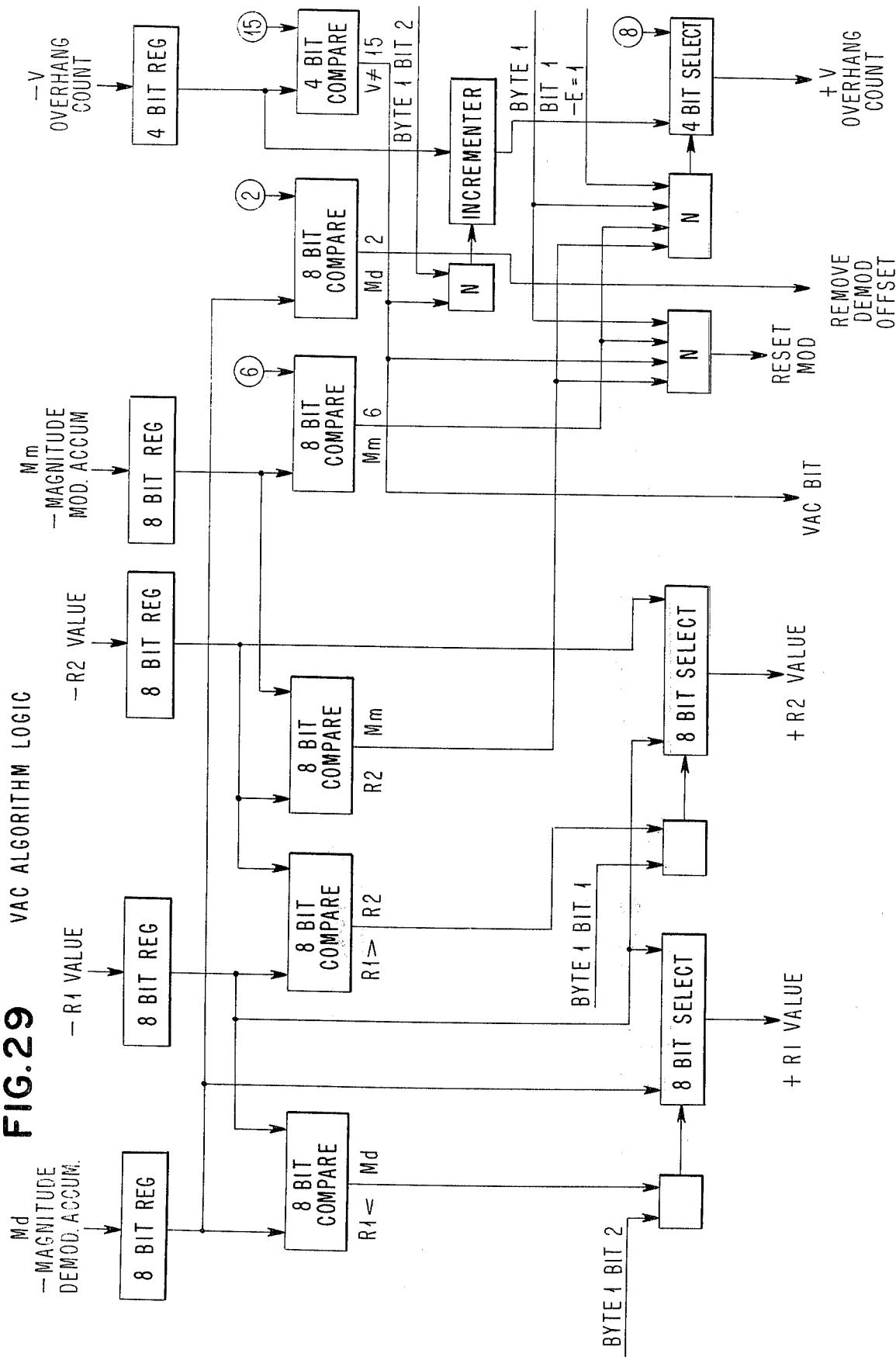
FIG. 29 VAC ALGORITHM LOGIC

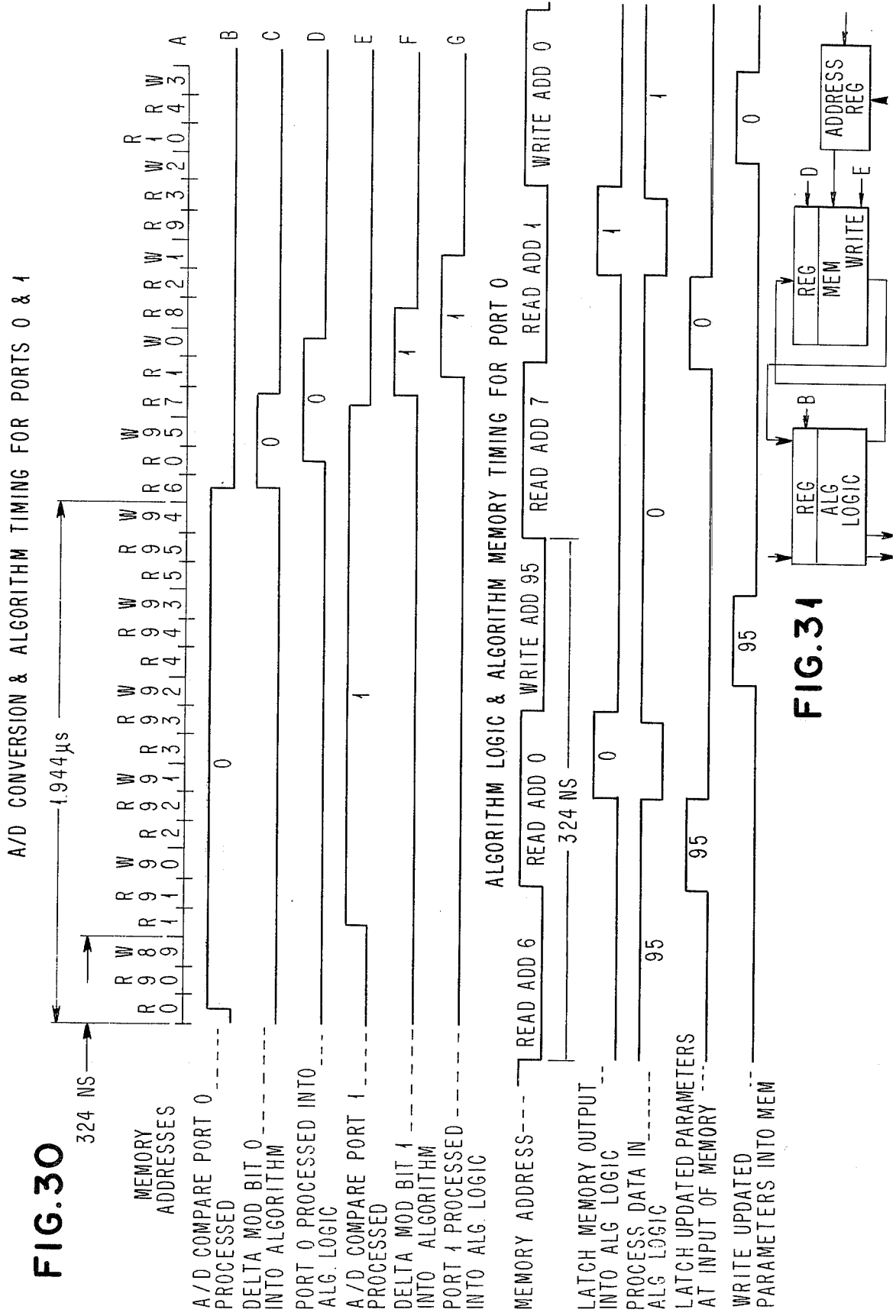

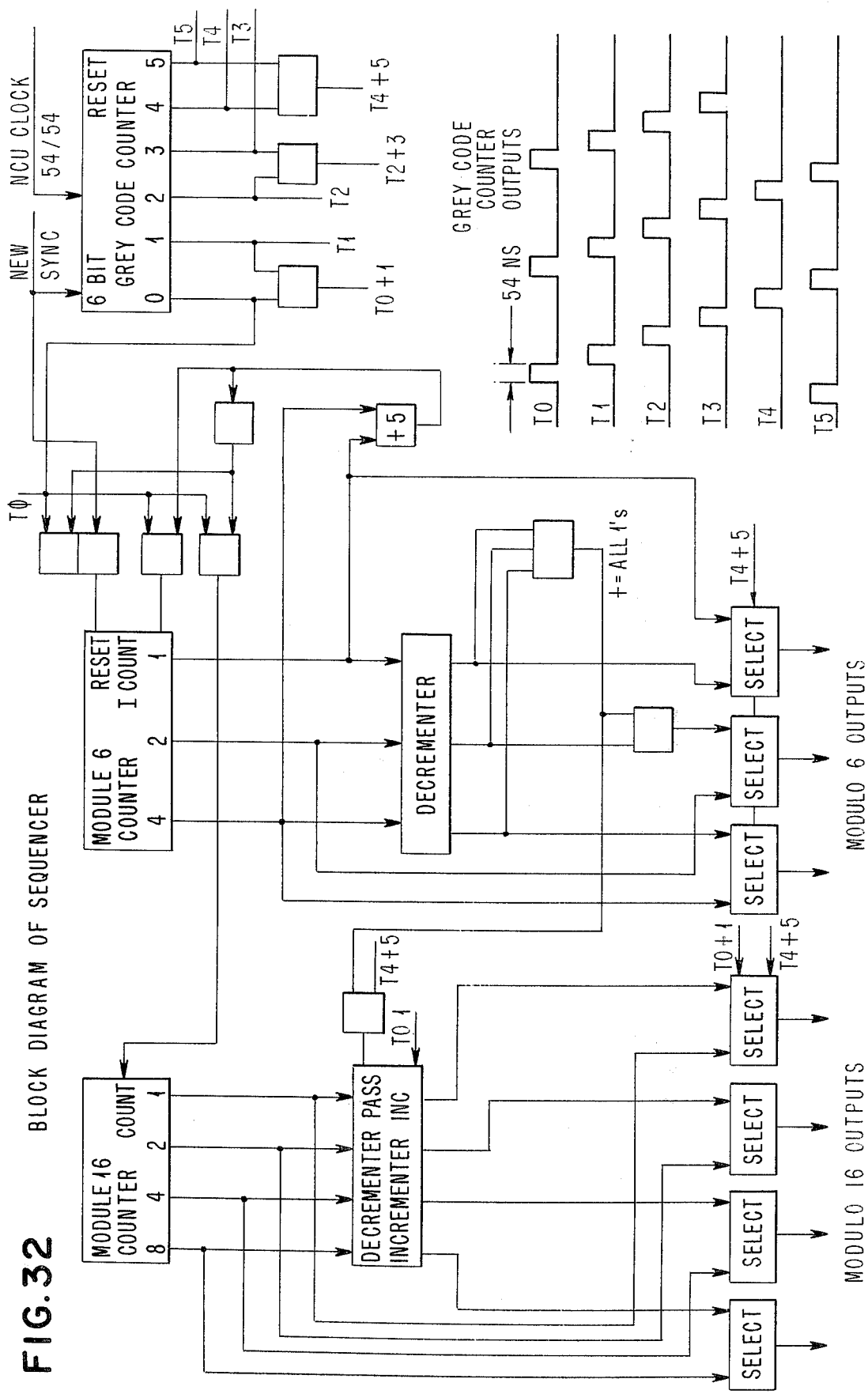
FIG.32 BLOCK DIAGRAM OF SEQUENCER

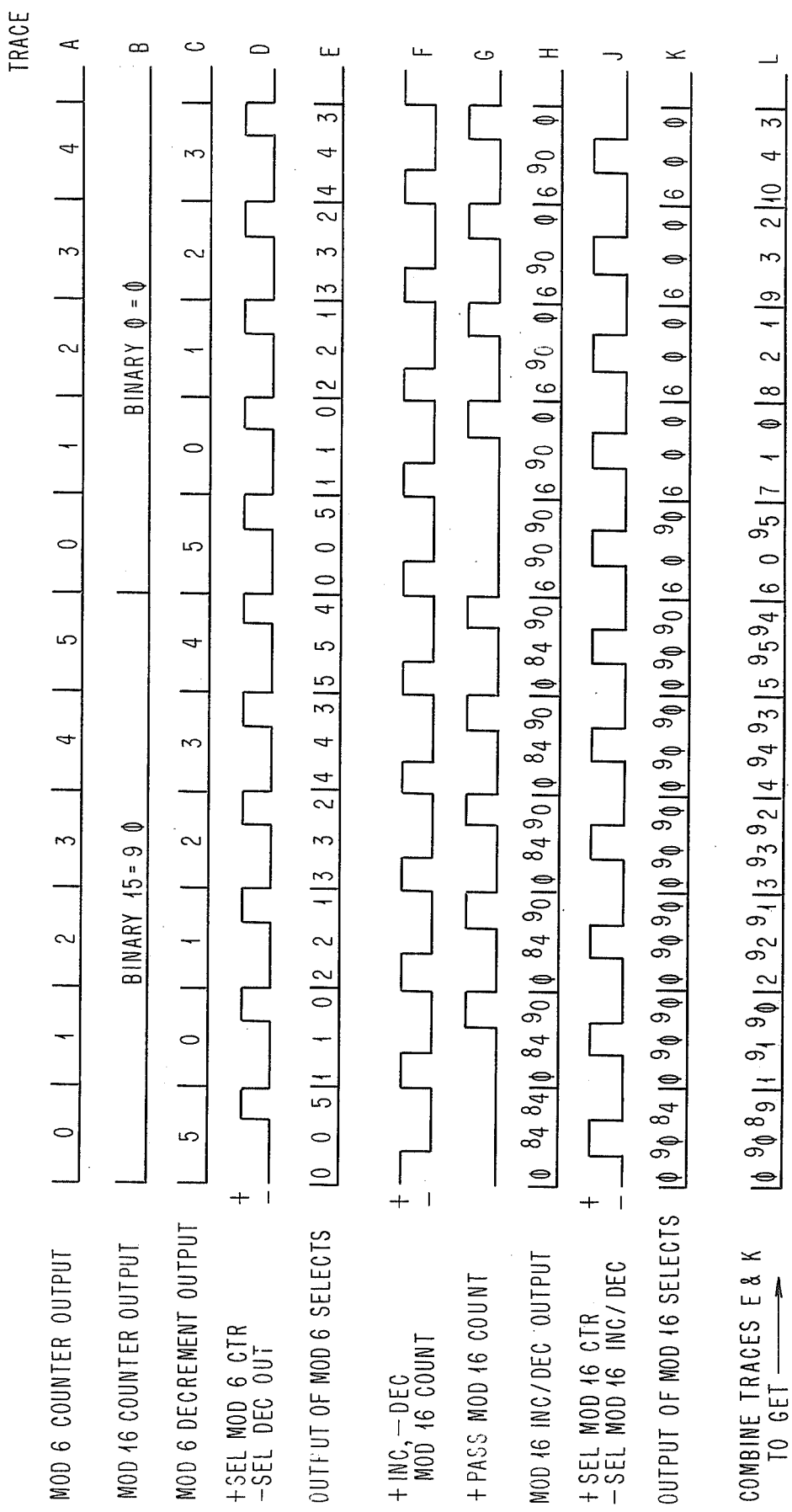

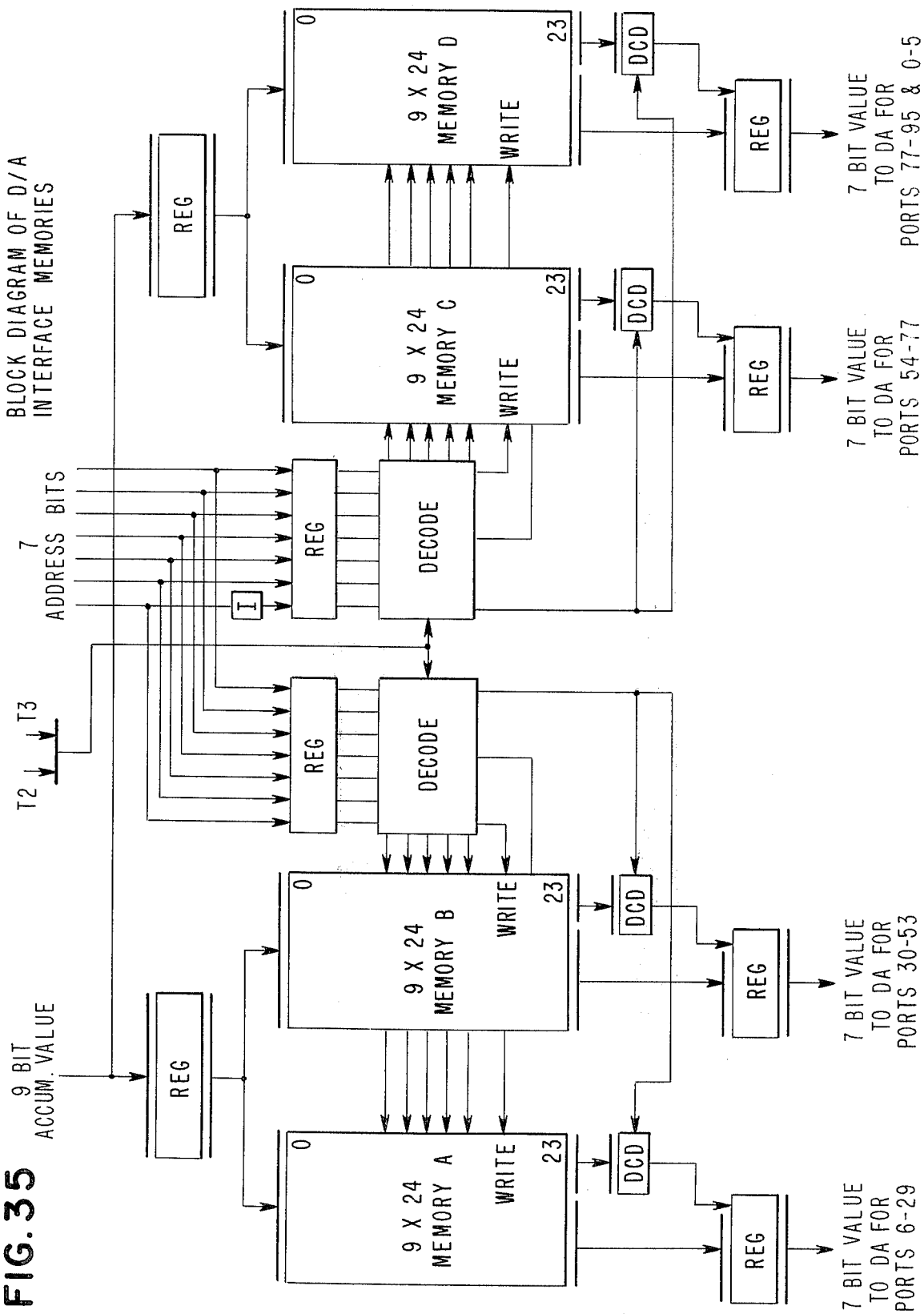
FIG. 35 BLOCK DIAGRAM OF D/A INTERFACE MEMORIES

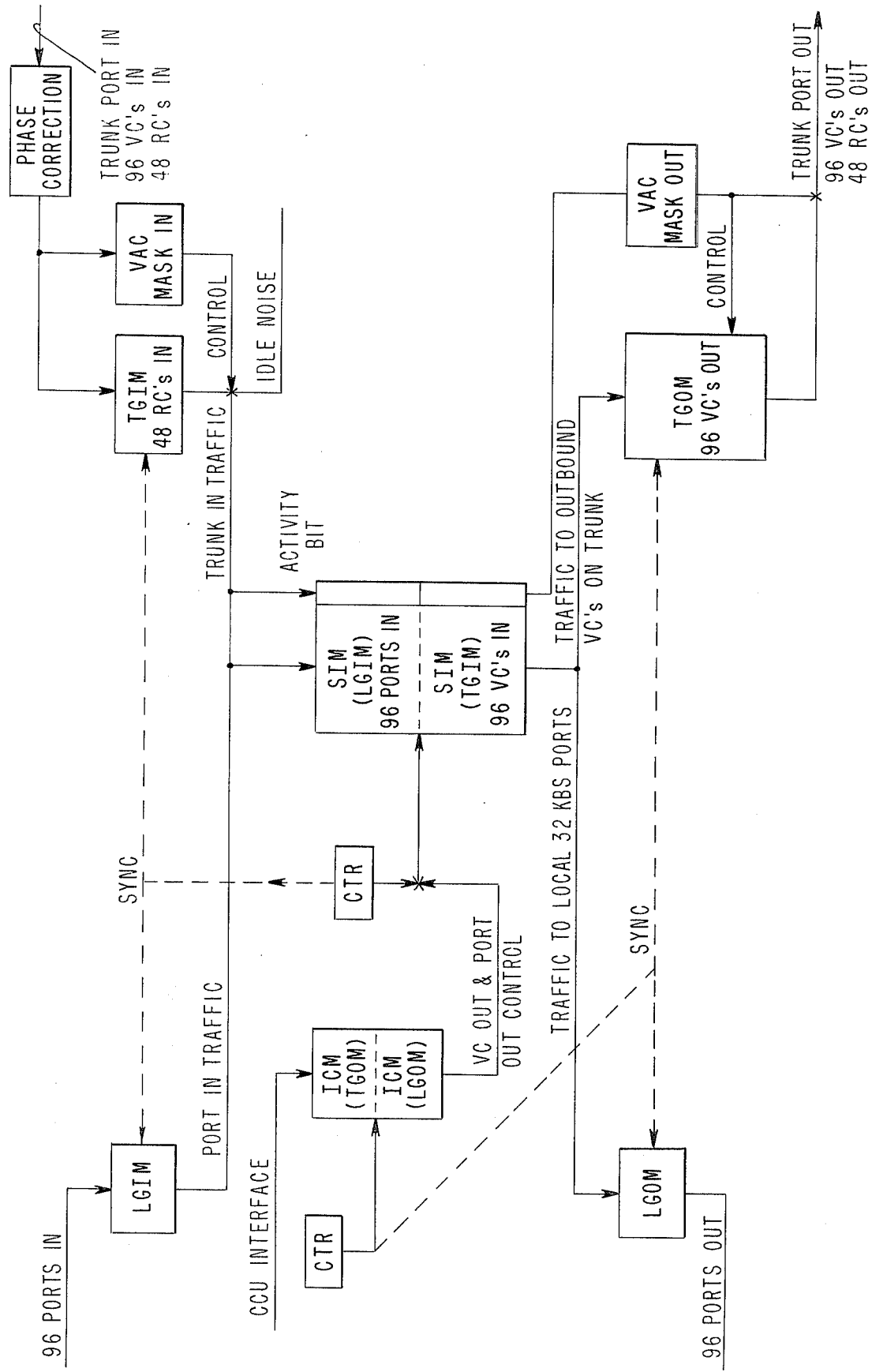
FIG. 38 DIGITAL SWITCH (ONE MODULE)

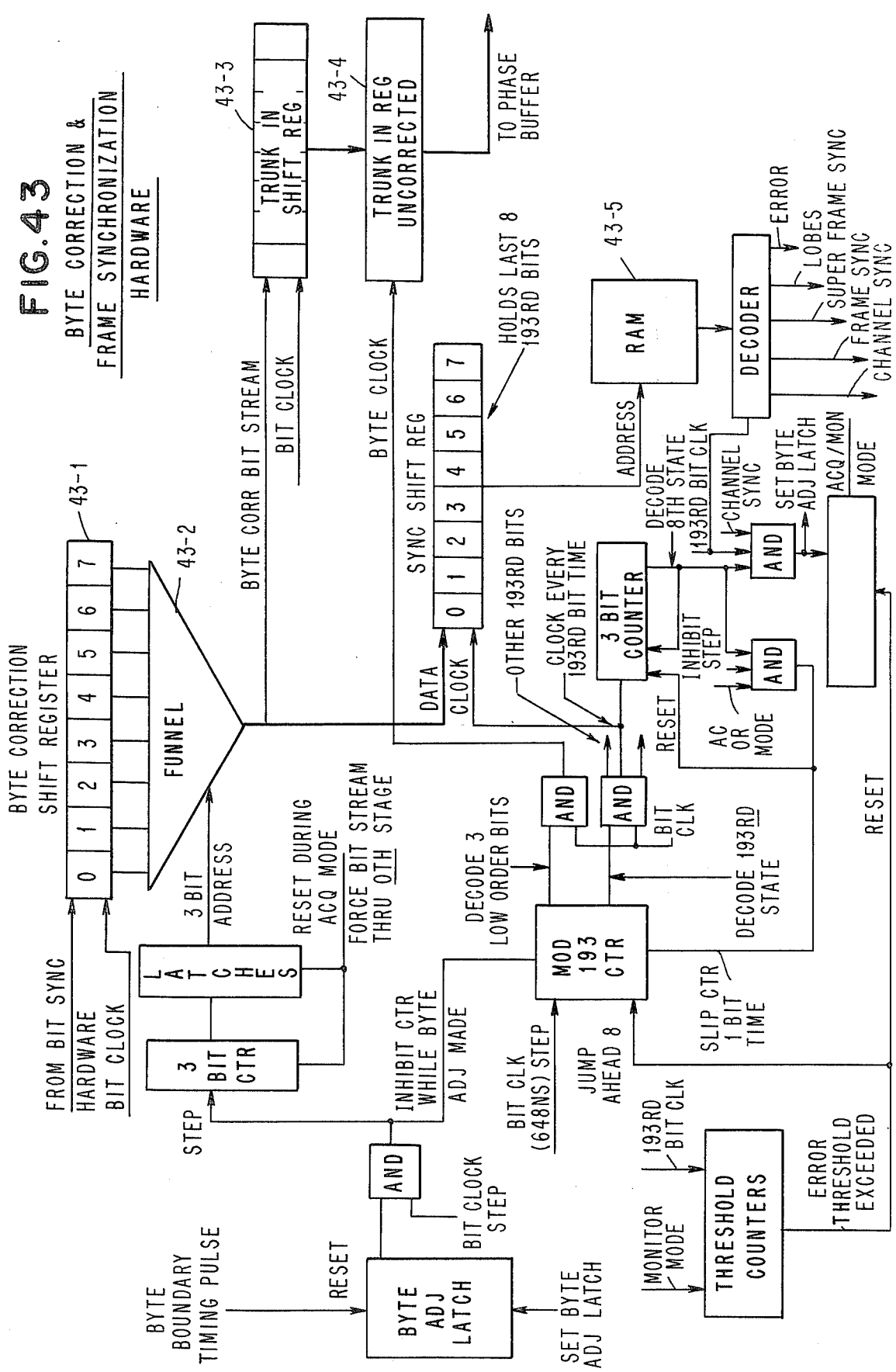
FIG.43 BYTE CORRECTION & FRAME SYNCHRONIZATION HARDWARE

FIG. 44

SYNCHRONIZATION HARDWARE

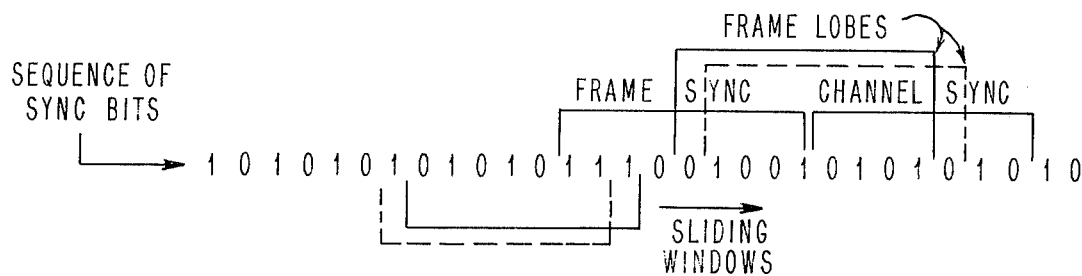

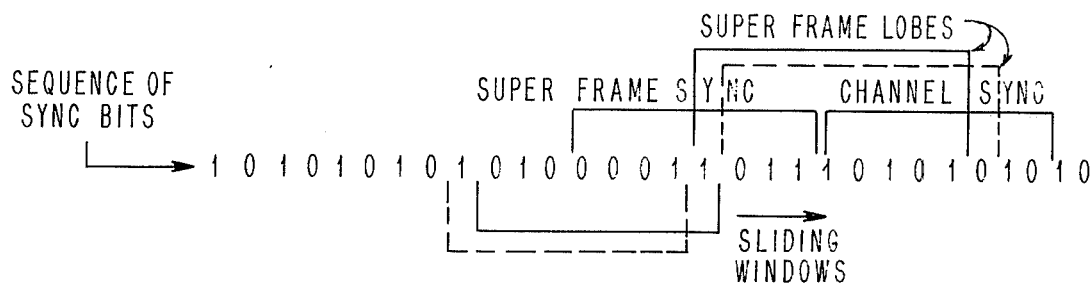

EXAMPLE OF FRAME SYNC

```
                              ┌─ BIT IN ERROR
                              ↓
SINGLE ERROR:    1 0 1 0 0 1 0 0
                 1 1 1 0 1 0 0 0
                     └─────┘
                  BITS IN ERROR
```

| | |
|---|---|
| CHANNEL SYNC ─────────── | 0 |
| CHANNEL SYNC SINGLE ERROR ── | 1 |
| CHANNEL SYNC DOUBLE ERROR ── | 2 |
| FRAME SYNC ─────────── | 3 |
| FRAME SYNC SINGLE ERROR ── | 4 |
| FRAME SYNC DOUBLE ERROR ── | 5 |
| SUPER FRAME SYNC ─────── | 6 |
| SUPER FRAME SYNC SINGLE ERROR ── | 7 |
| SUPER FRAME SYNC DOUBLE ERROR ── | 8 |
| FRAME LOBES ─────────── | 9 |
| SUPER FRAME LOBES ─────── | 10 |
| ERROR PATTERNS ─────── | 11 |

RAM CONTENTS

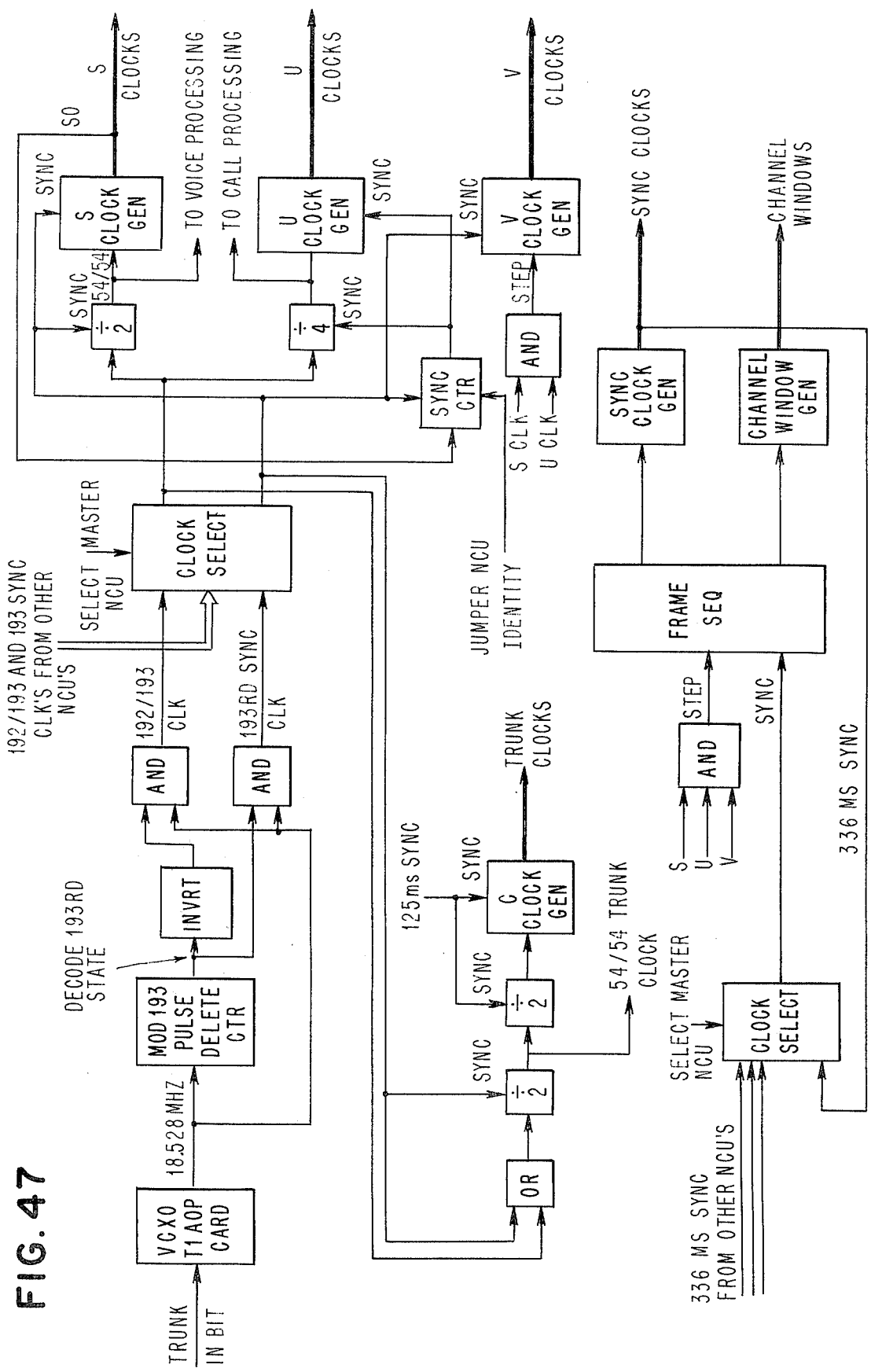

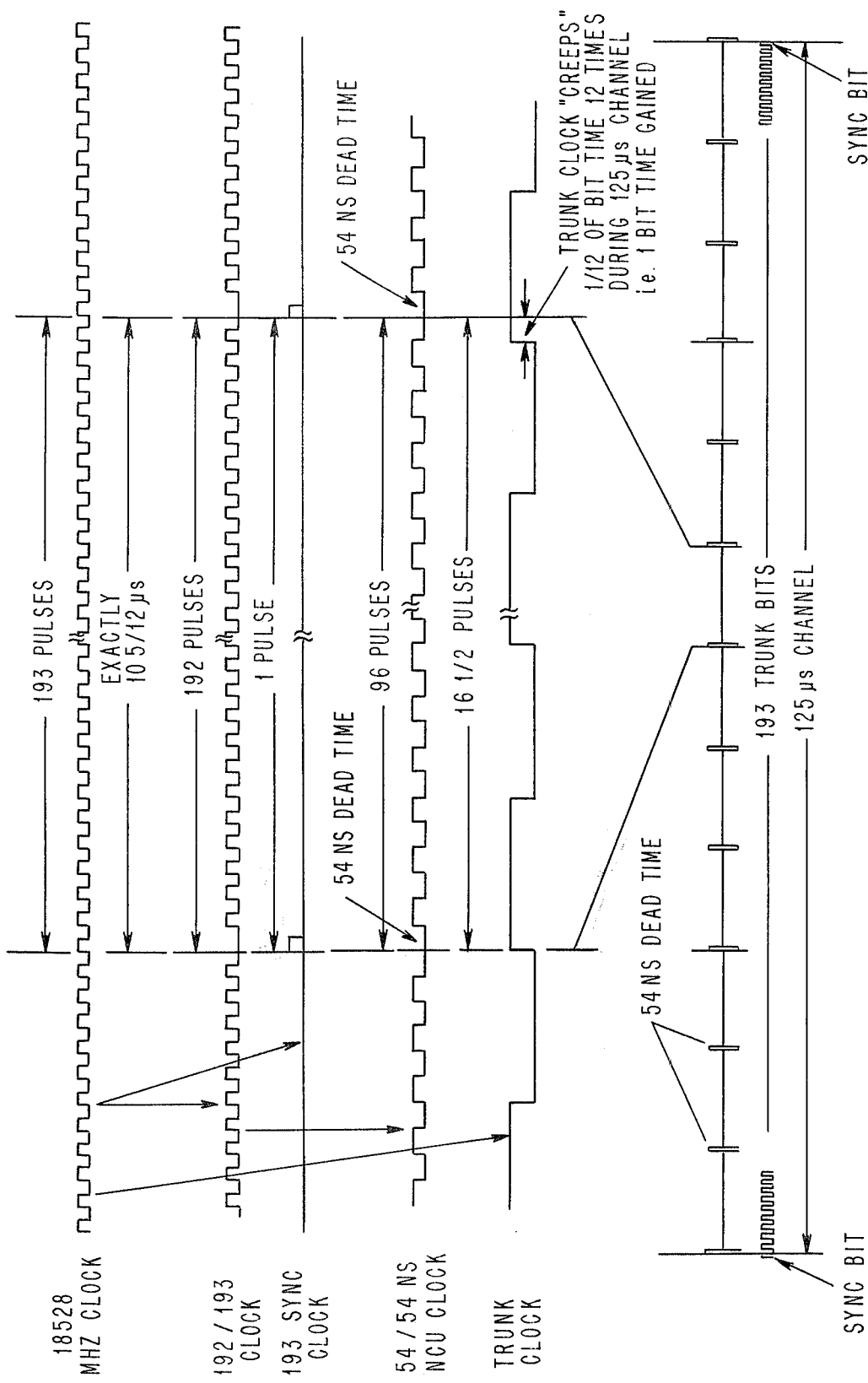

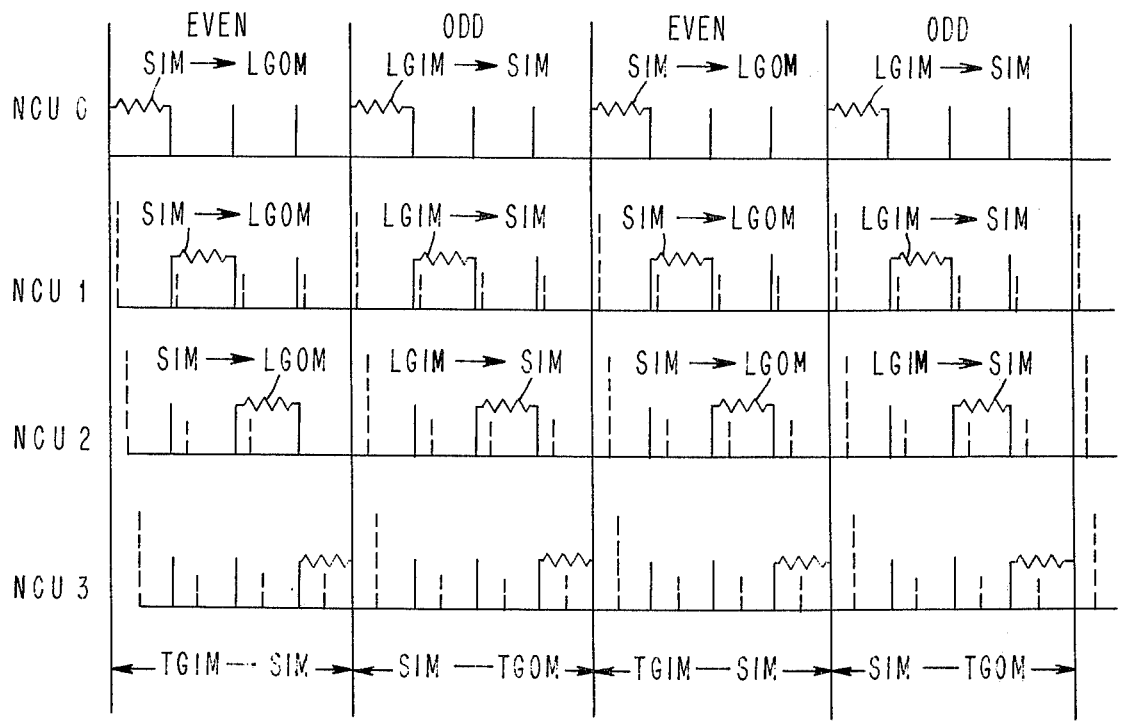
FIG.49 MULTIPLE NCU FRAME STRUCTURE
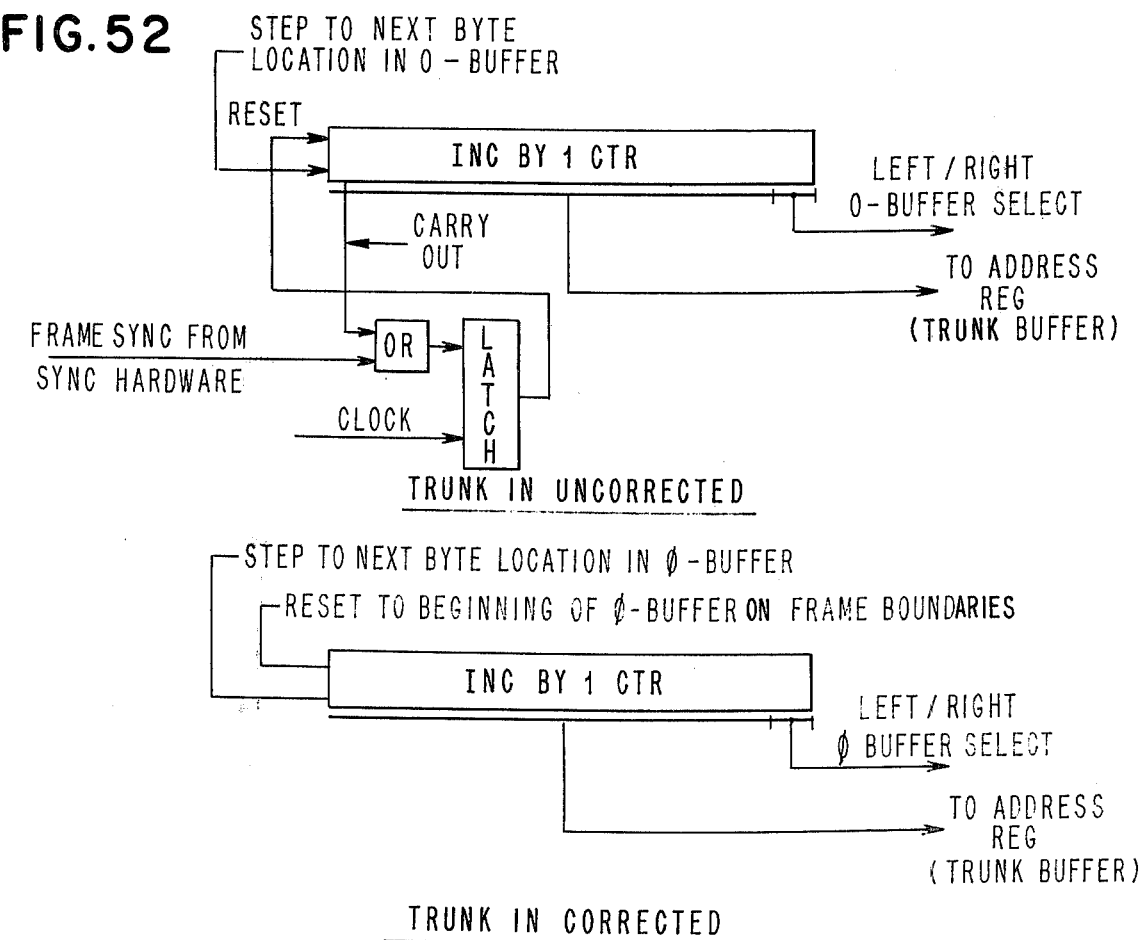
FIG.52

FIG. 50

TRUNK BUFFER

STARTING ADDRESS (HEX)

| | | |
|---|---|---|
| 000 | VCO-95 BYTE GROUP 0 | VCO-95 BYTE GROUP 0 |
| | VCO-95 BYTE GROUP 1 | 1 |
| | 2 | 2 |
| | 3 | |
| | TGOM A | TGOM B |
| | 22 | 22 |
| 900 | VCO-95 BYTE GROUP 23 | VCO-95 BYTE GROUP 23 |
| | RCO-47 BYTE GROUP 0 | RCO-47 BYTE GROUP 0 |
| | 1 | 1 |
| | 2 | 2 |
| | TGIM A | TGIM B |
| | 22 | 22 |
| | RCO-47 BYTE GROUP 23 | RCO-47 BYTE GROUP 23 |
| | SPARE | SPARE |
| DC0 | BYTE 0 | BYTE 1 |
| | 2 | 3 |
| | 4 | 5 |
| | PHASE BUFFER | |
| | 1148 | 1149 |
| | 1150 | 1151 |

VC OUT BYTE GROUP 1

| VCO BYTE |
|---|
| 1 |
| 2 |
| 3 |
| 94 |
| 95 |

RC BYTE GROUP

| RCO BYTE |
|---|
| 1 |
| 2 |
| 46 |
| 47 |

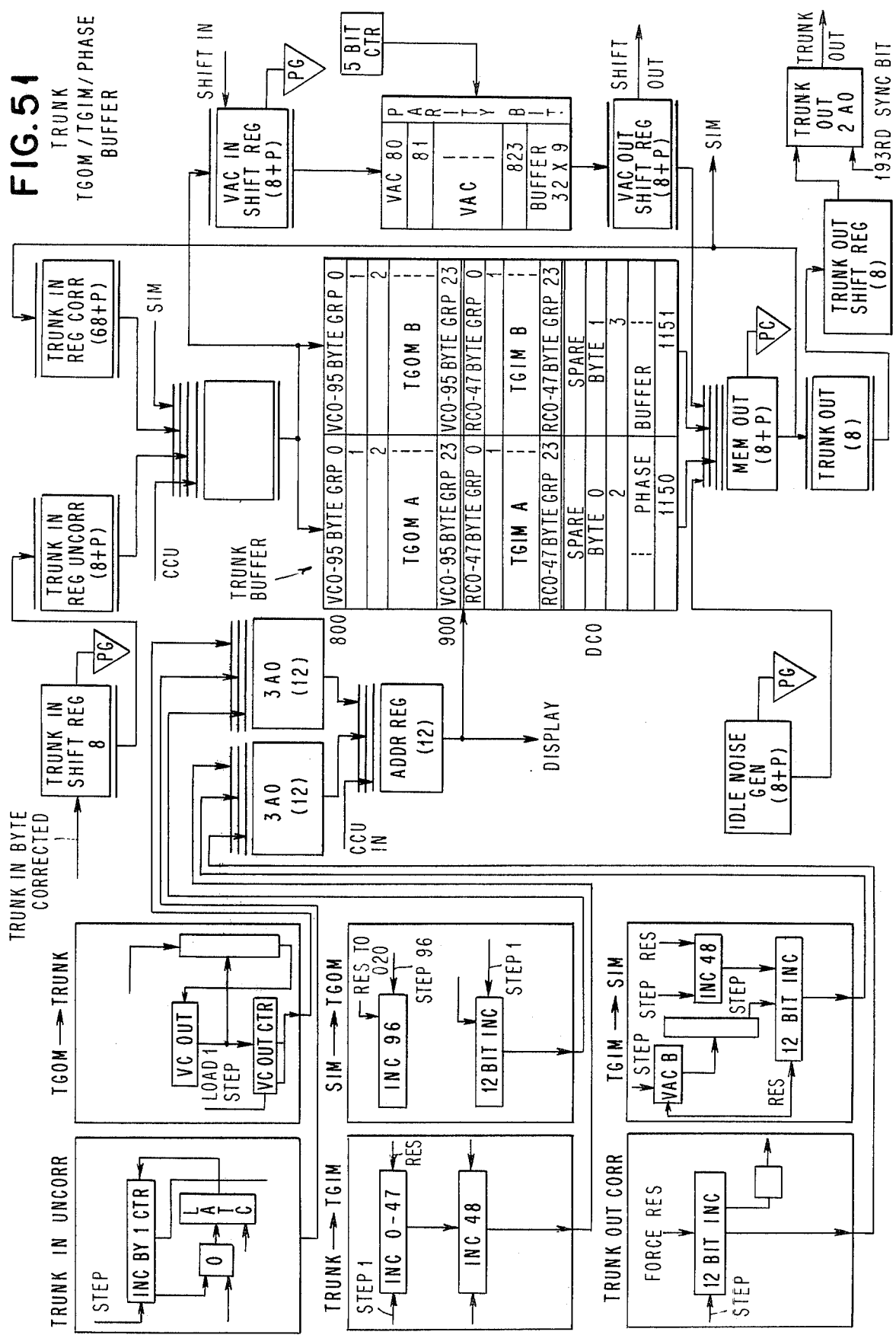
FIG. 51 TRUNK TGOM/TGIM/PHASE BUFFER

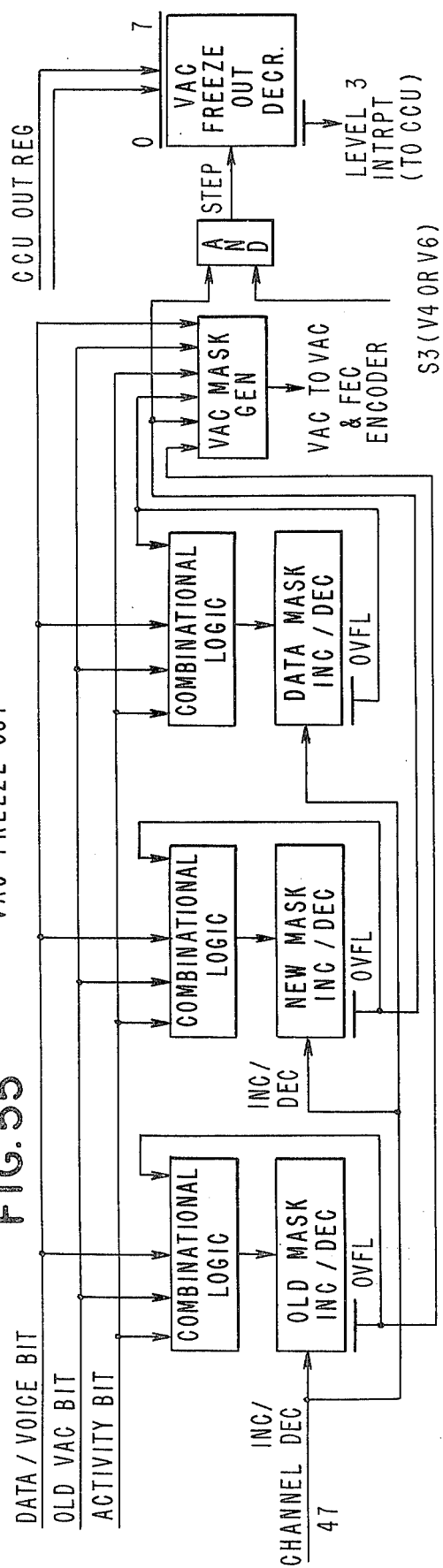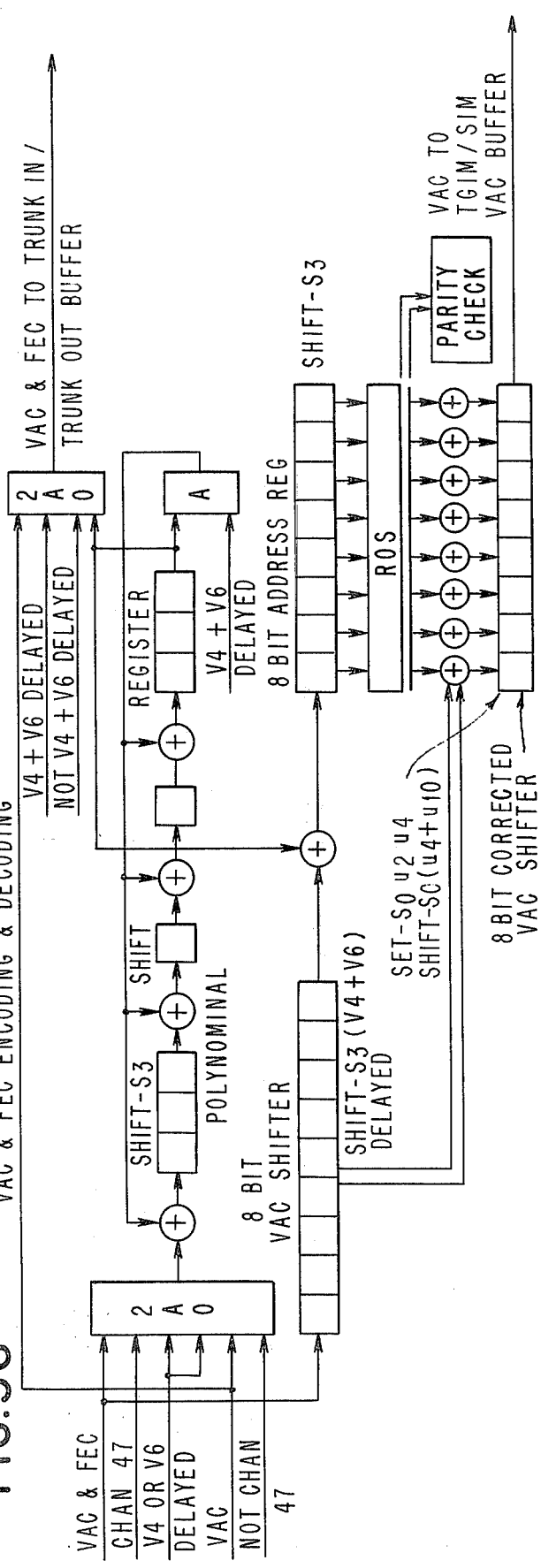

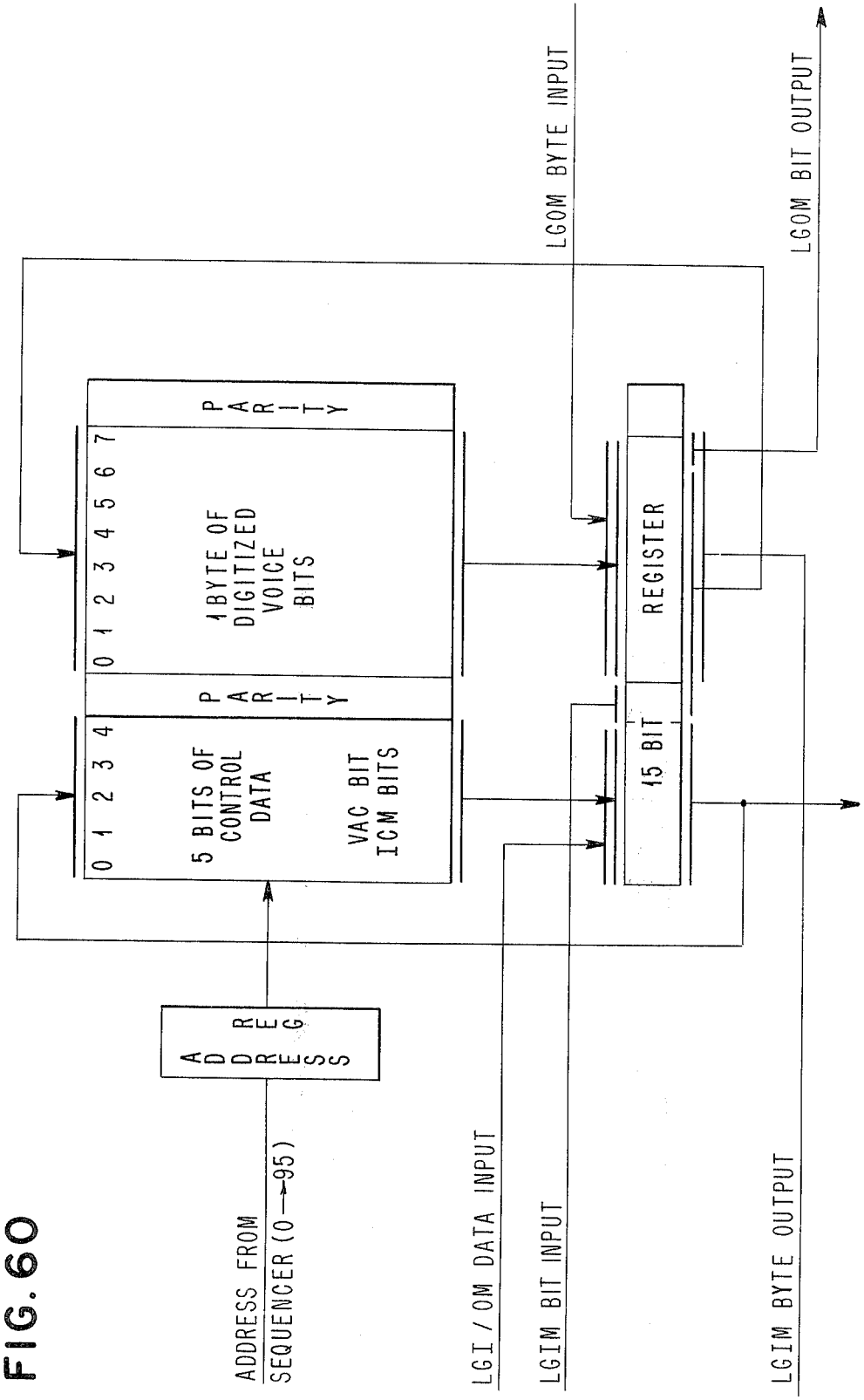

FIG. 65   IF MODULATOR INTERFACES
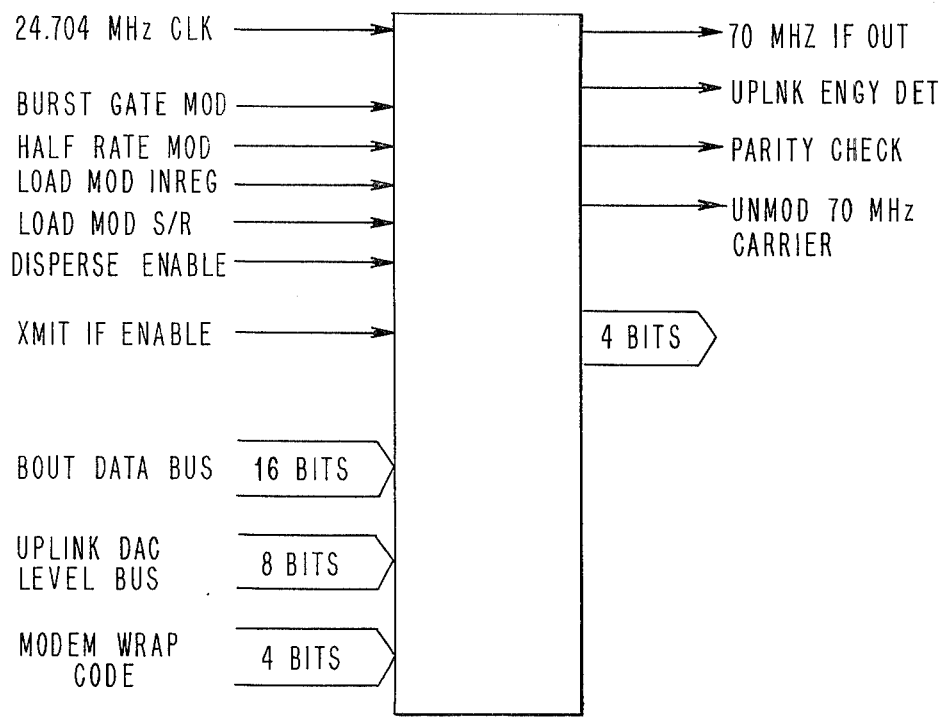
FIG. 66   RECOVERED CLK & SYNC DATA
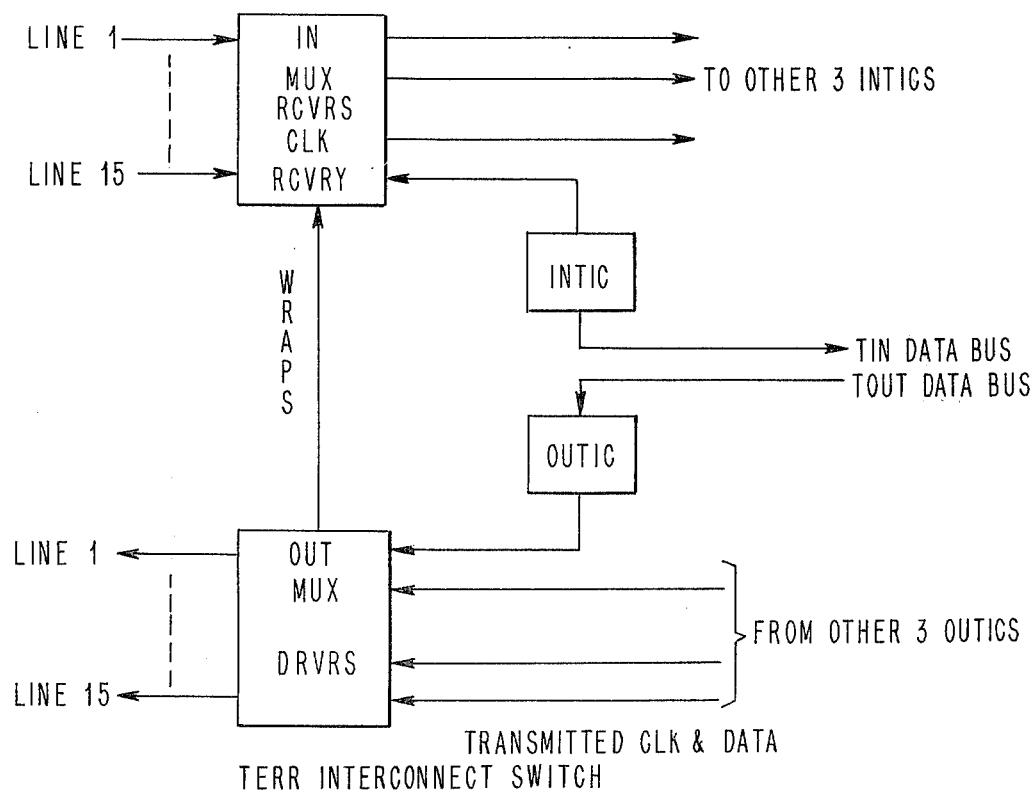

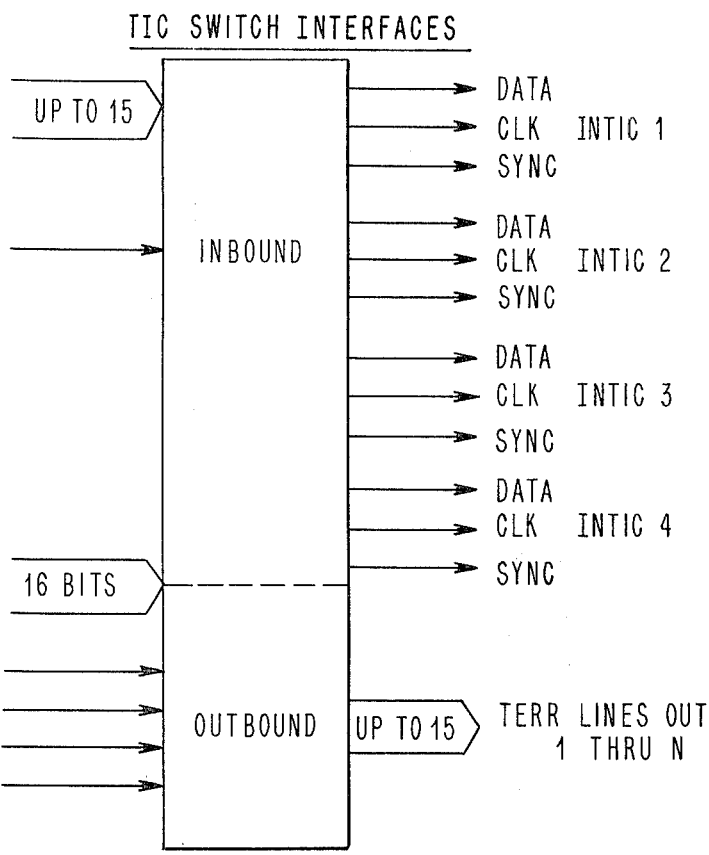
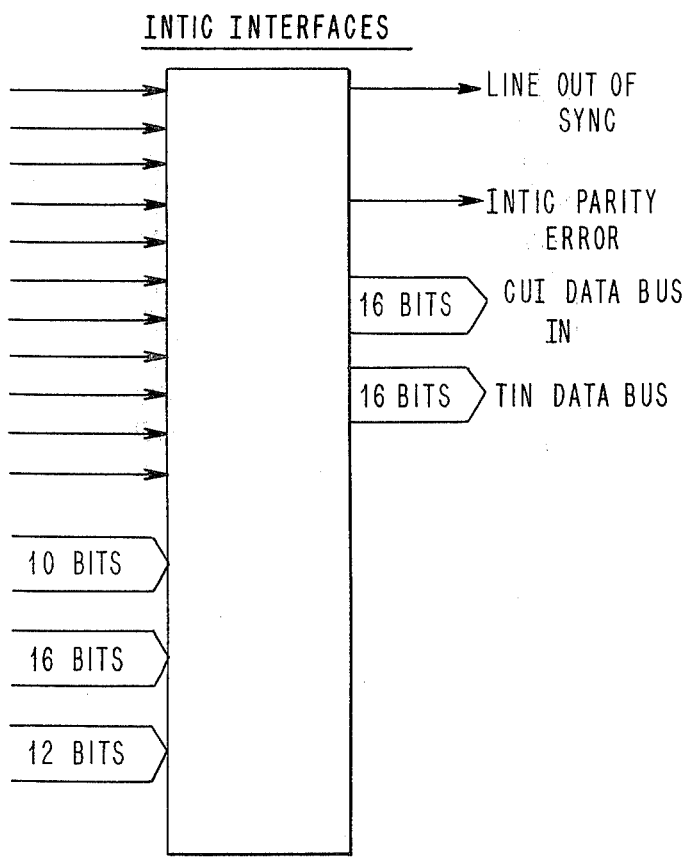

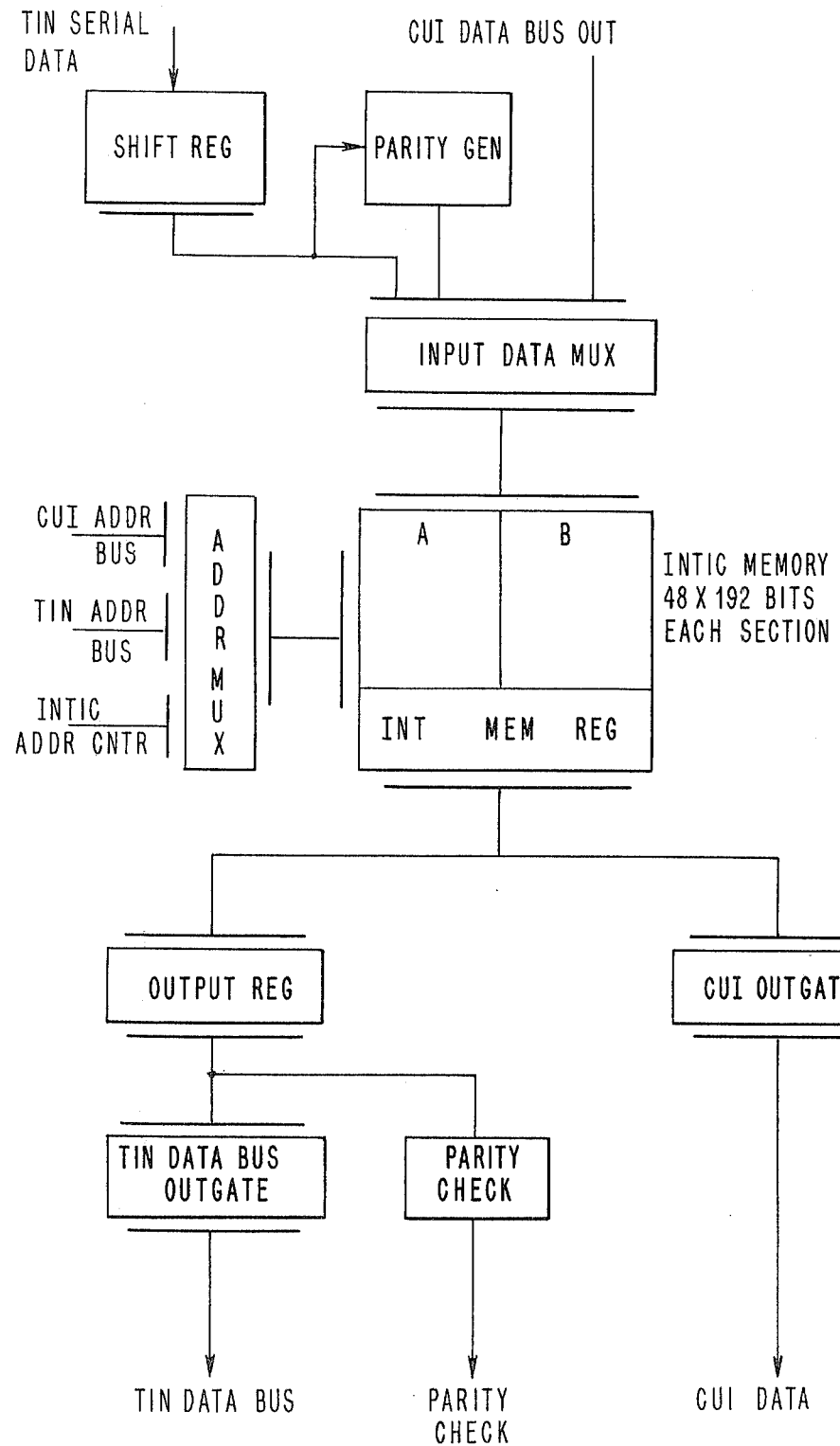
FIG. 68    BASIC INTIC DATA FLOW

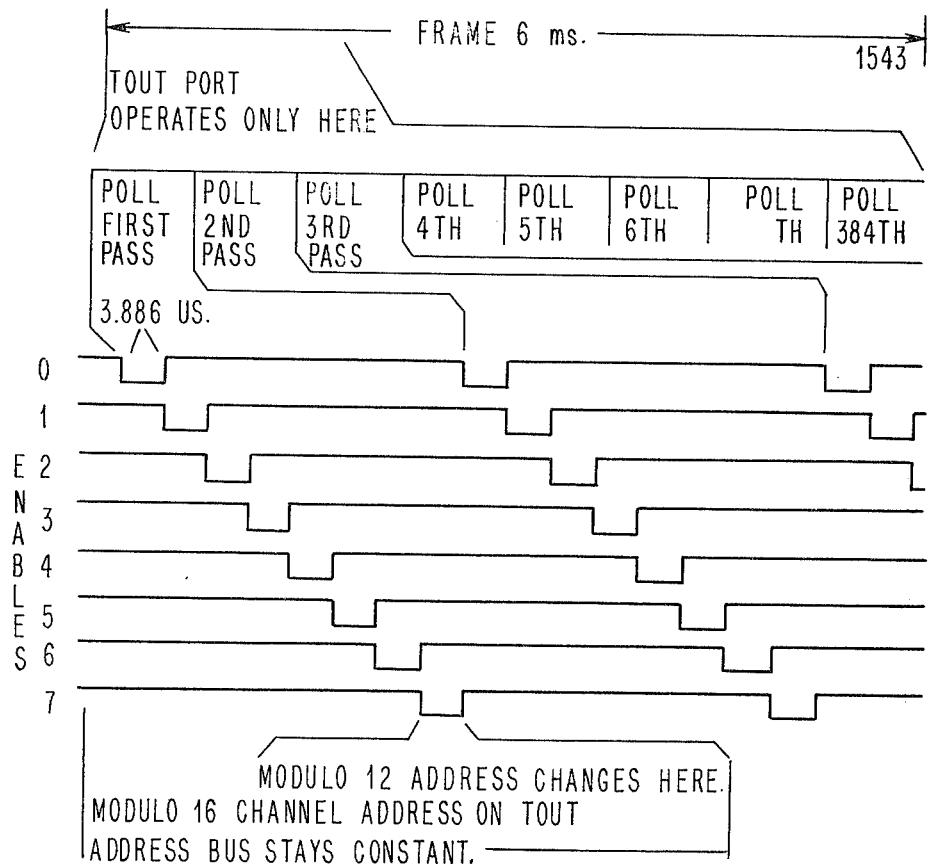
FIG. 74 TOUT PORT TIMING
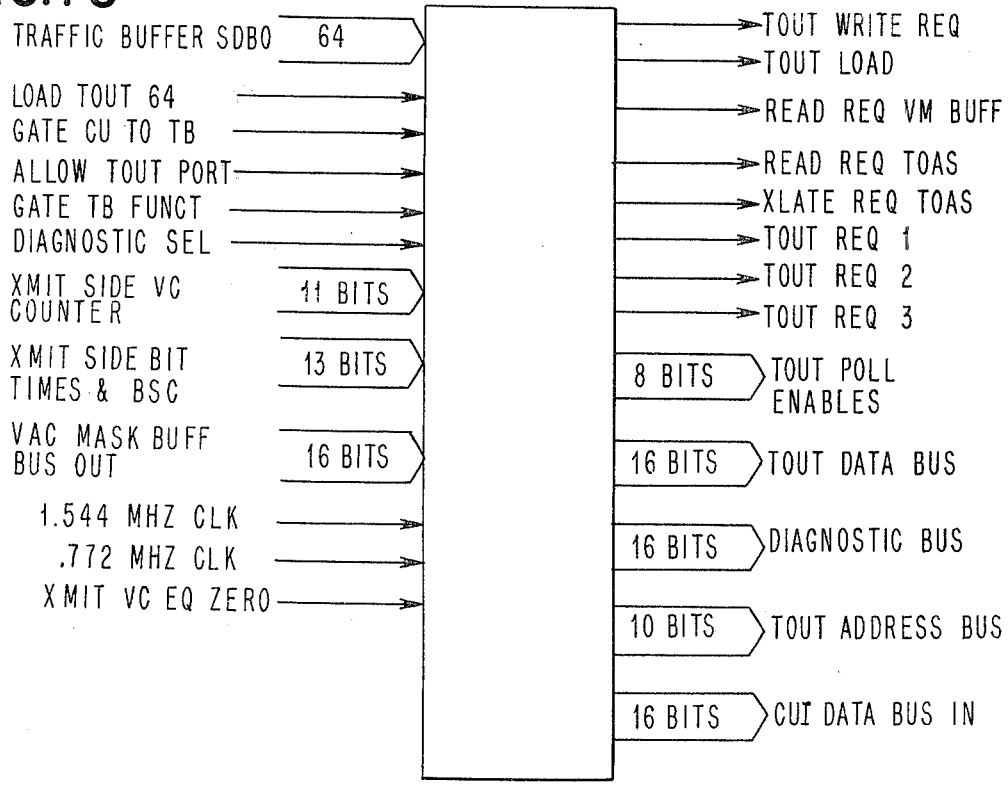
FIG. 75

FIG. 78   ELASTIC BUFFER INTERFACES
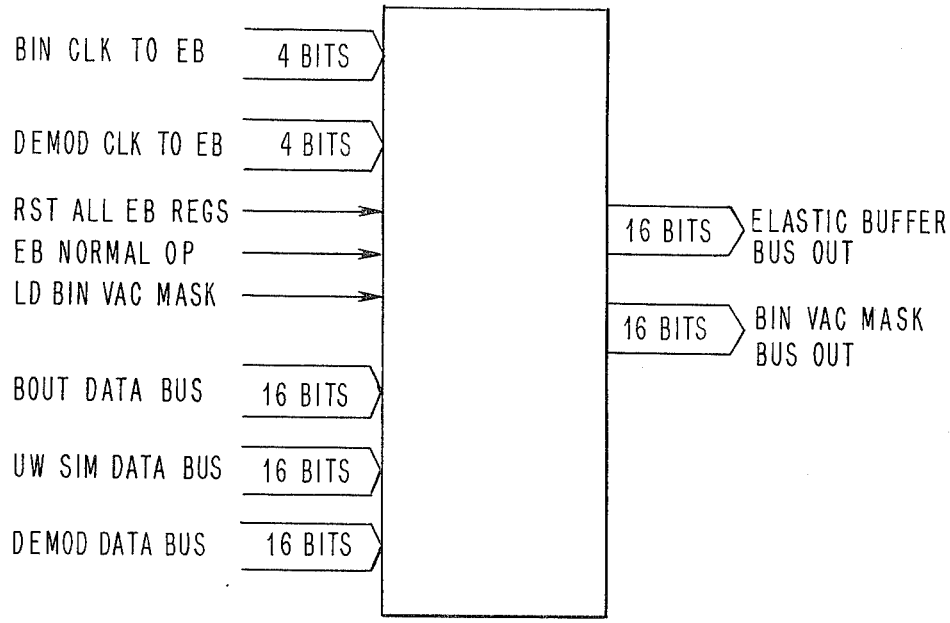
FIG. 79   TRAFFIC BUFFER INTERFACES
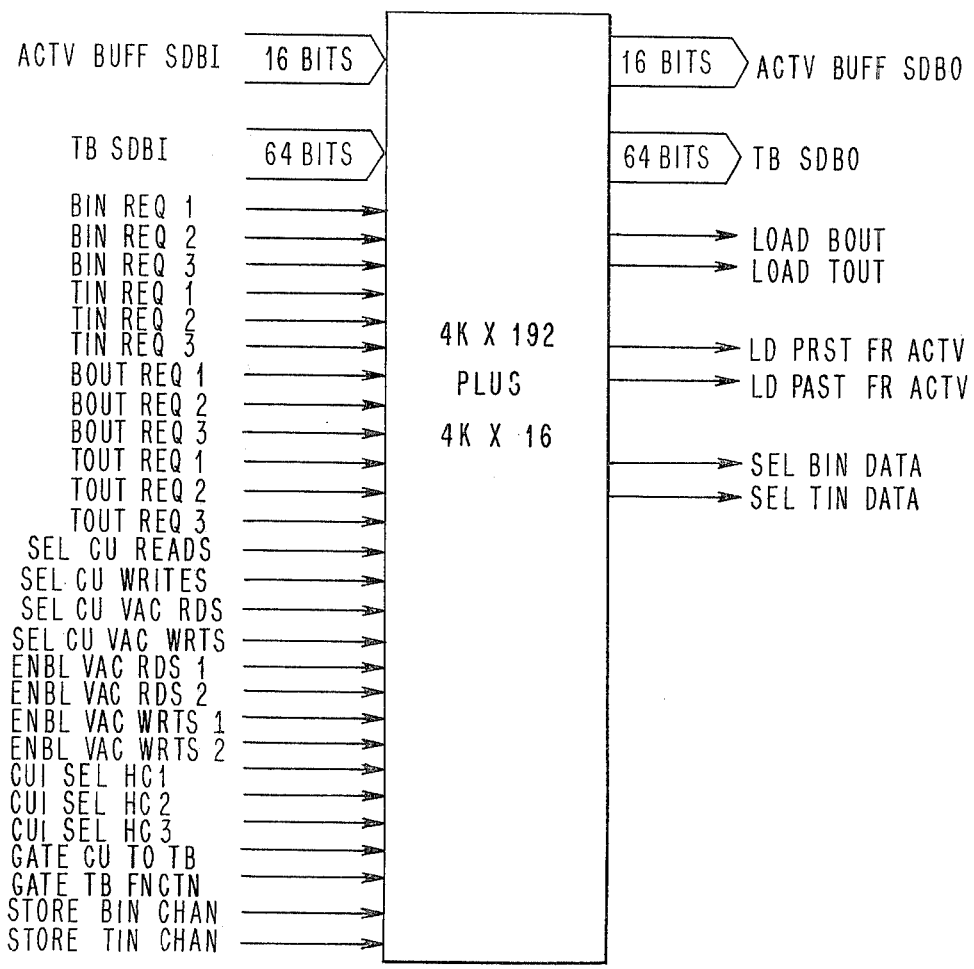

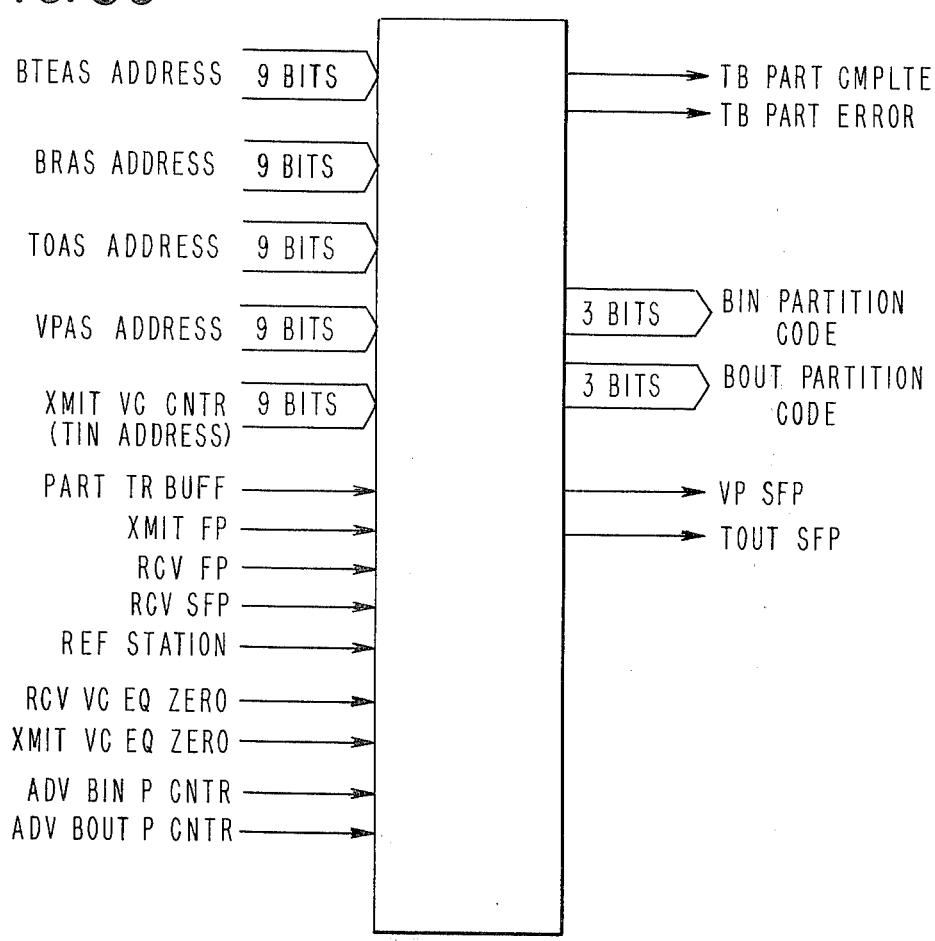
FIG. 80  TRAFFIC BUFFER INTERFACES
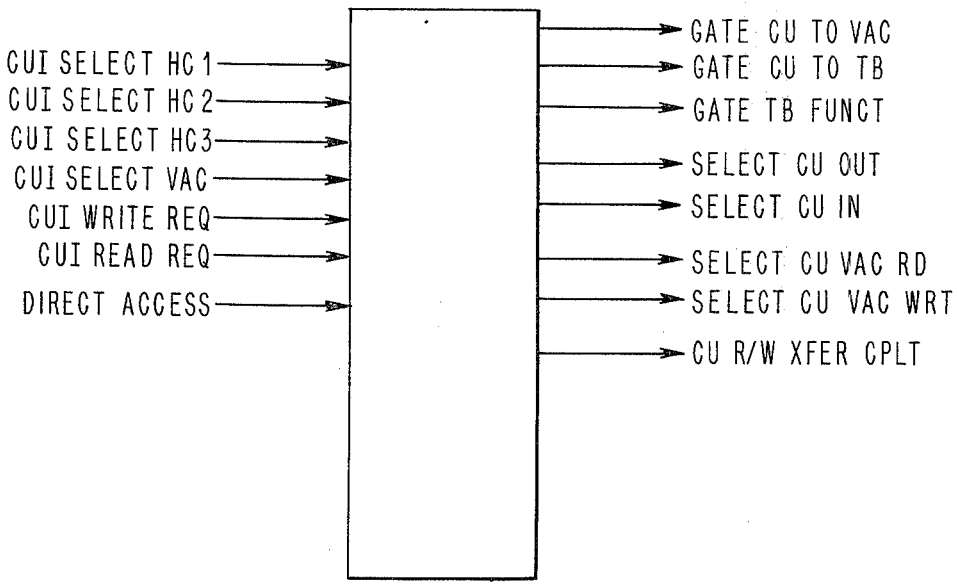
FIG. 81  TRAFFIC BUFFER INTERFACES

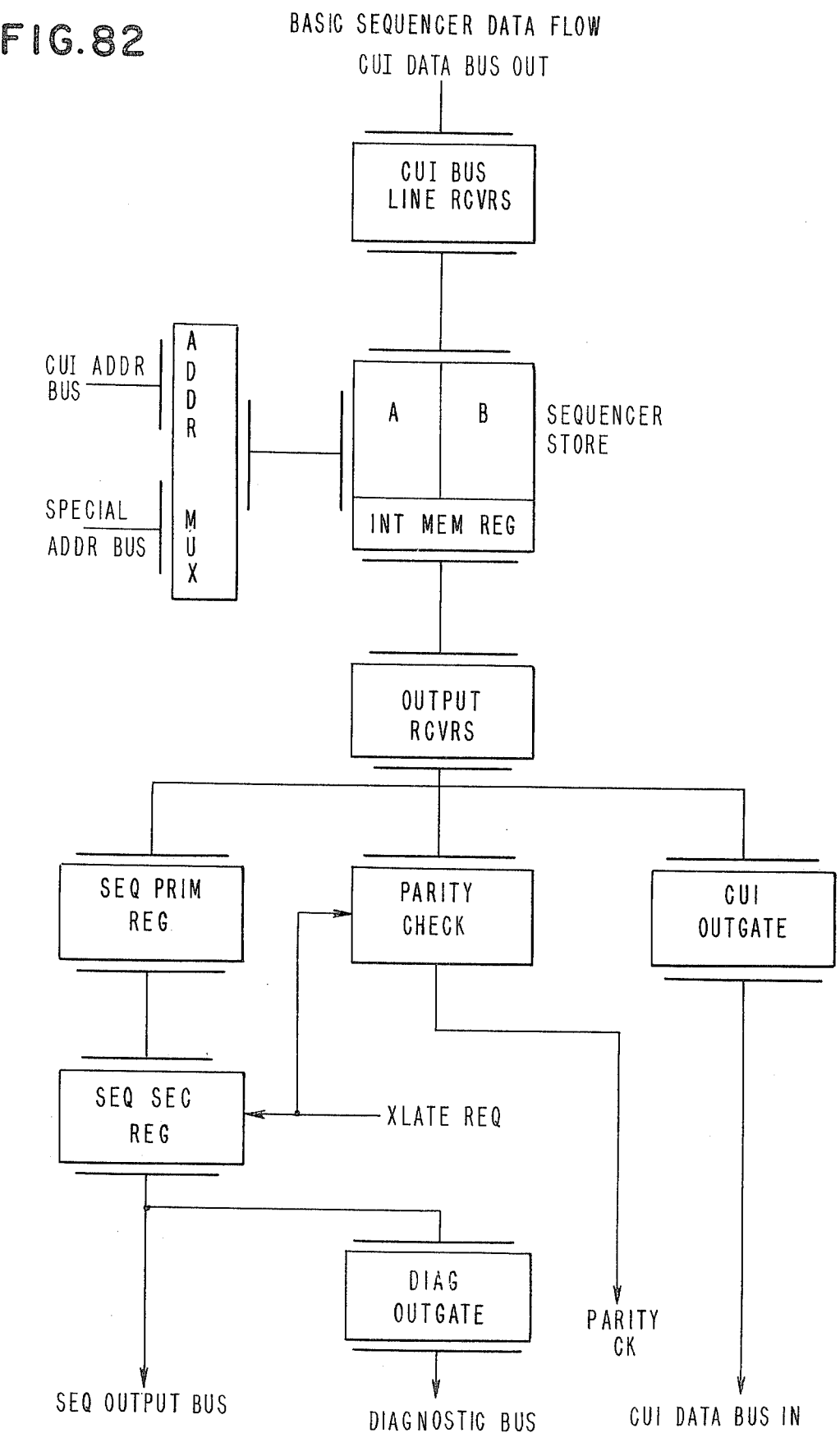
FIG.82  BASIC SEQUENCER DATA FLOW

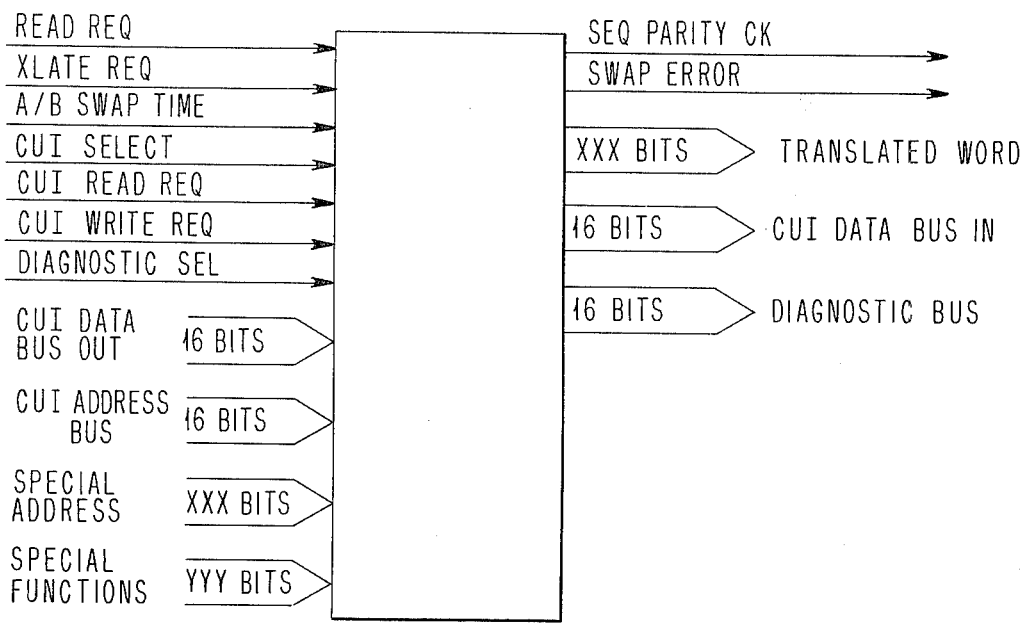
FIG. 83  BASIC SEQUENCER INTERFACE
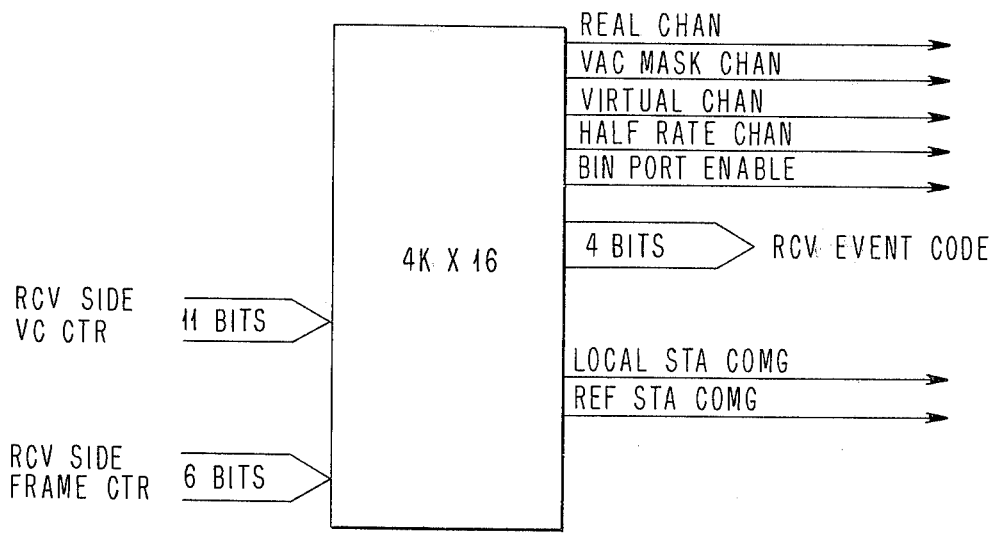
FIG. 84  BRES INTERFACE LINES FIG. 85   VPAS SPECIFIC INTERFACES
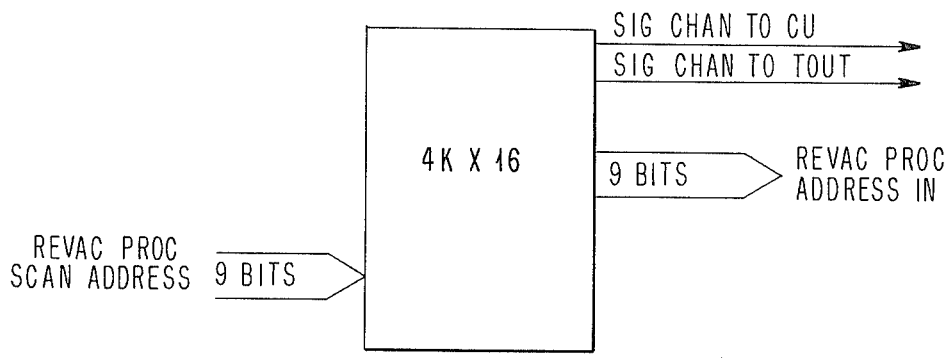
FIG. 86   TRANSMIT SIDE CLOCK GENERATION
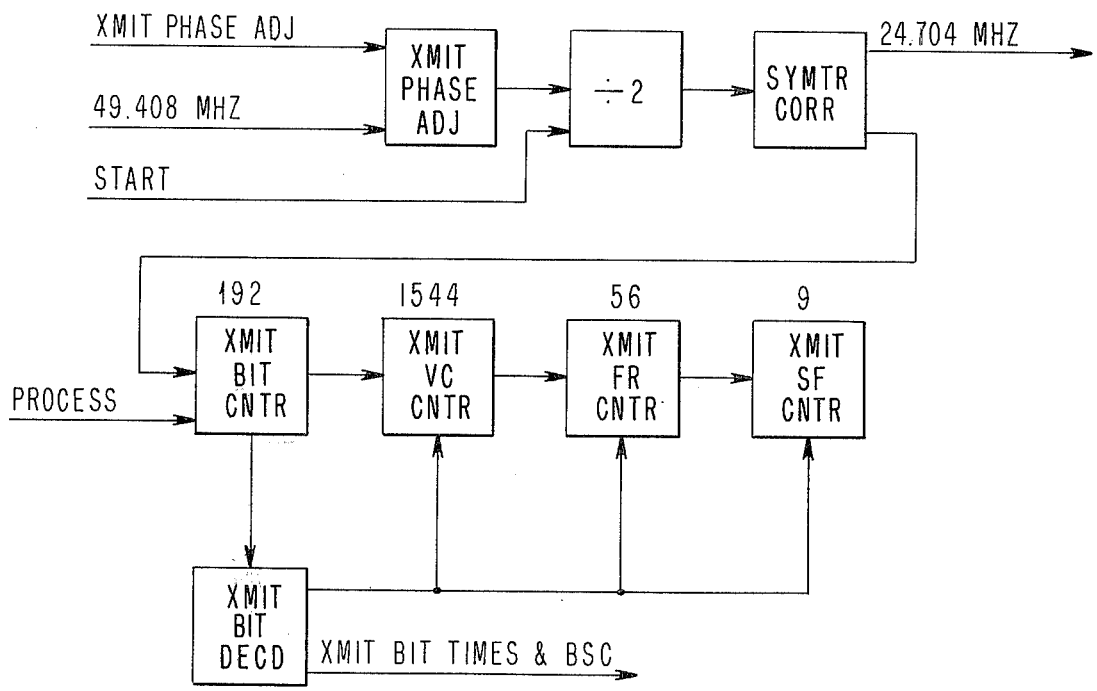

FIG. 87 RECEIVE SIDE CLOCK GENERATION
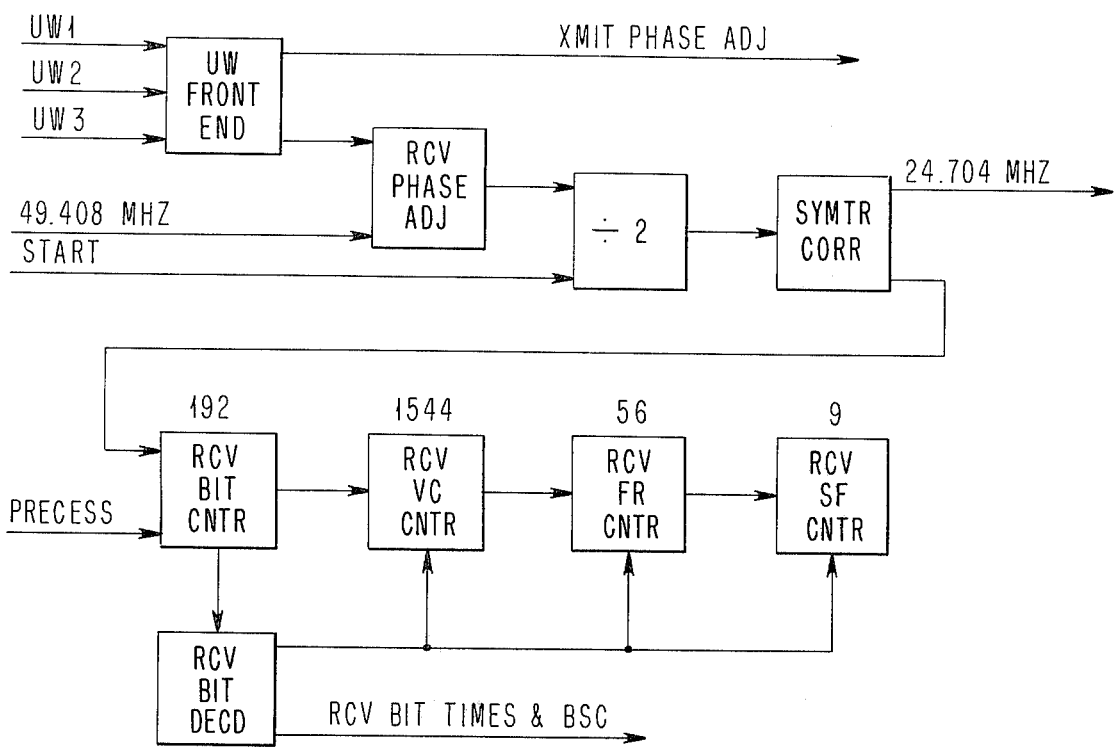
FIG. 88D RECEIVE ACQUISITION (PART 4 OF 4)
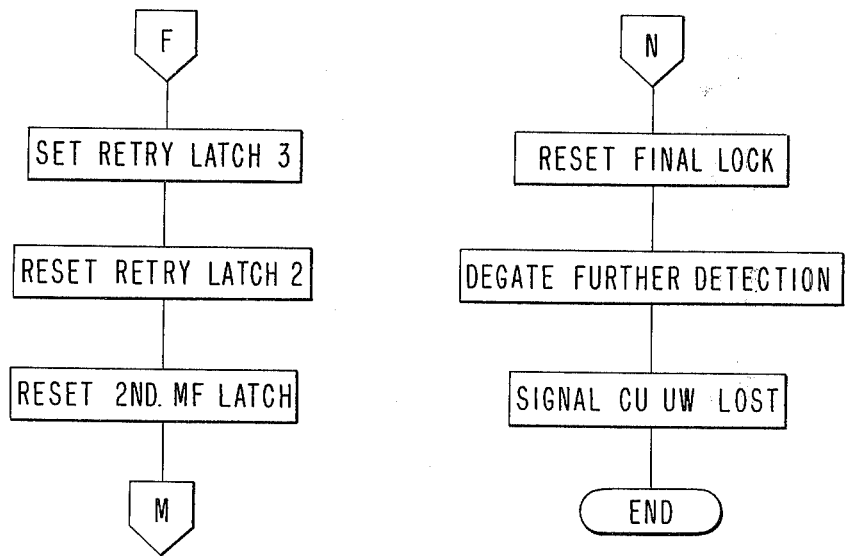

RECEIVE ACQUISITION
(PART 1 OF 4)

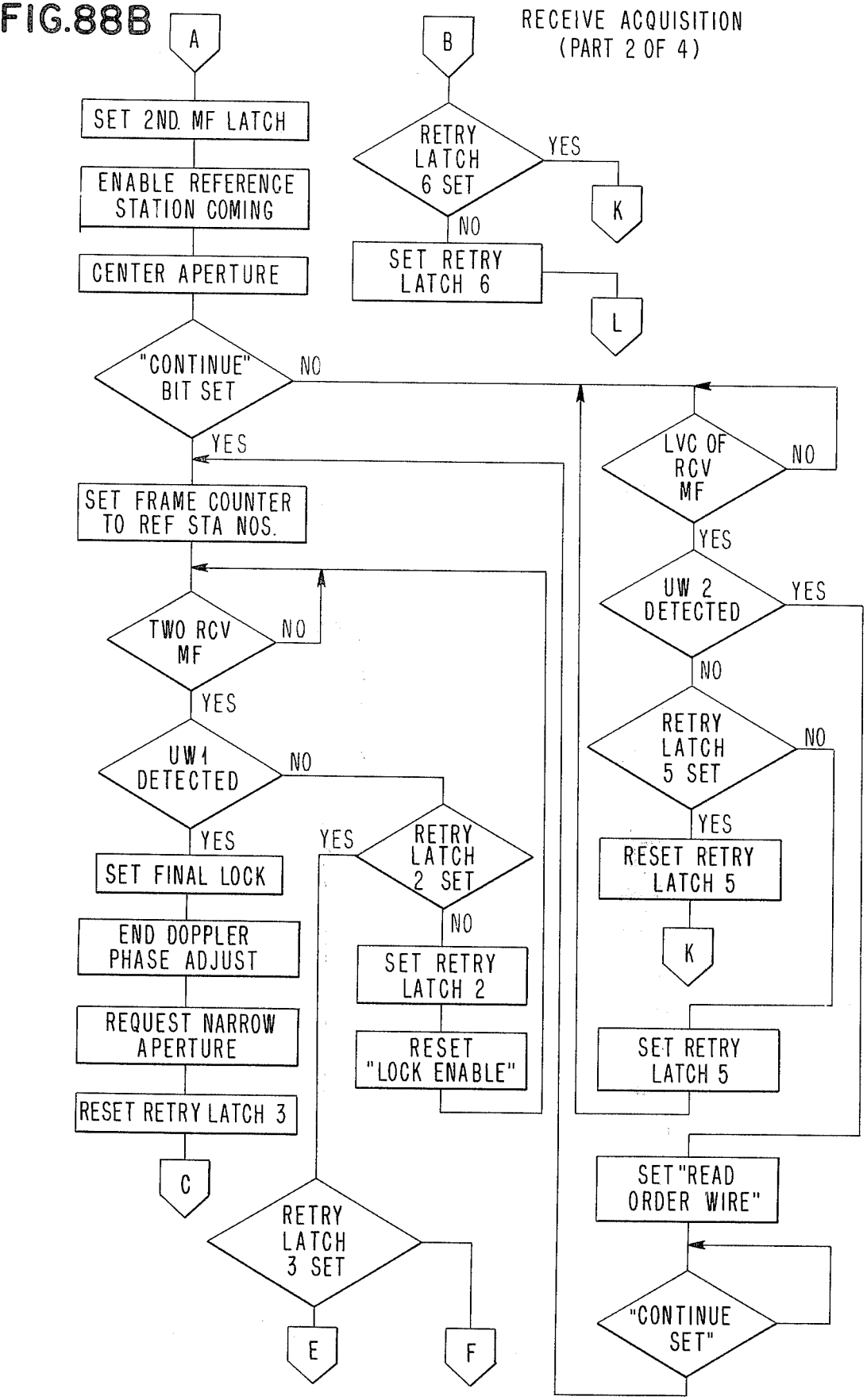
FIG.88B RECEIVE ACQUISITION (PART 2 OF 4)

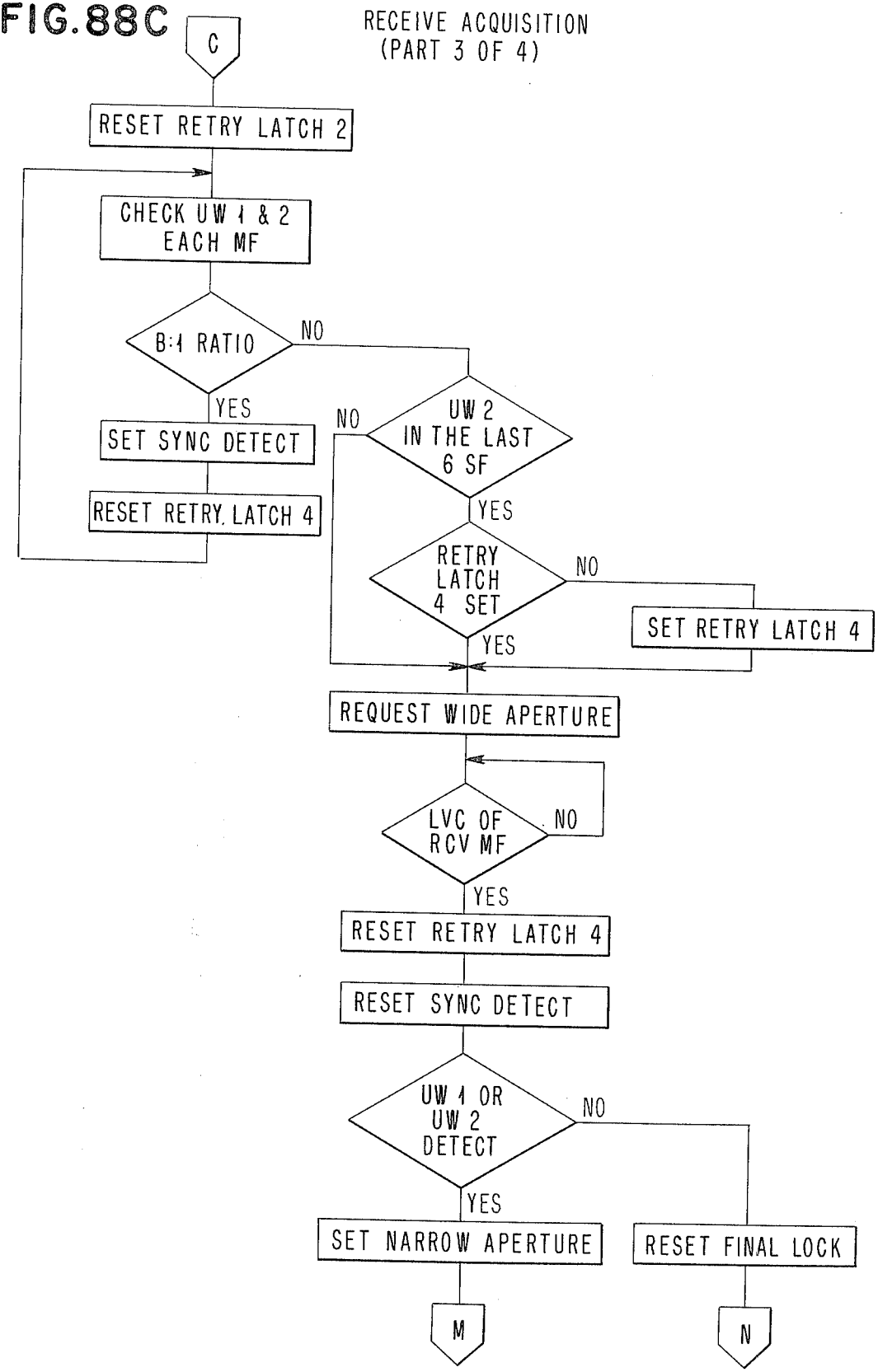
FIG.88C RECEIVE ACQUISITION (PART 3 OF 4)

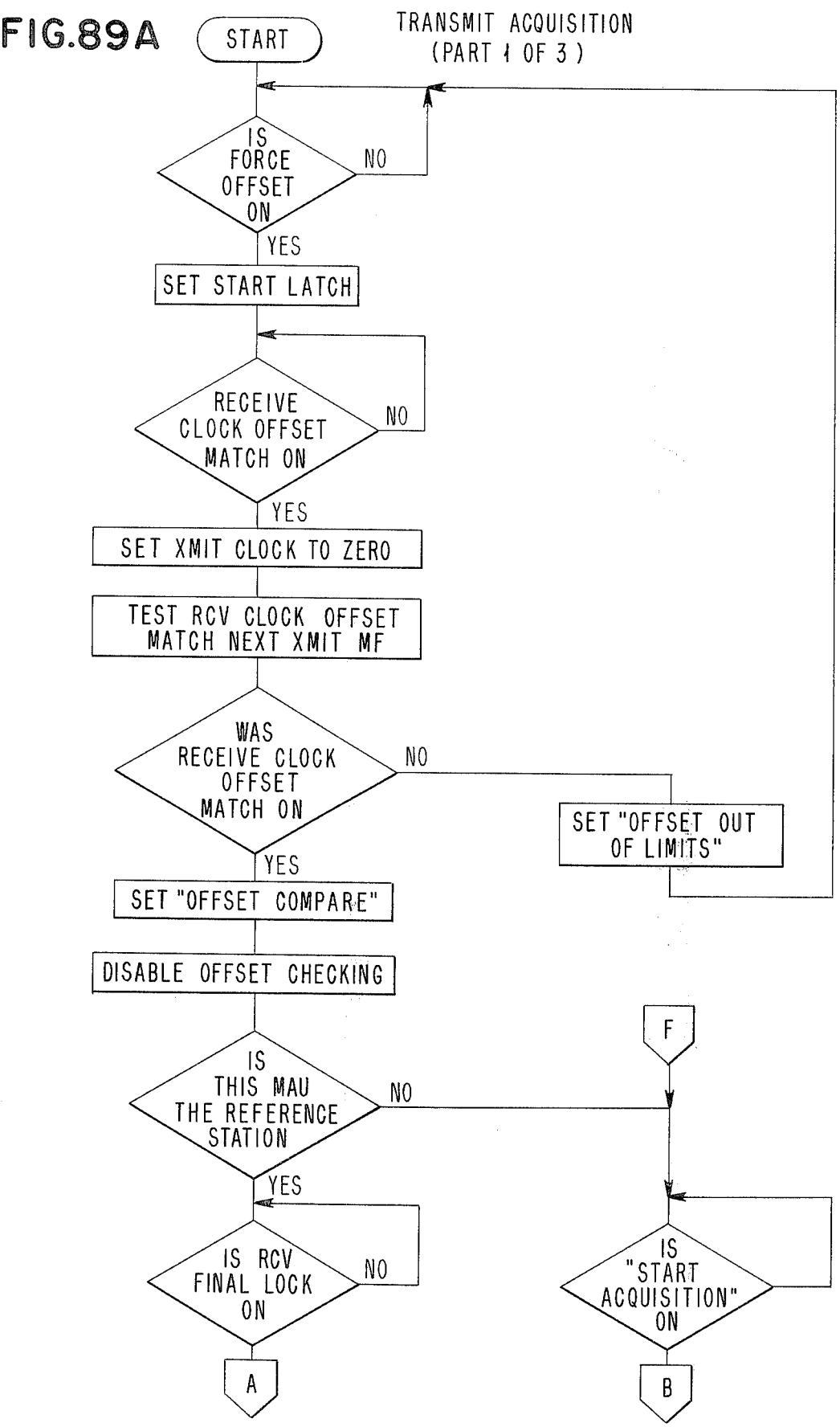

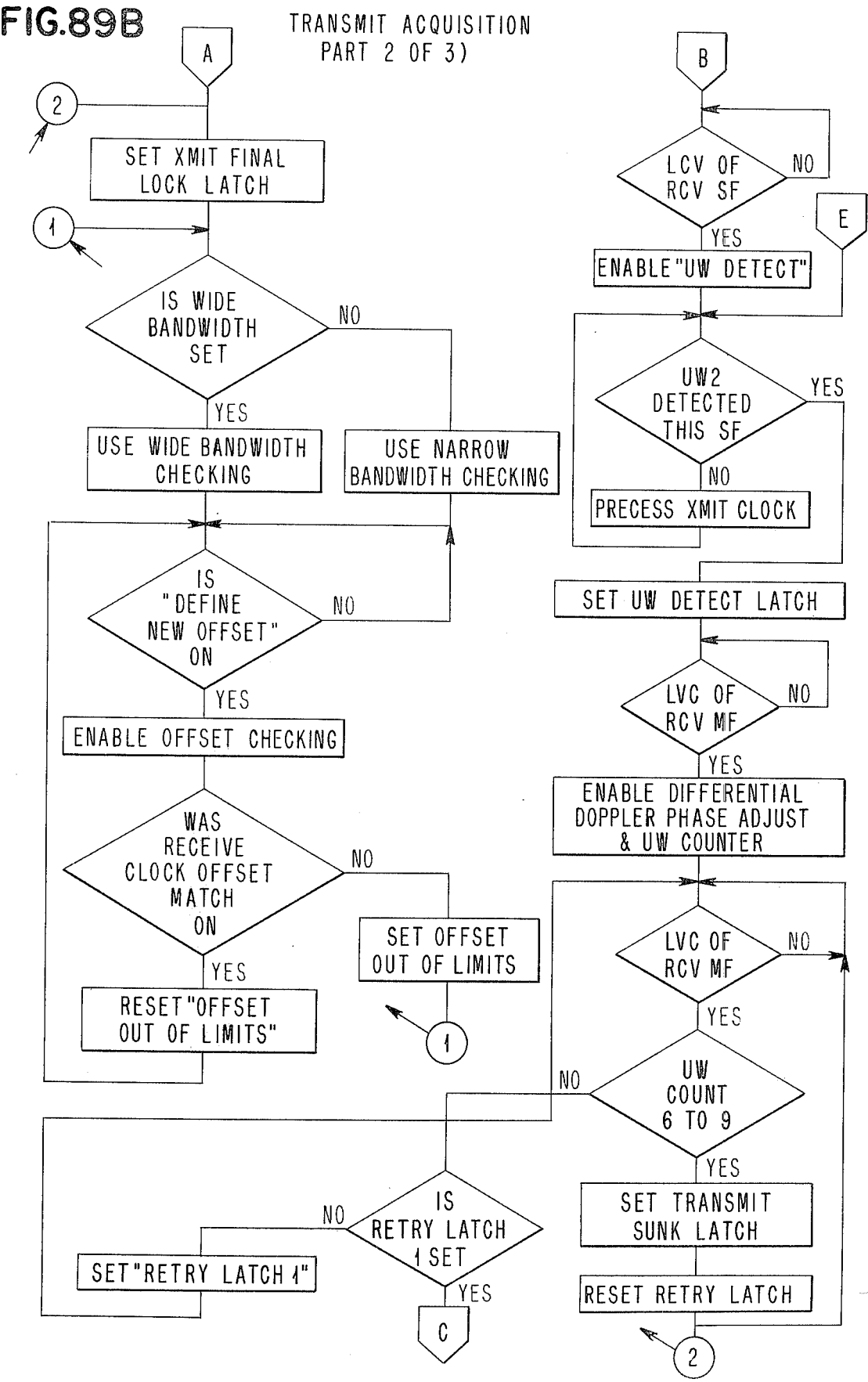
FIG.89B TRANSMIT ACQUISITION PART 2 OF 3)

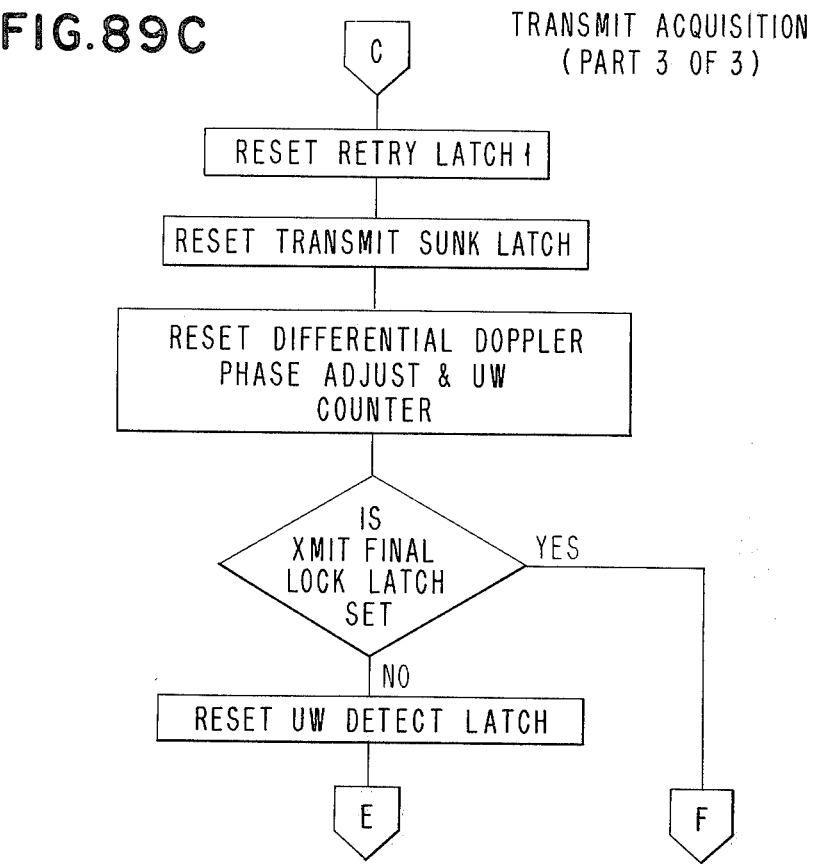
FIG.89C — TRANSMIT ACQUISITION (PART 3 OF 3)
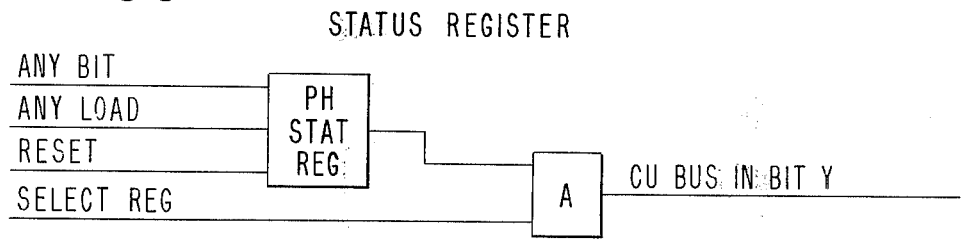
FIG.90 STATUS REGISTER
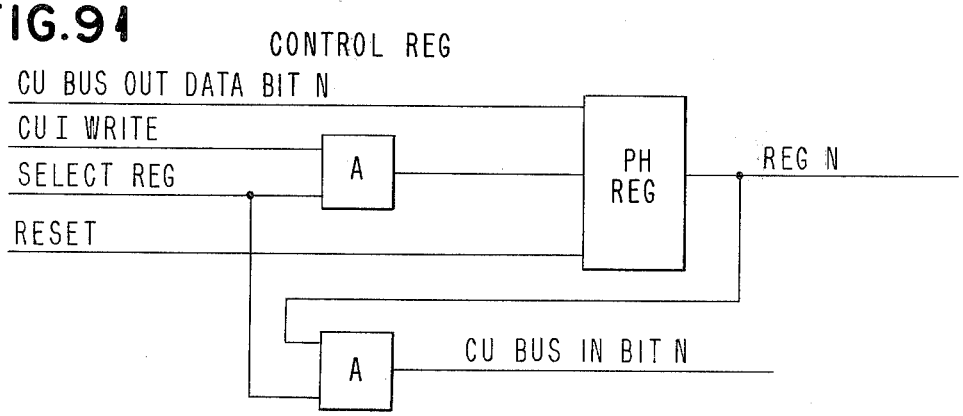
FIG.91 CONTROL REG

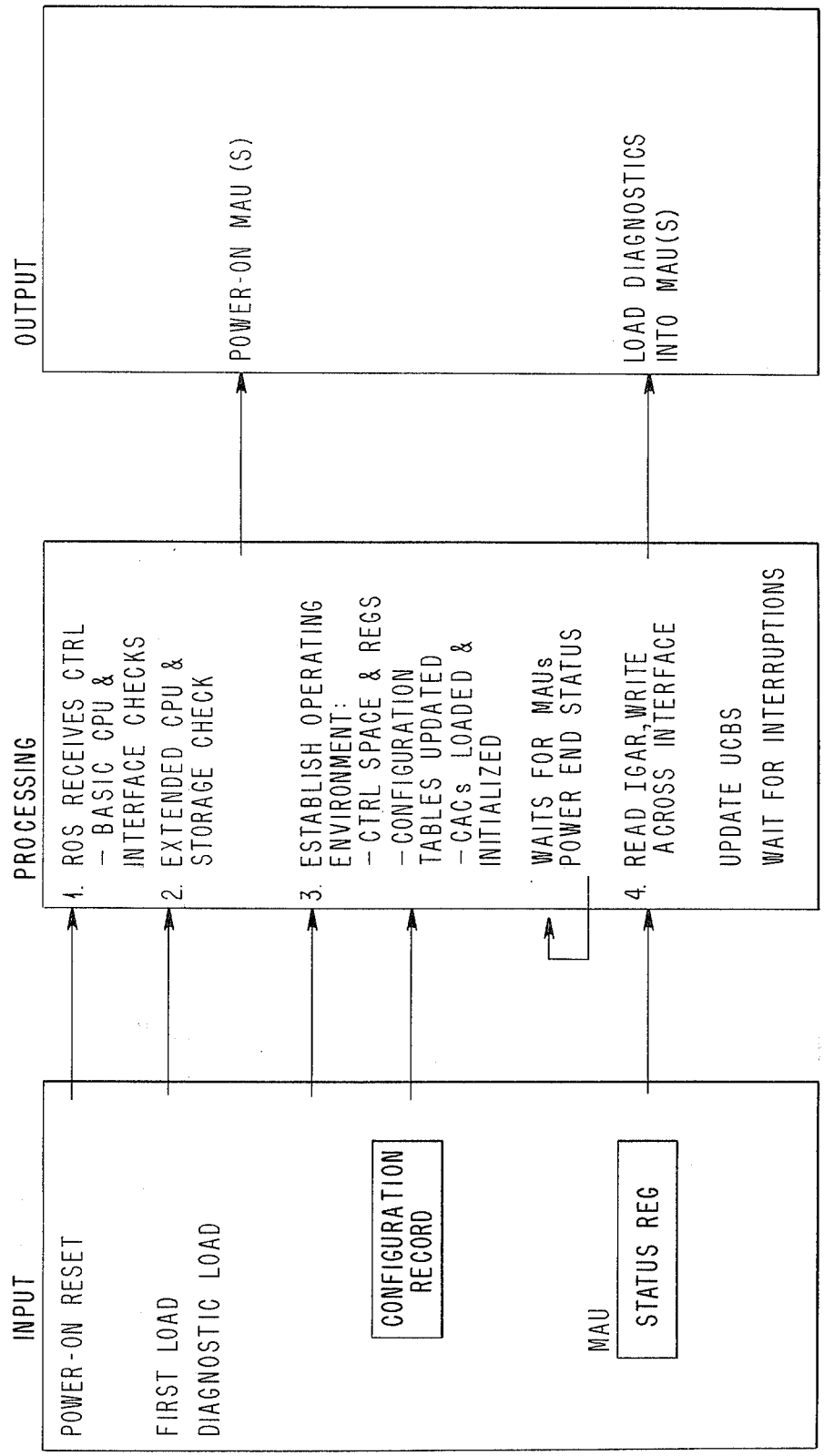

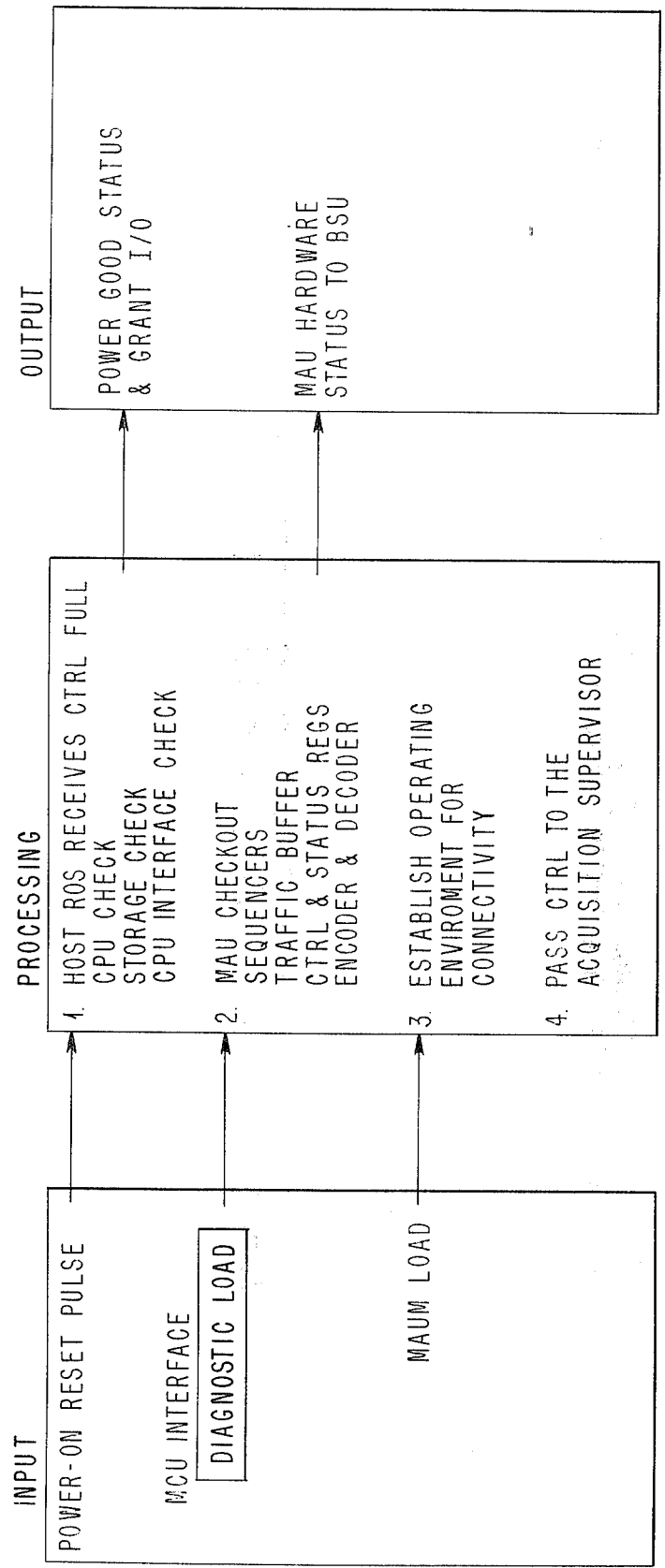

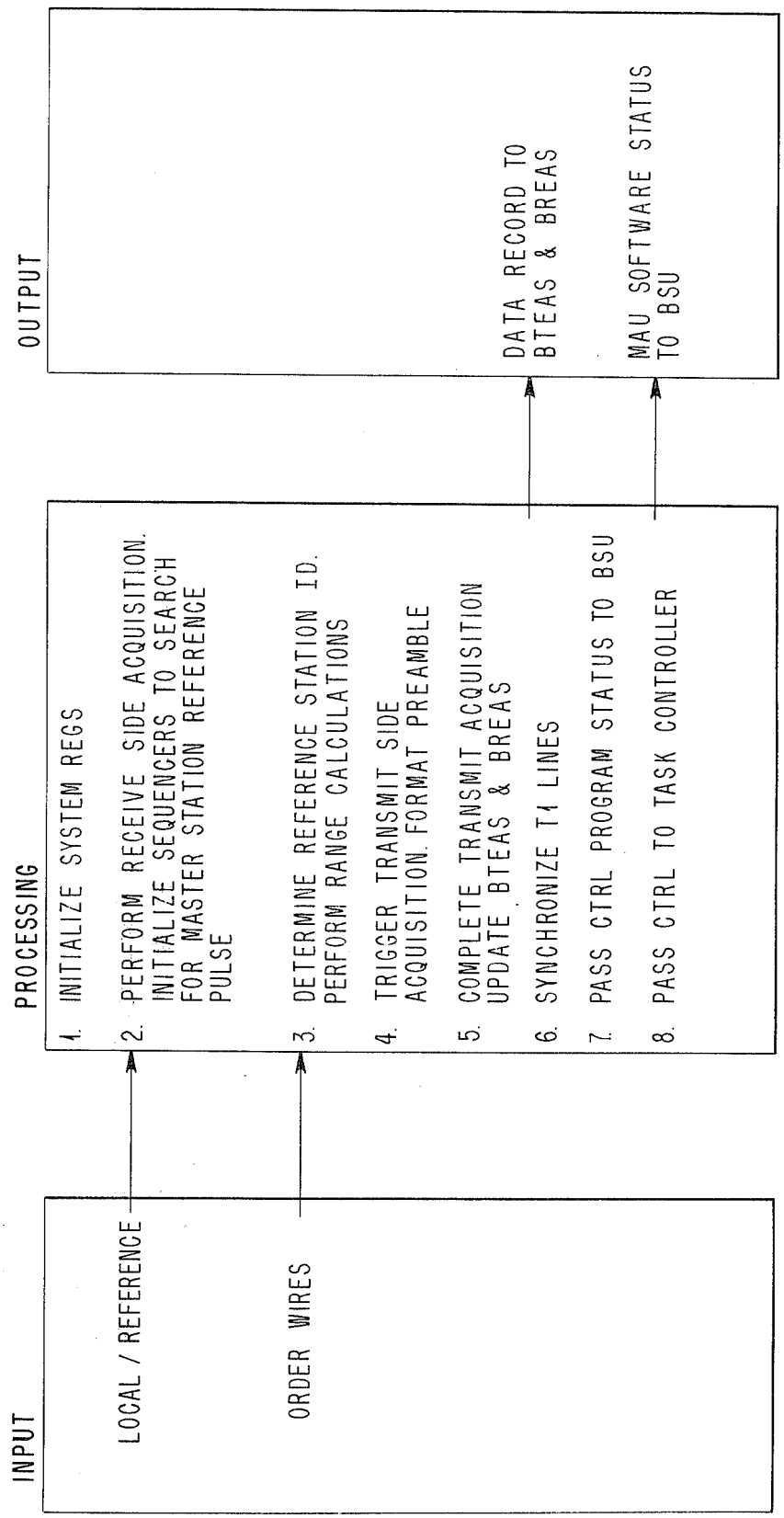

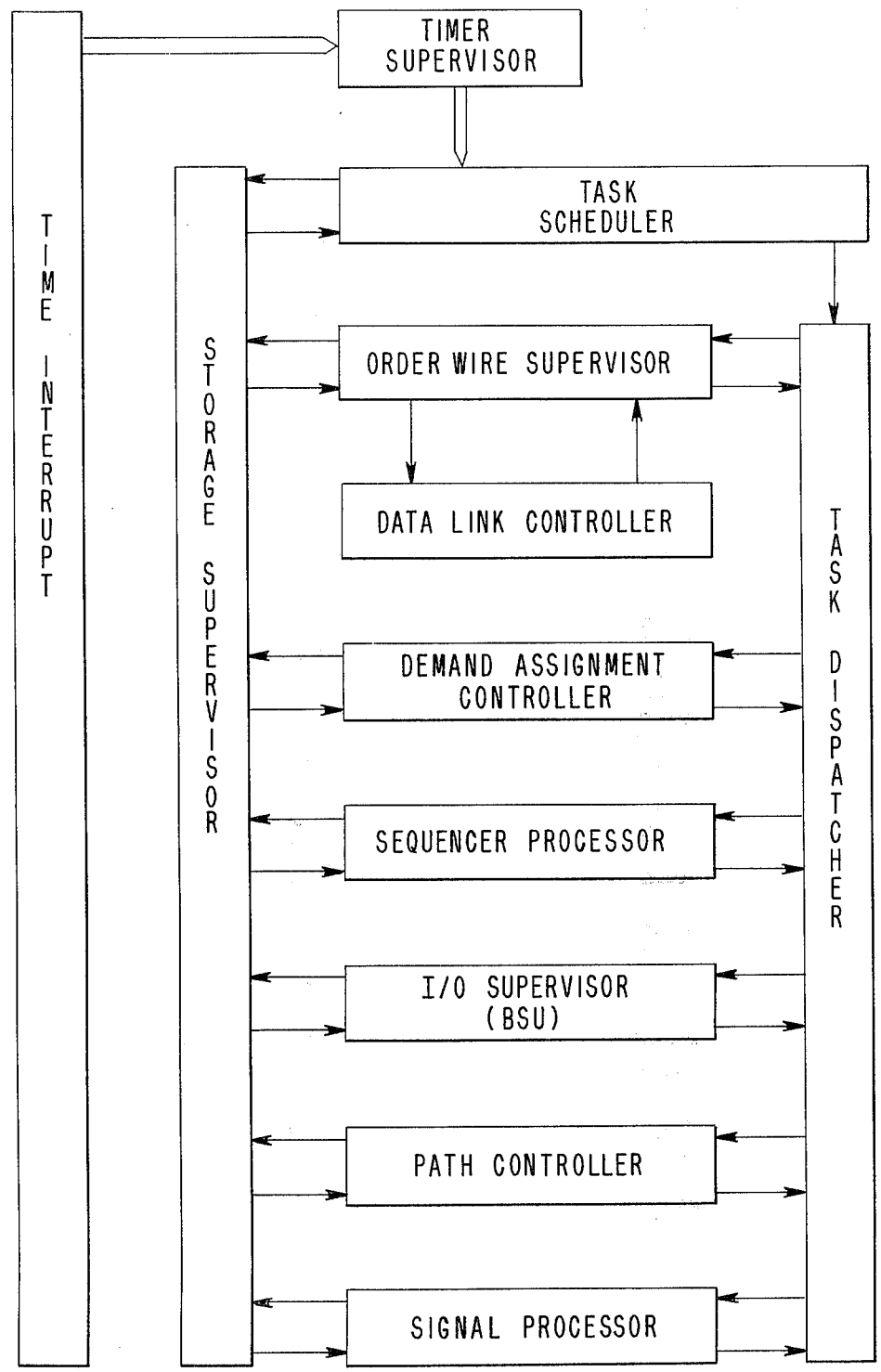
FIG.96 CONNECTIVITY CONTROLLER

FIG. 97  INTERRUPTS
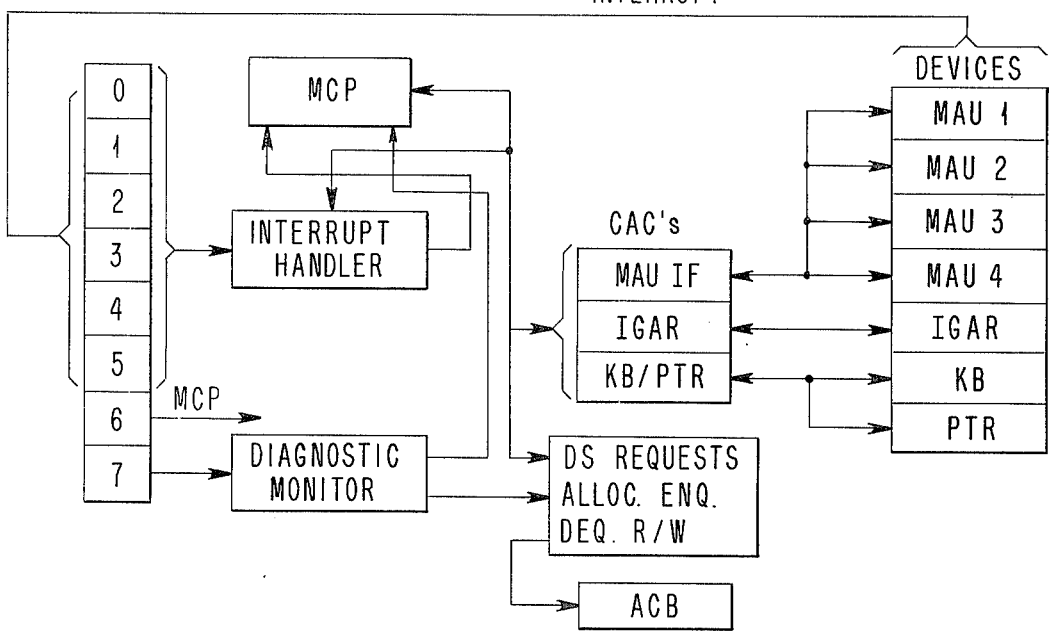
FIG. 99
SATELLITE ORDER WIRE
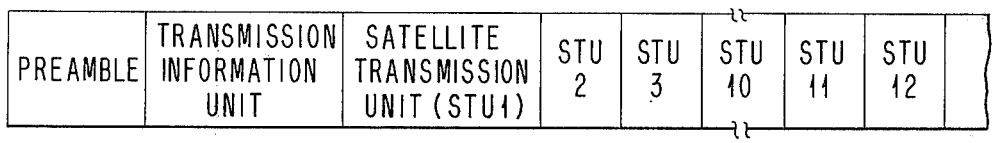
FIG. 100  PREAMBLE
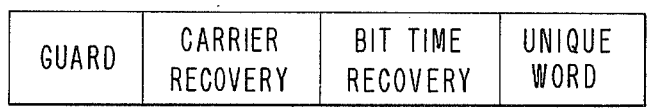
FIG. 101  TRANSMISSION INFORMATION UNIT
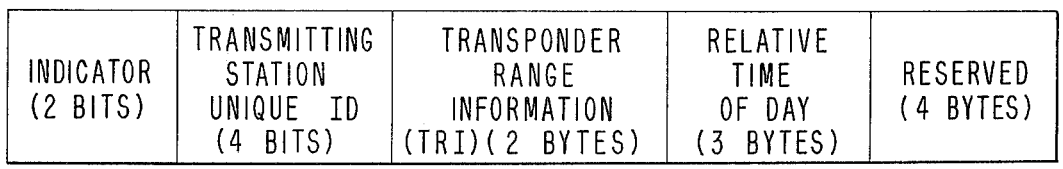

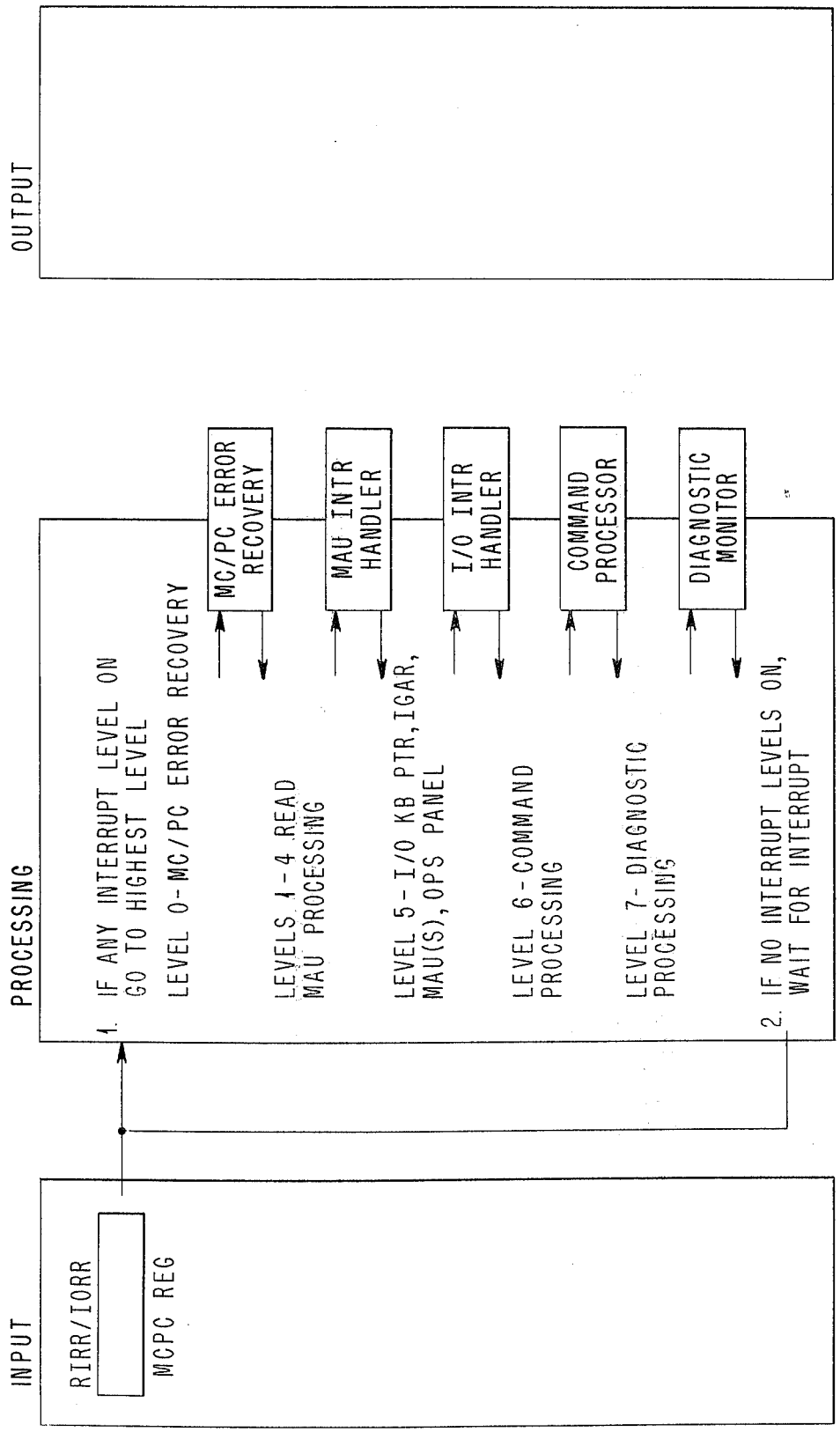

FIG.102 SATELLITE TRANSMISSION UNIT

| FORMAT 4 TRANSMISSION HEADER (3 BYTES) | REQUEST HANDLER (3 BYTES) | ALTERNATE ROUTE (3 BYTES) | SOURCE CONNECTION INFO. UNIT (6 BYTES) | SINK CONNECTION INFO. UNIT (6 BYTES) | DIAL INFORMATION UNIT (5 BYTES) | LINK MESSAGE CTRL. UNIT (3 BYTES) |
|---|---|---|---|---|---|---|

FORMAT 4 TRANSMISSION HEADER

FIG.103

| FORMAT ID | DAF | OAF |
|---|---|---|

FIG.104 MAU SEQUENCE NUMBER

| NO.SENT TO MAU 0 | NO.RECEIVED FROM MAU 0 | NO.SENT TO MAU 1 | ~ | ~ | NO.SENT TO MAU 55 | NO.RECEIVED FROM MAU 55 |
|---|---|---|---|---|---|---|

FIG.105 TERRESTRIAL ORDER WIRE

| ERROR FLAGS (2 BYTES) | LOCAL MAU'S STU'S ID (2 BYTES) | SATELLITE ORDER WIRE | TERRESTRIAL ORDER WIRES LINE 1 | TERRESTRIAL ORDER WIRES LINE 2 | TERRESTRIAL ORDER WIRES LINE 3 | TERRESTRIAL ORDER WIRES LINE 4 |
|---|---|---|---|---|---|---|

FIG.106 ORDER WIRE SUPERVISOR (INBOUND) PROCESSING

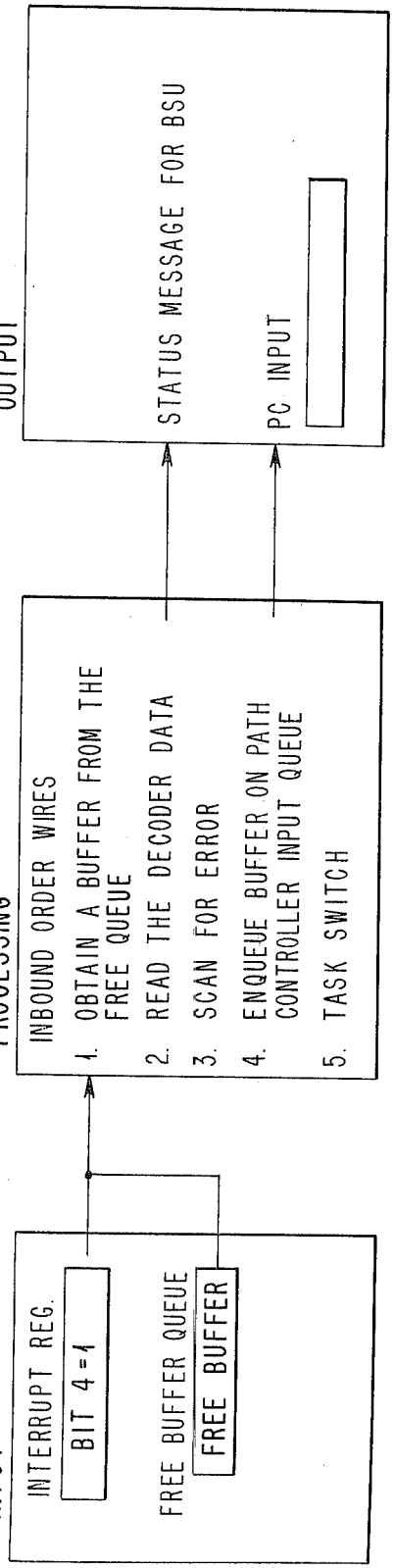

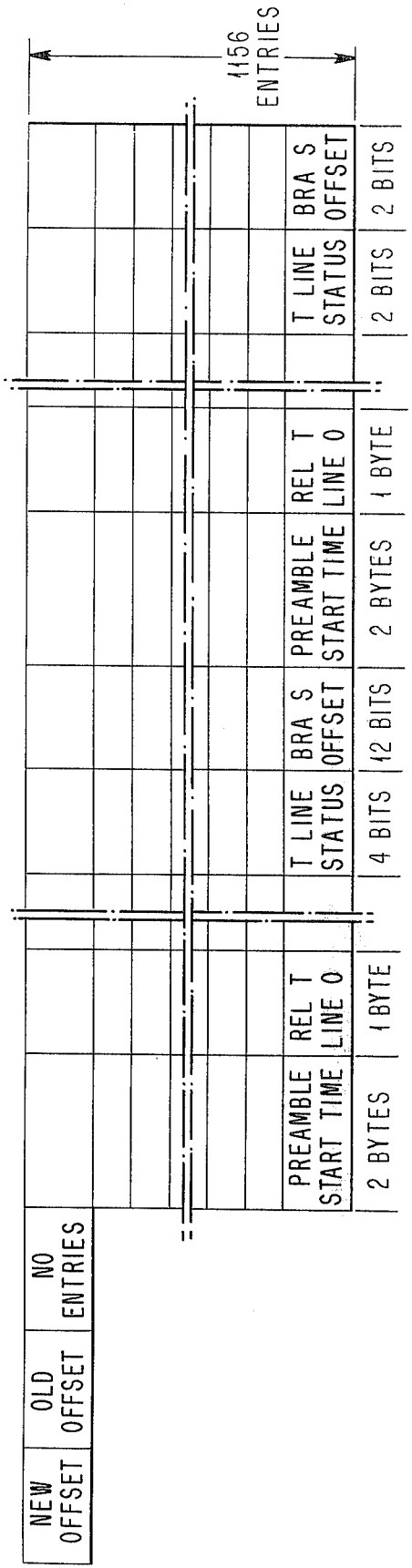

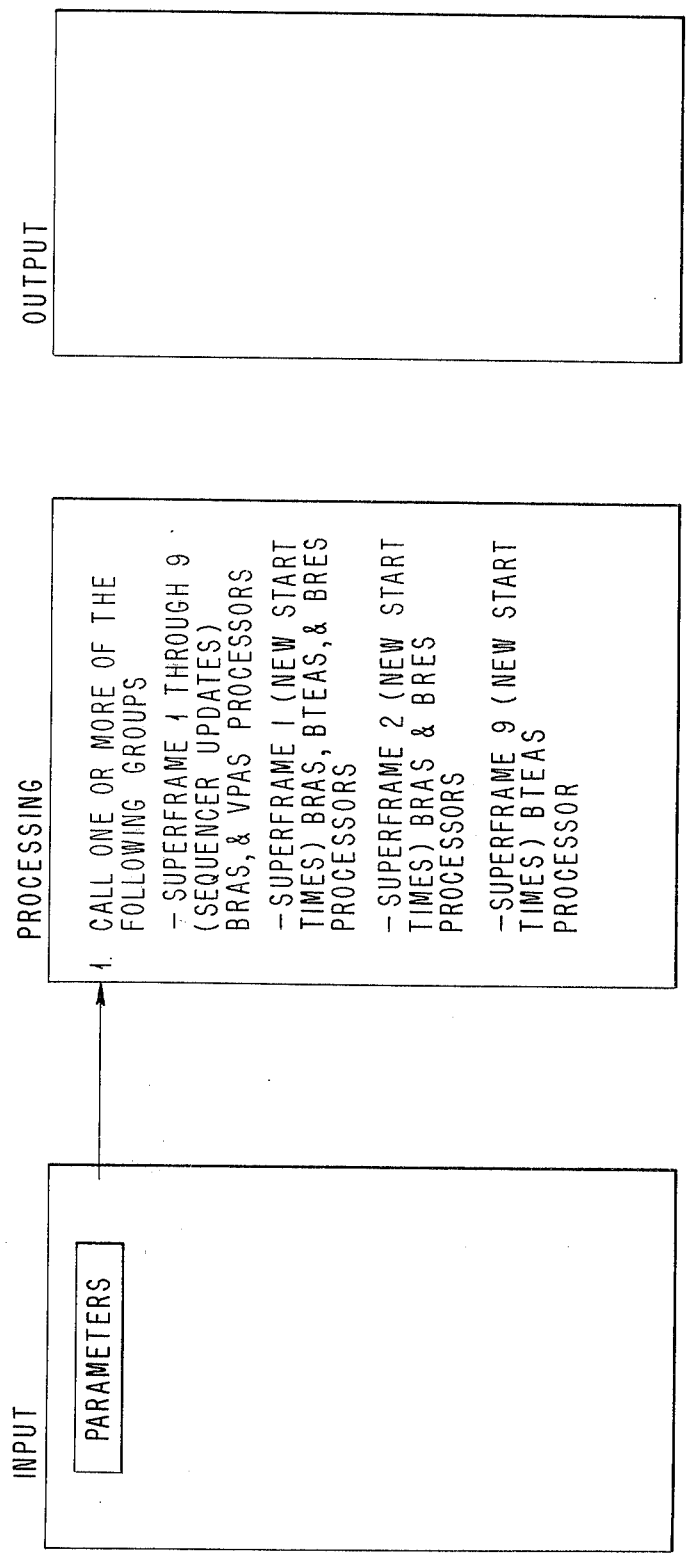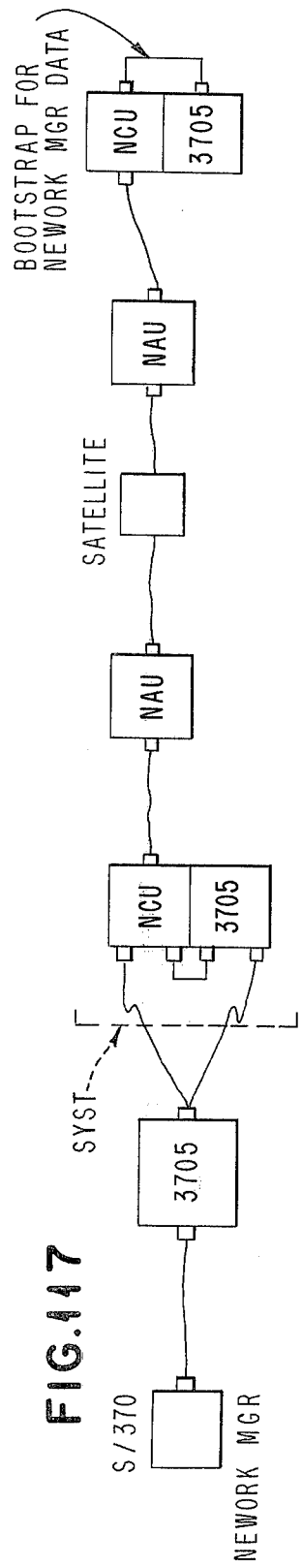

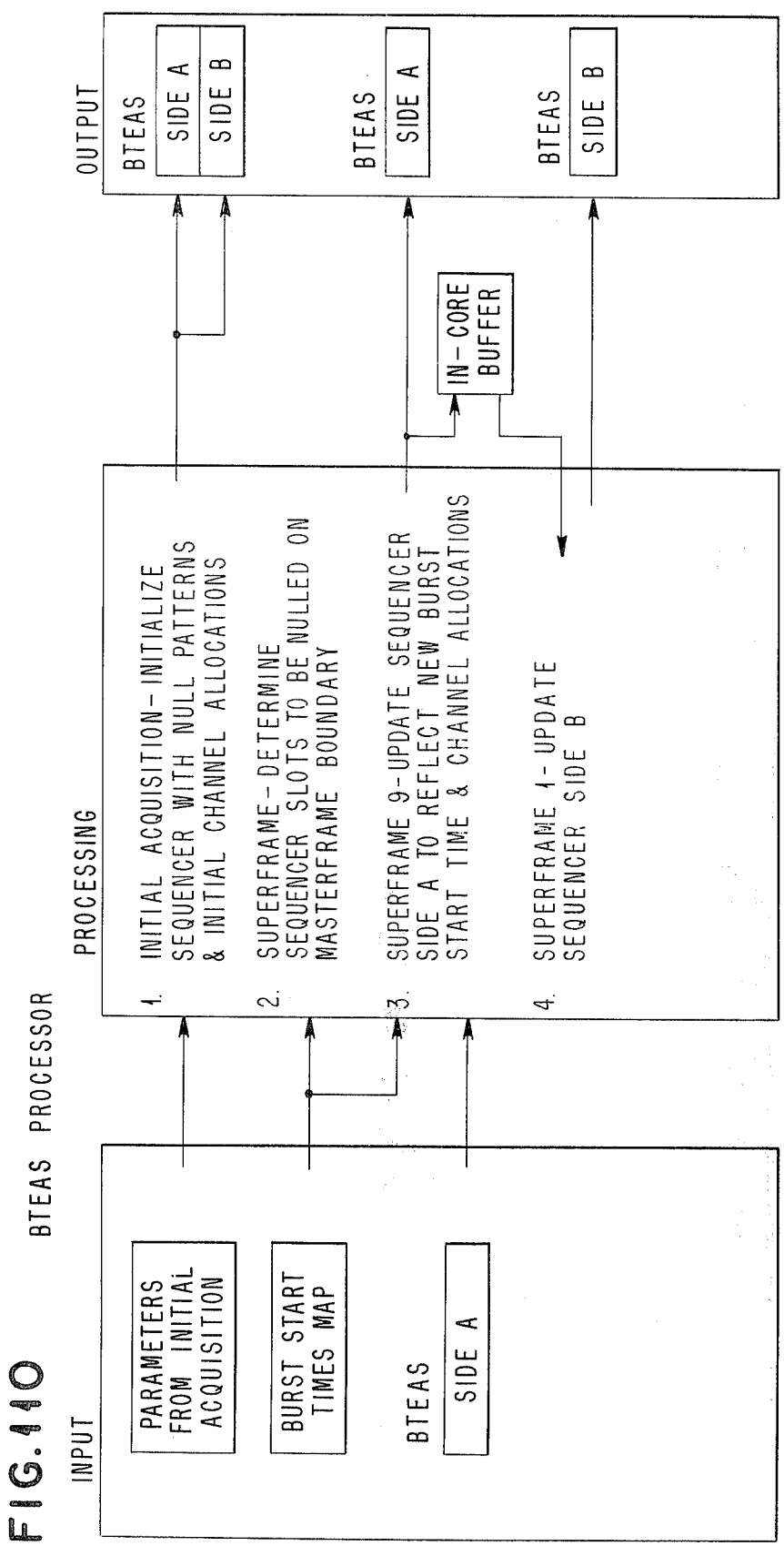

FIG. 113
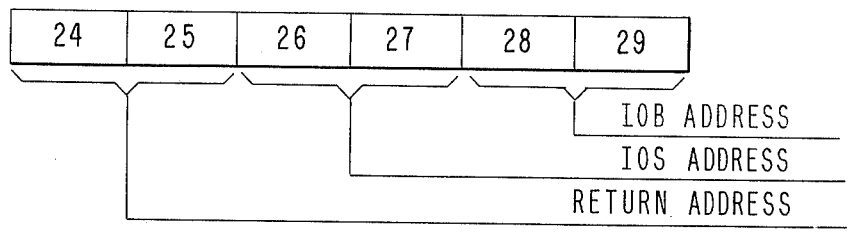
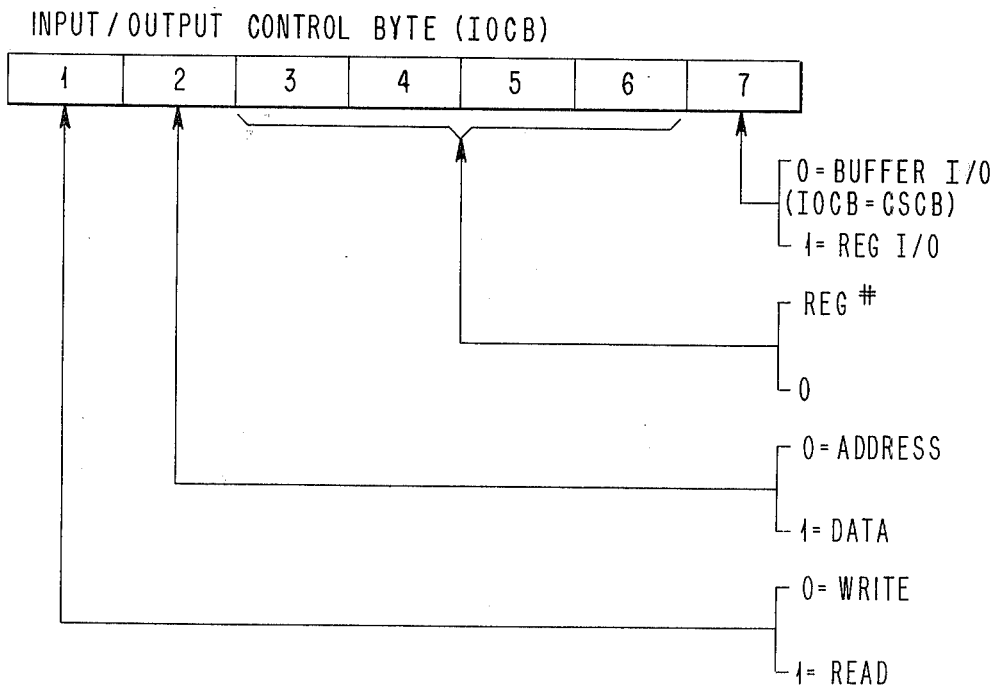

FIG. 414  I/O SUPERVISOR OVERVIEW

SWITCHING AND ACTIVITY COMPRESSION BETWEEN TELEPHONE LINES AND DIGITAL COMMUNICATION CHANNELS

CROSS-REFERENCES TO RELATED APPLICATIONS

1. U.S. patent application Ser. No. 537,502, by D. C. Flemming et al., entitled "MODULAR BRANCH EXCHANGE AND NODAL ACCESS UNITS FOR MULTIPLE ACCESS SYSTEM", filed Dec. 30, 1974.
2. U.S. patent application Ser. No. 537,212, by D. C. Flemming, entitled "INTER-RELATED SWITCHING, ACTIVITY COMPRESSION AND DEMAND ASSIGNMENT", filed Dec. 30, 1974.
3. U.S. patent application Ser. No. 537,501, by B. E. Parker et al., entitled "DISTRIBUTIONAL ACTIVITY COMPRESSION", filed Dec. 30, 1974.
4. U.S. patent application Ser. No. 537,281, by D. C. Flemming et al., entitled "EXTERNAL MANAGEMENT OF SATELLITE LINKED EXCHANGE NETWORK", filed Dec. 30, 1974.
5. U.S. patent application Ser. No. 590,547, by H. G. Blasbalg, entitled "MODULAR SLOT INTERCHANGE DIGITAL EXCHANGE" filed June 26, 1975.
6. U.S. patent application Ser. No. 560,422, by U. Appel, entitled "LOSS SIGNAL GENERATION FOR DELTA-MODULATED SIGNALS" filed Mar. 20, 1975.
7. U.S. patent application Ser. No. 560,423, by P. Abramson et al. entitled "DIGITAL VOICE SIGNALING WITH DIGITAL ECHO DETECTION AND VOICE ACTIVITY COMPRESSION USED TO CANCEL ECHO", filed Mar. 20, 1975.

BACKGROUND OF THE INVENTION

A problem in utilization of time division multiple access (TDMA) space satellite communication facilities has been to strike an advantageous balance between station costs and network performance; one factor of the latter being the proportionate "throughput" of information bits to non-information bits (e.g. bits used for time control, error control, etc.).

Another problem has been to provide modular time division multiplex (TDM) switching centers for such facilities, which can be conveniently assembled into various station (access node) configurations without precise foreknowledge of station traffic and geographic coverage.

Another problem has been to provide for efficient acquisition, timekeeping and use of satellite time in such networks.

Another problem has been to provide multiple routing capability in modular units relative to a TDMA facility.

Another problem has been to provide efficient terrestrial linkage of a large geographic area to one station (access node) of a TDMA space satellite facility.

Another problem has been to provide for efficient multiplex switching and high speed transmission of diverse digital signal traffic—including telephone (encoded voice), data and non-coded image (NCI) information—by satellite and over point-to-point terrestrial links between physically remote switching centers of one station.

Another need has been to provide digital switching service to voice users of satellites with echo suppression taken care of in the switch.

An object of the present invention is to provide a method of communication fulfilling requirements associated with eliminating the foregoing problems and satisfying respective needs.

Another object is to provide an architecture for modular time domain switching centers, and a related method of communication, which fulfill the foregoing requirements.

Other objects are to provide modular "store and forward" digital switching centers, for operating hierarchically in stations covering a variety of "use-interface" areas relative to access nodes of a TDMA principal trunk facility, and a method of operating a network of such stations.

Another object is to provide a method of TDMA satellite communication characterized by use of digital switching coordinated over all access nodes, time multiplexing and activity compression of switched virtual channels into system transmission channels to achieve station and network efficiencies relative to use of the satellite.

Another object is to provide a method of efficiently switching and handling data and encoded sound (telephone) signals relative to a TDMA link.

A feature is the use of land-linked time and space domain digital switch modules having fixed time capacity to handle a wide range of mixed voice and data traffic in block multiplex relative to a satellite; the extra cost of storage for block handling (over bit handling) being offset by reductions in transmission overhead relative to the land links and the satellite.

SUMMARY OF THE INVENTION

The invention concerns an access method and modular station apparatus for switching voice and data signals relative to a TDMA link; especially a satellite. The method is distinguished by use of long frame times (long by comparison to the sampling period at a voice trunk), extensive block storage of switched traffic per access station, and time compression and activity compression of traffic signals on a modularly structured block basis.

Being modular in traffic capacity the subject apparatus can be variously configured to adapt to changing traffic situations over the long term. Being adaptive in respect to activity compression, demand assignment and alternate path routing the apparatus adapts efficiently to short term traffic fluctuations. Subject switch modules can be concentrated in a combined center under one housing or dispersed geographically.

Switching, activity compression and TDM handling services include: establishing (and communicating) varying connection associations between input/output ports and buffer store locations representing virtual channels (VC) of communication relative to potentially "outnumbered" real channels on associated digital trunks, the VC's associated with each trunk being arranged in ordered groups of 96; sampling (distributing) input/output signals (voice or data) at each associated input/output port in repetition intervals of short duration relative to a digital trunk frame; encoding (decoding) samples (delta mod form); temporarily storing samples in associated VC locations; accumulating up to 192 samples per VC location per trunk frame; activity compressing (decompressing) the accumulated contents of each group of 96 outbound VC's for handling over 46 real channels (per frame) of the associated trunk; sending (receiving) an activity compression mask signal per VC group in each trunk frame to indicate VC to real channel assignment associations in the group in the same frame; rearranging received information signal transmissions and associated mask signal bits from origin-ordered form to destination-ordered form for output distribution handling in ordered VC groups; selecting mask and information channel assignments to adjust for over-runs (fewer real channels than active VC's) and to block echo transmission; selecting active VC's over-run eliminations in a predetermined order of priority; monitoring over-run rates; using the rate information to control setting up of further connections relative to the associated digital trunk and preserving the information as a communicatable statistic relative to high level control of network (global) connectivity.

Second level centers are organized to interface between up to four first level centers (via TDM digital trunks if not co-located) and rf station apparatus which links to the space segment.

Services provided relative to the satellite include:

Acquiring and maintaining time synchronization relative to the satellite (after receiving initial high level control —program initialization and activation ordering—from host management apparatus externally linked to all station processing centers); maintaining buffer storage addressing in time correspondence with path delay variations to the satellite; communicating time base control information to associated first level centers; scheduling and maintaining segments of "toll" connection paths between virtual path switching centers and the space segment; scheduling (including carrying out necessary communication for) assignments of traffic burst lengths relative to the satellite in accordance with demand (demand relative to demand at other stations); providing additional temporary storage and time compression/decompression of communicated signals between virtual path switching centers and the space segment; separating out associated information from the interleaved space composite; temporarily storing the separated information; rearranging the information and associated activity compression mask elements for output distributional handling relative to ports in virtual channel groups; handling transmission over-runs relative to virtual channel groups by a selective blocking technique similar to the technique used in origin-ordered activity compression handling relative to the satellite.

By providing selective activity compression in the distribution handling the system avoids compounding origin station inefficiencies in receiving stations. For example many "low traffic" stations can transmit inefficiently (allowing idle channels) over the satellite to a common virtual channel receiving group of a high traffic station and the inefficiencies (idle channels) of the transmitting stations need not be carried along in the virtual usage at the receiving station.

All stations utilize "large" capacity solid state random access buffer storage facilities for ordering, queueing, compressing and multiplexing the information traffic in "molecular" sample sets of substantial bit length (192 bits per set). This affords transmission overhead efficiencies by reducing the per frame proportion of control signals (signals used for timekeeping and source tagging purposes) to information (traffic) signals; in comparison to "atomic" (single sample) systems.

The foregoing and other features, objects and advantages of our invention will be further appreciated from the following detailed description.

DESCRIPTION OF THE DRAWINGS

FIGS. 5 and 6 indicate TDM frame timing and usage relative to the satellite;

FIG. 7 indicates the form and content of station bursts relative to the satellite;

FIG. 18A shows the control clock sequence timing of the CPF;

FIG. 19 shows the voice processing unit (VPU) section of the NCU;

FIGS. 20.1 and 20.2 together show the digital switch section of the NCU;

FIGS. 21–61 are utilized to describe the NCU;

FIG. 21 shows the A/D card layout;

FIG. 22 shows the A/D conversion logic;

FIG. 23 shows the path of local call switching through the VPU and SIM elements of the NCU;

FIG. 24 shows the modulation demodulation logic interconnection in the VPU;

FIG. 25 shows the delta modulation algorithm logic;

FIG. 26 shows the correlation between the algorithm function and the control signals in FIG. 25;

FIGS. 27 and 28 are utilized to explain the relationship between the delta modulation algorithm parameters R1, R2 and Md;

FIG. 29 describes the voice activity detection logic;

FIG. 30 describes the analog to digital conversion and algorithm timing;

FIG. 31 describes the algorithm logic and the algorithm memory timing;

FIG. 32 is a sequencer block diagram;

FIG. 33 indicates sequence timing;

FIG. 34 indicates the NCU path for ringing and busy tones;

FIG. 35 indicates the D/A interface memories;

FIGS. 36 and 37 indicate the D/A interface memory timing;

FIG. 38 provides a simplified block diagram view of the digital switch;

FIG. 39 indicates trunk interfaces between the NCU and NAU;

FIG. 40 indicates trunk interface signal timing;

FIG. 41 indicates trunk frame format;

FIG. 42 indicates the elastic buffer utilized for NCU bit synchronization;

FIG. 43 indicates the byte correct and frame synchronization circuits;

FIGS. 44, 45A, 45B and 46 indicate frame structure and timing;

FIG. 47 indicates clock generation circuits of the NCU;

FIG. 48 indicates clock timing;

FIG. 49 indicates frame timing structure for multiple NCU's sharing a common 3705 control unit;

FIGS. 50 and 51 indicate the trunk buffer memory;

FIG. 52 indicates trunk-in uncorrected and corrected handling;

FIG. 53 indicates trunk to TGIM/TGIM to SIM handling;

FIG. 54 indicates SIM to TGOM/TGOM to trunk handling;

FIG. 55 indicates VAC Freezeout handling;

FIG. 56 indicates VAC encoding and decoding with forward error correction (FEC);

FIG. 57 indicates SIM memory organization;

FIG. 58 indicates ICM memory organization;

FIG. 59 indicates SIM/ICM timing;

FIG. 60 indicates LGIM/LGOM in block diagramatic form;

FIG. 61 indicates the 3705/NCU interface;

FIG. 63 indicates the general layout of parts in the NAU;

FIG. 65 indicates the NAU IF interface;

FIG. 66 indicates the MAU TICSW unit;

FIG. 67 indicates the TICSW interface;

FIG. 68 indicates the INTIC data flow;

FIG. 69 indicates the INTIC interface;

FIGS. 72-74 indicate traffic buffer in/out timing;

FIG. 75 indicates TOUT interface;

FIGS. 77 and 78 indicate the elastic buffer of the MAU;

FIGS. 79-81 indicate traffic buffer interfaces;

FIGS. 82-85 indicate MAU sequencer organization and interfaces;

FIG. 86 indicates transmit side clock generation;

FIG. 87 indicates receive side clock generation;

FIG. 89 (parts A, B and C) indicates transmit acquisition;

FIG. 90 indicates a status register;

FIG. 91 indicates a control register;

FIG. 93 indicates BSU initialization procedure;

FIG. 94 indicates MAU initialization procedure;

FIG. 95 indicates acquisition procedure;

FIG. 96 indicates connectivity control processing;

FIG. 97 indicates interrupt organization;

FIG. 98 provides an overview of the BSUM process;

FIGS. 99-105 indicate information formats;

FIG. 106 indicates order wire supervisor processing;

FIG. 107 indicates sequencer start times map;

FIG. 108 indicates traffic buffer partition functions;

FIGS. 109-112 indicate MAU sequencer processes

FIGS. 113 and 114 indicate the IOS (I/O Supervisor) process;

FIGS. 115 and 116 indicate satellite path control procedures; and

FIG. 117 indicates the network manager in relation to the other system elements.

DETAILED DESCRIPTION

Table of Contents
 I. Introduction
  A. Network Configurations
  B. Nodal (Station) Organizations
 II. Network Signaling
  A. Space Segment Signaling
  B. Digital Trunk Signaling
  C. Signaling At First Level Input/Output Ports
  D. Compression-Multiplex
  E. Network Sequence For Connection Path Preparation
  F. Call Timing and Termination
 III. Exchange Center Apparatus/Operation
  A. Introduction
  B. NCU (First Level)
   1.0 NCU General Description
   2.0 Call Processing
   3.0 Voice Processing
   4.0 Digital Switch
   5.0 NCU/3705 Interface
   6.0 Summary of NCU Operation
  C. NAU (Second Level)
   1.0 Introduction
   2.0 MAU System
   3.0 Functional Principles (Timing Structure)
   4.0 Input/Output
   5.0 Programming
 IV. (High Level) Network Control
  A. Initialization
  B. IPL
  C. NMF "Control" After IPL

I. Introduction

The invention concerns a modular hierarchical approach to TDM switching relative to TDMA facilities; particularly earth satellite TDMA facilities. Presently described exchange modules/centers are used for connection scheduling and time compression handling of TDM voice and data information signals relative to a principal TDMA link; in particular a time divided frequency channel (transponder) of a satellite space segment. Also of interest are particular activity compression and demand assignment control techniques presently described.

The invention contemplates time-compressed use of multiple subsidiary digital trunks (e.g. leased high speed public carrier lines) in space and time domain associations with each of a plurality of "regional" access nodes (rf ground stations) of the space segment. The digital trunks are installed as point-to-point links between regionally associated first level and second level switching exchange centers constructed from basic modules. These cooperatively provide switching and activity compression handling between use access ports of the first level enters and respective access nodes.

A. Network Configuration

Figure 1:
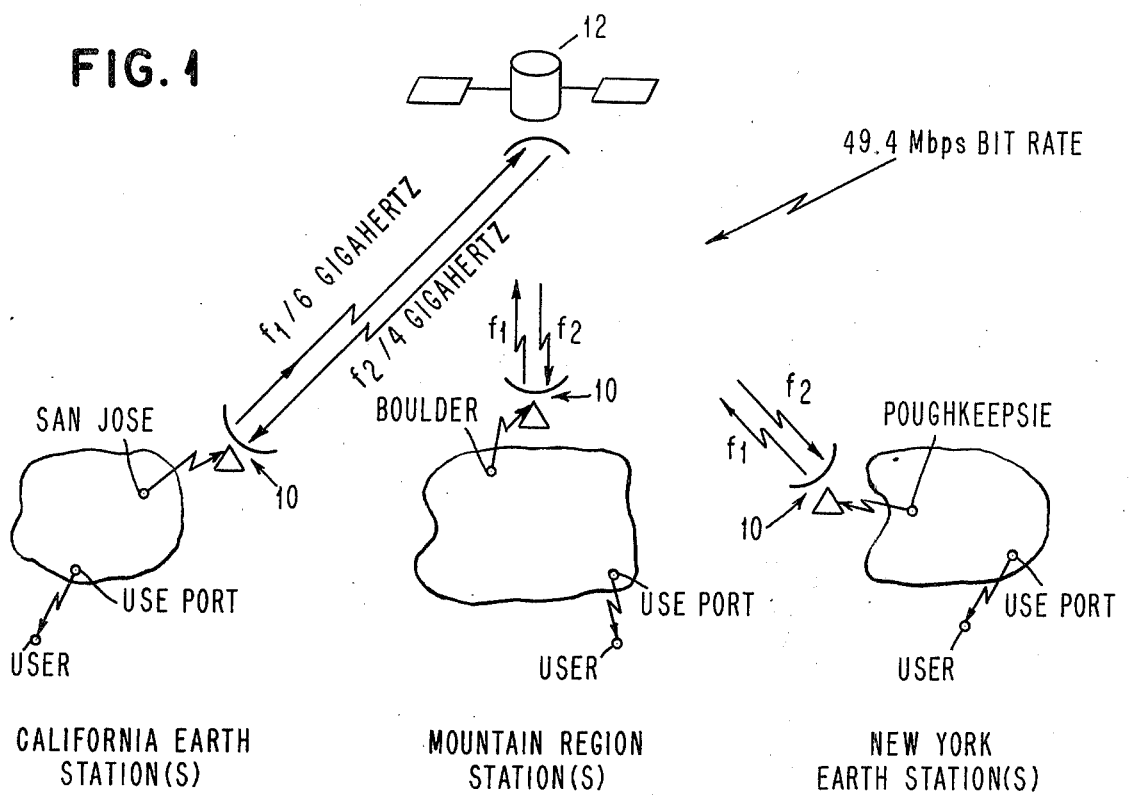
FIG. 1 schematically illustrates an exemplary geographic organization of a network according to the invention for explanatory purposes.

An illustrative geographic configuration of regional stations is shown in FIG. 1. The number of regions (three) is for simplified illustration only and not limiting. Each station encompasses a land area or region of use "access ports" at which information bit signaling speeds (or effective speeds for analog voice trunks) are quite low in comparison to the signaling capability of rf apparatus 10 relative to satellite 12.

The rf stations 10 transmit up-link to the satellite 12, in time divided bursts, on carrier frequency $f1$ (e.g. 6 gigahertz) and receive "down-link" in time-divided composite bursts on carrier frequency $f2$ (e.g. 4 gigahertz). The up-link information (traffic) bursts have varied lengths assigned according to station demand. The bursts of all participating stations are timed to span a TDM frame and to reach the satellite in juxtaposed or close succession without overlap. The satellite apparatus thereby acts as a repeater, broadcasting the composite of all bursts at the new carrier frequency $f2$.

B. Nodal (Station) Organizations

Figure 2:
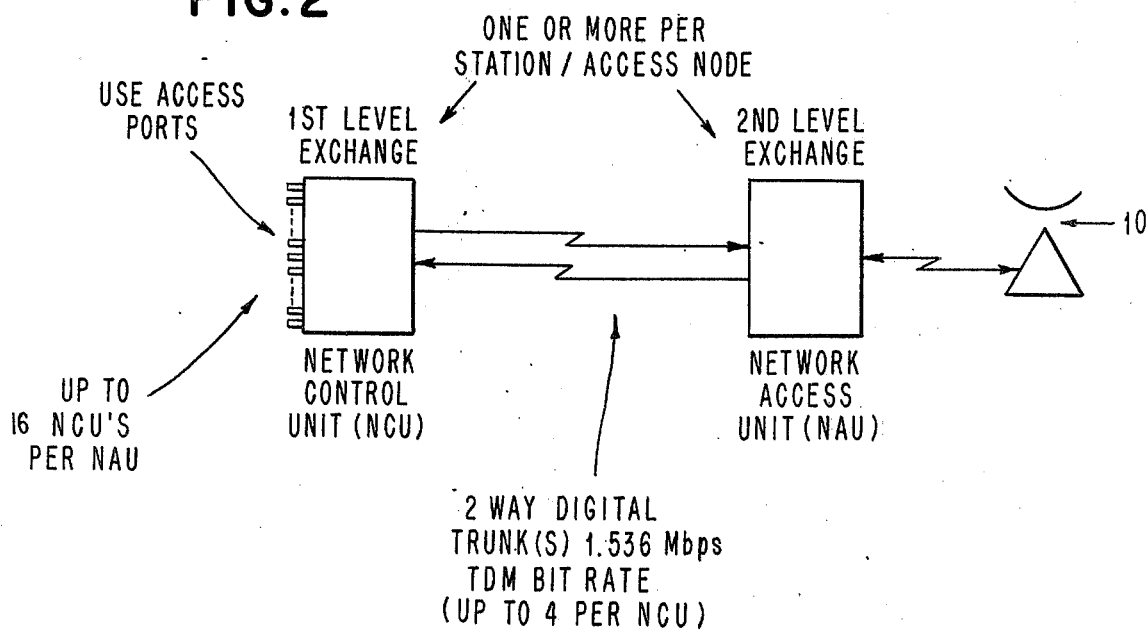
FIG. 2 schematically illustrates a station configuration of first and second level switching centers linked by land-based digital trunks, for interfacing hierarchically between the satellite and first level use ports in accordance with one aspect of the invention.

As shown in FIG. 2 the TDM switching apparatus of a region includes at least one first level TDM switching module-center, also termed NCU for Network Control Unit, and at least one second level TDM switching module/center, also called NAU for Network Access Unit. First and second level centers, when not co-located as discussed later, are linked bidirectionally by subsidiary digital trunks (e.g. high speed leased public carrier lines) each capable of supporting time-compressed time division multiplex signaling at information rates intermediate the high rate of the space segment (49.4 Megabits per sec.) and the low rates at individual input/output ports (e.g. effectively 32 kilobits per sec. per connected voice trunk). Certain NCU ports are connected to not-shown voice signaling facilities (e.g. PBX analog voice trunks) and others are connected to data sources and receivers (or modems).

Figure 3:
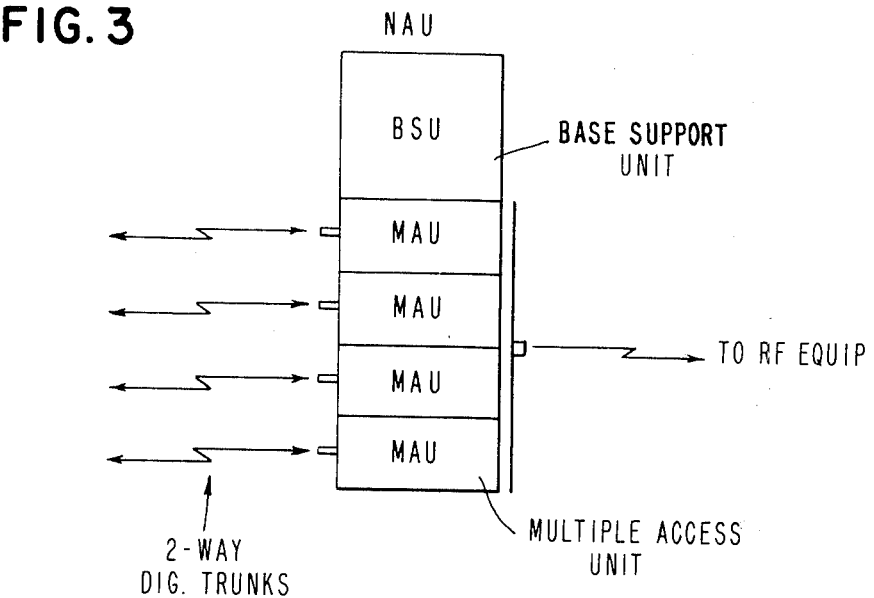
FIG. 3 schematically illustrates the modular organization of the second level centers.
Figure 4:
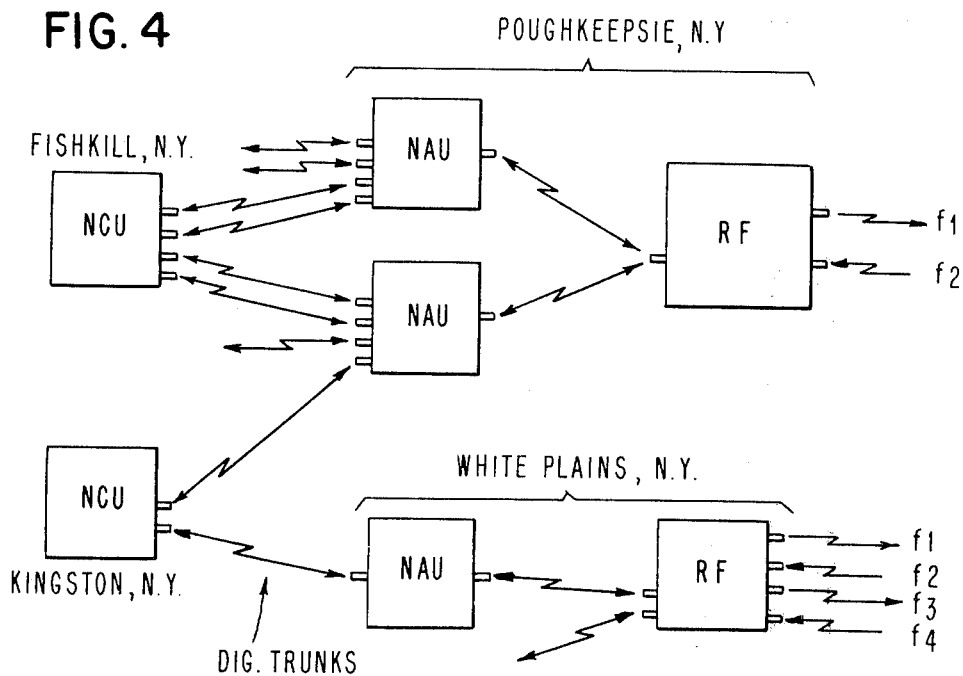
FIG. 4 schematically illustrates various land-linked station configurations, according to the invention, for providing time, space and frequency domain "toll" switching relative to the satellite and first level use ports.

FIG. 3 indicates that a NAU unit contains up to four MAU (Multiple Access Unit) basic switching modules having common program storage BSU (for "Base Support Unit"). FIG. 4 indicates that several NAU's may share common rf equipment, and that an NCU can link to the satellite via plural digital trunks and NAU's (or MAU's) over a variety of switched paths having space, time and frequency domain elements or segments. This figure is intended to illustrate further that one rf station can be adapted to communicate over more than one transponder band ($f1/f2$ and $f3/f4$) of one or more satellites. In the latter configuration one or more MAU's of a NAU may use different transponder bands of one satellite and economize on timing synchronization by sharing timing acquisition controls. This will be more fully explained later in the discussion of satellite tracking.

II. Network Signaling

A. Space Segment

FIGS. 5–7 illustrate TDM frame usage for signaling over a transponder channel of the space segment. Frames (FIG. 6) are of 6 millisecond duration. Fifty-six successive frames constitute a superframe (FIG. 5) of 336 milliseconds duration. Nine successive superframes form a masterframe. Initial "fixed length" burst segments of the frames of a superframe (FIG. 5 are assigned uniquely to different stations or earth access nodes (56 stations thereby being the maximum number of stations supportable on one time divided transponder channel) for control signaling usage. The aggregate of these control burst segments is termed the "Order Wire" (or OW).

The OW segments are used by respective stations for timekeeping (synch acquisition, satellite tracking, doppler-differential doppler correction, etc.), call connection scheduling and demand assignment communications. After initial acquisition the OW segments of acquired (active) stations (top line FIG. 7) have fixed equal lengths and uniform formats. The OW segments of inactive and initially acquiring stations (second line FIG. 7) are of fixed durations shorter than those of acquired stations. The OW segments of inactive (not transmitting and not receiving) stations are quiescent but always available for use.

The remainder of each frame is reserved for the traffic (information) bursts of all acquired ground stations (see FIG. 6 illustrating two acquired stations). These bursts have various lengths, selected according to a demand assignment procedure discussed later, and are sequenced in the numerical ordering sequence of the stations (i.e. 1, 2, . . . 56; assuming 56 stations, all acquired and having traffic burst assignments). The control (OW) and traffic bursts in each frame are timed by the source stations to interleave without overlap at the satellite. A small "guard" interval is maintained between bursts to avoid overlap.

Each type of burst (FIG. 7) carries bit timing (clock recovery) information and "unique word" information distinguishing the burst type. OW bursts are distinguishable by a unique word number 1 or number 2. Word number 1 is associated uniquely with a "reference" station determined at system initialization. It is the first station to acquire and its OW bursts provide a time/distance reference to other stations for superframe and masterframe timing, and for doppler shift correction relative to the satellite as discussed later. The reference station sends word number 1 in the first superframe of each masterframe. In other superframes the reference station sends word number 2. The other stations send word number 2 only (in their OW slots). Traffic bursts are distinguished by unique word number 3.

OW bursts carry control message information. The control message information of an initially acquiring station is used only to distinguish the burst as an initial transmission. The acquired stations follow the control message portion of their OW bursts with station identity information and satellite range information. Thus, OW bursts of acquired stations are longer than those of transitionally acquiring or inactive stations.

Traffic bursts (illustratively that of station J in the lower part of FIG. 7) carry user message information and control (activity compression mask) information relating to activity compression. Each burst contains one or more parts associated with respective source MAU's of the origin station. Each part is further subdivided into pieces associated with source trunks (e.g. J21, J22 . . . ) of the respective MAU. The compression mask information consists of 192 bits containing "two for one" information redundancy for error correction. With redundancy eliminated the compression information constitutes a 96-bit ordered mask having bits arranged in a predetermined order. The mask bits are associated with up to 96 correspondingly ordered first level virtual channels of the origin station. The association extends in varied order to origin ports by virtue of the slot interchange connection process described later and is pre-communicated among the stations by a technique described later.

The compression mask information occupies a time channel of 192 bit slots. Traffic information channels follow the associated compression information channel. The traffic information is arranged in ordered sets (or blocks) of 192 bits, each set associated with a variably positioned port of the origin station and an NCU storage area representing a virtual channel. Each set occupies a separate time channel of 192 consecutive bit slots in the transmission frame. The non-redundant mask bits having binary "1" value (always restricted to less than 48 of the 96 bits for reasons explained later) serve to indicate source associations of individual user message blocks.

The bit slots of a satellite frame are highly time compressed to accommodate a digital signaling rate of about $49.4 \times 10^6$ bits per second (contrasted with the analog to digital voice sampling rate, at any first level voice trunk/PBX interface, of $32 \times 10^3$ bits per sec.) The information content and timing of bursts within a frame is determined at associated source NAU's (or MAU's for the more primitive second level access interfaces).

Received composites (of interleaved station bursts) are partially decomposed at receiving NAU's, according to connection association information (prepared by techniques described later), and temporarily stored. Each MAU re-structures the activity compression mask elements (bits) and associated user message (traffic) information sets scheduled for its station to optimize down-link use of associated digital trunks.

The activity compression mask thereby defines the interpolative (virtual-to-real channel assignment) handling of traffic relative to virtual channels of origin stations (source NCU up-link; destination MAU down-link). This type of handling is related to time assignment speech interpolation (TASI) techniques dealt with in earlier patents (for instance in U.S. Pat. No. 3,644,680).). It differs in several significant respects: (1) the compressively handled user message information is accumulated and transmitted in multi-sample blocks (192-bit sets) rather than single sample units (hence proportionately fewer mask bits need be sent); (2) the compression is applied to modular fixed size ordered groups of virtual channels and extended to ports in arbitrary order through switching between ports and satellite access station nodes which is controllable relative to activity at other access nodes; (3) the user message traffic and compression mask information is rearranged after passing through the satellite and a new mask is generated on the down-link trunk paths with resulting trunk signaling efficiencies; (4) the mask generation procedure is unique in respect to over-run (freezeout) management and echo control, as described later; (5) the compression handling is adapted to accommodate mixed voice (or sound) and data, rather than voice only; (6) the handling is unique in respect to preservation of voice intelligibility.

B. Digital Trunk Signaling

Figure 8:
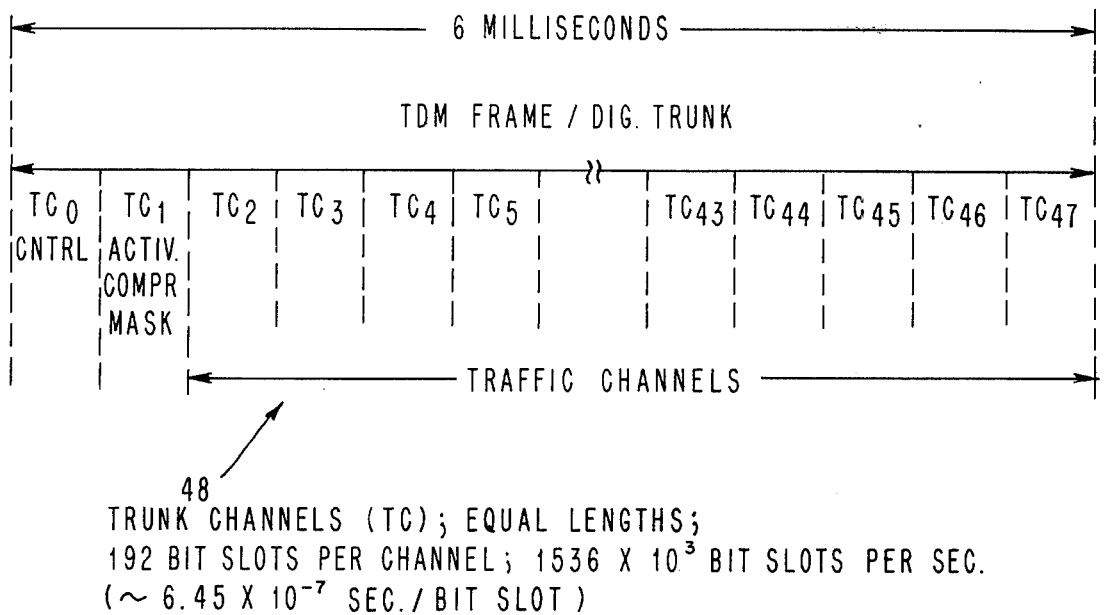
FIG. 8 indicates the form and timing of the TDM signal frame employed on digital trunks between first and second levels.

The trunk frame time, for intra-nodal (intra-station) TDM signaling between NCU's and MAU's of a station, is also 6 milliseconds (recall that the satellite frame time is 6 milliseconds). Trunk TDM frames (FIG. 8), both up-link and down-link, are segmented into 48 consecutive "trunk" channels (TC) each containing 192 bit slots.

The first trunk channel TC0 carries control (signaling) information used for intra-station control and inter-station connection path preparation. The second channel TC1 carries activity compression information with FEC (Forward Error Correction) redundancy. With redundancy eliminated the compression information reduces to a 96 bit compression mask as defined above for relating traffic in the following 46 channels (TC2-TC47) of the same frame either to input origin virtual channels and ports or to output destination virtual channels and ports. Note that in the presently described system trunk frames invariably have 46 traffic channels associatable with 96 ports. (This is the basis for system modularity and for the restriction to less than 48 1 valued mask bits noted above).

Figure 9:
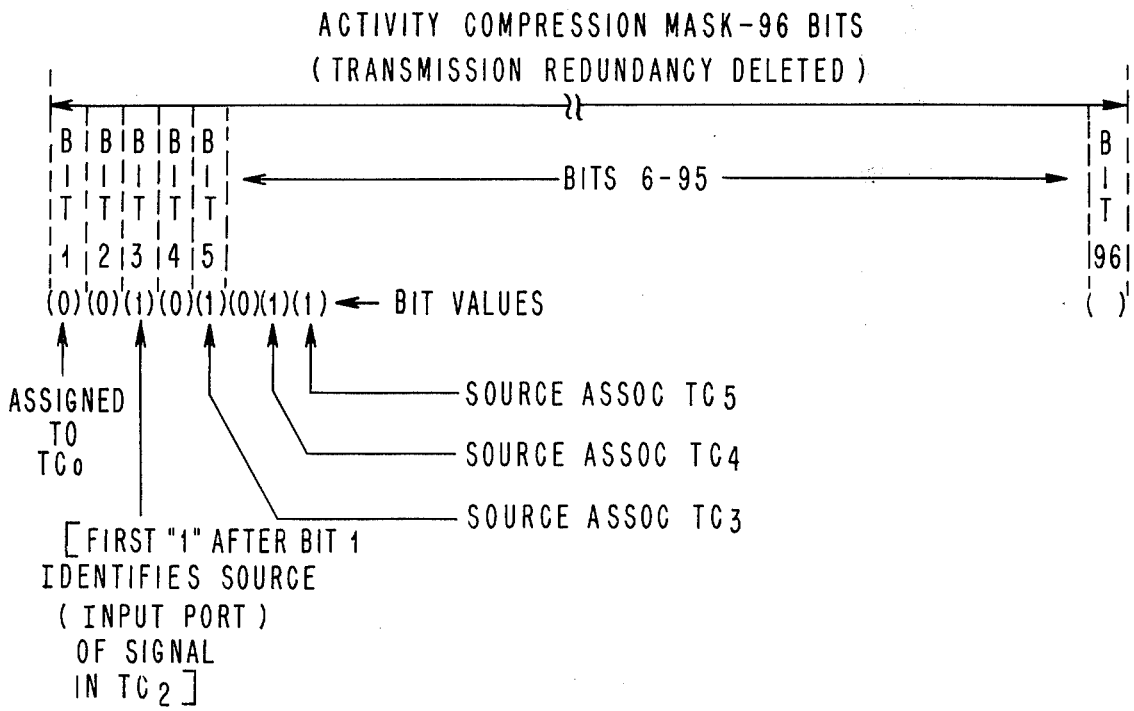
FIG. 9 indicates the form of the activity compression mask (exclusive of transmission redundancy) used to indicate virtual-to-real channel assignment associations of compressed information block transmissions.

The non-redundant activity compression mask for trunk signaling (FIG. 9) consists of 96 1 and 0 bits of which not more than 47 bits are allowed to have 1 value as explained previously. The mask bits are associated positionally with up to 96 virtual channels and their connectively associated first level ports and the 1 bits in the mask are associated positionally with the trunk channels TC2-TC47 which follow the mask information channel TC1. The first bit in the mask (whether 1 or 0) represents the activity state of control signal channel TC0, the first 1 bit after the first position associates with TC2, the second 1 bit with TC3, and so forth. If there are less than 47 1 bits in the mask a corresponding number of trunk channels will be vacant. Thus, for instance if there are 20 1 bits in the mask and the first mask bit is 1 the 20 bits associated consecutively with and indicate activity in TC0 and TC2-TC20 and channels TC21-TC47 are vacant.

In up-link trunk signaling the mask bits are associated with NCU input ports and respective trunk-out (virtual channel) information storage areas. The 1 bits in the mask effectively identify origin port (and NCU storage area associations) of traffic information blocks carried in the same frame in trunk channels which follow TC1. The association need not be constrained by the physical positions of the ports (or storage areas) relative to each other. Indeed, as explained more fully below in the description of the NCU module, the up-link mask bit and port associations may be grouped according to scheduled down-link destinations in order to speed up decomposition and recompression (re-VAC) handling.

In down-link trunk signaling the compression mask and traffic are developed from the recovered satellite frame information. The down-link NAU's reference stored information associated with distribution connections at their respective stations and the MAU's individually assemble the mask and traffic information for handling over respective trunks. The mask is formed to associate contents of trunk channels TC2–TC47 of each frame with respective NCU storage areas (virtual channels) and output port destinations.

In trunk signal handling, both up-link and down-link, when virtual activity exceeds channel capacity of a trunk frame (i.e. more than 47 storage areas loaded or partially loaded) the handling center (NCU up-link or MAU down-link) recognizes this as an over-run condition relative to that trunk. It then selects only 47 storage blocks (Virtual Channels) for transfer to the trunk and effectively discards (freezes out) the rest. The process of selection is prioritized to cause least disruptive effects relative to the users (as explained later) and the mask is formed to appropriately indicate source associations of only the information blocks actually transmitted.

C. Signaling at First Level NCU Input/Output Ports

Analog voice (sound) and data inputs (e.g. at ports attached to telephone trunks) are sampled 32,000 times per second and encoded in delta modulation form by shared encoding apparatus in the NCU. Data inputs are received either through datasets or directly from data source lines and processed through interfacing modems in the NCU. Output signals are dispensed at NCU output ports in the signal form (and rate) of the corresponding input.

NCU's can establish local connection associations directly between input and output ports of one station, and internal virtual segments up of remote toll connection associations between ports of different stations. A toll connection association through the satellite is made up of four duplex or simplex segmental path associations (NCU and MAU up-link and NCU and MAU down-link) from the calling port to the called port.

For switched voice connections the off-hook, dialing, inter-office signaling, and ringing or busy tone effects receive special handling by first level modules. Once established the path between toll connected parties is functionally that of a long distance call with a very long delay (due principally to the 44,000 mile round trip path from earth to satellite).

Data signaling connections relative to the space segment are of two types: (1) transparent native, in which the handling between input and output ports is transparent to the user, and (2) controlled links in which user signals are used interactively with network controls to determine utilization of network channels.

D. Compression-Multiplex Handling

Voice connection paths between stations, established by signaling procedures described later, are utilized as follows. Input/output ports having virtual connection association with a trunk are scanned 192 times per frame by respective NCU's. Scanned telephone voice inputs are monitored for "talk" (sound) activity exceeding a predetermined threshold level; "echo" signals being distinguished and treated as inactivity. Active inputs are sampled, encoded in companded delta-modulation form (one bit per sample) and transferred by slot interchange switching described later into 192 bit random access trunk-out storage areas assigned associated switchably to respective ports. Each such area corresponds to a Virtual Channel VC for transmission.

At appropriate intervals in a trunk frame contents of these storage areas are transferred over selectively assigned real channels RC (also TC) of connectively pre-associated digital trunks. The trunk channels utilized for this purpose in a frame are associatively identified by compression mask bits sent over channel TC1 of the same trunk (and frame) as explained previously.

The process is then repeated in the next frame with new samples being cumulatively stored and forwarded by the NCU as time compressed and activity compressed TDM signals. For each digital trunk (an NCU module may accommodate up to four trunks) there are 48 time-ordered RC's assignable through ordered buffer storage and switching (slot interchange) to 96 relatively ordered VC's and 96 relatively unordered ports. Thus an NCU module accommodates duplex connection of multiples of 96 voice and data ports (i.e. 96, 192, 288 or 384 virtual input/output connection associations), according to the number of associated digital trunks, and is constructed to contain sufficient block trunk storage for such accommodation. Furthermore, as described below, the scanning apparatus of the NCU is organized to be able to maintain the desired uniform rate of information sampling ($32 \times 10^3$ bits per second per port) relative to as many ports as can be connectively accommodated at one time.

The determination of voice input activity is based upon the difference at sampling time of signal levels at paired (duplex) input and output voice trunk lines. The NCU keeps track of input activity states in each frame and changes in activity relative to previous frames. Echo signal levels are distinguished effectively as inactivity and if there is no over-run condition the activity information of a frame becomes the activity compression mask bit which is transmitted in trunk channel TC1 in the next frame.

When there is an over-run (coincidental activity in more than 47 VC's associated with a trunk) the NCU "recognizes" this and selects information (block storage areas) to fit the available (47) channels, discarding (freezing out) all other activity. The activity compression mask transmission is adjusted so that the VC (and port and storage area) associations of the transmitted information are correctly identified. Activity mask bits associated with discarded blocks are sent as 0 values (inactive indications).

The storage areas (addresses) selected in an over-run situation are chosen on a predetermined priority schedule. The selections are fixed prior to the channel (time slot) TC1 of the activity mask transmission. The order of priority for selection is: data takes precedence over voice (sound) and continuing voice ("talkspurt") activity takes precedence over voice activity beginning in the sampling (storing) frame. The continuity of voice activity is determined by comparing activity information of present and of previous sampling frames for each voice activity port. Human factors observations indicate that with provision of suitable "overhang" described later clipping an initial or terminal 6 milliseconds (192 samples) of "talkspurt" activity is less disturbing to a connected listener than interruption of a continuing talkspurt. There is apparently less noticeable effect upon listening intelligibility in the former case than in the latter.

The rate of transmission blockage due to activity compression freezeouts is continually monitored by the NCU and maintained as a connection control parameter relative to the affected (blocked or over-run) digital trunk. A rate in excess of a predetermined threshold value sets a system indicator used in the NCU to inhibit setting up of further connections relative to that trunk. This is significant because in a system handling mixed voice and traffic it is not always possible to anticipate the blocking rate.

Second level MAU modules in up-link paths receive activity mask and information signals from respective trunks and stage these in pre-assigned random access buffer storage areas for burst transmittal to the satellite in the assigned burst segment of the following satellite frame. The storage use is managed so that trunk reception and storage proceed continuously during satellite transmission, as explained more fully later in the description of the MAU circuits.

In down-link second level handling the MAU's utilize pre-exchanged connection schedule information to select only those portions of the transponded composite signal which relate to respective switched path schedules. The selected portions, including the information to be distributed and associated activity compression mask elements (bits), are stored and re-grouped in block-frame units suitable for handling over the digital trunks. The activity compression mask elements associated with a trunk route are restructured by the MAU into a new mask (96 bits plus FEC redundancy) having no more than 47 non-redundant bits in the "one" state. The mask indicates VC and output port associations of transmitted information blocks carried in real trunk channels TC0 and TC2–TC47. The zero-valued mask bits represent inactivity in associated VC's and the one-valued mask bits define the RC's carrying the transmitted activity.

If more than 47 (VC's) information blocks are prepared in storage for down-link transmission relative to a trunk the MAU recognizes this as a "down-link over-run" condition, and selects only 47 blocks for actual transmission, discarding the others. The selection is prioritized on the same basis as explained above for up-link NCU handling. The information required for distinguishing data from voice and continuing talk (talkspurt) activity from starting or ending talk activity, is extracted from the mask information carried over the satellite as explained later. The trunk activity mask is formed to correctly indicate the output associations of the selected information blocks.

In the final leg of down-link handling the "output" NCU stores the information received from its digital trunks in storage areas associated switchably with output ports. The destination port associations of received information blocks are determined from the preceding activity compression mask transmission and the pre-exchanged connection schedule information. The information carried over the trunks is distributed by digital switch apparatus described later from assigned storage areas to output ports in the same signal form as the corresponding input signal. Thus digital voice signals are scanned at 32 kbps, decompanded, decoded to analog form and applied to scheduled NCU output ports. Output data is also scanned at the corresponding input rate and remodulated in a modem if received in modulated form through a modem.

E. Network Sequence For Connection Path Preparation

Figure 10:
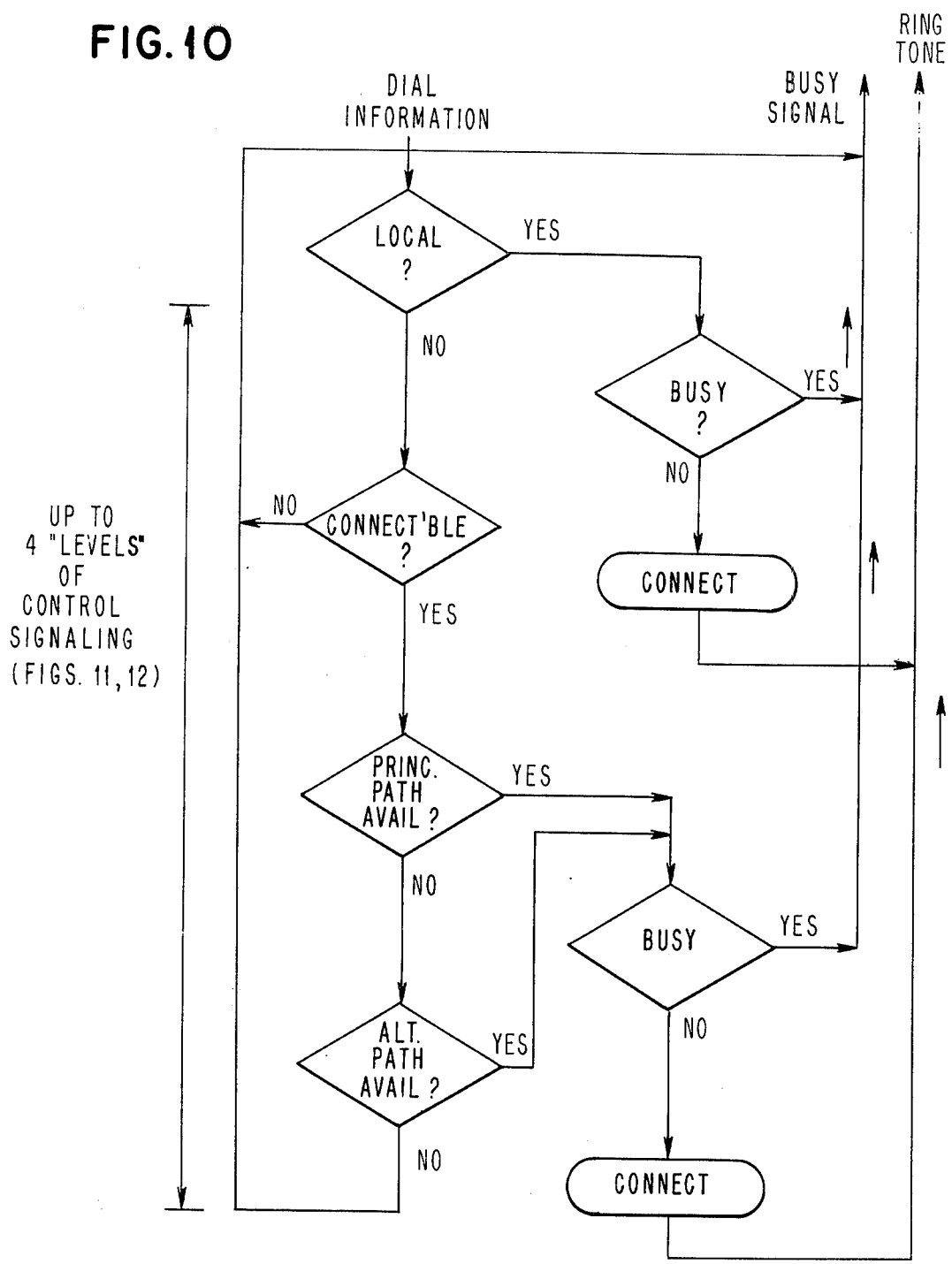
FIGS. 10–12 indicate network inter-communication and operational sequencing for call processing.
Figure 11:
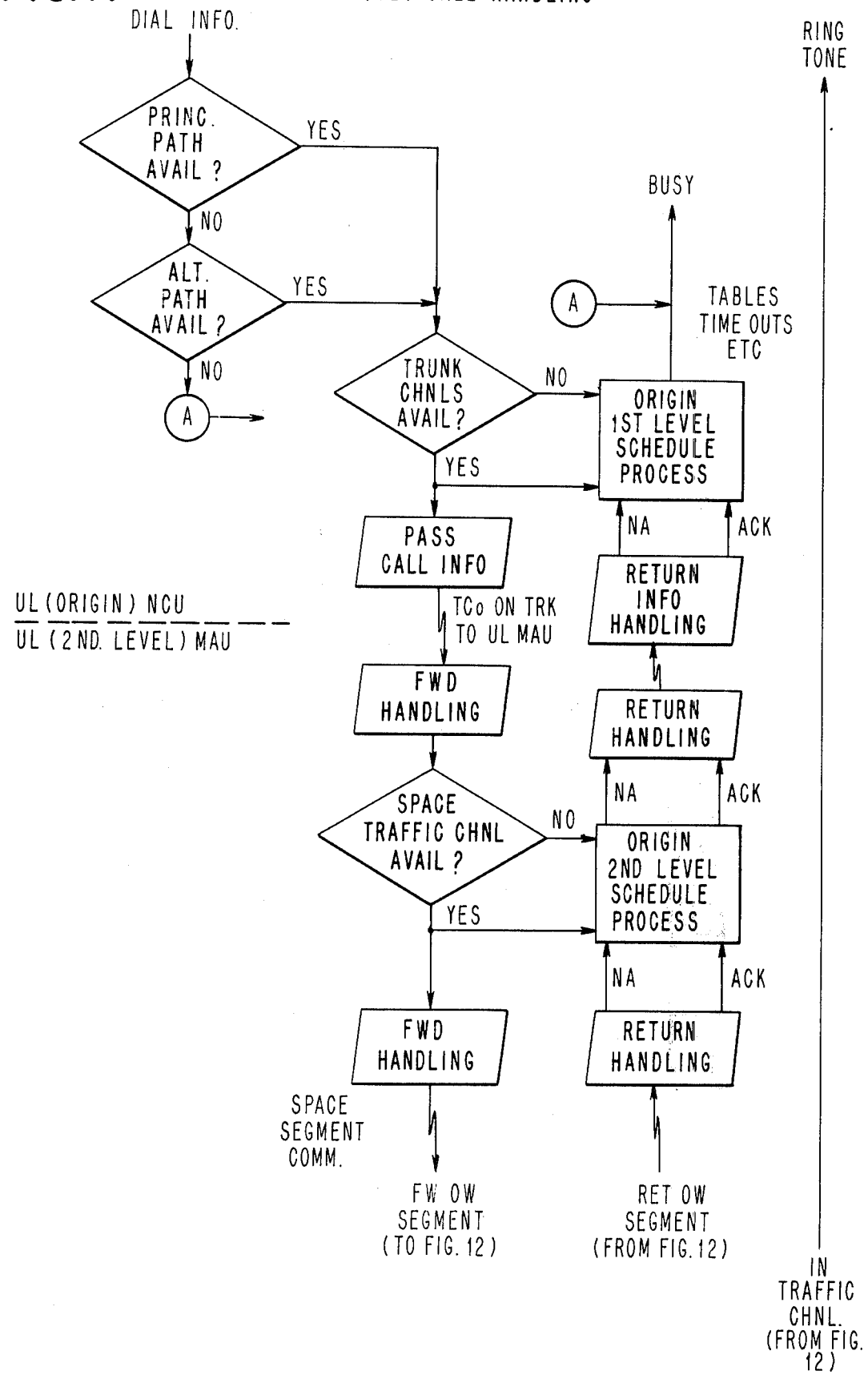
Figure 12:
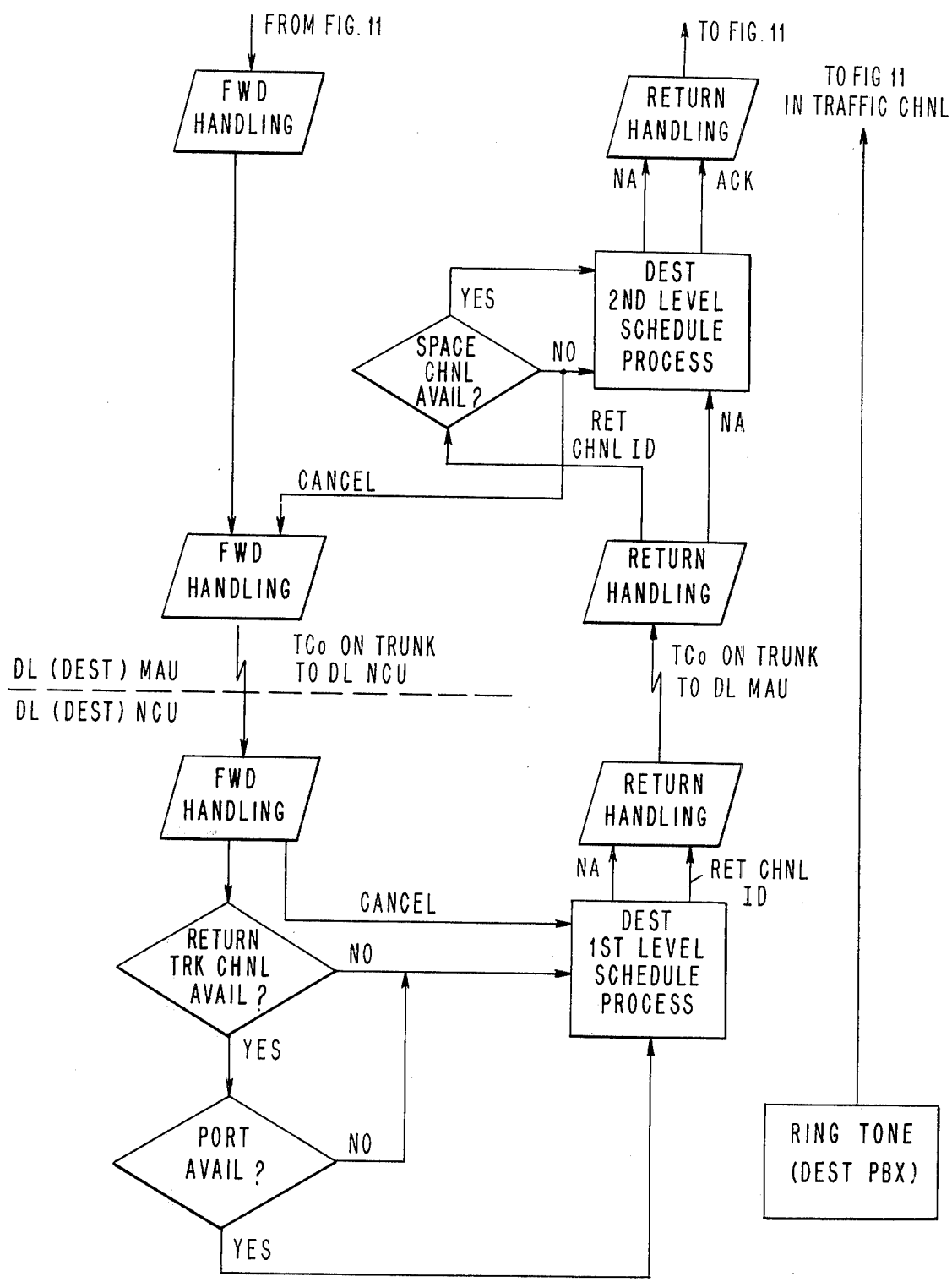

The sequence of network operations involved in setting up time and space domain "switched" connections through the NCU and NAU exchange centers and over the space segment is explained referring to FIGS. 10–12. Upon detecting off-hook condition of a calling telephone trunk (PBX) the locally associated NCU uses its pre-stored information to determine (FIG. 10) whether the call is local or toll. If local a switch path to a called port within the same station region is examined for busy condition and the NCU either performs the switch function or returns a busy signal. A completed local connection is held by the NCU until the originating party hangs up. All completed connections, local and toll, are timed and monitored for termination by the origin NCU.

For setting up a toll connection through the space segment the origin NCU (FIG. 10) refers to an internally stored network directory and tests external path segments (by trunk communications on TC0) for "availability" status. If a principal path specified in the directory of the origin NCU is unavailable, one (or more) alternate paths may be tested. The testing and completion of paths involve control signaling communications over control channels TC0 on digital trunks and over OW segments of satellite bursts. The communication procedure is described next with reference to FIGS. 11 and 12.

Each NCU is provided with stored tables indicating prescribed toll paths between itself and exchanges attached to other NCU's. The tables further contain indication of the status of availability of these paths on a long term basis indicating, for instance, paths taken out of service for diagnostic or other purposes. If a principal or alternate path is indicated as tentatively available the origin NCU checks for availability of traffic channels on the digital trunk segment of the path for carrying traffic from the calling port to the NAU. If the digital trunk channels are not available for this purpose, in either a principal or alternate path, the NCU returns a busy signal tone indication to the calling port (i.e. to the calling PBX or data source). If an up-link trunk traffic channel is available the origin NCU passes the call information over the control channel (TC0) of any digital trunk attached to the up-link (UL) MAU which is in the tentatively designated path. At the same time information is stored by the NCU to tentatively prepare for (schedule) use of the selected trunk traffic channels pending arrival of path extension information from up-link modules.

The UL MAU tests for availability of a space traffic channel for carrying information by satellite to a down-link MAU associated with the called (destination) port. If a space channel is not available, a Not Available indication is returned to the origin NCU and the call is terminated again with all scheduled information effectively nullified in both the origin NCU and UL MAU. If a space traffic channel is available, the call information is transferred over the Order Wire (OW) segment of the UL MAU to the "called" DL MAU.

On the down-link (destination side) the information is initially processed by the DL MAU and the call information is relayed to the DL NCU over control channel TC0 of any digital trunk. The DL NCU then proceeds to determine whether the call is duplex or simplex and whether the destination port is busy. For both types of calls the destination NCU determines availability of return trunk traffic channels to the associated DL MAU. If return trunk channels are unavailable or the output port is busy a Not Available (NA) indication is relayed up-link, in successive communication steps, through the DL MAU, the up-link MAU and the origin NCU; the call being thereby terminated as incomplete with appropriate nullification of all prepared connection information. If the return channels and the output port are available their identity is communicated up-link to the DL MAU. If ringing action is initiated to the PBX corresponding ringing information is relayed back through the connected traffic channel to the calling port. Thus the calling party "hears" the remote ringing.

F. Call Timing And Termination

The origin NCU associated with the calling party is responsible for timing the duration of calls (completed connections). The origin NCU must therefore maintain appropriate internal processes for monitoring its completed call channels to determine call status. When the calling party "hangs up" the associated NCU detects this as a call termination condition and relays this to all up-link and down-link stages of call handling. At each stage the call connection is effectively nullified and the scheduled path segments are effectively made available for other connections.

The origin NCU is also responsible for communicating its call duration information to external network manager (data processing) apparatus as described later for revenue billing. The origin NCU is also responsible for maintaining information relative to non-completion of calls due to unavailability of path segments for completion. This information is also reported to the network manager as a network statistic for high level path table configuration control and also for diagnostic purposes.

The NCU's, on both ends of a call connection are responsible for monitoring respective traffic signal blocking rates due to freezeout occurrences in activity compression as mentioned above, and for maintaining this information in a condition of reportability relative to the network manager whereby the freezeout rate may be used not only as a local statistic of connectability but also as a network statistic for high level configuration control and diagnostic purposes.

III. Exchange Center Apparatus

A. Introduction

The art to which this invention pertains is digital switching for time multiplex digital communication, by satellite, or equivalent time division multiple access (TDMA) facilities. One skilled in this art is presumed to have working familiarity with system and circuit design principles relative to conventional multiplex switching control and rf handling. Relative to multiplex handling a working knowledge is presumed in these areas: satellite communication, "intelligent" digital communications controllers and operating systems for controllers. References considered representative of the state of the art in these areas, and effectively incorporated herein by this reference, are:

1. Satellite Communications

| U.S. Patent No. | Inventor | Subject Matter |
| --- | --- | --- |
| 3,509,471 | Puente | bit timing recovery |
| 3,526,719 | Puente et al | unique word recovery |
| 3,530,252 | Puente | acquisiton |
| 3,542,956 | Sekimoto | echo cancellation |
| 3,562,432 | Gabbard | interleaved burst timing |
| 3,564,147 | Puente et al | carrier switching |
| 3,566,267 | Golding | interleaved burst timing |
| 3,569,853 | Wolejsza | signal recovery |
| 3,617,644 | Boag | demand assignment and exchange handling |
| 3,634,628 | Sekimoto et al | TDM signaling in bit multiplex |
| 3,644,678 | Schmidt | burst timing demand assigned length |
| 3,644,680 | Amano et al | activity compression |
| 3,649,764 | Maillet | burst timing, demand assigned length |
| 3,678,389 | Heers et al | minimizing effects of "signal blocking" |
| 3,683,116 | Dill | Exchange path connection handling |
| 3,712,959 | Fariello | activity detection |
| 3,725,612 | Campanella | echo cancellation |
| 3,730,998 | Schmidt et al | acquisition in TDMA system |
| 3,772,475 | Loffreda | TDMA frame, superframe format |
| 3,778,715 | Schmidt | acquisition in TDMA system |
| 3,780,233 | Campanella | echo cancellation |
| 3,789,142 | Shimasaki | TDMA frame synchronication |
| 3,789,165 | Campanella | echo cancellation |
| 3,806,879 | Schmidt et al | block multiplexing in TDMA |
| 3,812,430 | Schmidt et al | burst acquisition in TDMA |
| 3,813,496 | Maillet | burst acquisition in TDMA |
| 3,816,666 | Tomozawa et al | burst formatting in TDMA |
| 3,818,348 | Puente | unique word detection |
| 3,818,453 | Schmidt et al | block multiplexing in TDMA |

2. Communication Controllers

| IBM Manual No. | Title | Copyright Date |
| --- | --- | --- |
| GA27-3051-2 File No S360/370-09 | Introduction to the IBM 3704 and 3705 Communication Controllers, Third Edition | April 1974 |
| GC30-3004-3 File No S360/370-09 | IBM 3704 and 3705 Communications Controllers Principles of Operation, Fourth Edition | June 1974 |
| SY30-3003-1 File No S360/370-30 | IBM 3705 Communications Controller Network Control Program, Program Logic Manual, Second Edition | Sept. 1973 |
| GC30-3003-1 File No S360/370-30 | IBM 3704 and 3705 Communications Controllers Assembler | July 1973 |

| | 2. Communication Controllers | |
|---|---|---|
| IBM Manual No. | Title | Copyright Date |
| GC30-3003-2 File No S360/370-30 | Language, Second Edition IBM 3704 and 3705 Communications Controllers Network Control Program Generation and Utilities, Third Edition | Aug. 1973 |

B. First Level (NCU)

1.0 NCU General Description

The NCU is a programmable digital switch which is a major element in the system. The switching function of the NCU is designed to accommodate both data and private voice traffic. Input-traffic is primarily switched from data sets and PBX's to a high speed digital trunk facility and vice-versa.

The NCU may be configured in a terrestial network, a satellite network, or a combination of both. An NCU may communicate directly with another NCU or with a Network Access Unit (NAU) via a high speed digital trunk line. The NAU provides the necessary function to support a satellite communication system.

Figure 13:
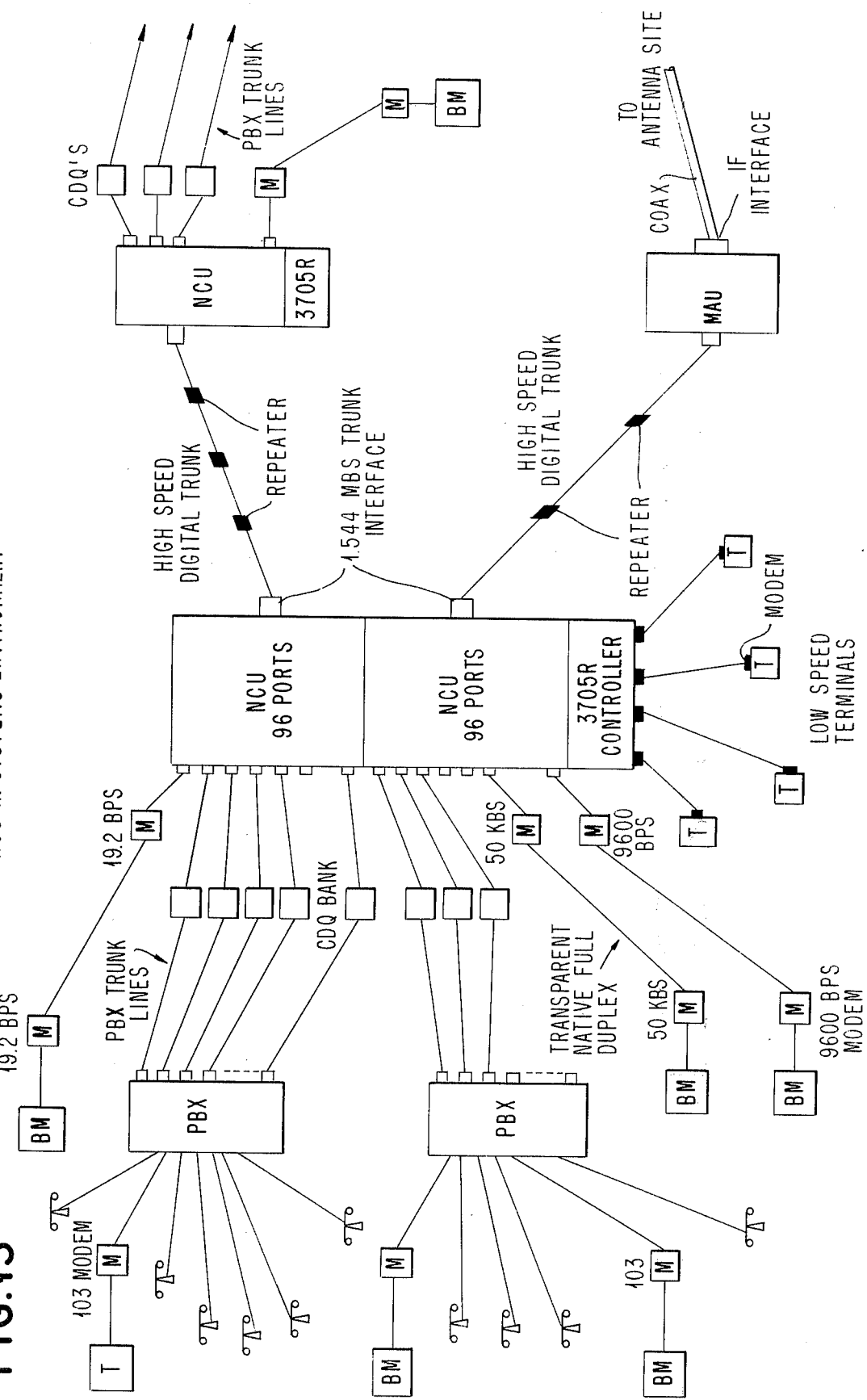
FIG. 13 provides a network configuration overview for explaining certain connection path capabilities of the subject system.
Figure 14:
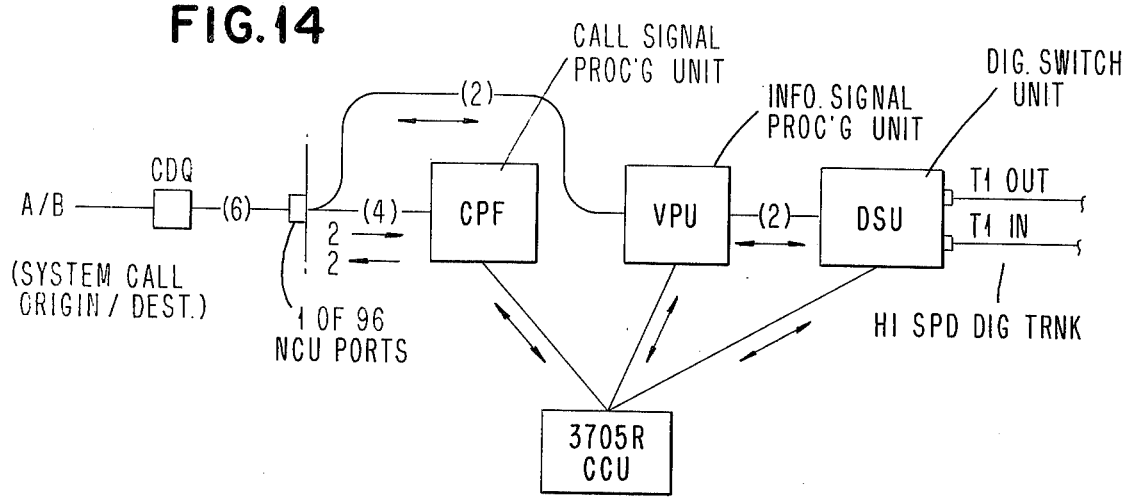
FIG. 14 shows the system organization of the NCU.

The NCU attaches to a 3705 communications controller controlled by a Network Control Program (NCP). FIG. 13 describes the NCU system environment. The data flow of the NCU is shown in FIGS. 14A-14C (3 pages). All memory units are solid state random access unless otherwise specified.

1.1 Voice Traffic and Voice Activity Compression

The NCU is designed to attach via telephone trunk lines to PBX's and Centrexes. The attachment of a trunk line is defined by the public carrier in its interface specifications; two of which are Voice Connect Arrangements (VCA) CDQ2W and CDQ4W.

The CDQ interface includes control (call) and analog (voice) signal sections. The control signalling portion is used to communicate dial and state (on/off hook, talking . . .) information between the NCU and PBX and is managed by Call Processing hardware.

The analog portion of the CDQ is used to communicate call signal tones (busy, ringing) and voice information after a call is established. In the NCU, the analog signals are digitalized using Delta Modulation and transmitted in 32 KBS channels.

In addition to digitalizing and connectively switching voice information, a Voice Activity Compression (VAC) scheme is implemented in the NCU on a modular basis. VAC is a compression technique similar in function to the TASI System used in the public telephone network. Channels which are assigned in a "virtual" sense for voice transmission are dynamically turned on and off as "real" voice activity is "sensed" on the line and only real activity is transmitted. This allows for the allocation of two or three times the number of call connections per available real channel, since "talk activity" is normally in the 30–50% range. VAC and its operation are described in section 4. Voice Processing and activity detection are described in section 3.

1.2 Dial Up Data

Data sets which are attached to phones may be handled by voice processing hardware of the NCU for rates up to 1200 BPS. Calls are established through the PBX from the modem and the analog information is digitalized by the delta modulation hardware. The characteristics of the modem carrier are quite different from voice and necessitate a modification to the delta modulation (voice encoding) algorithm when a data call is made. Data calls are indicated to the NCU by preceding the seven digit "dialed" number by a 1. This allows the NCU to distinguish between voice and data calls and modify the delta modulation algorithm appropriately.

1.3 Transparent Native Data

Data for speeds higher than 1200 BPS cannot be processed with delta modulation. For these cases, data adapter hardware is used which allows the NCU to interface directly with the digital side of a high speed modem. Transparent Native (TN) connections must be full duplex point-to-point arrangements as shown in FIG. 13. In order to achieve an extremely low error rate, Forward Error Correction (FEC) is added to all transparent native data before it is transmitted through the NCU network.

1.4 High Speed Digital Trunk

A high speed digital trunk is used to transmit voice and data to a remote NCU or NAU. The digital trunk operates at 1.544 MBS and is commonly called a T-1 line. The T-1 interface has been defined by the public carrier (AT&T) and is described in section 4. At the present time the public carrier supplies a limited distance T-1 service up to 50 miles.

Information is formatted on the T-1 trunk line in frames. A frame contains 48 channels plus frame synchronization information. A channel contains 192 bit slots. In addition, a VAC mask and signaling information are transmitted in two reserved channels (TC0, TC1) of the frame. Signaling is used for control communication between units linked by the trunk line. The VAC mask contains control information which defines the compressed voice channels being transmitted. These topics are described in section 4.

1.5 Capacity and Configuration

The basic NCU is a modular digital switch which interacts with an IBM 3705 communications controller capable of controlling up to four NCU's. The module has 96 full duplex ports capable of attachment to PBX's via CDQ interfaces. Alternatively ports 0-31 may be attached to transparent native hardware. The NCU module may interface with a high speed digital trunk line at 1.544 MBS and with a 3705 controller via the 3705 I/O adapter bus.

Figure 15:
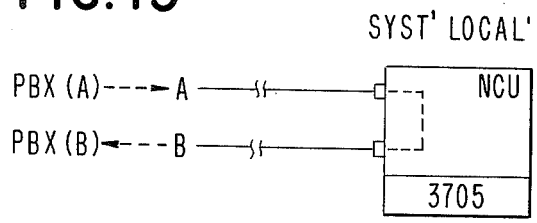
FIG. 15 schematically shows utilization of the NCU to establish local connection paths.
Figure 16:
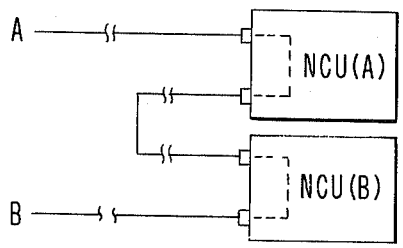
FIG. 16 shows the use of NCU's in tandem to establish connection paths which do not utilize the satellite.
Figure 17:
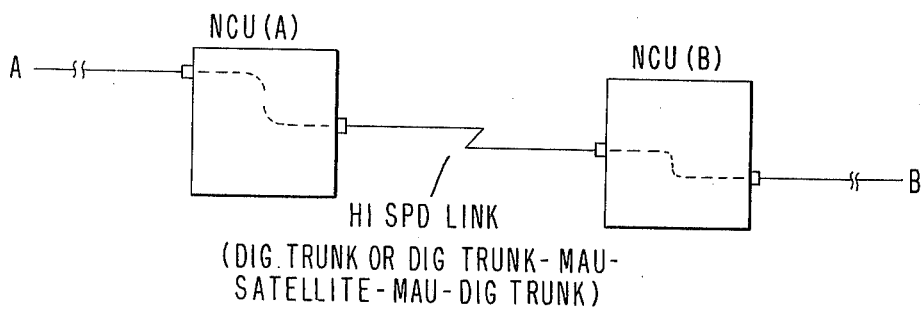
FIG. 17 shows toll connection paths utilizing the satellite transponder path.

NCU capability may be expanded by interconnecting two to four NCU's together under common 3705 control. The maximum configuration consists of 384 full duplex ports and four high speed digital trunk interfaces. When NCU's are interconnected, inter ("tandem") as well as intra (local) NCU switching is possible. Interconnected NCU's interface with a single 3705. If reliability is a key factor, interconnected NCU's may be attached to two 3705's. The basic configurations of NCU interfaces are shown in FIG. 13. The connection configurations (local, tandem, toll) are shown in FIGs. 15–17.

1.6 Programming Support

The Network Control Program (NCP) is the control program for the 3705 adapted to include Call Processing and Network Management functions described below. These programs serve to manage the NCU resources, process calls, tabulate billing information and direct other networking functions.

1.7 NCU Organization

The NCU module contains three sections (FIG. 14): the Call Processing Facility (CPF), the Voice Processing Unit (VPU) and the Digital Switch Unit (DSU).

2.0 Call Processing 2.1 Introduction

The Call Processing Facility CPF (FIG. 18) interfaces with the CDQ lines of distant PBX's and the Central Control Unit (CCU) of the 3705. It processes incoming and outgoing calls relative to the lines. The address counter in the CPF continuously scans CDQ supervisory receive lead pairs (CBS) of the 96 PBX ports to detect line state (on-hook or off-hook; dialing or talking). Upon detecting an off-hook transition, the CCU of the 3705 is interrupted by the CPF. During the operation, the CPF takes commands and information from the 3705 CCU and generates pulses on CS lines going back to the CDQ. Subsequently, a connection is established. The leads CS provide the means of acknowledging an incoming call and relaying dial pulse information of an outgoing call. The supervisory leads CBS provide the distant PBX with a means of seizing and dial impulsing the CPF on incoming calls, and acknowledging outgoing calls.

2.2 Interface with CDQ

The CPF interfaces with voice connecting arrangement CDQ2W* or CDQ4W*. Plug-on pins are used on the CDQ adapter cards to match the CDQ2W or CDQ4W.

Six interface leads (3 pairs) per tie trunk are provided from the Voice Connecting Arrangement CDQ2W to an interface connecting block and then to the CPF.

The leads and their functions (FIG. 18) are as follows:

a. CT, CR leads are used for two-way (transmit, receive) voice and one-way (tone) transmission relative to the NCU.

b. CS, CG leads are used for outgoing signals (to the connecting arrangement)—seizure, dc dial pulses, answer and disconnect supervision.

c. CBS1, CBS2 (2CBS) are used as incoming signals (from the connecting arrangement—seizure, dial pulses, and answer and disconnect supervision from distant end.

Eight interface leads (4 pair) per tie trunk are provided from the VCA CDQ4W. There are 2 pair for voice transmissions, one for receive and the other for transmit. The outgoing and incoming signal pairs are the same as CDQ2W. For detailed information see Voice Connecting Arrangement CDQ2W, CDQ2X Interface Specification, June 1971 by AT&T Company, and Voice Connecting Arrangement CDQ4W Interface Specification, August 1969 by AT&T Company.

Different telephone company systems require various kinds of signaling arrangements prior to receiving dial digits from a distant telephone system, such as delay dialing, wink operation, stop and go, etc. For details see "Notes on Distant Dialing" 1968 by AT&T. In order for the CPF to interface with different telephone company systems, the software of the NCU and the hardware of the CPF need to be appropriately adapted.

2.3 Interface with CCU or 3705

The CPF relays CDQ information to the CCU and the CCU commands the CPF by writing status bits into the call state memory unit SMU (FIG. 18) as in Table 2.2.2-1 below. Input and output X'30 through 33 (Table 2.3-2) are used to write and read the data of the SMU. The bits on the CCU in bus and out bus are shown in Tables 2.3-1, 2.3-2 and 2.3-3 below.

Table 2.3-1

| STATUS BITS FROM CCU TO CPE | | | | | |
|---|---|---|---|---|---|
| XMIT MODE | S1S2 | M (N) | CS0 | XMIT | INTRPT GEN |
| CALL INITIATION | 00 | 0 | 0 | 1 | 0 |
| XFER CS DIGIT | 01 | X | 0 | 1 | 0 |
| END OF CS D. DIGIT | 10 | 0 | 1 | 1 | 0 |
| CS ON HOOK RCVE MODE | 11 | 0 | 0 | 0 | 0 |
| CALL OR DIGIT ACPTO | 01 | 0 | 0 | 0 | 0 |
| TALKING | 11 | 0 | 1 | 0 | 0 |
| IDLE | 00 | 0 | 0 | 0 | 0 |
| LINE DISABLE | 11 | 0 | 0 | 0 | 1 |

Table 2.3-2

| DATA FROM CPF TO CCU ON THE CCU IN BUS | | | | |
|---|---|---|---|---|
| CCU In Bus | X 30 | X 31 | X 32 | X 33 |
| 0.0 | NCU ID B0 | | | 1 Sec Res |
| 0.1 | NCU ID B0 | Intrpt Gen | Interpt Gen | Par B0 |
| 0.2 | CPF Intrpt | | M (t) B3 | CS0 |
| 0.3 | FRZEOUT OVFLW INTRPT | | 2 | Xmit |
| 0.5 | | | 7 | S1 |
| 0.5 | | | 6 | S2 |
| 0.6 | | | 1 | CBS |
| 0.7 | | | 5 | CS1 |
| 1.0 | Adrr B0 | M (N) B0 | M (n) B0 | M (t) B0 |
| 1.1 | 1 | 1 | 1 | Call Acpt T.O. |
| 1.2 | 2 | 2 | 2 | M (t) B4 |
| 1.3 | 3 | 3 | 3 | MMT/CS T.O. |
| 1.4 | 4 | Intrp B0 | Intrpt B0 | PAR B1 |
| 1.5 | 5 | 1 | 1 | M1 (Δ S) |
| 1.6 | 6 | 2 | 2 | M2 (Δ S) |
| 1.7 | | 3 | T.O.3 | On Hook T.O. |

Table 2.3-3

| DATA FROM CCU TO CPF ON THE CCU OUT BUS | | |
|---|---|---|
| CCU OUT BUS | OUTPUT X ' 30 | OUTPUT X ' 31 |
| 0.0 | NCU ID B0 | |
| 0.1 | NCU ID B1 | Intrpt Gen |
| 0.2 | | CS0 |
| 0.3 | | XMIT |
| 0.4 | | S1 |
| 0.5 | | S2 |
| 0.6 | | |
| 0.7 | | |
| 1.0 | Addr. B0 | M (N) B0 |
| 1.1 | 1 | 1 |
| 1.2 | 2 | 2 |
| 1.3 | 3 | 3 |
| 1.4 | 4 | |
| 1.5 | 5 | |
| 1.6 | 6 | |

Table 2.3-3-continued

| DATA FROM CCU TO CPF ON THE CCU OUT BUS | | |
|---|---|---|
| CCU OUT BUS | OUTPUT X ' 30 | OUTPUT X ' 31 |
| 1.7 | | |

Note: Blank positions are "don't cares".

Figure 18:
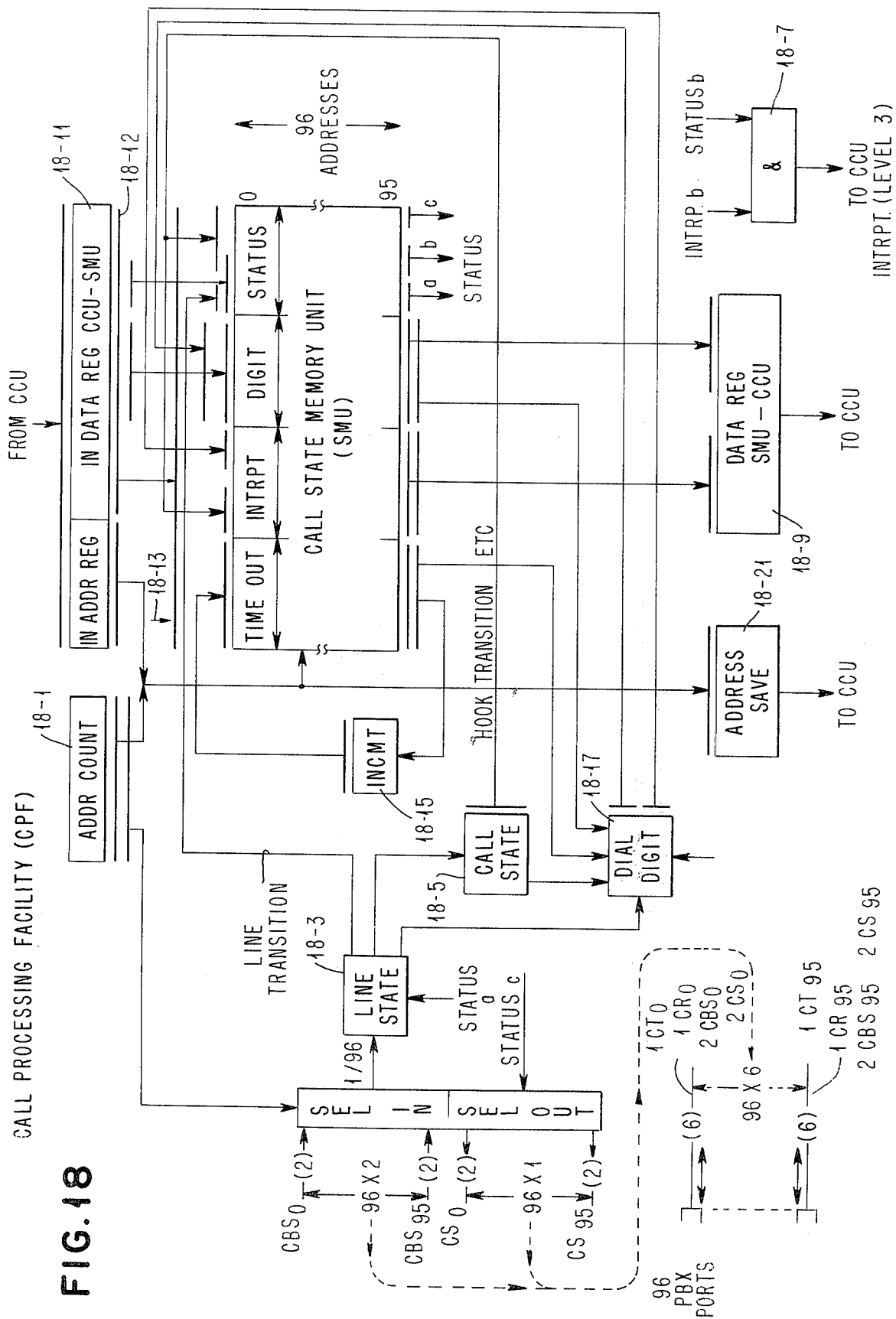
FIG. 18 shows the call processing facility (CPF) section of the NCU.

2.4 Call Process Sequence (FIG. 18)

The 96 line positions are scanned cyclically in 4 ms intervals under control of Address Counter 18-1 which also addresses a 96 location State Memory Unit SMU. When a line state transition from on-hook (idle) to off-hook (not idle) is detected by the state detection circuits 18-3, 18-5, an interrupt code is entered into the appropriate (interrupt) section of the corresponding SMU address. On the next scan cycle this interrupt code is presented to the CPU as an interrupt request (via SMU gated output path 18-7).

Upon accepting the requested interruption the CCU picks up stored line status information from the SMU (via path 18-9) and determines whether an incoming call is being initiated. If the CCU determines that a call is being initiated it passes dial state information to the corresponding SMU address (via path 18-11, 18-12) and time-out control information to that address (via path 18-13). The time-out information is cyclically incremented through incrementer path 18-15 while the dial pulses are received through the dial digit handling path 18-17.

After a dial digit has been incrementally accumulated in SMU a predetermined interdigit time out is detected in dial digit circuit 18-17 and an interrupt code for digit transfer is set in SMU. When the interrupt is taken the dial digit is passed to the CCU.

The first dial digit distinguishes local or tandem calls from toll calls involving use of a high speed trunk (Tl) path. For local or tandem calls the CCU determines the line state of the called port (from the SMU listing for that line). If the called path is busy a "busy tone" in digital form is passed to the NCU digital switch section for handling through the digital/analog path of the VPU section over to the CR (voice receive) line of the calling port. If the called line is not busy a "ringing tone" in digital form is passed through the DSU and VPU sections to the CR lines of the calling and called ports. These tones are generated from a read only store discussed later. If the called line is answered (off-hook on its CBS) a duplex path is established through the VPU and DSU sections of the NCU for carrying the voice information as described later.

If the call is toll all digits are accumulated by the CCU. If a high speed trunk path is available "up-link" the CCU formulates a control message for connection extension which is passed via the DSU section of the NCU into channel TC0 of a high speed trunk linked to the DSU. The handling for system path preparation is described above. Ultimately, either a busy tone is returned to the CR line of the calling port or ringing tones are transferred to the CR lines of the calling and called ports at the ends of a completable path.

2.5 Process Sequence Details

2.5.1 Scan Sequence

A five step gray code counter (not shown) is used to generate 5 consecutive step pulses (FIG. 18A). The counter is triggered to cycle its 5-step sequence every 31.25 us, by a sync pulse from a not-shown clocking circuit.

Step 1: This step increments SMU address counter 18-1 to next sequential address states from 0 to 127 and then wraps around. The complete cycle of this counter takes 4 ms. Only 96 of the 128 counts are used to interrogate the 96 CBS ports, i.e. from 0 to 95 for 96 CBS ports. Steps 96 to 127 are not used for scanning.

As the counter steps to each new address information is read out of SMU. These include system status bits written by the CCU, timer bits, dial digit bits, interrupt bits, and CPF line status bits.

Step 2: This pulse is 324 ns wide, and overlaps Step pulses 3 and 4. The state of the CBS line is gated so it can be latched by Step 3 time. The CS latches on the CDQ adapter cards are clocked, which in turn activates or deactivates relay coils to open or close CS line contacts.

Step 3: This clock loads SMU bits into CPF registers and the counters.

1. The memory timer bits are loaded through a timer buffer register into the timer counter.

2. The memory dial digit bits are loaded through a dial digit buffer register into the dial digit counter 18-17 (FIG. 18).

3. The CCU interrupt bits and dial digit bits are loaded into the interrupt section of the data register 18-9, and the address count bits are loaded into address save register 18-21 to be gated onto the CCU bus to the CCU if the "interrupt busy" had not been set at the last address select time.

4. Eight status bits are loaded into the SMU output register.

Step 4: The step 4 clock increments or decrements the dial digit counter and increments the memory timer. Under certain conditions, the clocks are inhibited to step the counters.

Step 5: At this time, the updated bits are written back into the SMU, and the interrupt latch is turned on if an interrupt is decoded from the SMU.

2.5.2 SMU Timer Logic

There are 8 timer bits in the SMU for each of the 96 addresses. As the address counter steps through each address, the bits are read out and loaded into an 8-bit counter at Step 3 time, incremented at Step 4 time, and written back into the SMU at Step 5 time.

The timer is required to count up to 32 sec. In order to save memory timer bits, two different resolutions of counting are implemented. From 0 to 600 ms, a fine resolution is needed and the timer is incremented at a 4 ms rate. When the timer equals 600 ms, the bits are reset to zeros. A "1 sec resolution" bit in the SMU is set and the timer increments at a 1.024 sec rate thereafter. This is accomplished with a pulse which is down for 4ms and up for 1.02 seconds. This 4 ms pulse covers the whole cycle of 96 addresses.

Normally the timer is free running. The timer is also reset when the CBS or CS lines change state.

2.5.3 Dial Digit Logic

When the CCU sets SMU line state bits to idle state, it must also set the dial digits for that line to zero. After an incoming call is started, the dial digit counter is incremented by one at the end of each dial pulse. When the interdigit time out is detected the dial digit is considered completed. The CPF causes an interrupt and transfers the value of the dial digit to the CCU. After the CCU accepts a dial digit, the CCU resets the dial digits in the SMU to zero, thereby enabling the CPF to accumulate the next digit. This process continues until the CCU receives the complete dial digits.

For outgoing calls, the CCU writes a dial digit in the SMU. The CPF sends out dial pulses by driving the CS line up and down. At the end of each CS break pulse the dial digit count is decremented by one. The completion of a dial digit is indicated by a zero dial digit count. At this time the CPF initiates the interdigit timeout and interrupts the CCU to request another dial digit. Before the end of the interdigit timeout the CCU must respond to the interrupt and send another dial digit to the SMU. This digit is sent out by the CPF when the interdigit timeout of the previous digit is ended. This process continues until the CCU sets the status bits in the SMU on an "end of dial digit" state.

2.5.4 Interrupt Logic

As the SMU address counter steps through each of the 96 addresses, the associated status bits, timer bits, the dial digits in SMU are examined. Under certain conditions an interrupt code is formed and written into the SMU. When the SMU address counter steps to the same address 4 ms later, the interrupt code is read from the SMU. If the interrupt busy latch is not on, and the interrupt generated bit is not on at step 5 time, the CPF will generate an interrupt to the CCU. The interrupt busy latch is turned on and the interrupt generated bit in the SMU is set to 1. When the bit is on, it prevents that address making any more interrupt requests.

When an interrupt is read out of a specific address in the SMU, acceptance by the CCU is conditioned upon the state of an interrupt busy latch (not shown). If the latch and an interrupt generated status bit is not on, no action is taken until the latch is reset.

Interrupts are not queued. Interrupts are serviced on a rotating basis as the ports are scanned in numerical sequence. Since the rate of interrupts is small relative to the rate of CCU operation all interrupts are processed in due time.

After the CCU receives the interrupt address and the data, the CCU writes new information into the associated address in the SMU. The interrupt code is reset to all zeros and the interrupt generated bit is also reset.

There are 11 different interrupts from the CPF to the CCU as follows.

2.5.4.1 CBS Call Initiation (0011)

When the CBS line goes off hook at the idle state, the CPF informs the CCU that an incoming call is initiated.

2.5.4.2 CBS On Hook (0001)

When the CBS line goes on hook in any state except dialing state, the CPF informs the CCU that the CBS line is on hook. If the CBS line goes on hook first during talking state, the CS line will subsequently follow with on hook. Whenever the CS line goes on hook the state of the CBS line is sampled. If it is on hook, the interrupt will be generated again. The CPF informs the CCU that the CBS line is still on hook.

2.5.4.3 Transfer CBS Digit (0010)

In call receive mode and dialing state, if the CBS line has been up (off-hook) for 600 ms (that is the interdigit time out), and the dial digit is other than zero, the CPF informs the CCU that a complete dial digit for an incoming call has been accumulated to be transferred to the CCU.

2.5.4.4 Party Answered (1010)

In the call transmit mode at the "end of dial digit" state (i.e. the CPF has sent out all dial digits on the CS line and the CBS line has responded with off hook) the CPF informs the CCU that the called party has answered.

2.5.4.5 Request Next CS Digit (0110)

In transmit mode and dialing state, when the timer equals 44 ms and the dial digit equals zero, the CPF informs the CCU a complete dial digit has been sent out and another digit is required.

2.5.4.6 Started to Transmit (1001)

When the CCU initiates an outgoing call, it sets a transmit bit in a specific position in the SMU. When the CPF scans that position if the CBS line is on hook the CS line is raised. After the timer has run for 44 ms, the CPF informs the CCU that an outgoing call has been initiated.

2.5.4.7 Information Overrun (1000)

When the CCU fails to process a prior "CBS digit transfer" interrupt, the CPF informs the CCU that an overrun has occurred when the next digit is received.

2.5.4.8 Maximum Interdigit Time Out Exceeded (1101)

This interrupt occurs during the receive mode and dialing state, if all digits have not been received and CBS has been off hook for longer than 32 seconds.

2.5.4.9 Maximum Make Exceeded (1100)

This occurs during receive mode and dialing state when the CBS line goes off hook for 120 ms to 320 ms.

2.5.4.10 Maximum Break Exceeded (0100)

This occurs during receive mode and dialing state, when the CBS line goes on hook for 120 ms.

2.5.4.11 Contention (0101)

This occurs during the transmit mode before the CPF was set to the dialing state and if CBS line goes off hook.

2.5.5 SMU Memory

There are 96 storage locations in the SMU memory. Each location holds 31 bits. The data in the SMU can be divided into three areas A, B and C defined below. While the NCU is running, area A can be written into only by the CPF; area B can be written into only by the CCU; area C can be written into by both the CPF and the CCU. When the NCU stops, the CCU can write into any bit in the SMU. This enables the CCU to check out or set up SMU bits.

SMU addresses are stepped every 31.25 microseconds. 540 ns of the period is used by the CPF to read and update the SMU. Therefore, the CCU may execute instructions in the SMU at the maximum rate of one instruction per 1.2 microsecond. Since the clocks of the NCU and the CCU are not synchronized, the address and the data from the CCU are first latched into separate buffer registers. When the CCU sends the CPF instructions, if the CPF area is processing data, the CCU data will be delayed to write into the SMU until the 540 ns period is over.

The area definitions are:

Area A:
1. MEM TIMER BIT 0
2. MEM TIMER BIT 1
3. MEM TIMER BIT 2
4. MEM TIMER BIT 3
5. MEM TIMER BIT 4
6. MEM TIMER BIT 5
7. MEM TIMER BIT 6
8. MEM TIMER BIT 7
9. CALL ACCEPTED Time out
10. On hook time out
11. Max make time/CS time out
12. CBS changed state 1
13. CBS changed state 2
14. 1 sec resolution
15. CS1
16. CBS Status Area B:
1. Line Status B1
2. Line Status B2
3. CS0
4. Xmit Area C:
1. Dial digit bit 0
2. Dial digit bit 1
3. Dial digit bit 2
4. Dial digit bit 3
5. Interrupt bit 0
6. Interrupt bit 1
7. Interrupt bit 2
8. Interrupt bit 3
9. Interrupt Generated

2.5.5.1 SMU Data Bits Description:

CBS status: This bit indicates the status of the CBS line at the last cycle. By comparing this bit with the CBS status in the present cycle, a transition made by the CBS line can be detected.

Line Status bit 1, 2: These two bits indicate 4 states of the line.
00 Idle
01 Dialing
10 End of dial digits
11 Talking Transmit: This bit indicates that CPF is in the transmit or the receive mode.

CS0: This bit is "ORed" with other logic functions to form the status of the CS line.

CS1: This bit indicates the status of the CS in the previous cycle. By comparing this bit with the present CS state a CS transition can be detected.

Interrupt Generated: When this bit is on, it indicates that a specific address has caused an interrupt to the CCU, and is waiting to be processed. After the CCU processes the interrupt the CCU turns the bit off. When the CCU turns this bit on, it disables the line from causing any further interrupts.

Dial Digit: (4 bits) This field represents the CBS dial digit in the receiver mode. In transmit mode, the field is used to contain the CS dial digit.

Interrupt Bits: Four bits specify one of 11 interrupt codes.

Parity — 2 bits to check errors in read/write of the SMU.

Parity bit 0 checks the following bits:
o CBS
o 1 sec resolution
o on hook time out
o CS0
o Transmit
o Memory timer bit 0–3
o Call accepted time out Parity bit 1 checks the following bits:
o CBS changed state 1
o CBS changed state 2
o CS1
o Line status bit 1
o Line status bit 2
o Memory timer B4–7
o Max make time/CS time out
o Interrupt bit 0–3
o Dial digit, bit 0–3
o Interrupt generated 1 Second Resolution: This bit is used to gate the timer clock. When the bit is off, the timer for each address is incremented once every 4 ms. When the bit is on, it is incremented once every 1.024 sec.

Memory Timer bits: (8 bits) At the beginning of each cycle, 8 bits are loaded into the timer counter 18-15. They may be incremented, reset, or stay the same and are written back into the memory location.

CBS Changed State bit 1 & 2: Bit 1 indicates the CBS line has changed state during the last cycle. Bit 2 indicates the CBS line changed state 2 cycles ago. These bits are used to discriminate any pulses less than 8 ms. CBS Change State indicates that the CBS line state changed in the last cycle but not in the present cycle or two cycles ago.

Call Accepted Timeout: This bit is set for 600 ms to blank out the noise on the CBS line at the end of the dial digit state of an incoming call.

Maximum Make Time/CS Timeout: In the receive mode, the bit is set to 1 during 120 ms to 320 ms interval. During this time when the CBS line breaks, it is considered a maximum make. In the transmit mode, this bit is set at the end of a dial pulse break or when the CS line is raised. When the dial digit counter is not equal to zero, the bit stays set for 44 ms to form the make portion of the pulse. After the CS line sends out a complete digit, the dial digit count equals zero. Then the bit is set for 600 ms rather than 44 ms to perform the interdigit timeout.

On Hook Timeout: After both parties are on hook, this bit stays on for 600 ms. It prevents the CCU from making an outgoing call while the bit is on.

3.0 Voice Processing 3.1 Introduction 3.1.1 Purpose of Voice Processing (VPU)

The purpose of the VPU is to provide an interface with the common carrier, to convert the analog voice (and data) signals to digital pulse trains, and to convert the digital pulse trains back to analog voice signals.

3.1.1.1 General Description

In general, the interface with the common carrier is by means of CDQ4W Voice Connecting Arrangements for 4 wire lines, and CDQ2W Voice Connecting Arrangements for 2 wire lines.

3.1.2 Echo Suppression

The analog signal is converted to a digital signal in the form of 32 Kb/sec companded delta-modulation.

Due to the transmission time delay of satellite communication echo control is incorporated. This echo control is completely digital.

3.1.3 VAC

In order to conserve satellite (and high speed trunk) channel capacity Voice Activity Compression (VAC) is provided on a modular (NCU) basis. This compression takes the form of relinquishing the channel during pauses in conversation.

3.1.4 Gain through VPU

The gain through the VPU should be 0 db with a one sigma variation of 1 db. This is the gain from the analog input into a coder at one station to the analog output of a connected decoder at another station, without digital errors in the satellite link.

3.1.5 Delta-Modulation (FIGS. 19, 22, 24–26)

The voice digitization technique used is Predictive Delta Modulation. Analog voice in a 4 KHz bandwidth is converted to a 32 KBPS digital signal. At each port the present voice sample is compared with a predicted value based on the past binary sequence at the output of the Delta-Mod, and the error is quantized to two levels. The Accumulated Value is a 9-bit binary number which represents and tracks the input analog voice signal. The output of the Voltage Comparator (FIG. 22) is a one if the input analog signal is greater than the magnitude represented by the D/A conversion of the last accumulated value, and a "zero" if the D/A conversion of the accumulated value is greater than the input analog signal. For a Delta-Mod bit equal to one out of the comparator, a quantity called the "step size" is added to the 9-bit accumulated value. For a Delta-Mod bit equal to zero the step size is subtracted from the Accum. value. At the next sample time this new Accum. value is converted to analog in the D/A converter and again compared to the input voice signal.

3.1.6 Audible (Busy and Dial) Tones a. Busy tone:
   Frequency — 440 Hz plus 480 Hz
   Level (each tone)
      16 dBm for CDQ2W and
      32 dBm for CDQ4W
   Code — 60 interruptions per minute
b. Dial tone:
   Frequency — 480 Hz plus 620 Hz
   Level (each tone)
      21 dBm for CDQ2W and
      37 dBm for CDQ4W
   Code — steady tone
Overall frequency tolerance: ± 0.5%
Tone level variation: ± 1.5 dB.

3.1.7 Idle Trunk Transmission

The interface of the CDQ consists of signal leads (CBS, CS) and voice or trunk leads (CT, CR), the latter connected through hybrids. The impedance seen in the CT-CR pair looking into the hybrid is always 600 ohms whether the trunk is connected or idle.

For the CDW4W 2 pairs of leads designated CT-CR and CT1-CR1 represent the voice path. These pairs are always terminated in 600 ohms in the VPU-NCU whether the trunk is connected or idle.

3.1.7.1 Return Loss of Hybrid

The use of 2 wire lines terminating in CDQ2W interface to the VPU-NCU requires a not-shown hybrid device to produce the equivalent of a 4 wire line path to the coding/decoding apparatus of the VPU. The device is required to pass the voice signals from the CDQ2W to the coder in the VPU and to take the output of the decoder in the VPU to the CDQ2W. In this process the hybrid is required to pass as little of the signal as possible from the decoder back to the coder, since this would create echo effects. The VPU has an echo attenuation system which eliminates any non-cancelled echo. The hybrid should be adjustable so that as little as 1/100 or —40 db of the decoder signal appears at the coder input. This adjustment, however, is dependent upon the impedance of the specific telephone line which is connected to the CDQ2W. Since the line may be switched by a common carrier PBX, and since different lines have different impedances, the hybrid may only be —10 db effective. 95% of the lines will have a loss greater than 6 db.

3.2 Voice Activity Compression

Voice Activity Compression requires a method of detecting whether a speaker is active, and the setting of some value of signal level to define activity. In the VPU this level is set at —33 dbm. Thus any signal due to speech or noise which is greater than this level will trigger the Voice Activity Detector. The state of the Voice Activity Detector is stored in a latch to inform the NCU. The state of this latch is also modified by "overhang and echo suppression".

The purpose of "Voice Activity Compression" as used in this system is to permit the use of 2 groups of 48 unidirectional channels on high speed trunks to accommodate up to 96 simultaneous conversations.

3.2.1 Talkspurt Statistics

In order to make efficient use of Voice Activity Compression, knowledge of speaker talkspurt statistics is required. Evidence indicates that with overhang (see paragraph 3.2.2) of 64 ms, the distribution of talkspurts is essentially Poisson with approximately half the talkspurts in the region of 80 to 160 ms. About 25% are in the region of 160 to 320 ms. About 20% are between 320 to 640 ms. The remaining 5% are between 640 ms and 1.28 sec with extremely few somewhat greater. This is based upon data taken using a signal threshold of —33 dbm for the CDQ2W and —39 dbm for the CDQ4W.

3.2.2 Overhang

In conjunction with Voice Activity Detection (VAD) there is a function called Overhang. Since the VAD may be triggered by voice which rises and falls above and below a critical level a circuit is required to retain continuity and prevent choppiness of speech. This circuit is called Overhang and it adds 64 ms (i.e. 10.4 T1 frames) to every VAD duration.

3.2.3 Intermodulation

Since the delta-modulation coder-decoder is essentially a sampled data system, with a sampling rate of 32 Kb/sec., a certain amount of intermodulation will exist. In addition, due to the non-linearities of the coder-decoder-compander system other intermodulation distortion will result.

3.2.4 Clipping

The process of delta-modulation coding and decoding involves the use of an integrator. In the present design, this integrator is a digital accumulator (FIG. 19) into which a number may be added and from which a number may be subtracted. The amplitude of the analog signal is proportional to the magnitude of the number in the accumulator so that clipping of the analog signal begins when the accumulator reaches its largest number. This places an absolute maximum on the analog signal of −7 dBm for the CDQ2W and 0 dBm for the CDQ4W. This value is compatible with measured peak voltages which are encountered when a 3 second average for voice is equal to −13 dBm, or −7 dBm.

3.2.5 Dynamic Range and Compander Algorithm

The dynamic range of the VPU is 36 db. This is accomplished by providing seven 6 db step-sizes (i.e. each step is twice the next lowest). The companding algorithm causes the step size currently in use to be increased by 1 step (6 db) whenever 4 ones or 4 zeros appear consecutively in the delta-mod stream. Thereafter for each contiguous one or zero, the step-size is again increased by 1 step until step 7 is reached. If 16 contiguous equal bits appear in the delta-mod stream while the step size is not increased, the current step size is reduced by 1 step.

In the voice output path the companded binary delta-mod signal is decoded using the inverse algorithm to regenerate the analog signal.

From the above it is apparent that it is important that the binary signal which reaches the decoder/receiver be identical to the binary signal generated at the coder. Any errors in between could cause up to 24 db jumps in amplitude. At the conclusion of each talkspurt, the step-size registers at coder and decoder ends of a system talking connection are reset, and any amplitude errors are thereby removed.

3.2.6 Noise

3.2.6.1 Quantization Noise

Quantization noise in the Voice Processing System is a function of the step-size which is used. The larger the step-size the larger the quantization noise. With the coder and decoder set for the minimum step-size, with a 1 Khz signal at −30 dBm into the coder, the noise at the output of the decoder as measured with a spectrum analyzer should be less than −60 dBm except at the harmonics of 1 Khz.

With the coder and decoder set for the maximum step-size, with a 1 Khz signal at 0 dBm, the noise at the output of the decoder as measured with a spectrum analyzer should be less than −37 dBm except at the harmonics of 1 Khz.

3.2.6.2 Signal to Noise Ratio as a Function of Signal Level

The step-size generated by the coder is directly proportional to the amplitude of the input signal. At a given frequency (1 Khz) therefore, the S/N should be relatively constant as a function of signal level.

3.2.6.3 Injected Idle Noise

Idle noise is defined as an analog sound resulting from a binary train generated by the receiving NCU into one of its 96 decoder paths when there is no activity in the corresponding (connected) coder path. There are two purposes for idle noise.

1. To produce a white-noiselike sound in the receiving telephone so that a listener does not hear a "dead" line. At the output of the decoder, this sound is −49 dbm ± 1.5 dbm.
2. To force the decoder to its minimum step-size.

3.2.7 Echo Suppression

With the use of telephone hybrids for 4 wire to 2 wire conversions there is coupling of signals from receiving to transmitting paths. This is called echo. Thus, when a signal appears at an input to a delta-mod coder, the system must decide whether it represents speech generated in the transmission path (CT) at the CDQ interface or echo from the reception path (feeding CR) passed back into the coder by the hybrid. This is accomplished by comparing the accumulated digital values stored in the integrators of the coder and decoder associated with the subject port. The number in the decoder integrator represents the largest value for the past 6 to 12 ms.

When the number in the coder integrator is larger than the number derived from the decoder integrator, it is concluded that the coder input is a legitimate signal and the coder output is transmitted up-link. If the opposite is true the coder output is blocked and an idle signal pattern is substituted. When this occurs, a bit is stored in a latch to notify the NCU that Voice Activity is off in the subject path (virtual channel). At the receiver or decoder end an "Idle Signal" is inserted in decoder paths identified as receiving "inactivity".

From the foregoing it should be apparent that with legitimate speech at a coder input the coder output is transmitted even though a signal may be simultaneously present at the decoder input of the same port. This is known as double talk, and occurs if talkers at opposite ends of a circuit (connection) are talking at the same time (taking into account path delay). Since the channel is open some of the echo is returned and heard by each speaker. To reduce the effects of this when a channel is open (i.e. the coder input is being transmitted) the decoder output to the same port is reduced by 6db. Therefore, the echo if heard is further reduced by 6 db.

3.2.8 References 3.2.8.1 Bell system — Private Line Interconnection Voice Applications, June 1970
3.2.8.2 Bell System — Voice Connecting Arrangement CDQ-4W, Interface Specification, August 1969
3.2.8.3 Bell System — Voice Connecting Arrangement CDQ-2W, Interface Specification, June 1971
3.2.8.4 Bell System — Data Communication Using the Switched Telecommunications Network, May 1971
3.2.8.5 Bell System — Voice Grade Entrance Facilities for Extending Customer — Provided Communications Channels, May 1969
3.2.8.6 Bell System — Data Couplers CBS and CTB for Automatic Terminals, August 1970

3.3.0 Voice Processing Unit Circuits

3.3.1 Analog to Digital Conversion and Multiplexing

Figures 21, 61:
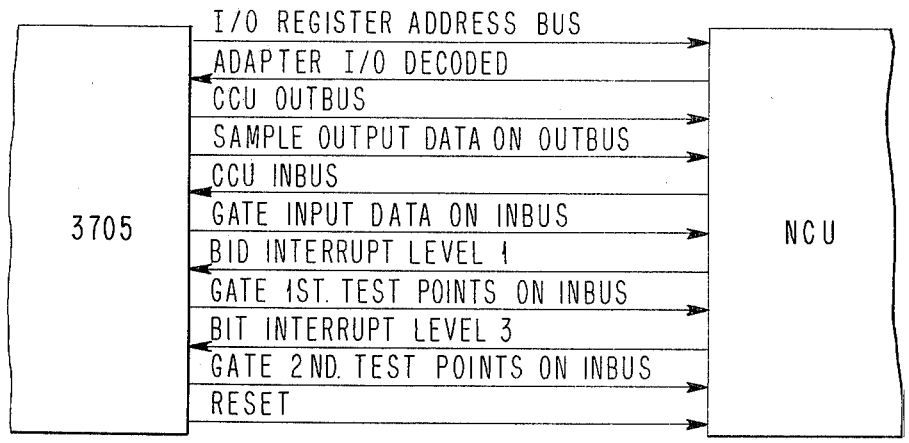

This portion of the VPU circuitry cyclically samples the voice signals from up to 96 CDQ input voice lines (CT), converts them to a series of digital delta-modulation bits, and holds the bits in storage for block multiplex transmission. FIGS. 19, 21 and 22 show this area.

At the left of FIG. 21 is shown the NCU-CDQ interface, through the NCU Tailgate.

3.3.1.1 CDQ Interface

Each of the 6 CDQ interface cards handles the CR and CT voice lines for 16 CDQ ports. The connections can be either 3W or 2W, provided that proper P4 jumper connections are made on the CDQ interface cards. For voice these cards contain 2 operational amplifiers for each port. One of these receives the voice signal from the CDQ and makes the voltage swing compatible with the analog to digital conversion input requirements. The other receives the voice signal from the NCU digital to analog converter and amplifies it to satisfy the requirements of the CDQ. The net gain of a voice signal from a CDQ, through the system and out to a CDQ is 0 db.

3.3.1.2 Analog to Digital Compare

The incoming voice signals, after being altered by the CDQ interface card, are digitized on the A to D compare cards. The circuitry on one of the 6 cards is shown in FIG. 22. Each card handles 16 analog signals on a Time Shared basis, and generates one delta-mod bit for each of the 16 signals in 31.25 micro-seconds, or one bit per port in 1.95 micro-seconds.

The compare circuit in FIG. 22 operates as follows:

Time 0: a 54 nano-second pulse: latches the 9-bit accumulated value for one of the ports processed by this circuit, registers a 4-bit code to select the 1 of 16 analog port inputs to be compared and a 3-bit code to select a card and sets the previous delta-mod bit of the corresponding port in the D flip-flop.

Time 0–1.95: D/A convert circuit 22-1 converts the 9-bit latest accumulated digital value for the line being scanned to an analog voltage. The 4-bit code selects 1 of 16 comparators 22-2 and gates its output to the D-type flip-flop. This process takes most of the 1.95 micro-seconds to settle down.

Time 1.95 micro-seconds: The leading edge of the 54 nano-second pulse latches the output of the 1 to 16 selection into the D-type flip-flop. The 54 nano-second level of the pulse gates a new 9-bit accumulator value and 4-bit code (of the next port of that card) into the registers and the trailing edge of the pulse latches up the registers for the A/D compare for the next port.

3.3.1.3 Multiplexing of the 6 A/D Compare Circuits

The timing for the above process is skewed by 324 nano-seconds on each of the successive A/D compare cards (lower right FIG. 22). While one circuit is settling down, the other 5 A/D compare circuits are supplied with Accum. values and 4-bit codes. As a circuit is given new parameter representations the delta-mod bit for the previous sampling is gated to the delta-mod algorithm logic discussed below relative to FIG. 25. The bits out of the A/D compare circuits should be sampled near their centers, by the algorithm logic, to guarantee they will have a stable level.

3.3.1.4 A/D Compare System View

FIG. 21 shows how the 16 analog inputs to the 6 A/D compare cards relate to the 96 ports connected to the Voice Processing Unit. The port numbers 0 through 95 are processed in different sequences in different areas of the Voice Processing Unit, so that later discussions of sequences of actions with respect to ports, will be the same "numbered" ports defined in this section.

3.3.2 Delta-Mod-Demod Algorithm Hardware

3.3.2.1 Delta-Mod-Demod Inputs and Outputs

The Time-Shared bit stream output of the A/D conversion circuits is input to the Modulator Algorithm logic, as shown in FIGS. 23–25. The output to the LGIM (LIne Group Input Module) is a modified form of this input bit stream. Identical hardware is used for both the Modulator and Demodulator Algorithm, but the connection of the hardware to the supporting hardware is different for the two cases. This difference can be seen in FIG. 24, a block diagram of the Voice Processing Unit.

The Algorithm Logic is connected to a read/write A/D (D/A) memory which saves information about the past sequence of delta-mod bits. The memory has 96 addressable locations, one for each of the 96 CDQ ports. For a given port, the memory is read and its output is latched in the algorithm register along with the Delta-Mod bit for that port from the A/D compare circuitry. The algorithm logic updates all the stored parameters and stores the updated information back in the memory to hold until the other 95 ports have been processed.

3.3.2.2 Stored Parameters

There are 22 bits stored in the A/D for each port. They are as follows:

|  | Bits |
|---|---|
| Am=Modulator Amplitude (Accum. Value) | 9 |
| Sm=Modulator Step Size (Binary 1–7) | 3 |
| Dmm=Latest Data Bit | 1 |
| Nm=Number of consecutive Like Bits (1–7) | 3 |
| XVIM=16 Count (No change in Sm) (0–15) | 4 |
| Vmn Vac bits for the last two | 1 |
| Vmn-1 Bit times | 1 |
|  | 22 |

The demodulator algorithm stores the same set of parameters except for the last two bits.

3.3.2.3 Data Flow

The stored parameters described above are latched into the algorithm data flow shown in FIG. 25. They are altered by the incrementers, increment-decrement circuits and ALU, and exit the logic at the bottom of FIG. 25.

3.3.2.4 Delta-Mod-Demod Algorithm

The hardware in FIG. 25 operates on the stored parameters according to the following Algorithm.

| 1. | Set: Dn=1 | If: Dn=0 |
|---|---|---|
|  |  | and N=7 |
|  |  | and Dn−1=0 |

This step insures 1 transition out of 8 bits which is a requirement of the T1 trunk. If there are 8 consecutive Dn zero bits into the Algorithm logic for a given port, the eight bit is forced to a one and used in the Algorithm as well as sent to the LGIM.

| 2. | Set: N=1 | If: $D_n \neq D_{n-1}$ |

Sets the consecutive like bits count to one if the present delta-mod bit is different than the stored previous delta-mod bit. Where the algorithm counts from 1 to 7 consecutive like bits, the hardware counts from 0 to 6. Therefore using control "Force to zero" to the Count (N) path in FIG. 25 performs this step of the algorithm.

| 3. | Set: N=N+1 | If: $D_n = D_{n-1}$ and $N \neq 7$ |

Increments the consecutive like bit count if the present delta-mod bit is the same as the stored previous bit and the count value before incrementing is less than 7.

| 4. | Set: S=S+1 | If $N \geq 4$ and $S < 7$ |

Increments the step size if there have been 4 consecutive 1's or 0's. This is a sliding window detection, where if there are five 1's in a row, the step size is incremented at the bit time of the fourth 1 and again at the fifth 1.

| 5. | Set: XVI=0 | If $N \geq 4$ or XVI=15 |

Resets the 16 count to zero if there have been 4 or more consecutive like bits or if the count is 15. This count represents the number of bits processed with no change in step size. After 16 iterations with no step size change the step size is decremented as seen in step 7.

| 6. | Set: XVI=XVI+1 | If $N < 4$ |

Increments 16 count if the number of consecutive like bits is less than 4. If the number of consecutive like bits had been 4 or more the step size would have been incremented in step 4 and the 16 count would have been set to zero in step 5.

| 7. | Set: S=S−1 | If: XVI=0 and $N < 4$ and $S \neq 1$ |

Decrements step size if there have been 16 iterations with no step size change.

| 8. | Set: S=5 | If: L=1 |

Locks the step size to a value of 5. This is done when a transparent data modem is connected to the voice port being processed. It will be shown in one of the following sections, how the control logic knows that a port is serving voice or data modem apparatus.

| 9. | Set: $B_D = 2^{(SD-2)}$ | If: L=0 and Vacm=1 and E=0 and S > 1 |

This function occurs in the Demodulator algorithm only and is part of the echo control algorithm. When the modulator VAC bit is on the step size in the demodulator is decreased by one, which reduces the signal out of the D/A circuit by 6 db for that port. This will be discussed further in the discussion of the Echo control algorithm.

| 10. | Set: $B = 2^{(S-1)}$ | If: L=1 or Vac=0 or E=1 or S=1 |

The range of the step size is from 1 to 7. However B is the quantity actually added to or subtracted from the accumulated value. The relation of B to the step size is:

| Step Size = 1 2 3 4 5 6 7 | | |
|---|---|---|
| B = 1 2 4 8 16 32 64 | | |
| 11. | a. Set: A=A+B | If: Dm=1 |
| | b. Set: A=511 | If: A > 511 |
| | c. Set: A=A−B | If: Dm=0 |
| | d. Set: A=0 | If: A < 0 |

This series of steps adds B to the Accum. value if the most recent Delta-Mod bit is a "1", and the value would not exceed 511. Parts c and d subtract B from the Accumulated value if the delta-mod bit is "0". If the result would be less than zero it is forced to zero.

A 3-bit code generated by the 3705 CCU is sent to the modulator and demodulator algorithm logic by way of the digital switch memories ICM, SIM, and LGOM discussed later. These 3 bits specify the mode of operation of each port, as defined below:

| ICM Code | | |
|---|---|---|
| 0 | 000 | Voice Port: Process Delta-Mod bits in algorithm |
| 1 | 001 | (Not used) |
| 2 | 010 | Busy: Gate busy generator into Modulator algorithm |
| 3 | 011 | Local Call: Disable Echo Suppressor for this port |
| 4 | 100 | Data Port (Full Duplex Modem): Lock Step Size "5" and disable Echo suppression |
| 5 | 101 | Data Port (Transparent Native): Gate data input, inhibit voice input, inhibit Step 1 of Modular algorithm |
| 6 | 110 | (Not used) |
| 7 | 111 | (Not used) |

3.3.2.5 Algorithm Hardware

To perform the preceding functions with the hardware in FIG. 25 the control signals are as tabulated in FIG. 26. A few of the functions in the tables have to do with the VAC (Voice Activity Compression) algorithm and will be described later.

3.3.2.6 Accumulator Offset Removal (Demod Only)

During a period of no voice activity the Modulator Accumulated value tracks D.C. input voltage seen by the CDQ interface card. However, the only input to the Demodulator is from the LGOM, and after power ON or due to transmission errors its accumulated value could be at any value between 0 and 511 during NO activity. This offset from the desired 256 value is removed slowly during periods of NO activity. The algorithm for this function is to replace Dn in steps 11a and 11c of the Delta-Mod-Demod algorithm with the complement of bit 9 (most significant bit) of the Demod Accumulated value. Thus, if the Accumulated value is above 256, bit 9 will be a 1, thus B will be subtracted from the Accumulated value bringing it closer to the 256 value. This is done:

If: $Md > 2$ and $Sd=1$ and $XVId=0$

The above case occurs once in 16 bit times (500 us) when the magnitude of the Demod. Accumulator value is greater than 2 and the Step Size is minimum. This is a slow removal process. The magnitude is derived from the equations:

$Md=Ad-256$   If: $Ad \geq 256$ $Md=255-Ad$   If: $Ad < 256$

This offset removal takes place in the algorithm control logic and ALU (Arithmetic Logic Unit) in FIG. 25.

3.3.2.7 VAC (Voice Activity Compression) Algorithm

The VAC Algorithm logic like the Delta-Mod Algorithm requires stored parameters pertaining to the history of the incoming signal. These parameters are:

$R_1 \cong Md$ max for the last 0-6 MS (Binary 0-255)

$R_2 \cong R_1$ max for the last 0-6 MS (Binary 0-255)

$V \cong$ VAC Overhang Counter (4 bits)

Where: $Md$=Demodulator Magnitude
=$Ad$-256 if $Ad \geq 256$
=255-$Ad$ if $Ad < 256$
And
$Ad$=Demodulator Accumulated Valve Using these parameters the Algorithm proceeds as follows:

| 1. | Set R1=Md | If: R1 < Md or Time=Byte 1, Bit 2 |
|---|---|---|

This makes R1 track the maximum of the magnitude of Demodulator Accumulated value for 6 ms periods. Shown in FIG. 27 is a voice signal and the value of R1 over a 30 ms duration. At the beginning of each 6 ms period there are two 31.25 us pulses. The first is called "Byte 1 Bit 1" and the second, "Byte 1 Bit 2". These are two consecutive bit times in the NCU frame. In FIG. 28 the dotted curves represent the positive magnitudes of the negative a.c. portions of the voice signal. Between Byte 1 Bit 2 pulses, R1 will track $Md$ if R1 < $Md$. When R1 > $Md$, R1 does not change. Then, at times Byte 1 Bit 2 R1 is set to $Md$. At time Byte 1 Bit 1 R1 will be equal to the maximum value of $Md$ for the past 6 ms. Thus the definition; R1 $\cong$ $Md$ max for the past 0 to 6 ms.

| 2. | Set R2=R1 | If: R2 < R1 or Time=Byte 1 Bit 1 |
|---|---|---|

FIG. 28 shows the relationship between R1 and R2 for this step of the Algorithm. For the signal and R1 shown in FIG. 28, R2 takes the values shown in FIG. 28. R2 tracks R1 the way R1 tracks $Md$ in step 1, except that R2 is set equal to R1 one bit time (or Sample Time) earlier than the setting of R1 to $Md$ in the previous step. The result is that R2 is equal to the max of $Md$ for the past 6 to 12 ms. R2 is used in the following steps to determine if the modulator VAC bit is to be turned on or off.

| 3. | Set: Am=256<br>Sm=1<br>Dmm=1 if n is odd<br>Dmm=0 if n is even<br>XVI=0<br>Mm=1 | If: V=15<br>and Mm $\geq$ R2<br>and Mm > 6<br>and Time $\neq$ Byte 1 Bit 1 |
|---|---|---|

This initializes the modulator algorithm parameters when voice activity starts. The "If" conditions are satisfied when the digital representation of the magnitude of the voice signal into the modulator is greater than that of the voice signal out of the demodulator. The $Mm > 6$ condition is included so that noise will not be interpreted as a voice signal. The accumulated value magnitude must be greater than a threshold of 6, and greater than or equal to R2 to be regarded as voice. The magnitude is compared to R2 to insure it is not an echo of the signal being generated by the demodulator. V is a 4-bit count which when equal to 15 causes the VAC Bit to be turned off. Conversely when V is not equal to 15 the VAC bit is ON in the modulator. With the If conditions of this step satisfied it will be seen that they are also satisfied in step 4, which turns the VAC bit ON. Until the time the VAC bit is turned ON, the demodulator connected via the system to this modulator is receiving either a pattern of alternating 1's and 0's (idle noise) or a noise pattern. For both cases the step size is 1. This step guarantees that the step sizes in the modulator and demodulator at two ends of a system connection start at the same value, insuring unity gain through the system. Also, the first two bits sent to the LGIM after the VAC bit is turned ON will be 10 or 01 insuring that the number of consecutive 1's or 0's are initialized in the Demodulator where the setting Nm=1 in this step insures it in the Modulator.

| 4. | Set V=8 | If: Mn $\geq$ R2<br>and Mm > 6<br>and Time $\neq$ Byte 1 Bit 1<br>or E=1 |
|---|---|---|

Where E=Disable Echo Suppressor

| 5. | Set V=V+1 | If Time=Byte 1 Bit 2 and V ≠ 15 |
| 6. | VAC=1 | If: V ≠ 15 |

The previous 3 steps turn the VAC bit On and Off. When step 3 is executed, steps 4 and 6 are also executed at the same time, turning the Voice Activity Compression Bit (VAC) ON. When the VAC Bit is ON, step 5 is executed once every 6 ms, and increments the VAC overhang count (V). If the requirements for step 4 cannot be met for 42 ms, step 5 will increment V until V equals 15 which causes the VAC bit to be turned OFF. This delay allows the bit to stay ON during pauses between syllables of a word and prevents clipping at the end of words and sentences.

3.3.2.8 VAC Circuits

FIG. 29 is a block diagram of the circuits used to execute the VAC algorithm. For example, the "If: R1 < Md" term in step 1 is decided in the leftmost compare circuit. The output R1 value at the bottom of the figure will be either Md or the previous value of R1 depending on the output of the compare circuit and Byte 1 Bit 2. This circuit interacts with an associated memory similar to the way the mod/demod algorithm circuits interact with respective memories (see FIG. 24). Several of the outputs such as "Remove Demod. Offset" and "Reset Mod." pass to the Mod. and Demod. algorithm logic to affect step size, Accum. value, etc. as defined in the algorithms. By going through the steps of the VAC algorithm it can be seen where each step is implemented in the data flow diagrams (FIGS. 19, 24).

3.3.2.9 Echo Suppression

Echo attenuation for voice ports is accomplished in step 6 of the VAC algorithm and step 9 of the Delta-Mod. algorithm. Whenever the Modulator VAC bit is ON, the step size in the demodulator algorithm for that port is reduced by one. This has the effect of dividing the Step Amplitude and Accumulated value magnitude by 2. The original step size, not the decremented one is stored back in memory.

3.3.2.10 VAC and Delta Mod Timing

The memories for the Modulator algorithm, Demodulator Algorithm, and VAC Algorithm logic are stepped through their addresses in unison. During each 324 nano-second bit time they are read twice and written into once. The sequence of addresses read and written is shown at the top of FIG. 30. All four algorithm memories receive this sequence of addresses at the same time. The R's and W's represent read and write times. The numbers represent the line port for which data is read or written. Each port number appears three times in one complete cycle of the memories (or 31.25 micro-seconds). In FIG. 30 all three occurrences are shown for ports 0 through 3, and it can be seen that the relative times between these occurrences are identical, as they are for all ports.

Traces B, C and D in this figure show the events which occur as a result of the two reads and one write for port 0 in the modulator logic. For the first read the accumulated value for port 0 is latched in A/D Compare Card 1 as discussed above (reference discussion of FIG. 22). 1.944 us later the accumulated value for port 6 is read and latched and the delta-mod bit for port 0 is presented at the output of this A/D card. 108 Nano-seconds later the memory location for port 0 is read again. All the modulator parameters read from memory plus the delta-mod bit from the A/D compare card are latched in the algorithm logic input register, and the parameters are updated by the new delta-mod bit. 432 Nano-seconds later the updated parameters are written back into the memory location dedicated to port 0.

This sequence of events is similar in the demodulator area. The differences are: (1) instead of latching the accumulated value in an A/D register it is sent to the D/A interface memories which will be discussed later and (2) instead of receiving a delta-mod bit, the algorithm logic gets its bit from the LGOM.

For the VAC and Echo Logic and associated outgoing and incoming signal memories, the first read is ignored and the algorithm is exercised with the remaining read and write.

FIG. 31 gives a more detailed view of the interconnection of the memory with the algorithm logic. Trace A and the subsequent traces are expanded from the traces A and D in FIG. 30.

3.3.2.11 Sequencer Hardware

The memory addressing discussed in the previous section is generated by the sequencer logic. A block diagram of this logic appears in FIG. 32, and a timing diagram showing how the addresses are derived is shown in FIG. 33.

In the block diagram, the modulo 6 counter counts from 0 to 5 and keeps repeating this as shown in trace A in FIG. 33. The modulo 16 counter counts from 0 to 15 and is incremented every time the modulo 6 count goes from 5 to 0 as shown in trace B. Since the modulo 16 counter steps 1/6 as fast as the modulo 16 counter, each count has a value of 6 in the memory address. A count of 0=0, 1=6, 3=18 ... 15=90. The decrementer below the modulo 6 counter subtracts 1 from the count. If the count is 0, the decrementer output is 7, but the two circuits shown at the output force this 7 to 5. The select gates below the decrementer select one of the two counts. The result is trace E for these 3 bits of the address. Similarly the modulo 16 outputs are derived from traces F through J and appear in trace K. The complete 7-bit address buss is trace L which is the same as that previously discussed in trace A of FIG. 30.

The sequencer also supplies information to the A/D compare logic such as the 3-bit code and select pulses previously discussed in reference to FIG. 22.

3.3.2.12 Audible Tone - Dial and Busy Tone

The dial tone has a frequency of 350 hz plus 440 hz at −16 dbm. The binary pattern used in the NCU to generate the dial tone on the CR lines at the CDQ2W is a 364 bit sequence. This bit pattern is stored in a ROS module which is clocked at a 32 Khs rate. The bit pattern is shown in Table 3.3.2.12-1 below.

Table 3.3.2.12-1

| Dial Tone 364 Bit Pattern | | | |
|---|---|---|---|
| 0 | 1 0 0 0 0 0 1 0 | 24 | 0 1 1 1 1 0 1 0 |
| 1 | 1 1 0 1 0 1 0 1 | 25 | 1 0 1 0 1 0 1 0 |
| 2 | 1 0 1 1 1 0 1 1 | 26 | 1 0 0 1 0 0 0 0 |
| 3 | 1 1 1 1 0 1 0 1 | 27 | 1 0 0 1 0 0 1 0 |
| 4 | 1 0 1 0 1 1 0 1 | 28 | 0 0 1 0 0 1 0 0 |
| 5 | 0 1 0 1 1 0 1 0 | 29 | 0 1 0 0 0 1 0 0 |
| 6 | 1 0 0 1 0 0 0 1 | 30 | 1 0 1 0 1 0 1 1 |
| 7 | 0 0 0 0 1 0 0 0 | 31 | 0 1 1 1 1 0 1 1 |

Table 3.3.2.12-1-continued

| | Dial Tone 364 Bit Pattern | | |
|---|---|---|---|
| 8 | 10001001 | 32 | 11011011 |
| 9 | 00100001 | 33 | 01101101 |
| 10 | 01001101 | 34 | 01111010 |
| 11 | 01101101 | 35 | 10101010 |
| 12 | 11110110 | 36 | 10010010 |
| 13 | 11011011 | 37 | 01000100 |
| 14 | 01100110 | 38 | 01001000 |
| 15 | 11010010 | 39 | 10001001 |
| 16 | 10010000 | 40 | 01011101 |
| 17 | 01000100 | 41 | 11011101 |
| 18 | 10010001 | 42 | 11011101 |
| 19 | 00001010 | 43 | 11011101 |
| 20 | 10101010 | 44 | 11011101 |
| 21 | 10111011 | 45 | 1101 |
| 22 | 11011011 | | |
| 23 | 10111011 | | |

The busy signal is 44 complete sequences of the same 364 bit sequence interleaved with 16,016 bits of alternate 1's and 0's. Therefore, the dial tone signal is operative for ½ second and the alternate 1's and 0's is operative for ½ second. The data flow paths for both the dial tone and the busy tone are shown in FIG. 34.

The insertion of the dial tone and busy tone into the caller's CR line (via the path: modulator - LGIM-SIM-LGOM-demodulator) is controlled by the ICM (FIG. 21). The call processor obtains 3 encoded bits from the ICM which specify when to insert a dial tone or busy tone into associated voice lines.

3.3.3 D/A Interface and Conversion

3.3.3.1 Demodulator Interface Format

From the demodulator to the D/A interface memories there is a 9-bit wide buss seen in FIG. 24, the block diagram of the voice processing area. Multiplexed onto this buss are the accumulated values for the 96 ports. Every 324 nano-seconds a new 9-bit value appears here for the next consecutive port number.

3.3.3.2 D/A Interface Hardware

FIG. 35 shows a block diagram of the digital to analog interface memories. The 9-bit input buss is shown at the top of the figure. The D/A circuits which are connected to the outputs of these memories each require a 7-bit value at 8 times the input rate to these memories. For a port with an accumulated value of: 101101101 the eight associated 7-bit values sent to the D/A converter are as shown below:
 1011010
 1011011
 1011010
 1011011
 1011011
 1011011
 1011010
 1011011

The 6 high order bits of the 9-bit input become the 6 high order bits of the 7-bit output. The remaining 3 low order bits of the input are sent as the low order bit of the output, as many times in the 8 transfers as the binary value represented by the 9-bit input. That is, the least significant bit is sent once, the bit in the 2' or 2 position is sent twice, and the bit in the $2^2$ or 4 position is sent four times. They are distributed as shown above to reduce the generation of noise in the D/A circuit.

In 31.25 micro-seconds the memories receive 96 9-bit values and during that same time must send out 8 times 96 7-bit values. The timing of this procedure is shown in FIG. 36. The 4 traces are for the 4 memories. The trace for memory A is shown in detail in FIG. 37. For the first two passes through memory there are two reads and one write. For the third through eighth passes only reads are performed. During this time writes are performed to the other three memories. Memory A is dedicated to ports 6 through 29 and the output buss of this memory is connected to 24 D/A converters which are dedicated to these ports.

Table 3.3.3.2-1 below is a table of memory locations and associated ports in the four memories.

Table 3.3.3.2-1

| Mem Loc | Address Bits | Mem A Ports | Mem B Ports | Mem C Ports | Mem D Ports |
|---|---|---|---|---|---|
| 0 | 00000 | 6 | 30 | 54 | 78 |
| 1 | 00001 | 18 | 42 | 66 | 90 |
| 2 | 00010 | 7 | 31 | 55 | 79 |
| 3 | 00011 | 19 | 43 | 67 | 91 |
| 4 | 00100 | 8 | 32 | 56 | 80 |
| 5 | 00101 | 20 | 44 | 68 | 92 |
| 6 | 00110 | 9 | 33 | 57 | 81 |
| 7 | 00111 | 21 | 45 | 69 | 93 |
| 8 | 01000 | 10 | 34 | 58 | 82 |
| 9 | 01001 | 22 | 46 | 70 | 94 |
| 10 | 01010 | 11 | 35 | 59 | 83 |
| 11 | 01011 | 23 | 47 | 71 | 95 |
| 16 | 10000 | 12 | 36 | 60 | 84 |
| 17 | 10001 | 24 | 48 | 72 | 0 |
| 18 | 10010 | 13 | 37 | 61 | 85 |
| 19 | 10011 | 25 | 49 | 73 | 1 |
| 20 | 10100 | 14 | 38 | 62 | 86 |
| 21 | 10101 | 26 | 50 | 74 | 2 |
| 22 | 10110 | 15 | 39 | 63 | 87 |
| 23 | 10111 | 27 | 51 | 75 | 3 |
| 24 | 11000 | 16 | 40 | 64 | 88 |
| 25 | 11001 | 28 | 52 | 76 | 4 |
| 26 | 11010 | 17 | 41 | 65 | 89 |
| 27 | 11011 | 29 | 53 | 77 | 5 |

The address inputs shown in the block diagram (FIG. 35) are taken from the sequencer discussed in the previous section.

3.3.3.3 Digital to Analog Converter Hardware

The 7-bit modified accumulated value generated by a D/A interface memory is set into a 7-place counter and counted down to zero by a 18.528 MHz clock. A pulse is thereby produced with a width equal to the amount of time the value in the flip-flops is non-zero. The pulse width is thereby proportional to the 7-bit value.

Every 3.91 micro-seconds a new 7-bit value is loaded into the counter and counted down to zero, producing a pulse width modulated signal. This signal is then integrated to give the analog voice signal.

In each NCU there are 96 D/A converter circuits, each dedicated to one CDQ port. The outputs of these circuits pass via lines CR to CDQ interface circuits which amplify the voice signals for transmission to the CDQ's.

4.0 Digital Switch

4.1 Switch Architecture

The Digital Switch portion of the NCU is program controlled by the 3705 CCU. Input traffic to the switch is either data or voice which has been preprocessed by respective data adapters or voice processing hardware. FIG. 38 depicts the basic structure of the NCU switch. FIGS. 19 and 20 provide a more detailed view.

4.1.1 Switch Components

4.1.1.1 Ports

On the left side of the figure are shown 96 ports. Each port is full duplex and sustains a 32 KBS rate. The input (transmit) side of a port is referred to as "port in" and the output (receive) side as "port out". Under program control, ports may be individually selected to interface with voice processing or data adapter hardware.

4.1.1.2 LGIM/LGOM

The Line Group Input Module (LGIM) contains a one byte wide shift register location for each port and serves to deserialize the bit stream at each port in into one-byte units. The Line Group Output Module (LGOM) performs the inverse function of the LGIM for port out bit streams. The LGOM contains 96 one-byte wide shift register locations and serializes the switch traffic to the 96 ports out.

4.1.1.3 Trunk Port/Real Channels

On the right side of FIG. 38 is shown a high speed digital trunk port. The trunk port is a full duplex serial by bit interface and operates at 1.544 MBS. One out of every 193 bits (8 KBS) of the bit stream is used for synchronization, leaving an effective 1.536 MBS for data transmission. Digital traffic is represented on the trunk facility in units called frames. A frame is 6 ms in length and contains 48 Real Channels (RC) also termed trunk channels (TC) in previous discussions. Each real channel is composed of 24 bytes (192 bits) and operates at an effective 32 KBS rate. A synchronization bit is inserted between channels.

4.1.4 Virtual Channels

A Virtual Channel (VC) is defined as a 32 KBS channel which may be transmitted or received on the high speed digital trunk interface. The NCU supports 96 VC's out which are transmitted from the NCU and 96 VC's in which are received by the NCU.

4.1.1.5 Voice Activity Compression (VAC)

As mentioned previously VAC is a compression technique for voice. Voice Processing hardware senses voice activity and sends the activity indications (VAC bits) to the switch.

The switch contains a mechanism which maps the 96 VC's out onto the real 47 channels out at the transmission side of the trunk interface. On the receive side of the trunk interface VAC inversely maps the 47 received real channels (RC's) into the 96 VC's in.

Since only 48 real channels can be actually handled by the digital trunk, the compression ratio is two since there are twice the number of VC's as RC's. VAC operates by choosing a subset of the 96 VC's out every frame time and compressing them into the 48 RC's of the outgoing VC's out. Chosen for transmission by VAC are those VC's that are "active", that is, channels that have either data or "talkspurt" information present. Activity is indicated by a single control bit for each VC out. If more than half of the channels are active during a given frame, VAC employs a prioritization algorithm discussed below to eliminate or freeze out the virtual channels which are in excess of the frame capacity. In order to indicate which VC's are transmitted each frame time, it becomes necessary to define a VAC mask. The transmitted VAC mask is a 96-bit quantity sent over a dedicated real channel RC1 (or TC1) as previously discussed. The positions of the bits in the mask in time progression are associated with the numerical positions of the 96 VC's, 0 to 95, respectively. The state of the mask bit (1 or 0) represents the state of the associated virtual channel, i.e. active or inactive. Since the VAC mask requires a real channel, the 96 VC's out must be compressed into the remaining 47 real channels out.

4.1.1.6 TGOM/TGIM

The Trunk Group Output Module (TGOM) serves to buffer the 96 VC's out exiting the switch and contending for real channel assignments at the trunk out interface. The TGOM is an A/B buffer; each side of the buffer contains 24 bytes for each of the 96 VC's out. A frame time is required to load one side of the buffer and alternates between the two sides every 6 ms (in successive frames). While one side is being loaded, the other side is operated on to determine activity, compressively assigned to real channels on the trunk, and transmitted out the trunk interface preceded by control signaling and VAC mask channels.

The Trunk Group Input Module (TGIM) buffers the 48 real channels entering the switch via the trunk in interface. Like the TGOM, the TGIM is an A/B buffer with sides alternately loading and unloading, enabling the system to maintain transmission continuity. Each side of the buffer contains 24 bytes (192 bits) for each of the 48 incoming real channels. A frame time is required to load one side of the buffer while the other side is unloaded, and the loading and unloaded alternate between the two sides every 6 ms. While the RC's of one side are loaded from the trunk in, the RC's in the other side are demultiplexed out into slot interchange (SIM) VC's under VAC mask control. In this case VAC control performs the inverse function of compression. The VAC mask as received is used to expand the received and buffer stored real channels into 96 VC's in of SIM. For VC's that are active, information from the corresponding real channel is used as data. For a VC that is inactive, i.e. no assignment to a real channel, idle noise is used as a "filler".

4.1.1.7 SIM (FIGS. 20.1, 23, 38, 46, 49, 54 and 55 to 59)

The Slot Interchange Memory (SIM) is the heart of the Digital Switch and is the point from which all switching occurs. The SIM memory is one byte wide and may be logically divided into two parts. The top half is loaded in fixed sequence from the LGIM and contains a unique location for each port in (i.e. each LGIM location) and the associated activity bit. Data is transferred into the top half each time a new byte is accumulated from each of the 96 ports in.

The bottom half of the SIM is loaded in fixed sequence from the TGIM and contains a location for each trunk VC in and associated activity mask bit. Data is written into the bottom half of the SIM each time the TGIM is ready to unload a new byte from the 96 VC's in. Note that in the case of inactive VC's, idle noise is inserted.

4.1.1.8 ICM

The output from the top half of the SIM may be directed to either the TGOM or the LGOM and is controlled addressed in varied sequence by outputs of successive addresses of the Inter-Connect Memory (ICM). The ICM is programmable and is loaded via the 3705/NCU interface. The ICM is two bytes wide and may be considered logically divided into two parts. The top part contains 96 locations which are used to control the loading of the TGOM. Successive locations are implicitly associated with successive ones of the 96 VC's out. The content of an ICM location contains an address pointer which is used to address the SIM. Since the ICM locations are under program control any port in may be switched to a particular VC out by placing the port address of the SIM location in the ICM location corresponding to the VC out. Thus the association between port in and VC's out can be varied to suit system requirements for down-link processing.

The bottom half of the ICM location contains 96 locations which are used to control the loading of the LGOM. Each location is implicitly associated with each of the 96 ports out. As before, the contents of each location contains an address pointer which is used to address the SIM. Any VC in from the trunk in interface may be switched to an LGOM port out by placing the VC in address of the SIM location in the ICM location corresponding to the LGOM port out.

Although both halves of the SIM are logically separate, they are implemented in a common memory. Therefore, in addition to port to trunk switching described, it is possible to perform port to port and trunk to trunk switching at the SIM.

4.1.2 NCU Expansion

NCU capability may be expanded by interconnecting two or more NCU's together; up to four. The maximum configuration consists of 384 full duplex ports and four high speed digital trunk interfaces. The above is accomplished by interconnecting the SIM and ICM memories of the individual NCU's to form a common SIM and ICM switching node. By providing addressability from each ICM to all SIM locations the expanded circuit supports inter as well as intra NCU switching.

4.1.3 Switching Functions

With the switching system described, four basic switching functions are possible and are summarized below.

4.1.3.1 Port in to VAC out

Any port in in up to four groups of 96 ports in may be switched to any VC out in up to four groups of 96 VC outs. This connection is used to switch data or voice traffic from data sets or PBX's respectively to a VC out on the Digital Trunk interface.

4.1.3.2 Port in to Port out

Any port in in up to four groups of 96 may be switched to any port out in the same groups. Connections of this type are used primarily for local calls.

4.1.3.3 VC in to Port out

Any VC in of any group may be switched to any port out of any group. This connection is used to switch incoming data or voice from the digital trunk interface to a port out.

4.1.3.4 VC in to VC out

Any VC in of any group may be switched to any VC out of any group. Connections of this type are primarily useful in a terrestrial environment where the NCU is an intermediate node.

4.2 Switch Hardware 4.2.1 1.544 MBS Digital Trunk Interface

The NCU digital trunk interface port is the link on which all traffic is communicated to a MAU or another NCU. AT&T has standardized a 1.544 MBS digital interface with a 551A Channel Interface Unit. The NCU is designed to operate with this interface and conforms with the standard as currently defined.

4.2.1.1 Clock Recovery

NCU timing is derived from a Voltage Controlled Crystal Oscillator (VCXO) which is phase-locked to incoming data transitions appearing on the high speed trunk interface. Because the 551A interface does not furnish a clock signal (i.e. it only "regenerates" incoming data waveforms), the VCXO must be stable enough to provide an accurate clock within the frequency limits imposed by existing T-1 equipment. Furthermore, it should be capable of "coasting" through periods of data which contain no transitions for 16 bit times, without suffering substantial phase drift.

The VCXO generates a single frequency (when "locked" to the incoming data transitions) which is exactly 12 times the bit rate on the T-1 trunk line (i.e. 12X 1.544 MHz=18.528 MHz). The 18.528 MHz clock signal drives the entire NCU timing structure. Since the 18.528 MHz clock signal "tracks" the incoming data transitions, (via the phase-locked loop) the NCU timing structure is always synchronized with the "master reference" at the other end of the trunk line. The output signal timing (to the T-1 trunk) is coherent with the input signal timing since it is developed from the 18.258 MHz clock signal. Therefore, the source (MAU) driving the trunk line will "see" the same timing as it transmits except for phase jitter and long term phase shifts (i.e. static phase off-set) due to temperature variations.

4.2.1.2 Trunk Adapter Interface

Figure 39:
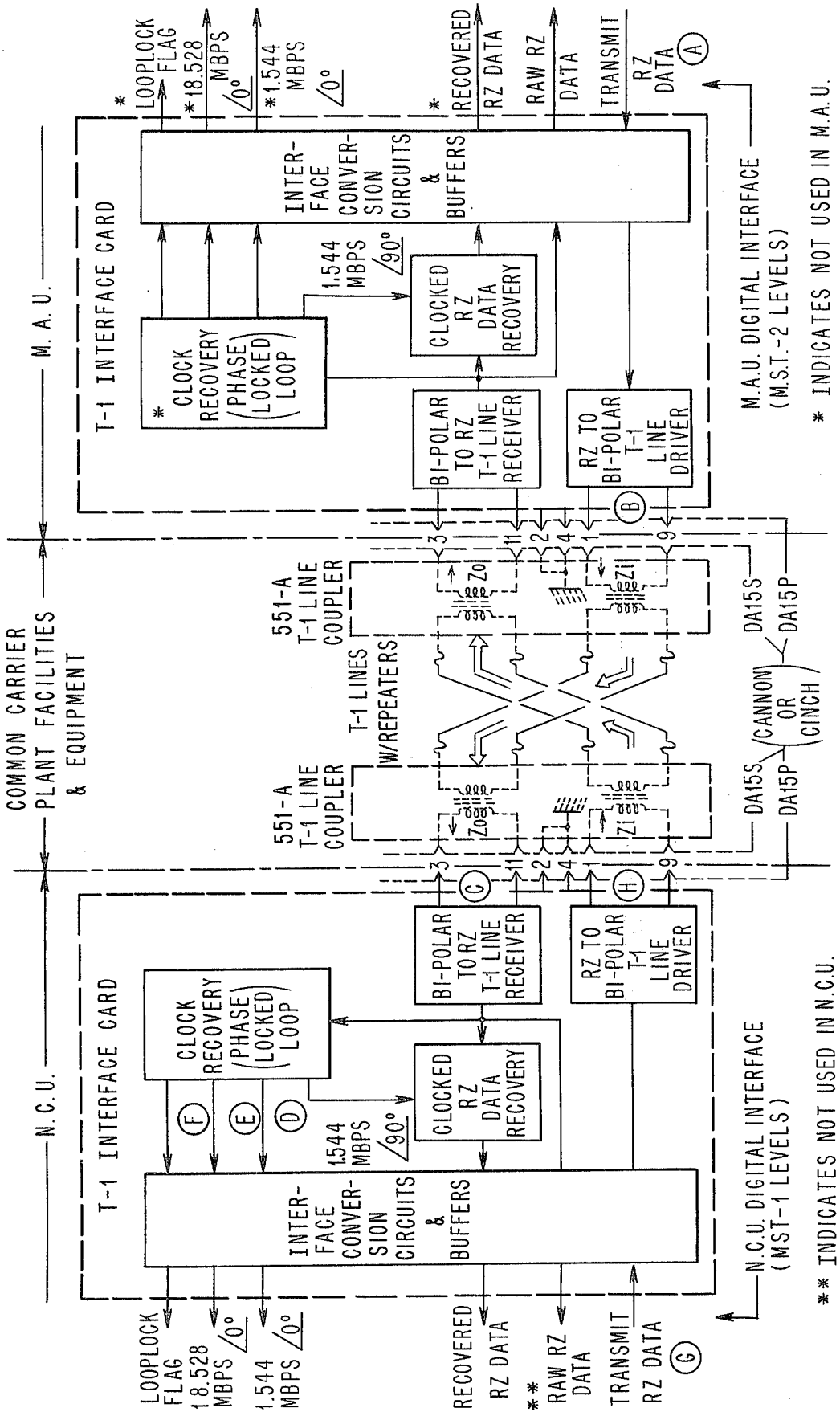
Figure 40:
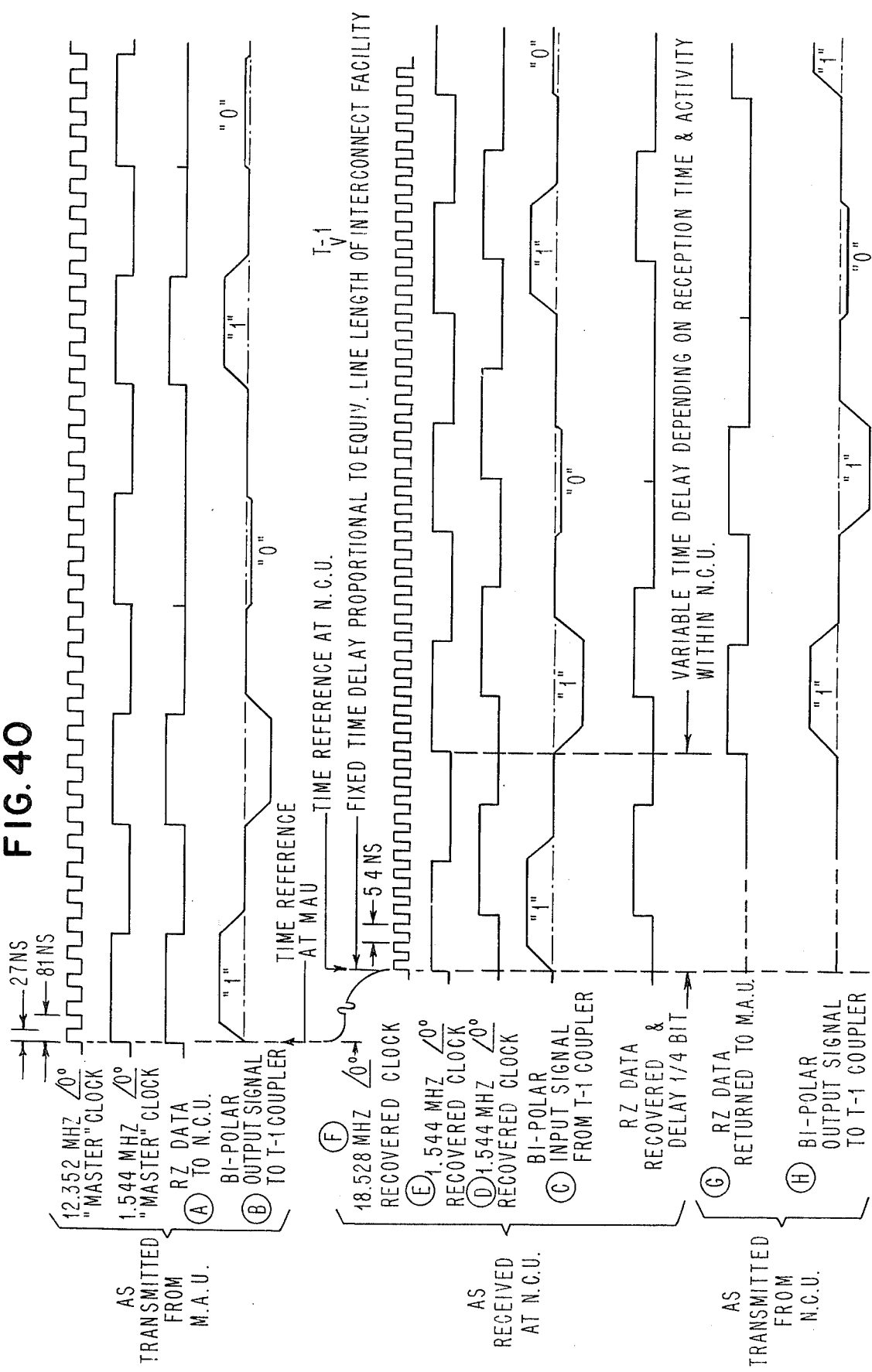

Transfer of signals between the NCU and the 551A Channel Service Unit is accomplished by a T-1 interface adapter assembly which performs the necessary level and format conversions (in both directions), as well as clock and data recovery functions and provides phase-lock loop status information. FIGS. 39 and 40 indicate the major functions which are performed in conversion of digital signals in the NCU to bi-polar signals at the T-1 input and vice-versa.

On the Channel Service Unit side of the interface, it is necessary to convert between RZ logic signals and bi-polar pulses at an impedance level of approximately 100 ohms. These complimentary functions are provided by the "Bi-polar to RZ T-1 Line Receiver" and "RZ to Bi-polar T-1 Line Driver" shown in the figure. The transmit path is a simple conversion from logic levels to the AMI output which drives a balanced 100 ohm load (in actuality, a transformer winding).

The receive signal path requires more sophisticated processing since a clock signal must be extracted from the incoming serial data. After the received AMI waveform is converted to "raw" RZ format, it is compared to a divided down (by 12) version of the VCXO output in a phase detector. This phase detector develops a bi-polar output signal voltage which is a function of the phase difference between the incoming signal (from the T-1 line) and reference signal (VCXO output divided by 12) at 1.544 MHz. Output from the phase detector is used as an error signal for a closed-loop feedback system whose output is a signal which is phase coherent with the incoming data transitions. The error signal is conditioned by a low pass filter and used to drive a Voltage Controlled Crystal Oscillator whose output (at 18.528 MHz nominal) is divided by 12 to provide the reference 1.544 MHz. Connection of the feedback path is such that the VCXO is always driven in the direction to cause the error signal (out of the phase detector) to diminish toward zero volts average. In this fashion, a so-called phase-locked loop configuration is achieved which provides outputs with well defined relationships to the incoming data transitions.

A phase-shifted (by approximately 90°) version of the recovered (or phase-locked) clock is used to strobe the raw RZ data derived from the bi-polar to RZ T-1 line receiver, providing a synchronously clocked (synchronous with the recovered clock) serial data stream to the NCU. In addition to the recovered data, the interface adapter furnishes the 18.528 MHz VCXO output used to derive all timing within the NCU. A "Loop Lock Flag" is provided to the NCU to indicate whether or not the interface adapter is providing valid data. All input and output signals are appropriately conditioned by the "Interface Conversion Circuits and Buffers" to furnish correct logic levels where appropriate.

4.2.2 Frame Structure and Alignment

4.2.2.1 Frame Description

Figure 41:
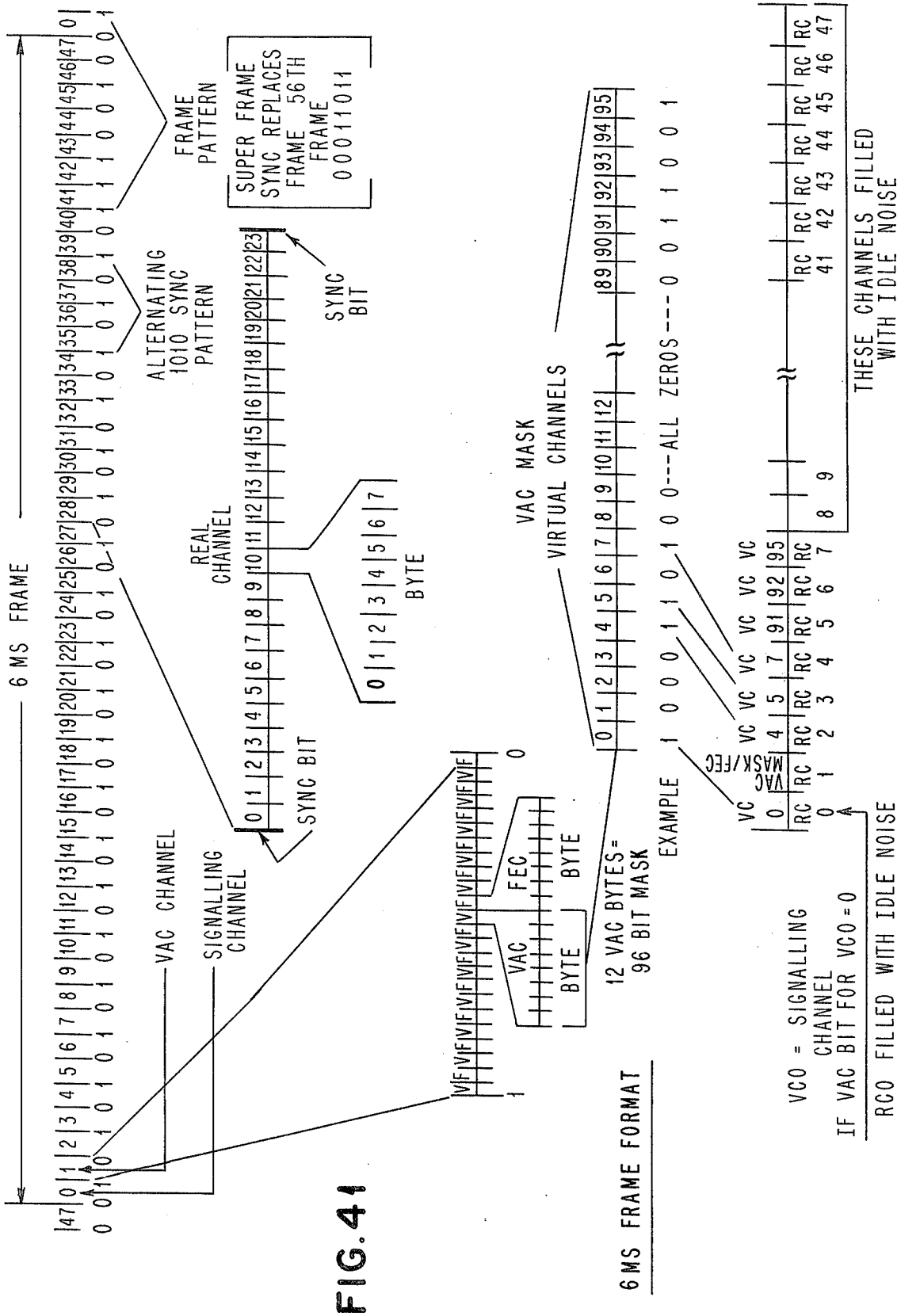

A frame is the time unit in which data is transmitted over the 1.544 MBS trunk facility. The format of the frame is shown in FIG. 41. A frame is 6 ms in length and consists of a total of 9264 bits.

4.2.2.1.1 Real Channels

The frame is composed of 48 real channels. Each real channel consists of 24 bytes (192 bits) and has an effective bandwidth of 32 KBS.

4.2.2.1.2 193rd Sync Bit

Frame synchronization (sync) bits are inserted between each real channel. The sync bits are used to define frame and channel boundaries. For every 192 bits of data transmitted (one channel), a sync bit is required which represents 1/193rd of 1.544 MBS or 8 KBS. The remaining bandwidth of 1.563 MBS or 192/193rd of 1.544 MBS is utilized by the 48 32 KBS channels.

The first 40 sync bits are an alternating 1010 — pattern as shown in FIG. 41. The last 8 sync bits of a frame consist of a frame or superframe sync pattern. The frame sync pattern is used by synchronization hardware to determine frame boundaries. In every 56th frame, the frame sync pattern is replaced with a superframe sync pattern which is the inverse of frame sync.

4.2.2.1.3 Signaling

Channel 0 (TC0) is reserved for signaling or communication between the two interconnected hardware boxes on the trunk line, i.e. an NCU connected to a MAU or an NCU connected to an NCU. Signaling and its protocol are discussed in section 4.2.7.

4.2.2.1.4 Voice Activity Compression (VAC) Mask

The VAC mask is a 96-bit mask which describes the allocation of the 96 VC's to 47 real channels of the 6ms frame (see FIG. 41). The VAC mask is protected by a Forward Error Correction (FEC) code. The VAC mask and its associated FEC are transmitted in real channel 1 (TC1), i.e. no VC can be assigned this real channel. The mask applies to the remaining 47 real channels in the same frame in which the mask is transmitted (channel 0 and channels 2–47).

The position of a bit in the mask implicitly defines the VC number, i.e. the first VAC bit in the mask applies to VC 0 and the 96th VAC bit applies to VC 95. The state of the bit defines the current activity of the VC. If the bit is 1, the VC is active and if the bit is 0, the VC is inactive.

The first bit of the mask represents VC 0 and is always assigned to real channel 0. If the bit is on, VC 0 is inactive. If the bit is off, VC 0 is inactive and channel 0 of the frame is unused. The remaining 95 bits of the mask describe the allocation of the active VC's into real channels 2–47 and are always assigned to the real channels in ascending order. Of the remaining 95 VC's (1–95) no more than 46 may be active at a time. If more than 46 are active, some of the VC's are "frozen out" according to a "freezeout" algorithm. See section 4.2.4.7. If less than 46 VC's are active, they are assigned real channels starting with real channel 2. The unused real channels are "filled" with idle noise. An example of the VC to RC assignment is shown in FIG. 41.

The VAC mask is protected with FEC with a (16, 8) block code which is described in section 4.2.4.8. For each byte of the VAC mask, a corresponding byte of FEC is transmitted. The 12 VAC mask bytes are transmitted in the 12 even byte positions of real channel 1 as shown in FIG. 41. The 12 FEC bytes are interleaved with the mask bytes and transmitted in the odd byte times. Each VAC byte is directly followed by its associated FEC byte.

4.2.2.2 Trunk Phase Corrections

Trunk phase correction is a process whereby incoming frames are aligned with the frame structure generated by the NCU Timing System. The correction is a three step procedure consisting of the three following mechanisms.

4.2.2.2.1 Bit Synchronization

Bit Synchronization is a mechanism which allows the NCU to synchronize bits received from the trunk line with the NCU clocking. If the frequency of the incoming bits are identical in frequency to the NCU bit strobe clock, Bit Synchronization amounts to a constant phase adjustment. The incoming bit stream is delayed by a constant amount such that a valid bit sample time is coincident with the bit strobe clock. The above is the case for one NCU since the NCU clocking is phase locked with the incoming trunk bit stream.

When two or more NCU's are interconnected together, NCU timing is derived from one of the trunk lines which is designated as master. Any one of the trunk lines may be chosen as master under program control. The 18.528 MHZ clock generated by the VCXO of the master trunk is used to derive the entire NCU timing structure which causes each NCU to be phase locked with the master trunk. Since the other connected trunks must be bit synchronized with the NCU clocking, it is necessary to account for short and long term differential frequency variations between the master trunk line and the other trunk lines.

Figure 42:
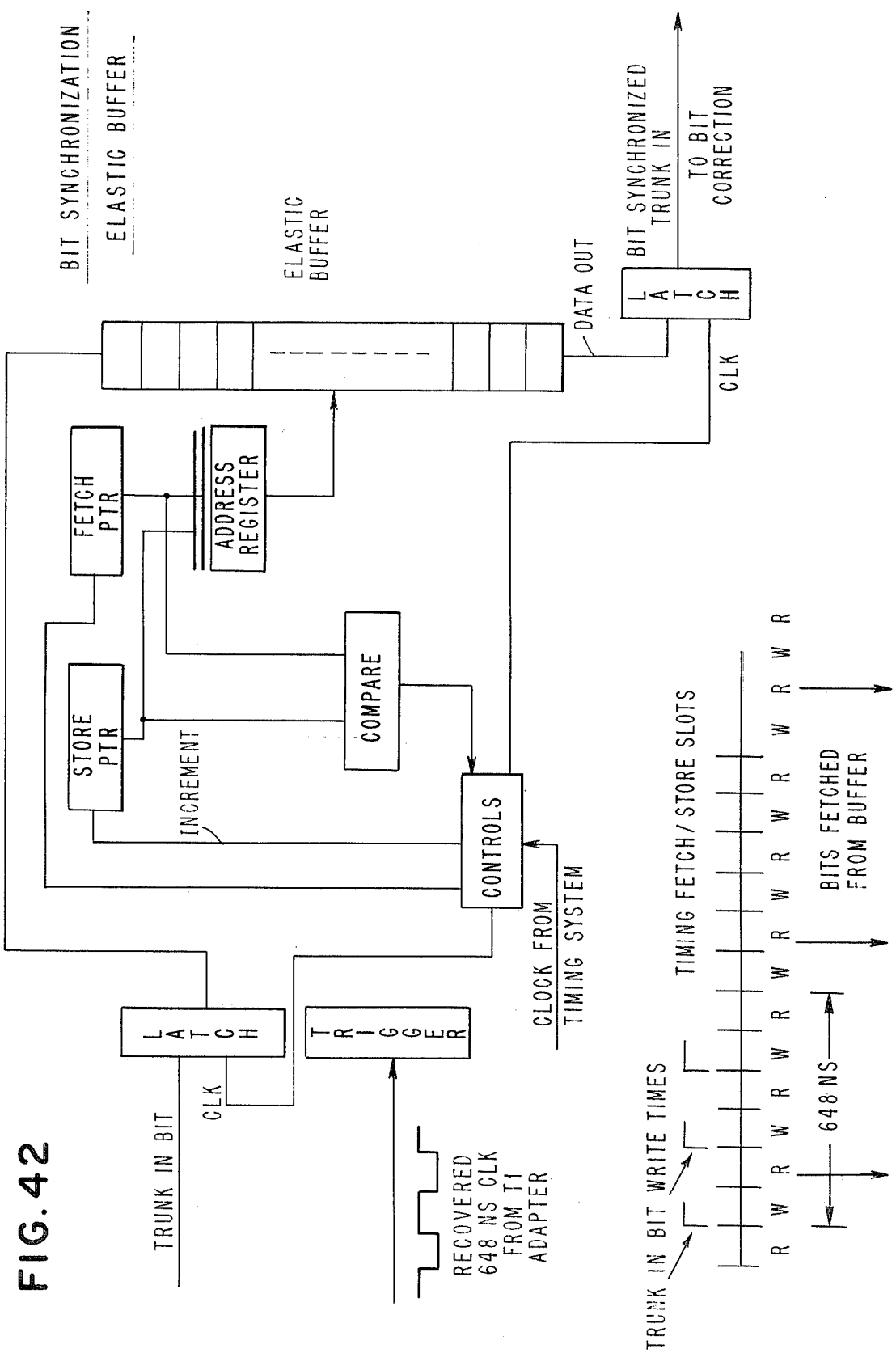

In order to achieve bit synchronization for the two cases cited, a 32-bit elastic buffer is provided as shown in FIGS. 20 and 42. The Elastic Buffer is logically a circular store with a store pointer and a fetch pointer. Bits are stored into the buffer on the closest 108 ns boundary from their arrival point on the trunk interface. This is necessary to remove store/fetch conflicts in the memory. Since the inter-arrival time of the bits is normally 648 ns, the 108 ns max from a bit arrival is sufficient to track the worst case short term jitter.

Bits are fetched from the buffer every 648 ns with the bit strobe clock $C_3$. The fetch pointer is nominally bits behind the store pointer and is set as such at system reset. Any long term phase shifts will cause the two pointers to drift apart or move closer. However, as long as the frequency variation is not constant in one direction for more than 16 bits, the pointers will never coincide. Note that for one NCU (or the master), the two pointers will always remain 16 bits apart since no phase shift will occur. If the pointers do coincide, the bits will be fetched out of order from the buffer and will cuase the NCU to eventually lose synchronization. Loss of synchronization causes the two pointers to be reset back to their initial separation of 16 bits.

4.2.2.2.2 Byte Correction

In the NCU, information is stored in the Phase Buffer on a byte basis. It is therefore necessary to align the serial by bit trunk interface traffic into byte wide units. Byte phase adjustment cannot be performed until Frame Synchronization is achieved since the synchronization bits define channel boundaries and therefore byte boundaries. Frame Synchronization is described in section 4.2.2.3. Byte Synchronization implementation is shown in FIG. 43.

4.2.2.2.2.1 Byte Correction Shift Register

The shift register 43-1 receives a new bit every bit time (648 ns) from the bit correction logic. Since there are eight stages in the shift register, the incoming bit stream may be delayed anywhere from zero to seven bit times.

4.2.2.2.2. Byte Correction Funnel

The funnel 43-2 is a serializer and contains an input from each stage of the shift register. The funnel is addressed by three bits generated by control logic which causes a particular "tap" to be selected. The manner in which the corrected adjustment is determined is discussed in Section 4.2.2.3.3.1. The serial by bit output from the funnel is a byte corrected data stream and is sent to the Trunk in Shift Register.

4.2.2.2.2.3 Trunk in Shift Register

The Trunk in Shift Register 43-3 is used to form byte units which are to be transferred to the Trunk in Uncorrected Register 43-4. The 193rd sync bit is removed from the data as transfers occur between the two registers. Twenty-four bytes (192 bits) are moved on byte boundaries between the Trunk in Shift Register and the Trunk In Uncorrected Register at evenly spaced intervals. When the 193rd sync bit is encountered, a 648 ns bit time is skipped and the sync bit is shifted out of the last stage of the shift register. Therefore, every 24 bytes an additional bit time elapses between the byte transfers which reduces the 1.544 MBS to 1.536 MBS into the phase buffer.

4.2.2.2.3 Frame Correction

Frame Correction is the process whereby incoming bytes from the byte correction logic are adjusted in phase so that the entire incoming frame is aligned with the frame structure generated by the NCU timing. The function is accomplished in the Phase Buffer portion of the memory unit containing TGIM and TGOM, and is described in Section 4.2.2.2.3.

4.2.2.3 Frame Synchronization

After the incoming trunk data stream has been bit corrected, frame boundaries are located by searching for the 193rd sync bit. After frame synchronization is achieved, byte phase adjustments and frame phase adjustment are made, i.e., frame synchronization hardware provides control signals to the byte phase and frame phase hardware.

4.2.2.3.1 Modes

Two modes are defined for frame synchronization:
1. Acquisition Mode: The synchronization hardware is in this mode when the 193rd sync bit is being searched for, i.e., the incoming trunk bit stream.
2. Monitor Mode: After the 193rd sync bit has been found, the hardware enters Monitor Mode. In this mode the sync patterns are monitored to ensure that the hardware remains in synchronization. The synchronization hardware remains in monitor mode as long as the synchronization pattern is recognizable, i.e., errors occurring in the sync pattern remain below a predefined error threshold.

4.2.2.3.2 Sync Pattern

The synchronization pattern is shown in FIG. 44. The pattern is an alternate 1010 sequence in the first forty sync bits of a frame. The last eight bits of the sync pattern denote either frame or superframe sync. The superframe 8 bit pattern is the inverse of the frame sync pattern and both are orthogonal to the alternating one-zero pattern.

4.2.2.3.3 Implementation and Algorithm

Figure 45A:
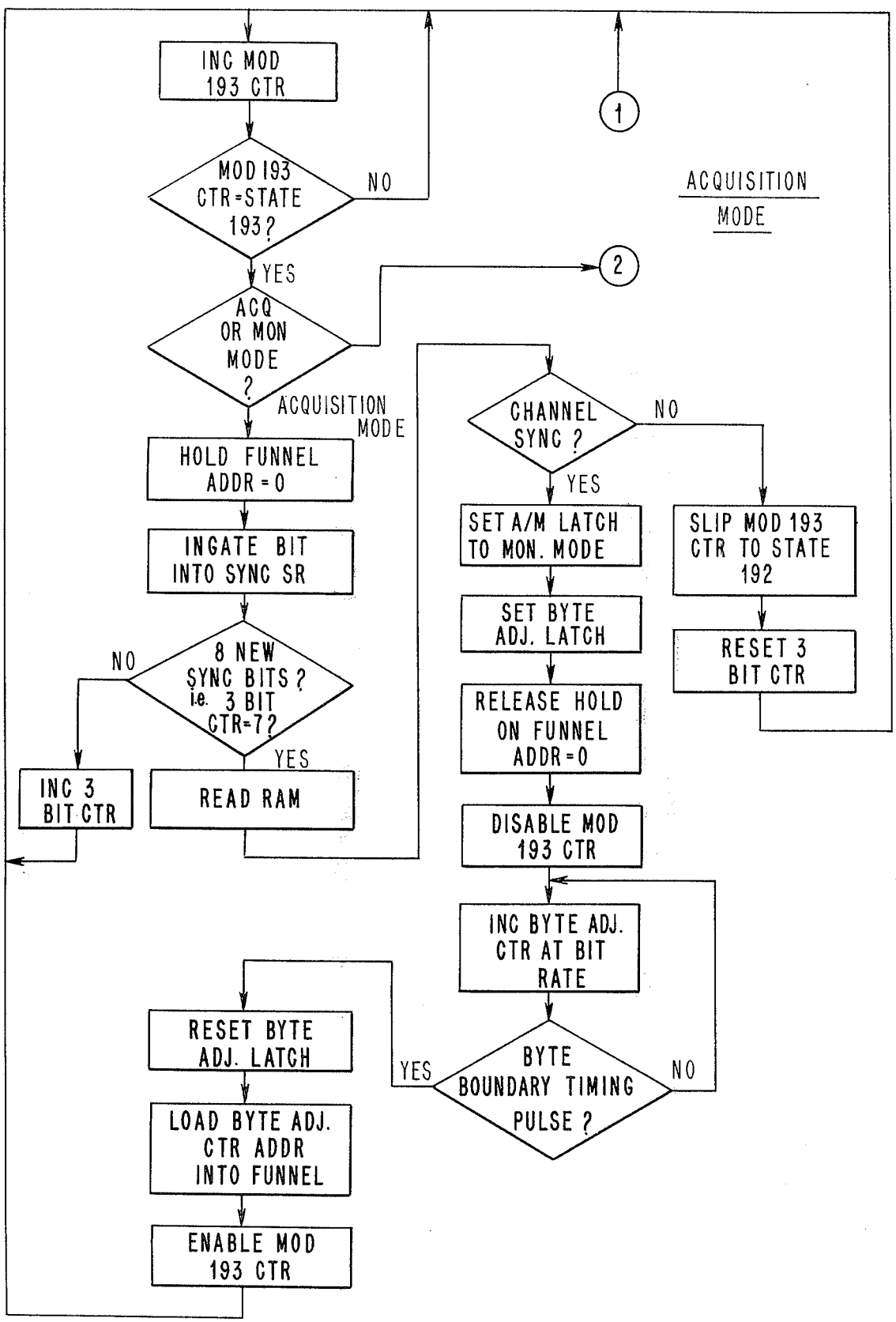
Figure 45B:
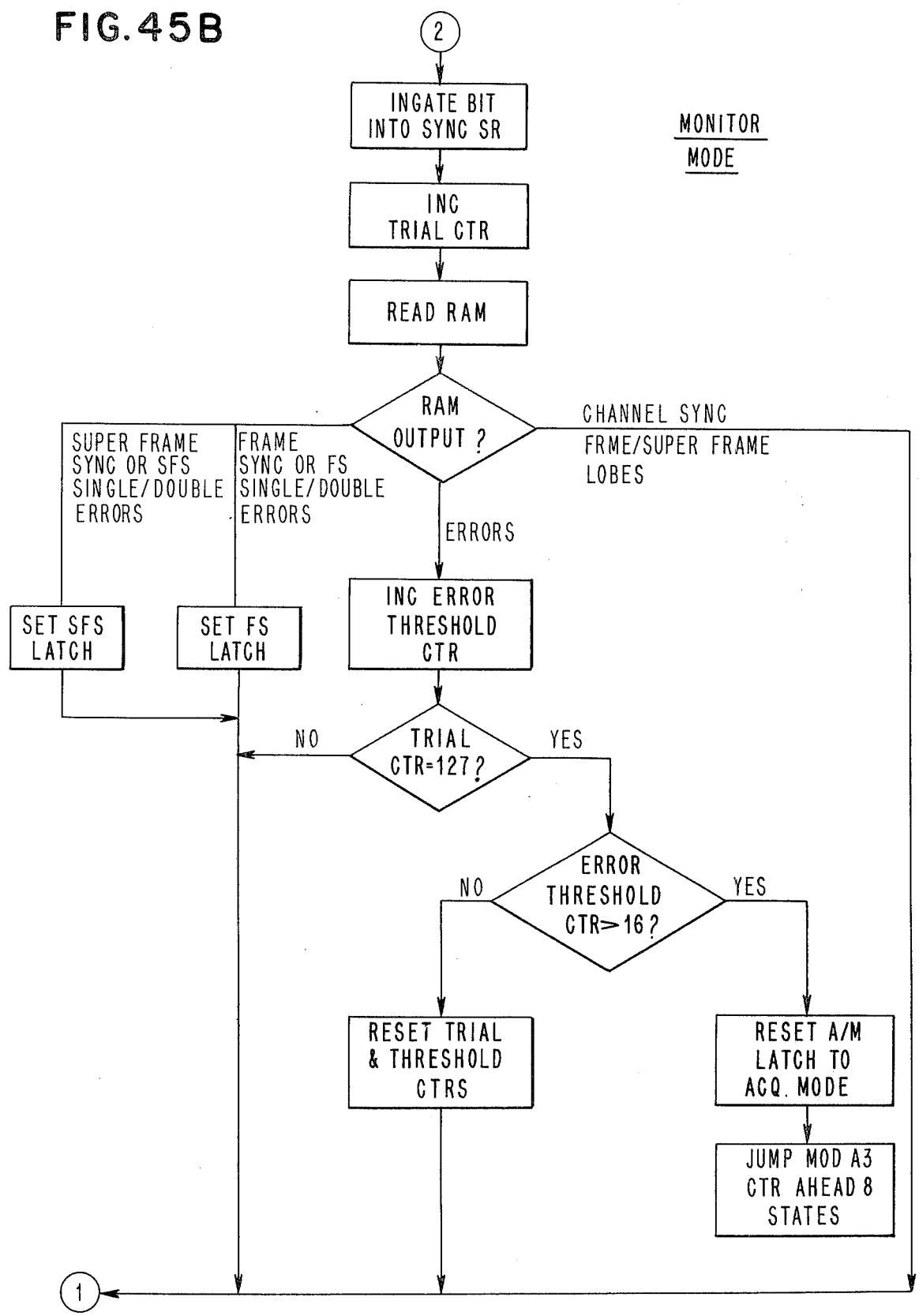

A block diagram of the synchronization hardware is shown in FIG. 43. The hardware employs a table lookup procedure in order to recognize the sync pattern and error patterns. FIGS. 45A and 45B combined provide a flow chart which shows the sequence of events during frame acquisition and frame monitoring times.

4.2.2.3.3.1 Byte Correction Control

When the synchronization hardware is in acquisition mode, the byte correction controls are reset and the bit corrected input is forced through the first stage of the funnel. No delay is imposed on the bit stream since the byte boundary is not yet known. After synchronization is achieved and the hardware is in monitor mode, the byte correction controls are activated to delay the bit corrected stream to align with the byte boundaries (0 to 7 bit times delay). At the same time the synchronization hardware is deactivated for an equivalent number of bit times. That is, the frame synchronization 193 bit count is "slipped" the same number of bits that the bit stream is delayed. This allows the synchronization frame of reference to move with the byte corrected bit stream. Therefore, the synchronization hardware can monitor the sync bit on the byte corrected stream. This allows frame sync and superframe sync indications to align on byte boundries.

4.2.2.3.3.2 Eight Bit Sync SR

This sift register contains the last eight 193rd sync bits. Each time a new sync bit arrives, it is shifted into the register and the oldest bit is shifted out. The register is used to address the RAM.

4.2.2.3.3.3 RAM

The RAM 43-5 is a 256 location read only memory which is addressed by the sync SR. If synchronization has been achieved, and ignoring error situations, only certain patterns will appear in the sync SR.

4.2.2.3.3.4 Mod 193 Bit Counter

This counter is a modulo 193 counter and is used to ingate the sync bit into the sync SR. When the hardware is in acquisition mode, the counter starts at an arbitrary point and samples a sequence of eight "193rd" bits into the sync SR. The resultant word is checked for a valid sync pattern. If the pattern is not a sync pattern, one step to the counter is inhibited, causing it to slip one bit. This causes the counter to look at a new sequence of 193 bits from the trunk. The procedure repeats until the correct 193rd bit has been found.

Once the counter is synchronized with the "right" 193rd bit, the hardware enters Monitor Mode. Successive sync bits can be predicted and the correct ones clocked into the sync SR.

In effect, the SR appears as a sliding window across the sync bits as they arrive. The various patterns that can occur are shown in FIG. 44. For each of these cases, a unique code is stored in the RAM which implements the table look-up procedure. Each time a new sync bit is shifted into the sync SR, the RAM is addressed and the code is read out. For the normal case, the code will be a sync pattern or lobe.

4.2.2.3.4 Acquisition Times

The sync search procedure starts with an arbitrary bit received from the trunk line. Eight bits, each 193 bits apart from one another, are clocked into the sync SR. At this time the RAM is read and the code checked. If the pattern is 1010, sync is declared. If not, one bit is slipped and the procedure is restarted.

Since it takes eight "193rd" bits to perform a sync check, the following time is expended.

193 × 648 ns × 8 = 1 ms

On the average, the sync hardware will slip through 92 bits before the 193rd sync bits are found.

Therefore, the average acquisition time is

92 × 1 ms = 92 ms

Maximum acquisition time is

92 × 1 ms = 192 ms

4.2.2.3.4 Error Thresholds

After sync has been achieved the hardware enters monitor mode. Each time a new sync bit is shifted into the sync SR, the pattern is checked. If it is in error, an error threshold counter is incremented. If the counter ever exceeds 32 errors out of 128 trials, the hardware reverts back to acquisition mode. The Mod 193 Counter is incremented forward by eight in anticipation that the actual sync bit is close to the 193rd bit being monitored. Therefore, the reacquisition time should be shorter than the average acquisition time.

4.2.3 Timing System and Clock Distribution

Figure 46:
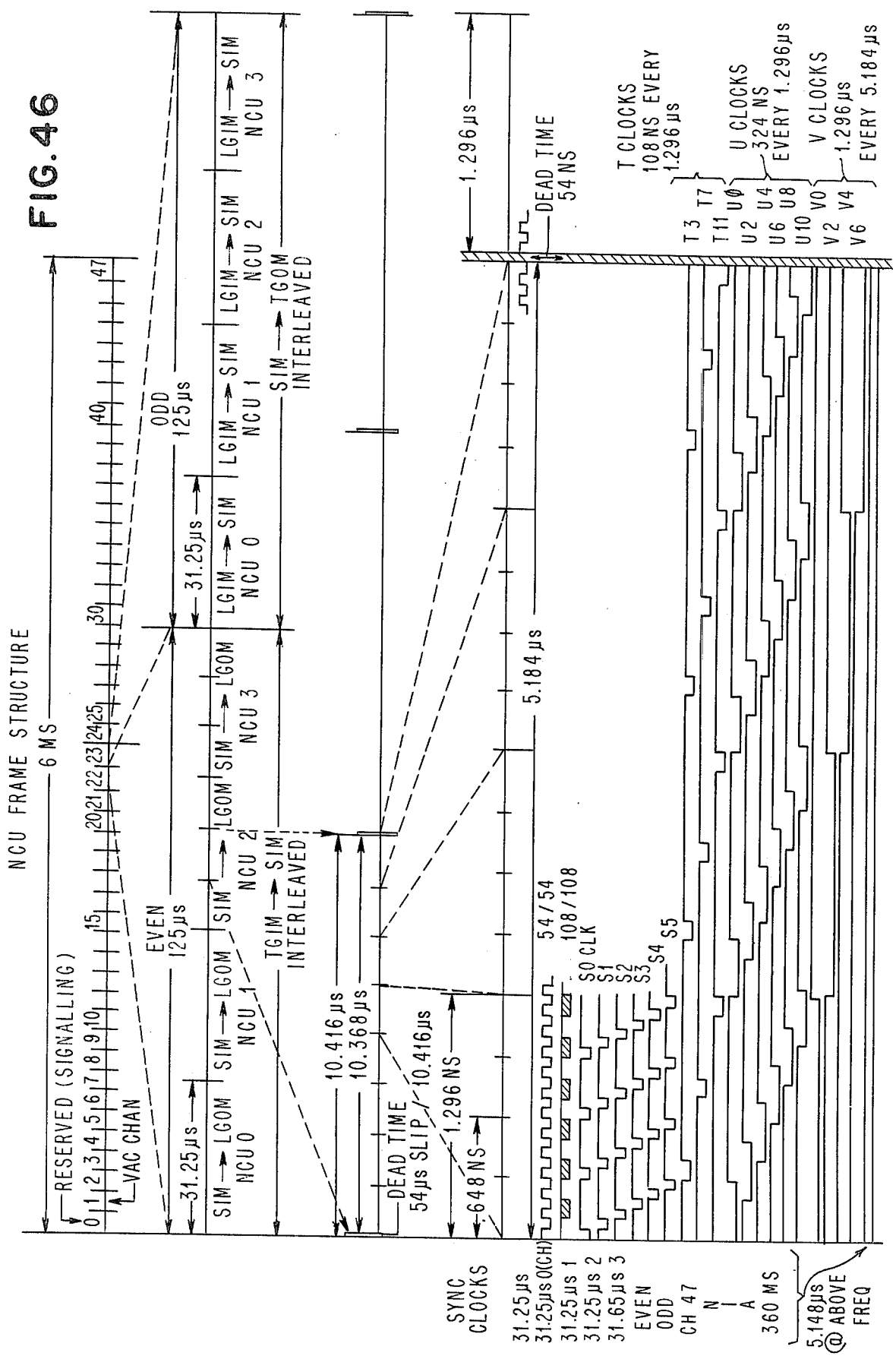

A hierarchy of clocks are used in the NCU and are depicted in FIG. 46. The 6 ms frame structure is basic to the entire NCU and consists of 48 channel times, each of which may be divided into four equal segments. Each segment is exactly 31.25 us long which is equivalent to a 32 KHz rate. Each segment is divided into three 10.416 us periods. Within the 10.416 us period, two 5.184 us periods are developed plus a 54 ns dead spot. The 54 ns dead time is used to accomplish the 1.544 MHz to 1.536 MHz conversion. There are 12 dead spots in a channel time (125 us) which is equivalent to one 648 ns bit time on the trunk line.

All events within the NCU occur at precise times within the frame and are controlled by the clocks developed within the frame structure. The 5.184 us period contains various clocks which are described in the next sections. A block diagram of the clock distribution implementation is shown in FIG. 47.

4.2.3.1 Clock Description

4.2.3.1.1 18.528 MHz Clock

All NCU timing originates from a single clock provided by the trunk adapter card. The clock is phase locked to incoming data on the trunk and runs at exactly 12 times the 1.544 MBS data rate, i.e., 18.528 MHz. The clock is generated by the VCXO and is fully described in Section 4.2.1.1.

4.2.3.1.2 192/193 Clock and 193rd Sync Clock

Data which is transferred over the trunk interface runs at an overall rate of 1.536 MHz. The 18.528 MHz clock is exactly 12 times 1.544 MHz which is the bit rate on the trunk line (including the 193rd sync bit). The 18.528 MHz clock is reduced in frequency by 1/193 by removing one out of every 193 pulses which results in the 192/193 clock as shown in FIG. 48.

The 192/193 clock is derived from a mod 193 counter in conjunction with a decoder for the 193rd state. The 193rd pulse which is deleted is used as a sync clock and contains one pulse for every 193 pulses or one pulse per 10.416 us. The 192/193 and the 193rd sync clock are used to develop all subsequent clocks which relate to 1.536 MHz.

4.2.3.1.3 54/54 NS Clock

The 192/193 clock is divided by two to produce a clock with a 108 ns period. As seen in FIG. 46, the 54/54 clock contains a half cycle of "dead time" every 10.416 ns due to the missing pulse in the 192/193 clock.

The 54/54 clock is distributed directly to the voice processing hardware. The clock is also used as a source for further clock development within the digital switch.

4.2.3.1.4 108/108 NS Clock

This clock is derived in parallel with the 54/54 clock from the 192/193 clock. The clock is distributed to the call processing hardware and is also used to produce the U clocks.

4.2.3.1.5 S Clocks

Six clocks are generated from the 54/54 ns clock with a modulo six grey code counter. Each clock consists of a 54 ns pulse which occurs every 324 ns. The six clocks are offset from one another by 54 ns. These clocks are primarily used in conjunction with others to generate the clock input to register and counters.

4.2.3.1.6 U Clocks

Six U clocks are generated and each consists of a 324 ns "window" which repeats at a 1.298 us rate. The U clocks are derived from the 108/108 ns clock.

4.2.3.1.7 V Clocks

Four V clocks are developed from the S and U clocks and are synchronized by the 193rd sync clock. Each clock is a 1.296 us window and repeats every 5.184 us.

4.2.3.1.8 Frame Sequencer/Sync Clocks/Channel Windows

The frame sequencer hardware develops all timing events with periods greater than that of the V clocks. The frame sequencer counts superframes, develops the 6ms frame structure, and provides sync clocks and channel windows which define events within the frame.

Twelve sync clocks are developed and are listed in the following table. Each sync clock is a 5.184 us window which repeats at the described intervals.
 a. 31.25 us sync — This clock repeats every 31.25 us, i.e. a 5.184 us window every 31.25 us.
 b. 31.25 us 0,1,2 and 3 — These four sync clocks repeat every 125 us and start on boundaries as shown in FIG. 46.
 c. Even and Odd — These two sync clocks define the beginning of even and odd channels and repeat every 250 us.
 d. Ch 47, 0 and 1 — These sync clocks define the beginning of the stated channels and repeat every 6 ms.
 e. 336 ms sync — This sync clock defines the beginning of a superframe.
 f. Channel Windows — Special events occur in channels 47, 0 and 1 with regard to the VAC mask preparation and its outgoing. Therefore, three channel vindows are developed. Each window is 125 us wide and repeats on a 6 ms basis within the frame structure.

4.2.3.1.9 Trunk Clocks

The clocks and all timing discussed in the previous sections were derived from the 192/193 clock. Therefore, the 54 ns dead time every 10.416 us appears in all of the clocks which adjusts the 1.544 MHz rate down to an effective 1.536 MHz. The trunk clocks are used to ingate data from the trunk and outgate data onto the trunk with the sync bit included. Thus, the clocks cannot be developed from the 192/193 clock since the 1.544 MHz rate is needed in order to accommodate the sync bit.

In the NCU the 192/193 clock and the 193rd sync clock are "ORed" together to reconstruct the basic 18.536 MHz clock. This clock is divided down to develop six C clocks which repeat every 648 ns and are 108 ns wide. The C clocks are used to drive the elastic buffer, the frame synchronizing hardware, and the trunk outgating. The C clocks are synchronized to the 192/193 clock with the 193rd sync clock pulse.

4.2.3.2 Clock Usage

With the hierarchy of clocks described, it is possible to develop pulses of various widths and periods by "ANDing" different combinations together. This allows for a flexible clocking system and provides a means for controlling the various events which occur in the NCU from a central area.

4.2.3.3 Clock Synchronizaton

All of the clocks described are closely synchronized with one another to insure proper operation. Sync pulses are continually sent to various parts of the machine which guarantees that all clocks within an NCU as well as between NCU's are always aligned correctly. If a clock for some reason "skips a beat" it will be resynchronized with its next sync pulse.

4.2.3.4 Interconnected NCU's

When NCU's are interconnected, basic clocks are provided to all NCU's by the NCU designated as the master. The master NCU generates the 192/193 clock and the 193rd sync clock from its 19.582 MHz clock. The 192/193 clock and the 193rd sync clock are distributed from the master to each NCU and also to itself. In addition, a 336 ms sync pulse (54 ns) is distributed from the master to each interconnected NCU to synchronize each NCU's frame sequencer. These three clocks are the only timing information communicated between NCU's. Each NCU derives all other clocks from these three basic timing sources.

4.2.3.5 NCU Identity

Up to four NCU's may be interconnected. The NCU's are identical to one another except for the times in which certain events occur within the frame structure. Each NCU may be made unique with jumpers on several of the NCU cards which causes an NCU to assume an identity of zero, one, two, or three. NCU's which are interconnected must have mutually exclusive identities. The identity of an NCU dictates where its frame structure starts with respect to an absolute frame of reference, i.e. the timing within the frame structure, as shown in FIG. 49. The frames are offset from one another for the reasons which are described below.

4.2.3.5.1 SIM to TGOM and TGIM to SIM

TGIM and TGOM transfers to and from the SIM are interleaved between the four NCU's. During odd channel times 96 SIM to TGOM transfers occur for each NCU. The total number of SIM reads from the common SIM buss is 4 × 96 = 384. The transfers are offset from one another by 324 ns. NCU 0 is the first to initiate a transfer from its TGOM location zero. NCU 1, 2 and 3 follow NCU 0 at 324 ns intervals. Then NCU 0 transfers a SIM location to its TGOM location 1 and NCU 1, 2 and 3 again follow. The operation ends with TGOM location 95 NCU 0, 1, 2 and 3 respectively. The above is conveniently accomplished by offsetting each NCU's frame structure from the next by 324 ns. The offset is accomplished in each NCU with a jumper on the clock card.

During even channel times, each NCU transfers its 96 TGIM locations to the SIM. The operation is interleaved as before starting with NCU 0.

4.2.3.5.2 SIM to LGOM and LGIM to SIM

Transfers for these cases are burst operations. As shown in FIG. 48, the absolute frame of reference is divided into four quadrants. Depending on the NCU, transfers occur during the first, second, third or fourth quadrant.

SIM to LGOM transfers occur only in quadrants which occur during even channel times of the absolute frame of reference. Again, the SIM buss is shared between the 4 NCU's. Since each NCU transfers 96 locations for SIM to LGOM operations, there are 96 × 4 = 384 SIM reads. NCU 0 reads the SIM 96 times at 324 ns intervals in the 1st quadrant and requires 31.25 us. Then NCU 1, 2 and 3 take their turns in quadrants 1, 2 and 3 respectively. LGIM to SIM transfers occur in quadrants which occur during odd channel times of the absolute frame of reference. These operations write into the SIM.

Note that NCU 0's frame structure is the only one which is aligned with the absolute reference frame. NCU's 1, 2 and 3 are each shifted 324 ns from one another. For NCU's 1, 2 and 3, the quadrants are shifted to the left within the NCU's own frame of reference by 324 ns increments, i.e. for NCU 1, the 31.25 us quadrant is shifted 324 ns to the left of its own second quadrant. For NCu 2, the shift is 324 ns × 2 and for NCU 3 = 324 ns × 3. This function is accomplished within the NCU with jumpers on the clock card.

4.2.4 Trunk Interface Buffering

The trunk interface buffering functions are implemented on a single memory card contaning 4096 18-bit words. In the NCU the dataflow is one byte wide plus a parity bit. For this reason the memory read/write path is one byte (9 bits including parity) wide.

Three buffering functions are incorporated into the memory. They are the Trunk Group Output Module (TGOM), the Trunk Group Input Module (TGIM) and the Phase Buffer. Each buffer has two sets of controls associated with it: one for writing into the buffer and one for reading from the buffer, i.e. there are a total of six control functions associated with the memory. FIG. 50 describes the organization of the memory. FIG. 51 is a data flow of the memory and its associated hardware.

4.2.4.1 Address Register

The Trunk Buffer address register is fed selectively from six sources of address generation associated with the six control functions. The Address Register is 13 bits wide which provides addressability to 8192 locations. The address sources are:
 a. Trunk In Uncorrected
 b. Trunk In Corrected
 c. TGOM to Trunk
 d. Trunk to TGIM
 e. TGIM to SIM
 f. SIM to TGOM In addition to the above sources, the CCU In Bus may be ingated to the address register when the NCU is stopped. This enables the trunk buffer to be loaded manually from the console or by a diagnostic program.

4.2.4.2 Trunk Buffer IN Register

The IN Register is used to hold data which is to be written into the buffer. The register is one byte wide plus a parity bit. The register may also be loaded from the CCU IN Bus to provide a manual load capability.

4.2.4.3 Trunk Buffer OUT Register

Data read from the buffer is latched in the Out Register. The register is one byte wide plus parity and contains parity check hardware.

4.2.4.4 Buffer Timing

The six functions which access the trunk buffer (three write and three read operations) are assigned dedicated times in which their operations occur. The combined access rate to the buffer is one operation per 648 ns. The buffer is capable of sustaining twice that number of accesses.

4.2.4.5 Phase Buffer

The phase buffer is used to time-align incoming trunk frames (from Trunk IN) with the frame timing structure generated by the NCU Timing System. This is necessary to accomplish the switching functions of the NCU. The Phase Buffer contains 1152 bytes which is equivalent to one six ms frame of data (not including the sync bit). The Phase Buffer is a rotating buffer whose access is controlled by a store pointer and a fetch pointer. An incoming frame may be delayed anywhere from 0 up to 1151 bytes of delay.

4.2.4.5.1 Trunk In Uncorrected

The Trunk In Uncorrected Controls are used to manage the store pointer to the Phase Buffer (see FIG. 52). The store pointer is a register which may be incremented and contains the address of the next byte to be stored into the Phase Buffer from the incoming trunk in frame. Bytes which are to be stored reside in the Trunk In Uncorrected register. Bytes are transferred into this register from the Trunk In Shift register.

The store pointer is synchronized by the frame synchronization hardware. Each time frame sync is generated by the frame synchronization hardware the store pointer is reset to the beginning of the Phase Buffer (address BC0). The pointer is thereafter incremented at a 5.184 us rate (trunk byte time). When the pointer reaches the last byte in the frame (i.e. the last byte of the Phase Buffer), it is reset by decoding the pointer address and also reset by the frame sync as described. This insures that the pointer will "wrap around" in the absence of a frame sync indication due to transient errors on the Trunk In Interface.

4.2.4.5.2 Trunk In Corrected

The Trunk In Corrected controls are used to manage the fetch pointer to the Phase Buffer (see FIG. 52). The fetch pointer may be incremented and contains the address of the next byte to be fetched from the Phase Buffer, i.e. the next byte from the incoming frame. Bytes fetched from the Phase Buffer are phase corrected on a frame basis and are aligned with the frame structure generated by the NCU timing system. Like the store pointer, the fetch pointer is incremented at a 5.184 us rate. The fetch pointer is reset with channel 0 sync clock. The sync clock is generated by the timing system and is equivalent to a frame sync.

Bytes fetched from the phase buffer are moved from the Trunk Buffer Out register to the Trunk In Corrected register. The Trunk In Corrected Register is used to hold data which is to be stored into the TGIM.

4.2.4.6 TGIM

The TGIM is used to hold incoming phase corrected frames while they are demultiplexed and switched through the SIM. Since frames are continually received every six ms, it is necessary to organize the TGIM as a double buffer or A/B buffer. Each side of the TGIM holds a six ms frame or 1152 bytes. The TGIM is loaded with output from the Phase Buffer. Each side (A/B) is alternately loaded on a six ms basis and is governed by the Trunk to TGIM controls. As one side of the TGIM is loaded from the trunk, the other side (loaded in the previous frame) is unloaded to the SIM and is controlled by the TGIM to SIM controls.

The organization of data in the TGIM is shown in FIG. 50. There are 24 groups containing 48 bytes each. Each group contains a byte from all 48 channels received for a particular byte position within a channel. The first group contains byte 0 from all 48 channels. The last group (i.e. 23) contains byte 23 from all 48 channels.

4.2.4.6.1 Trunk to TGIM

Figure 53:
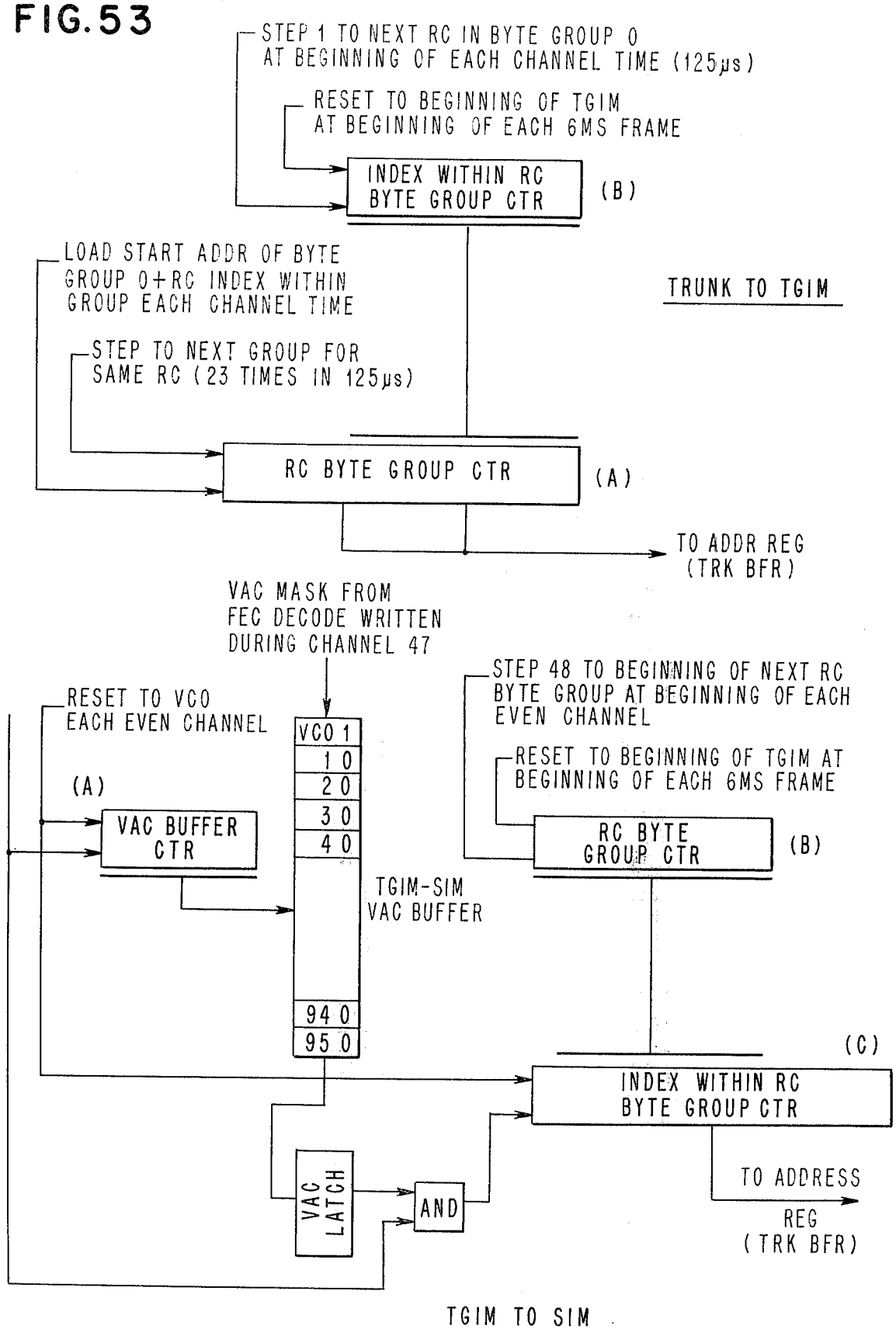

The TGIM is loaded with the output from the Phase Buffer which resides in the Trunk In Corrected register. Trunk to TGIM controls consist of a counter (A) which increments by 48 and a counter (B) which increments by one. The A counter may be loaded by the B counter as shown in FIG. 53. As bytes are received from the Phase Buffer, they are stored in the consecutive byte groups. The position that each byte is stored in the byte group is determined by the real channel in which the byte resides.

At the beginning of each 6 ms frame, counter B is initialized to the beginning of the TGIM and loaded into counter A. Counter A contains the address of the first byte to be stored, i.e. byte 0 channel 0. Counter A is incremented (by 48) during the first received channel a total of 23 times to store the remaining 23 bytes. At the beginning of the next channel, counter B is incremented by one and again loaded into counter A which now points to byte group zero, channel 1. Counter A is incremented (by 48), etc. The above procedure occurs 48 times to load all 48 channels into the TGIM in 6 ms. Upon completion, the 6 ms A/B window causes the loading to switch to the alternate side of the TGIM and repeats as described.

4.2.4.6.2 TGIM to SIM

FIG. 53 is a block diagram of the TGIM to SIM controls. This hardware generates addresses to the TGIM for demultiplexing of data between the TGIM and SIM. The demultiplexing process involves the de-VACing of the incoming real channels and their distributive association to the 96 VC's in supported by the trunk.

TGIM to SIM address generation is controlled by the TGIM-SIM VAC buffer. The buffer contains a 96-bit VAC mask received from the incoming trunk which has been decoded and corrected by the FEC hardware. The 96-bit mask describes the assignment of the received real channels contained in the TGIM to the 96 VC's in contained in the SIM. In addition to the VAC buffer, there are three counters A, B and C for the following functions. Counter A addresses the VAC buffer, counter B increments by 48 and is used to step to the beginning of each of the 24 byte groups in the TGIM. Counter C is initialized by counter B and addresses the 48 real channels within a byte group.

TGIM to SIM transfers occur during even channel times of the frame structure. At the beginning of a frame (channel 0), counters A and B are reset. Counter B poins to the beginning of the byte group 0 and is loaded into counter C. At the 1.296 us rate, counter A is incremented to sequentially read the 96-bit VAC mask from the VAC buffer. Counter C is incremented only if the VAC bit read from the buffer is 1. If the bit read from the VAC buffer is 1, the corresponding byte pointed to by counter C is fetched from the TGIM. If the bit is 0, a byte of "idle noise" is used to "fill" the inactive VC in. At the end of the channel (0) all 96 VC's in have been supplied a byte of data from byte group 0. No more than 47 of the VC's may receive data from the TGIM since no more than 47 VC's may be active during a frame. During the next even channel, the entire process described is repeated on the byte group one. Counter B is incremented by 48 to point to the beginning of byte group 1 and loaded into counter C. Since there are 24 even channel times in a frame, 24 bytes or one full channel of data is demultiplexed to the SIM in 6 ms for each of the 96 VC's in.

The TGIM contains 48 real channels from the frame, i.e. including channel 1 which contains the VAC mask. The VAC mask is not demultiplexed to the SIM and is therefore ignored in the TGIM. The controls are designed such that counter C "jumps" around the VAC mask from channel 0 to channel 2.

4.2.4.6.3 VAC Mask Loading

The VAC mask received on the trunk line resides in the Trunk In/Trunk Out VAC Buffer until channel 47 time, i.e. 45 channel times or 5.625 ms. During channel 47 the mask and its associated FEC are sent to the FEC hardware. FEC hardware decodes the mask and corrects any detected errors and sends the result to the TGIM-SIM VAC buffer. The TGIM-SIM controls are normally idle during odd channel time but channel 47 is an exception. The process completes before the end of channel 47 in time for channel 0. Channel 0 is the first time that the corrected mask is used for the TGIM-SIM transfers.

4.2.4.7 TGOM

The TGOM is used to buffer the 96 VC's out in preparation for their transmission on the trunk out interface. Like the TGIM, the TGOM is an A/B buffer since VC's out are continually loaded and unloaded from the buffer. However, the TGOM is twice as large as the TGIM since it buffers 96 VC's opposed to 48 real channels. The organization of the TGOM is shown in FIG. 50. The TGOM contains 24 groups. Each group contains 96 bytes with a byte position reserved for each of the VC's out. Each group is associated with the 24 bytes which comprise a channel.

The TGOM is loaded from the SIM and its address generation is governed by the TGOM to SIM controls. The TGOM is unloaded onto the Trunk Out by the TGOM to Trunk controls. Six ms are required to completely fill one side of the TGOM from the 96 VC's out with 24 bytes collected from each VC. Every 6 ms the loading alternates to the other side. As one side is loaded, the other side is VAC'ed (compressively assigned to trunk channels) and unloaded onto the trunk. That is, a subset of the 96 VC's are chosen to be transmitted in the 48 channel frame.

4.2.4.7.1 SIM to TGOM

Figure 54:
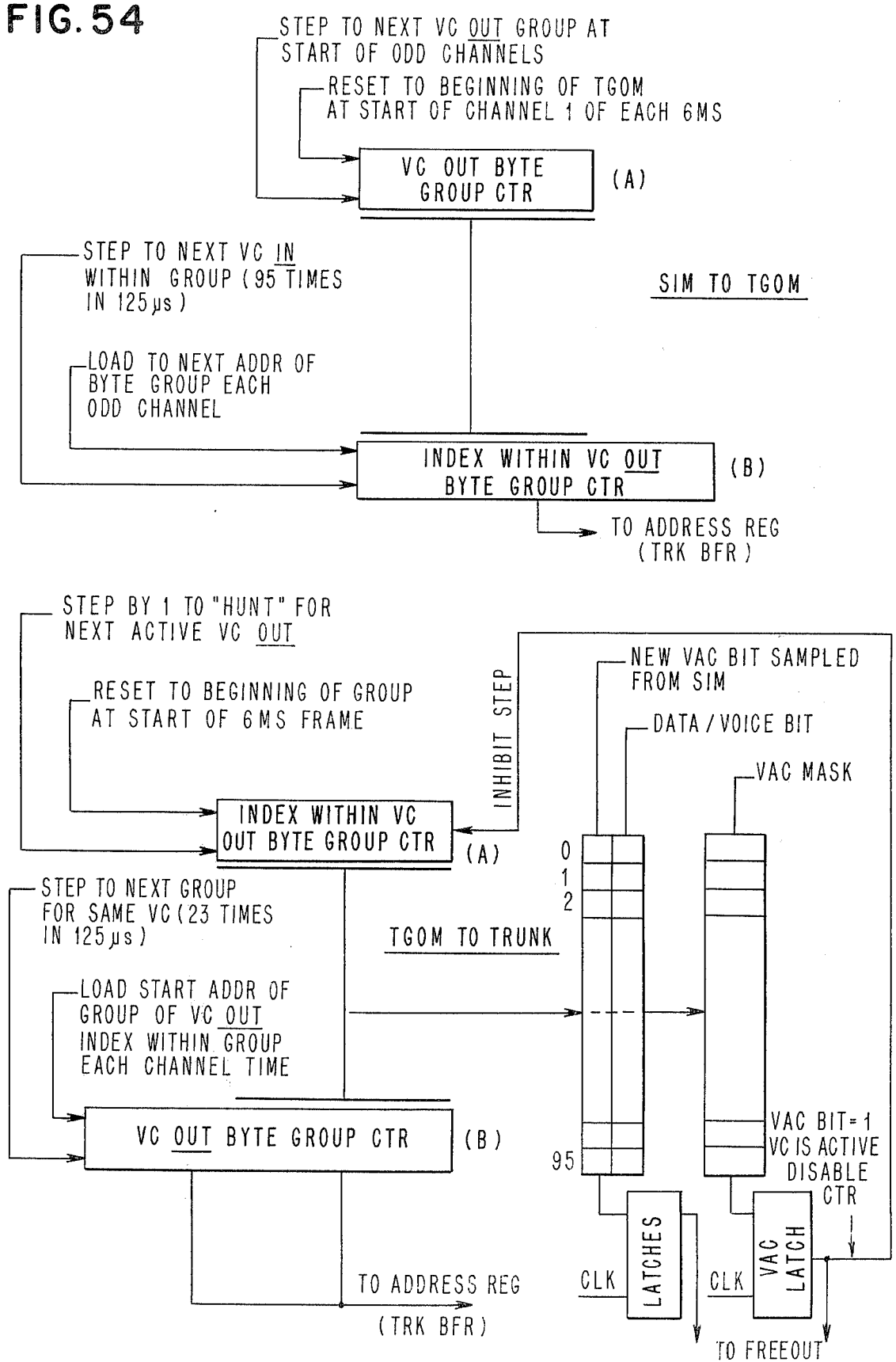

The TGOM is loaded from the SIM. SIM to TGOM controls consist of two counters A and B as shown in FIG. 54. The A counter increments by 96 and is used to address the byte groups. The B counter may be loaded with a starting value from the A counter and increments by 1 over the 96 VC's within a group.

SIM to TGOM transfers occur in odd channel times of the frame structure generated by the NCU timing system. During each odd channel time, a corresponding byte group is loaded with 96 bytes from the 96 VC's. At the beginning of channel 1, counter A is reset to point to byte group 0 and the address is loaded into counter B. During channel 1, counter B is incremented at 1.296 us rate and addresses the 96 locations within the group. Each byte received by the Trunk Buffer Input register is written into the corresponding TGOM location. At the beginning of channel 3, counter A is incremented by 96 and loaded into counter B. The process described above is repeated and occurs 24 times within a frame. Upon completion the 6 ms A/B window causes the loading to switch to the alternate side of th TGOM and repeats as described.

4.2.2.7.2 TGOM to Trunk

The TGOM to trunk logic is used to select and outgate onto the trunk a subset of the 96 VC's contained in the TGOM. These channels are compressed into 47 available real channels according to the VAC algorithm. Data is read from the TGOM in a different order than that in which it is stored. If a VC is chosen for transmission, all 24 bytes associated with it are transmitted contiguously in a real channel. FIG. 54 is a block diagram of the TGOM to Trunk controls.

Two counters are used in conjunction for address generation. Counter B increments by 96 and the low order bits may be initialized by counter A. Counter A increments by 1 and is used to index the new VAC buffer and old VAC buffer as well as to initialize counter B. The old VAC buffer contains the VAC mask generated by the freezeout logic and controls the A counter and the outgating of the VC's. The procedure for incrementing the counters is as follows.

During a channel time (125 us internal), counter A is incremented and the corresponding bit is read from the old mask buffer. If the bit is 0 which indicates the VC is inactive, the A counter is incremented to the next position until a 1 bit is found. If the bit is 1, the counter is inhibited from further searches. At the beginning of the next channel time, the B counter is initialized to point to byte group 0 of the TGOM. Counter A has already stopped and is an index within the byte group to the active VC to be outgated. These bits are set into the low order bits of counter B. Once counter B is set, it points to byte 0 of the chosen VC. This location is read from the TGOM and is byte 0 of the real channel it comprises. During the 125 us channel time, counter B is incremented 23 times to address the remaining 23 bytes which make up the channel.

As soon as counter B is initialized by counter A, the inhibit controls are released and counter A continues to search for the next VC to be sent out in the next real channel. In other words, counter A searches one channel ahead for a channel to be transmitted while counter B outgates the previous channel. Counter A steps fast enough such that the entire mask can be searched in one channel time.

4.2.4.7.3 VAC Sampling

As discussed before, there are 24 SIM to TGOM transfers which occur during odd channel times of the frame structure. During the last scan of all 96 VC's to the TGOM, i.e. channel 47 time, for each VC the VAC bit contained in the SIM and the corresponding data/voice bit contained in the ICM is stored bit by bit into the new VAC buffer. At the same time these bits are sent to the VAC freezeout hardware for the calculation of a new VAC mask. In addition, the old VAC bit for the same VC is read from the old VAC buffer and sent to the freezeout logic. The new and old VAC buffer as well as counter A are not required during channel 47 time to search for an active VC since channel 47 is the last channel of a frame. As stated before, counter A always searches for a channel in the previous channel time.

4.2.4.7.4 New VAC Mask Generation

As the end of channel 47 time, the freezeout counters have been incremented and a new VAC mask may now be formulated. During channel 0 time, VC 0 (control information) is always transmitted in real channel 0 and therefore no search is required by counter A. During channel 0, counter A is used to address the new and old VAC buffers. The data/voice bit, the new VAC bit sampled during channel 47 time, and the old VAC bit from the previous mask are all sent to the freezeout hardware one VC at a time. A new mask bit for that VC is immediately returned by the freezeout hardware and is written into the old mask VAC buffer. Approximately one half of real channel 0 is required to completely fill the old VAC buffer with the new mask.

At the beginning of channel 1, the VAC mask and its associated FEC are transmitted onto the trunk from the Trunk In/Trunk Out VAC Buffer. During this channel, counter A begins to search the old VAC mask buffer in order to find the first service VC to be transmitted in real channel 2. The last time in which the A counter is used for searching is channel 46. During channel 47, the A counter is again used to sample a new VAC bit in preparation for a mask for the subsequent frame.

4.2.4.8 Trunk In/Trunk Out VAC Buffer

The Trunk In/Trunk Out VAC Buffer is an auxiliary buffer to the Trunk Buffer. It contains 24 bytes (see FIG. 51). The buffer is used to hold the VAC mask and its FEC received during channel 1 time from the Phase Buffer output and is also used to hold the generated VAC mask and its FEC which is to be transmitted. Since the Phase Buffer aligns incoming frames on a frame basis, inbound frames to the TGIM and outbound frames from the TGOM are exactly in sync with one another. The VAC buffer is accessed in the following manner.

During channel 0 time, the newly formed VAC mask is generated and sent to the TGOM-Trunk Out VAC buffer. In addition, the mask is sent to the Trunk In/Trunk Out VAC buffer along with its associated FEC. During channel 1 time, bytes are read from the Trunk In/Trunk Out VAC buffer a byte at a time and transmitted on the Trunk Out interface. The timing in the NCU is such that after a byte is read, the corresponding byte from the Phase Buffer to the TGIM for the trunk in mask and FEC is ready to be written; i.e. between consecutive "reads" for the Trunk Out channel, "writes" are interleaves in order to copy the received VAC mask into the Trunk In/Out VAC Buffer. At the end of channel 1, the buffer has unloaded its contents (the outgoing mask) to trunk channel 1 out and is loaded with the received mask and FEC. The received VAC mask and FEC remain in the buffer until channel 47 time. During channel 47 time, the mask is decoded, corrected and sent to the TGIM-SIM VAC buffer in time for channel 0 time (the first TGIM-SIM transfer). During channel 47 time, the VAC bit from the SIM to TGOM scan is sampled into the SIM to TGOM VAC buffer for the mask preparation for the next frame.

4.2.4.9 VAC Freezeout Hardware

Voice Activity Compression is used to compress 96 VC's into 47 real channels on the trunk line. Connections established for voice are usually less than 50% active. Activity compression is a dynamic process recurring every 6 ms on each connection. Normally, less than half the connections will be active each time a sample is made and all will be assigned real channels. However, sometimes more than 47 connections are concurrently active during a VAC sample and a decision must be made to "freezeout" VC's.

The priority scheme used to create the new VAC mask is given below with highest priority listed first.
 a. Data port active in the previous 6 ms frame.
 b. Data port not active in the previous 6 ms frame.
 c. Voice port active in the previous 6 ms frame.
 d. Voice port not active in the previous 6 ms frame.

If "ties" cannot be broken according to the above priority algorithm, then the low order VC's within the lowest remaining priority category are frozen out first; beginning with VC 1. VC 0 (the control information) is an exception and is never frozen out.

Three counters are used to implement the VAC freezeout algorithm and are described below. A diagram of the counters is shown in FIG. 55. The counts are used to decide which VC's to freeze out and are incremented during real channel 47 time.

4.2.4.9.1 Data Mask Counter

This counter is incremented when the VC is a data channel not active in the previous 6 ms frame.

4.2.4.9.2 Old Mask Counter

This counter is incremented when the VC is a data channel not active in the previous 6 ms frame or the VC was active in the previous 6 ms frame and is active again in this frame.

4.2.4.9.3 New Mask Counter

This counter is incremented when the VC was not active in the previous 6 ms frame and is active in this frame.

During real channel 0 time, the new VAC mask is formed for that 6 ms frame. A VAC mask bit for a VC will be made active for the following cases:
 a. Voice activity bit active and new mask count is less than 48 OR
 b. Voice activity bit active, VC is data channel and data mask count is less than 48 OR
 c. Voice activity bit active, VAC bit active in previus 6 ms frame and old mask count less than 48 OR
 d. Voice activity bit active, VAC bit active during previous 6 ms frame and VC is data channel.

As any activity bit is frozen out (reset to 0) because the count is greater than 47, the count is decremented by 1 until the count is 47.

4.2.4.9.4 Program Freezeout Interface

The system manager has a requirement to know the number of VC's frozen out in the 6 ms frame. The CCU sends the NCU hardware an 8-bit count which is decremented by the number of channels frozen out. When the latter number exceeds this count, a level 3 interrupt is generated to notify the CCU. The same count is used until changed by the CCU. Each time the count is exceeded a level 3 is generated.

4.2.4.10 Forward Error Correction (FEC)

A requirement of the VAC bit transmission is to have a small probability of error. Forward error correction is added to the VAC bits to reduce the probability of error. A block code which has 9 parity bits for 8 VAC bits and corrects 1 or 2 arbitrary errors is used. The generator polynomial is:

$$G(X) = 1 + X^3 + X^4 + X^5 + X^8$$

4.2.4.10.1 Encoding

The encoding of the parity bits is performed by shifting the VAC bits into a polynomial shift register implemented from the above generated polynomial. Encoding is done during channel 0 time. The VAC bits are obtained from the freezeout logic and shifted serially into the polynomial shift register. Simultaneously the 8 VAC bits are sent serially to the Trunk In/Trunk Out Buffer. After the VAC bits are sent, the 8 FEC bits are shifted serially to the Trunk In/Trunk Out Buffer. This process is repeated until 96 VAC bits and 96 FEC bits have been sent to the Trunk In/Trunk Out Buffer.

4.2.4.10.2 Decoding

Decoding is done during channel 47 time and is implemented using a table look-up. New parity is generated at the receiver and compared with the transmitted parity. If the transmitted and generated parity differ, then a correction is made to the 8 VAC bits. The Exclusive OR of the two parities is used to address a ROS which contains the 8 correction bits which are Exclusive OR'ed with the received VAC bits to create the corrected VAC. After the VAC bits are corrected, they are sent serially to the TGIM-SIM VAC buffer. FIG. 56 shows the data flow of the encoding and decoding of the VAC bits.

4.2.5 Switching and Program Control

The Slot Interchange Memory (SIM) and the Interconnect Memory (ICM) are used in conjunction with one another and provide a program control capability in the NCU.

Figure 57:
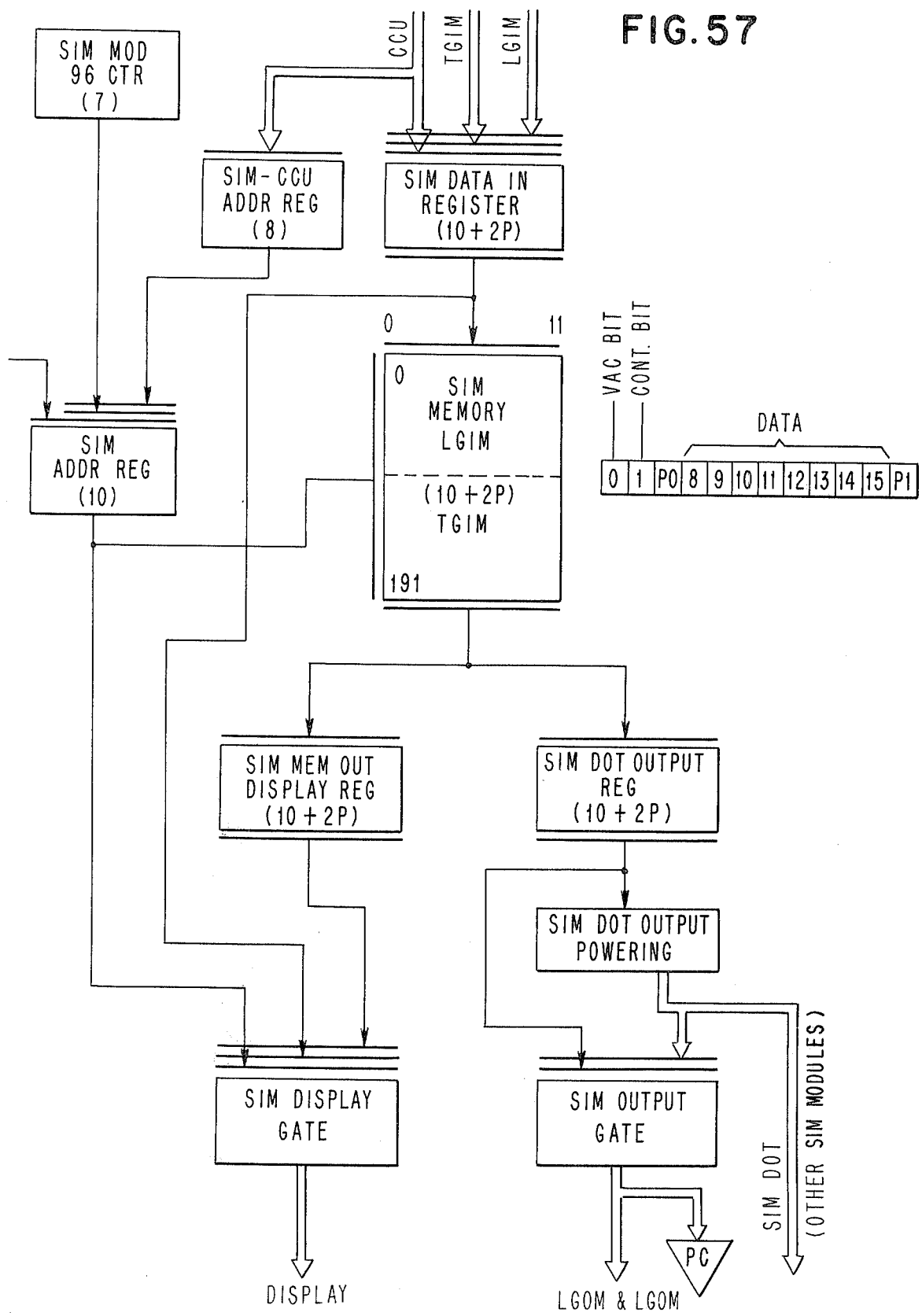

4.2.5.1 SIM (see FIG. 57)

The SIM is loaded by the LGIM and TGIM and is the point from which all programmed switching occurs in the NCU, i.e. Port to Trunk, Trunk to Port, Port to Port, and Trunk to Trunk. The memory is one byte wide and 192 locations deep and may be logically divided into two halves 96 locations each. One half contains a unique location for each input port and is loaded byte serial from the LGIM in a sequential manner. During odd channel times, a counter is used to address the memory at a rate of one location every 324 nanoseconds. At this rate all 96 ports are written into the 96 SIM locations in a 31.25 micro-second time period.

The other half of the SIM memory contains a unique location for each Virtual Channel in (VC in) and is loaded byte serially from the TGIM. During even channels, the SIM counter addresses the memory at a rate of one location every 1.296 micro-seconds. At this rate all 96 VC's in are written into the respective 96 SIM locations in a 125 micro-second time period. Active VC's receive data from the TGIM while inactive channels receive idle noise.

The output of the SIM may be directed to either the TGOM or the LGOM. The SIM read operation is controlled by the Interconnect Memory (ICM) which is programmable and loaded via the 3705/NCU interface.

During odd channel times, the ICM is used to address the SIM in order to accomplish Port to Trunk or Trunk to Trunk switching. The SIM data is read out byte serially to the TGOM at the rate of one location every 1.296 micro-seconds. At this rate all 96 locations are loaded into the TGOM in 125 micro-seconds.

During even channel times, the ICM is used to address the SIM in order to accomplish Trunk to Port or Port to Port switching. The SIM data is read out byte serially to the LGOM at the rate of one location every 324 nano-seconds. At this rate all 96 locations are loaded into the LGOM in 31.25 micro-seconds.

4.2.5.1.1 SIM Facilities

4.2.5.1.1.1 SIM Data-In Register

The SIM Data-In register is used to contain data which is to be written into the SIM.

The SIM Data-In register is ten bits plus two parity (2P) bits wide. The inputs originate from the TGIM and LGIM and each enters the register on an independent bus. An input bus from the CCU provides a manual load capability.

4.2.5.1.1.2 SIM Modulo 96 Counter

The SIM Modulo 96 counter is used to generate SIM addresses for LGIM to SIM and TGIM to SIM transfers.

The counter is seven bits wide and counts through 96 locations.

4.2.5.1.1.3 SIM-CCU Address Register

The CCU address register is used to address the SIM from the console or a diagnostic program.

The CCU Address register is eight bits wide and can only be used when the machine is in the stop state.

4.2.5.1.1.4 SIM Address Register

The SIM Address register is used to address locations in the SIM for read and write operations.

The address register is ten bits wide and is loaded via the modulo 96 counter for writes and the ICM for reads. Since read operations can address up to 4 interconnected SIM's, up to 768 locations can be addressed.

4.2.5.1.1.5 SIM Memory

The SIM memory is used to store data from the Ports In (LGIM) and Virtual Channels In (TGIM) until they can be switched out to the TGOM and LGOM, respectively.

The SIM memory is ten bits plus 2 parity bits wide and is logically divided into two parts, each 96 locations deep.

4.2.5.1.1.6 SIM Output Register

The SIM Output register is used to hold data which is read from the SIM memory. The register output is used to drive the SIM bus which is OR dotted between interconnected NCU's.

The SIM Out register is ten bits plus two parity bits wide.

4.2.5.1.1.7 SIM Dot Output Powering

SIM Dot Output Powering is accomplished using Transmission Line Drivers. Powering is essential to minimize the delay on a large board dot which is the case when multiple NCU's are interconnected.

4.2.5.1.1.8 SIM Output Gate

The function of the SIM Output Gate is to allow NCU's to run independent of one another when they are interconnected. If the NCU is In System, the board dot input to the gate is selected. If the NCU is Out of System, only its own SIM output is selected by the gate. A parity check is performed on the output of the SIM gate.

4.2.5.1.1.9 SIM Contents

Each SIM location is 12 bits wide.
- o Bit 0: This is a VAC bit which indicates whether or not a particular port or virtual channel is active.
- o Bit 1: This bit is reserved.
- o Bit P0: This bit is parity on bits 0 and 1.
- o Bits 8 through 15: These bits contain one byte of voice or data from the ports in and VC's in.
- o Bit P1: This bit is parity on bits 8–15.

Figure 58:
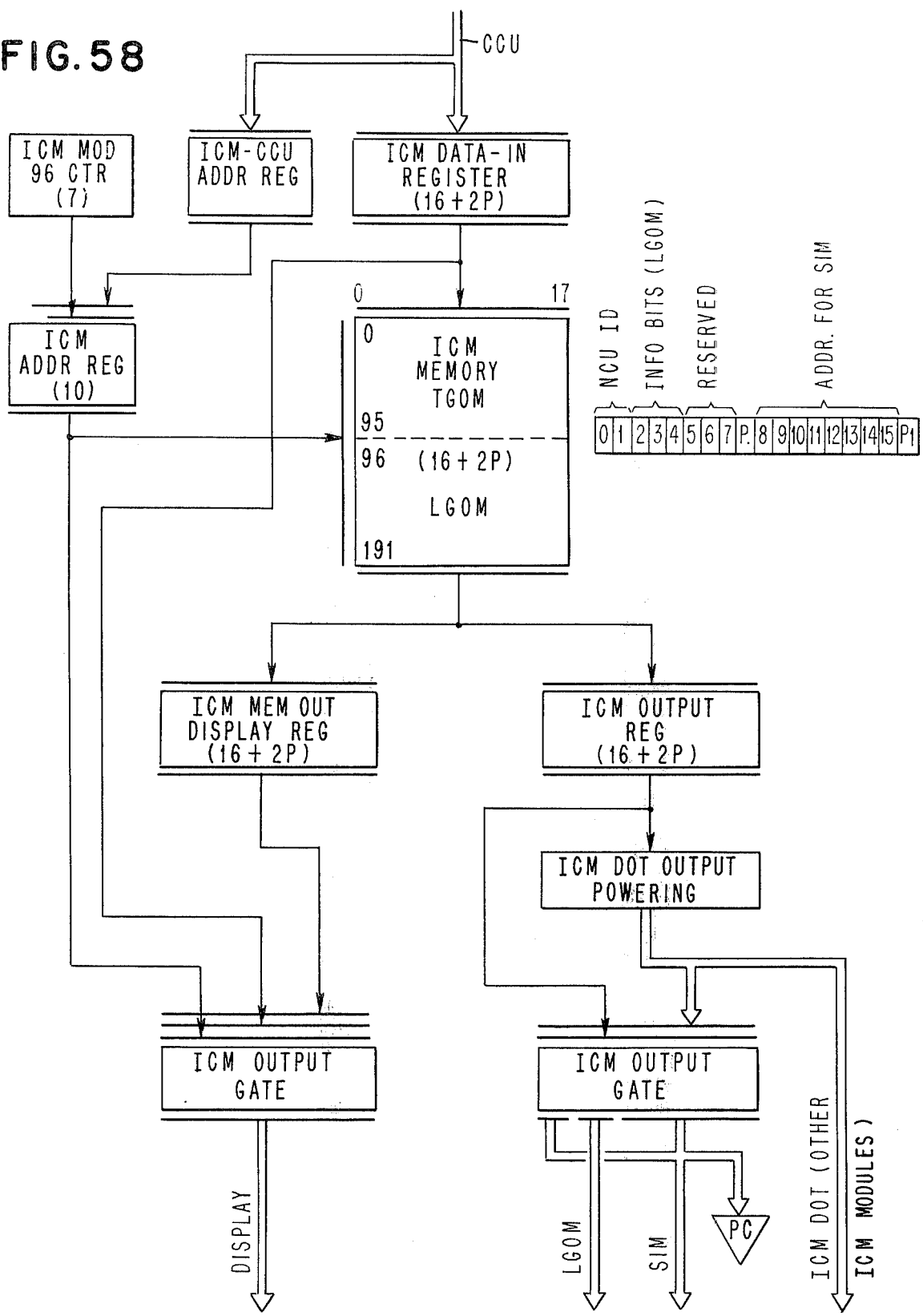

4.2.5.2 ICM (See FIG. 58)

The ICm is a programmable element of the digital switch that provides address information to the SIM to accomplish SIM to Trunk and SIM to Port transfers.

The ICM may be dynamically accessed by the CCU in order to manage the switching function of the NCU. Both read and write operations are possible when the machine is running or stopped. When the NCU is running, sufficient time slots are available in the ICM to accommodate the maximum access rate from the CCU.

The memory is two bytes wide and 192 locations deep and may be logically divided into two halves, 96 locations each. One half contains a unique location for each output port. The ICM locations correspond directly with the locations in the LGOM. During even channel times, a counter is used to address these 96 locations in the ICM at the rate of one location every 324 nano-seconds. At this rate all 96 locations are read out of the ICM in a 31.25 micro-second period.

The other half of the ICM memory contains a unique location for each Virtual Channel out (VC out). These locations correspond directly with the locations in the TGOM. During odd channel times, the counter addresses the ICM at a rate of one location every 1.296 micro-seconds. At this rate all 96 locations are read from the ICM in a 125 micro-second period.

4.2.5.2.1 ICM Facilities

4.2.5.2.1.1 ICM Input Register

The function of the ICM Input register is to hold the asynchronous CCU data until it can be clocked into the ICM memory.

The ICM Input register is sixteen bits plus two parity bits wide. Bits 5, 6 and 7 are spare.

4.2.5.2.1.2 ICM Modulo 96 Counter

The ICM Modulo 96 counter provides addresses to the ICM memory during the read operation.

The counter is seven bits wide and counts through 96 locations.

4.2.5.2.1.3 ICM - CCU Address Register

The function of the ICM-CCU Address register is to hold the asynchronous address from the CCU until it can be clocked into the ICM Address register.

The ICM-CCU Address register is eight bits wide.

4.2.5.2.1.4 ICM Address Register

The ICM Address register provides addresses to the ICM memory for read and write operations. During read operations, the address register is loaded via the ICM Modulo 96 counter and for writes it is loaded via the ICM-CCU Address register.

The ICM Address register is ten bits wide with the first 2 bits used for control.

4.2.5.2.1.5 ICM Memory

The ICM Memory is two bytes plus two parity bits wide and is logically divided into two parts, each 96 locations deep. The first two bits of the first byte and all bits of the second byte are read from the ICM memory and are used to address the SIM. Bits 2, 3 and 4 of the first byte are control bits which are sent to the LGOM. These ICM Code bits indicate the mode of operation of each port. The remaining three bits are spare and are reversed.

4.2.5.2.1.6 ICM Output Register

The ICM Output register is used to hold data which is read from the ICM memory. The register output is used to drive the ICM bus which is OR dotted between interconnected NCU's.

The ICM Output register is 16 bits plus two parity bits wide. Three of the bits are spare as in the ICM memory.

4.2.5.2.1.7 ICM Dot Output Powering

ICM Dot Output Powering is accomplished using Transmission Line Drivers. As in the SIM, the ICM output can be dotted with ICM's in other NCU's.

4.2.5.2.1.8 ICM Output Gate

The function of the ICM Output Gate is to allow NCU's to run independent of one another when they are interconnected. If the NCU is In System, the board dot input to the gate is selected. If the NCU is Out of System, only its own ICM output is selected by the gate. A parity check is performed on the output of the ICM gate.

4.2.5.2.1.9 ICM Contents

An ICM location is 18 bits wide and contains address information for the SIM and control bits for the LGOM.
- o Bits 0 and 1: These bits are an NCU ID and select the SIM in the designated NCU.
- o Bits 2 through 4: These bits are used for control and are sent to the LGOM. They indicate to the port how it is to be used, i.e. voice or data.
- o Bits 5 through 7: These bits are reserved.
- o Bit Pφ: This is the parity bit on the first byte.
- o Bits 18 through 15: These bits are address bits for the SIM.
- o Bit P1: This is the parity bit on the second byte.

4.2.5.2.2 ICM Program Interface

Output instructions X'34' and X'35' (below) along with an Input X'36' are used to dynamically read or write the ICM. The two byte operand of Output X'34" is used to address the ICM and the two-byte operand of Output X'35' is used to update an ICM location. Input X'36' is used to read the ICM Display register back to the CCU.

In order to read the ICM, Output X'34' must be executed which is followed by an Input X'36'. In order to update the ICM, output X'36' must be followed by output X'35'.

4.2.5.2.2.1 Output X'34'

- o Bits 0 and 1 — Address the ICM in the NCU described by bits 0 and 1.
- o Bit 8 — Describes Port out or VC out half of ICM.
- o Bits 9 through 15 — Selects 1 of 96 ports out or VC's out depending on bit 8. If 9 and 10 are 11, the ICM is not selected.

4.2.5.2.2.2 Output X'35'

- o Bits 0 and 1 — Describe NCU ID of SIM to be selected.
- o Bits 2 through 4 — Are ICM code bits. They indicate to the port the mode of operation that it is in.
- o Bit 8 — Describes a Port in or VC in, i.e. whether a Port IN, or VC in is being routed to the designated Port out or VC out.
- o Bits 9 through 15 — Address 1 of 96 Ports in or VC's in depending on bit 8. If bit 9 and 10 are 11 no portion of the SIM is selected. The VAC bit will always be 0 and 0's will be routed to the TGOM (or LGOM).

5.2.5.3 SIM-ICM Interconnection for Multiple NCU's

Two to 4 NCU's may be interconnected together to increase the switch capacity. This is accomplished by OR dotting the ICM and SIM output busses of each NCU to form a common ICM and SIM.

When four NCU's are interconnected, 384 SIM reads and 384 writes must be executed every 125 us. Enough bandwidth is available in the SIM to sustain this rate which equates to a read and write every 324 ns.

4.2.5.4 SIM-ICM Timing

Figure 59:
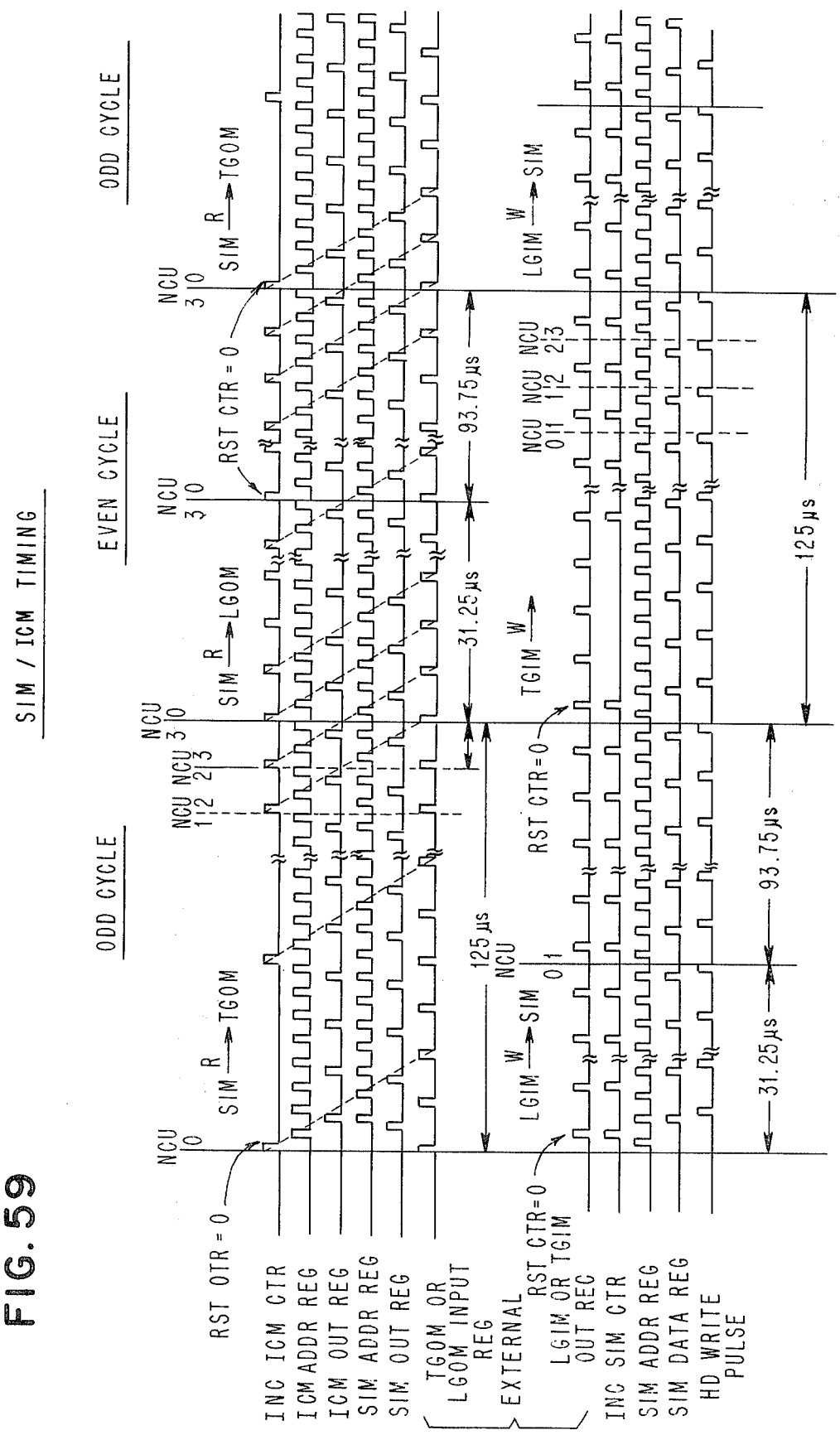

FIG. 59 depicts the SIM and ICM timing. SIM reads and writes are always interleaved with each other. In the maximum switch configuration SIM reads occur every 324 ns. Interleaved with the reads are writes which likewise occur every 324 ns and are offset from the reads by 162 ns.

During odd channel times, LGIM to SIM burst transfers take place for each NCU. The SIM counter is used for address generation and increments every 324 nanoseconds until 96 SIM locations have been written into from LGIM. The total time required is 31.25 us and each NCU has its own 31.25 us quadrant in which the operation occurs. During this same odd channel time, SIM to TGOM transfers occur which are interleaved between the four NCU's. The ICM addresses the SIM for reads at 1.296 us rate within each NCU. At this rate 96 locations are read from the SIM and transferred to the TGOM in 125 us. With four NCU's configured together, the SIM receives addresses at four times the rate of one read every 324 ns. During even channel times, SIM to LGOM transfers take place for each NCU. The ICM provides addresses to the SIM for read operations at a 324 ns rate. After 31.25 us, 96 SIM locations have been read and transferred to the LGOM for one NCU. The four NCU's have their own dedicated quadrant in which the operation takes place. During the same 125 us channel time, TGIM to SIM write operations occur. For this transfer, the SIM counter is used for address generation and increments at a 1.296 us rate in each NCU. At this rate, 125 us are required to update 96 SIM locations from the TGIM for each NCU. Since the writes are interleaved between the four NCU's, the overall rate to the SIM is one write every 324 ns.

4.2.6 Data/Voice Port Interface LGIM/LGOM

The Line Group Input Module (LGIM) and the Line Group Output Module (LGOM) are used to interface the digital switch with voice processing or data processing hardware. The LGIM supports 96 input ports. Each port is a serial by bit 32 KBS entry into the digital switch. The LGIM contains a one byte shift register location for each port and serves to deserialize each port in bit stream into one byte units. The output of the LGIM is transferred parallel by byte to the SIM. Transfers occur each time a byte is accumulated from all 96 input ports. The LGOM supports 96 output ports and performs the inverse function of the LGIM. The LGOM contains a one-byte location for each port out and is loaded by the SIM parallel by byte. The LGOM serializes each of the 96 bytes to produce 96 serial by bit output streams. Each output port runs at a 32 KBS rate. The LGIM and LGOM contain an activity bit for each location which is used to indicate whether the port content is active. In addition, three control bits are implemented in the LGOM to indicate the way in which a port is utilized.

Parity is incorporated in both the LGIM and LGOM for error detection. Address generation to the LGIM and LGOM is supplied by the sequencer card of the voice processing hardware. The LGIM and LGOM are constantly synchronized from the NCU Timing System in order to insure proper operation.

4.2.6.1 LGIM/LGOM Facilities

A block diagram of the LGIM/LGOM is shown in FIG. 60. The LGIM/LGOM has dual usage; and for each of its uses the inputs and outputs are shown. For use as the LGIM, there is a one bit input and a one byte output bus; when used as the LGOM, the input bus is one byte wide and the out bus one bit. In both the LGIM and LGOM, one bit for one port is processed in 324 nano-seconds. First, the address for that port is latched in the address register. The content of that memory location is latched in the 15-bit output register. For the LGIM application, one bit from the modulator algorithm is also latched in the output register. For the LGOM application, one bit from the register is sent to the demodulator algorithm logic. The contents of the output register plus two parity bits are written back into the memory as shown by the feedback busses. The word which is written is shifted over one bit from the word read out. The process is repeated for one bit of the next port in another 324 ns interval. Byte transfers from the LGIM to SIM and from the SIM to LGOM are done every eighth pass through these memories, as discussed in the previous description of the SIM.

4.2.7 Signaling

The first real channel of the frame is reserved for signaling. Signaling is used for communication between the two hardware units connected to each end of the trunk line. Signaling is switched within the NCU like any other connection with the following restrictions. Signaling enters and exits the switch on port 95 and must be switched on VC0. Therefore, VC 0 out in the ICM must contain the address of SIM port in 95. Likewise port 95 out in the ICM must contain the address of SIM VAC 0 in. At the port interface, the 32 KBS bit stream is reduced to a 4 KBS rate., i.e. the first bit of every byte that enters and exits the port is used for signaling. The remaining bits are stuffed with 0's. The resultant 4 KBS bit stream interfaces directly with a full duplex 3705 line set.

5.0 NCU/3705 Interface

5.1 3705 Input/Output (I/O) Bus

The I/O Bus is used to select external registers, to transfer data between the NCU and the CCU, and for interrupt handling. The lines that interface between the 3705 and the NCU are shown in FIG. 61 and described below.

5.1.1 I/O Register Address Bus — (8 + P)

Used to pass the register address to the NCU from the CCU op register during the execution of an Input or Output instruction and during SET ADDRESS/DISPLAY and STORE pushbutton operations. Duration — 1.2 microseconds. Refer to Table 5.1.1-1 below for list of NCU I/O register addresses.

5.1.2 Adapter I/O Decoded

Indicates that the register address was received by the NCU. Duration — 1.2 microseconds.

5.1.3 CCU Outbus — (16 + 2P)

Used to transfer data from the CCU to the NCU during execution of a CCU Output instruction or during a STORE pushbutton operation. Duration — 200 nanoseconds.

5.1.4 Sample Output Data on Outbus

A 100 nanosecond gate signal indicating the time when to sample the CCU Outbus.

5.1.5 CCU Inbus — (16 + 2P)

Used to transfer data from the NCU to the CCU during the execution of an Input Instruction or during SET ADDRESS/DISPLAY pushbutton operation.

5.1.6 Gate Input Data on Inbus

A 400 nanosecond gate signal indicating the time to put data on the CCU Inbus.

Table 5.1.1-1

| NOTES | INSTRUCTION | NCU I/O Instructions I/O | FUNCTION | NCU STATE |
|---|---|---|---|---|
| 1, 2 | X '20' | O | Identifies NCU that receives next I/O Instruction | Running and Stopped |
| 2 | X '21' | I/O | Identifies NCU errors | Running and Stopped |
| 2 | X '22' | I | Identifies parity errors in the MOD | Running and Stopped |

Table 5.1.1-1-continued

NCU I/O Instructions

| NOTES | INSTRUCTION | I/O | FUNCTION | NCU STATE |
|---|---|---|---|---|
| | | | algorithm | |
| | X '23' | O | Diagnostic programs can simulate any panel switch operation. Panel Enable switch is disabled | Running and Stopped |
| 1 | X '24' | I/O | Trunk Buffer address including the NCU identification | Stopped |
| | X '25' | I/O | Data from Trunk Buffer input and/or output register | Stopped |
| 2 | X '26' | O | Threshold count on VAC freezeout | Running |
| | X '29' | I | Condition of NCU clocks | Running and Stopped |
| | X '2A' | I | Condition of NCU clocks and trunk bit information | Running and Stopped |
| 1, 2 | X '30' | I/O | SMU address including the NCU identification | Running and Stopped |
| 2 | X '31' | I/O | SMU data | Running and Stopped |
| | X '32' | I/O | Left half of SMU | Stopped |
| | X '33' | I/O | Right half of SMU | Stopped |
| 1, 2 | X '34' | I/O | ICM Memory address register including NCU identification | Running and Stopped |
| 2 | X '35' | I/O | ICM input register data | Running and Stopped |
| | X '36' | I | ICM output register | Running and Stopped |
| 1 | X '38' | I/O | SIM memory address including NCU identification | Stopped |
| | X '39' | I/O | SIM input register data | Stopped |
| | X '3A' | I | SIM output register | Stopped |
| 1 | X '3C' | I/O | Analog memory address including NCU identification | Stopped |
| | X '3D' | I | Analog memory data | Stopped |

NOTES:
1 NCU ID of all address instructions is only given in the output instructions.
2 Instructions used while processing as well as diagnostics. The remainder of the instructions are exercised only for maintenance from the NCU panel or from the software.

5.1.7 Bid Interrupt Level 1

An asynchronous signal that is generated when there is an error or a check condition in the NCU. This line is reset with Output X '21' bits 0.1 and 0.2.

5.1.8 Gate 1st Test Points on Inbus

A 400 nanosecond gate signal that requests the ID of the NCU with the level 1 interrupt to be put on the CCU Inbus. Byte 1, Bits 4–7 of Input X '76' are reserved for NCU level 1 interrupts.

5.1.9 Bid Interrupt Level 3

An asynchronous signal that is generated when there is to be a dial digit transfer or an overflow of the freezeout counter. If the interrupt is generated by the freezeout logic, the interrupt is reset by Input X '30' and if the interrupt is generated by the CDQ signaling area the level 3 interrupt is reset by Input X '31'.

5.1.10 Gate 2nd Test Points on Inbus

A 400 nanosecond gate signal that requests the ID of the NCU with the level 3 interrupt to be put on the CCU INBUS. Byte 0, Bits 4–7 of Input X '77' are reserved for the NCU level 3 interrupts.

5.1.11 Reset

CCU requests the NCU to reset interrupt conditions and also to cycle for 1.4 seconds and stop at an NCU S5 clock before a 336 millisecond superframe boundary.

5.2 Interrupts 5.2.1 NCU Level 1 Interrupt

A level 1 interrupt is generated when there is a hardware error condition in the NCU. The 3705 CCU will issue input instruction X '76' in response to the level 1 interrupt. Then the NCU, in response to the level 1 interrupt, will turn on the bit associated with its interrupt. Simultaneous interrupts from different NCU's can occur. The bits on Input X '76' that identify the NCU that caused the interrupt is as follows:

Byte 1, bit 4 — NCU 1
Byte 1, bit 5 — NCU 2
Byte 1, bit 6 — NCU 3
Byte 1, bit 7 — NCU 4

After Input X '76' the CCU issues an Output X '20' to choose the NCU from which it wants to get the error information. It then does Input X '21' and X '22' to acquire the hardware errors. In order to reset the level 1 interrupt, the CCU issues an Output X '21' with bits 0.1 and 0.2 set. If a level 1 remains, it is because other NCU's or adapters have level 1 interrupts or the same NCU has another level 1 interrupt.

5.2.2 NCU Level 3 Interrupt

A level 3 interrupt can be generated by the call processor when dial digits or status are to be transferred or when the freezeout count has been exceeded. If there are more than 46 channels with voice or data activity in a 6 ms frame, the number above 46 will be frozen out. The numbers frozen out are counted in the freeze out counter. When the number exceeds the pre-set number set by output instruction X '26', a level 3 interrupt is generated.

The 3705 CCU will issue input instruction X '77' in response to the level 3 interrupt. Then the NCU with the level 3 interrupt will turn on the bit associated with its interrupt. Simultaneous interrupts from different NCU's can occur. The bits in Input X '77' that identify the NCU that caused the interrupt are as follows:

Byte 0, bit 4 — NCU 1
Byte 0, bit 5 — NCU 2
Byte 0, bit 6 — NCU 3
Byte 0, bit 7 — NCU 4

After Input X '77' the CCU issues an Output X '30' to choose the NCU from which it wants to get the level 3 information. It then does an Input X '30' and discovers whether the interrupt was caused by the CDQ or the freeze out logic. An Input X '31' is also done if the interrupt was a CDQ interrupt.

The Level 3 interrupt signal is dropped after Input 30 or Input 31, dependent upon what caused the interrupt. Table 5.2.2-1 lists the condition for resetting the level 3 interrupt in the NCU.

Table 5.2.2-1

Conditions for Resetting the Level 3 Interrupt in NCU

| Type of Interrupt | | Input Instruction | |
|---|---|---|---|
| CDQ | Freezeout | Input X '30' | Input X '31' |
| YES | YES | NO | YES |
| YES | NO | NO | YES |
| NO | YES | YES | NO |

If a level 3 interrupt remains at the CCU after the reset condition, it is because other NCU's can have an interrupt or because another level 3 interrupt has occurred in the NCU that was reset with the Input X '30' or Input X '31'.

5.3 NCU Input/Output Instructions 5.3.1 NCU Input Instructions
Input X '21'

This instruction obtains the status of the error registers in the NCU. The desired NCU is set by an Output X '20' instruction which contains the NCU ID.

Byte 0, bit 0: This bit is 0
Byte 0, bit 1: Clock Out—This bit is set to 1 when the voltage controlled oscillator (VCO) has stopped.
Byte 0, bit 2: VAC/FEC Error—This bit is set to 1 when a single or double error on the VAC has been corrected.
Byte 0, bit 3: Sync Loss—This bit is set to 1 when sync in initially lost with the T1 line.
Byte 0, bit 4: Data/FEC Error—This bit is set to 1 when an error is detected on the data going to a data port from the NCU.
Byte 0, bit 5: Sync ROS-Parity Error—This bit is set to 1 when a parity error occurs at the output of the 256×4 Sync Acquisition ROS.
Byte 0, bit 6: TGIM/SIM VAC Parity Error—This bit is set to 1 when a parity error occurs at the output of the 96×1 TGIM/SIM VAC Memory.
Byte 0, bit 7: TGOM/Trunk Raw VAC/Data Parity Error—This bit is set to 1 when a parity error occurs at the output of the 96×2 TGOM/Trunk Raw VAC/-Data Memory.
Byte 1, bit 0: TGOM/TGIM Parity Error—This bit is set to 1 when a parity error occurs at the output of the 8192×8 Trunk Buffer Memory.
Byte 1, bit 1: TGOM/Trunk VAC Parity Error—This bit is set to 1 when a parity error occurs at the output of the 96×1 TGOM/Trunk VAC (after freezeout) Memory.
Byte 1, bit 2: ICM Parity Error—This bit is set to 1 when a parity error occurs at the output of the 192×16 ICM Memory.
Byte 1, bit 3: SIM Parity Error—This bit is set to 1 when a parity error occurs at the output of the 192×10 SIM Memory.
Byte 1, bit 4: FEC ROS Parity Error—This bit is set to 1 when a parity error occurs at the output of the 256×8 FEC ROS.
Byte 1, Bit 5: CCU Outbus Parity Error—This bit is set to 1 when a parity error occurs at the CCU Outbus.
Byte 1, bit 6: SMU Right Parity Error—This bit is set to 1 when a parity error occurs on 21 bits of the SMU.
Byte 1, bit 7: SMU Left Parity Error—This bit is set to 1 when a parity error occurs on 12 bits of the SMU.

Input X '22'

This instruction obtains the status of the error registers of the voice processing area of the NCU.

Byte 0, bits 0–7: These bits are 0
Byte 1, bit 0: D/A Interface A or B Parity Error—This bit is set to 1 when a parity error occurs on either A or B Interface Memory.
Byte 1, bit 1: D/A Interface C or D Parity Error—This bit is set to 1 when a parity error occurs on either C or D Interface Memory.
Byte 1, bit 2: Algorithm Memory Demodulator Parity Error—This bit is set to 1 when a parity error occurs at the output of the 96×21 D/A Memory.
Byte 1, bit 3: Algorithm Memory 2 Echo and VAC Parity Error—This bit is set to 1 when a parity error occurs at the output of the 96×21 Echo Control and VAC Memory 2.
Byte 1, bit 4: Algorithm Memory 1 Echo and VAC Parity Error—This bit is set to 1 when a parity error occurs at the output of the 96×21 Echo Control and VAC Memory 1.

Byte 1, bit 5: Algorithm Memory Modulator Parity Error—This bit is set to 1 when a parity error occurs at the output of the 96×21 A/D Memory.

Byte 1, bit 6: LGIM Parity Error—This bit is set to 1 when a parity error occurs at the output of the 96×15 LGIM.

Byte 1, bit 7: LGOM Parity Error—This bit is set to 1 when a parity error occurs at the output of the 96×15 LGOM.

Input X '24"

This instruction obtains the address of the memory which contains the TGOM, the TGIM and the Phase Buffer.

Byte 0, bits 0–2: These bits are 0.

Byte 0, bit 3: Left/Right Bit-A zero (0) selects the left half of the trunk buffer memory which is also called the A side and a one (1) selects the right half of the trunk buffer memory which is also called the B side.

Byte 0, bits 4–7 and Byte 1, bits 0–7: Trunk buffer address—The address can be between 0–4096. The TGOM is located in hexadecimal addresses 000–8FF. The TGIM is located in hexadecimal addresses 900–D7F. The Phase Buffer is located in hexadecimal addresses DCO–FFF. The hexadecimal addresses D80–DBF are spare locations.

Input X '25"

This instruction obtains the digitized voice or data from the Input or Output Registers of the trunk buffer memory.

Byte 0, bits 0–7: These bits contain the digitized voice or data from the Output Register.

Byte 1, bits 8–15: These bits contain the digitized voice or data from the Input Register.

Input X '29'

This instruction obtains the status of the NCU clocks. This status can also be observed on the NCU panel.

Byte 0, bits 0–2: These bits are 0.

Byte 0, bits 3,4: These bits represent increments of 31.25 microseconds.

Byte 0, bits 5–7: These bits represent increments of 5.184 microseconds. The states of 110 and 111 are illegal and should not occur.

Byte 1, bit 0: This bit is 0.

Byte 1, bits 1,2: V Clocks—These bits represent increments of 1.296 microseconds.

Byte 1, bits 3, 4: U Clocks—These bits represent increments of 324 nanoseconds.

Byte 1, bits 5–7: S Clocks—These bits represent increments of 54 nanoseconds. The states of 110 and 111 are illegal and should not occur.

Input X '2A'

This instruction obtains the status of data at various multiplexed points in the NCU and the status of the channel clock.

Byte 0, bit 0: Monitor Acquisition—This bit is 1 during the period that the T1 trunk is out of sync.

Byte 0, bit 1: Stop—This bit is set to 1 when the NCU clock has stopped running.

Byte 0, bit 2: CS Bit—This bit indicates the state of the multiplexed NCU to CDQ dial digit line.

Byte 0, bit 3: CBS Bit—This bit indicates the state of the multiplexed CDQ to NCU dial digit line.

Byte 0, bit 4: Trk Out Bit—This bit indicates the state of the outgoing T1 line.

Byte 0, bit 5: Trk In Bit—This bit indicates the state of the incoming T1 line.

Byte 0, bit 6: Dem Bit—This bit indicates the state of the multiplexed NCU to CDQ voice line.

Byte 0, bit 7: Mod Bit—This bit indicates the state of the multiplexed CDQ to NCU voice line.

Byte 1, bit 0: This bit is 0.

Byte 1, bit 1: A/B Bit—This bit represents an odd (0) or even (1) 6 millisecond frame.

Byte 1, bits 2–7: Channel Indicator—These bits represent increments of 125 microseconds and represent the channels of the 6 millisecond frame. The legal clock states for this counter are 0–47.

Input X '30'

This instruction obtains the level 3 NCU interrupt status and the CDQ interface address of the State Memory Unit (SMU).

Byte 0, bits 0, 1: These bits are 0.

Byte 0, bit 2: CDQ Interrupt—This bit is set to 1 when there is a CDQ level 3 interrupt pending.

Byte 0, bit 3: Freeze Out Interrupt—This bit is set to 1 when there is a level 3 interrupt pending from the freeze out logic.

Byte 0, bits 4–7: These bits are 0.

Byte 1, bits 0–6: CDQ Interface Address—These bits contain the address of the SMU address register.

Byte 1, bit 7: This bit is 0.

Input X '31'

This instruction obtains the dial digit and interrupt code of the addressed CDQ port.

Byte 0, bit 0: This bit is 0.

Byte 0, bit 1: Interrupt Generate—This bit is set to 1 when an interrupt code generates a level 3 interrupt.

Byte 0, bits 2–7: These bits are 0.

Byte 1, bits 0–3: These bits indicate the binary state of the dial digit of the addressed CDQ port.

Byte 1, bits 4–7: Interrupt Code—These bits define the cause for the level 3 CDQ interrupt. The bits are encoded as shown in the table below.

| Interrupt Code | Definition |
|---|---|
| 0000 | Unused |
| 0001 | On Hook |
| 0010 | Digit Transfer to CCU |
| 0011 | Call Initiation from PBX |
| 0100 | Maximum Bread Violation (~ 80 ms) |
| 0101 | CBS Raises Contention |
| 0110 | Digit Request from CCU |
| 0111 | Unused |
| 1000 | Information Overrun |
| 1001 | Acknowledge to Call Initiation |
| 1010 | Party Answer with CBS Up |
| 1011 | Unused |
| 1100 | Maximum Make Violation (100ms <T< 600ms) |
| 1101 | Maximum Interdigit Time Out Violation |
| 1110 | Unused |
| 1111 | Unused |

Input X '32'

This instruction provides direct access to the SMU memory. Timeout information, interrupt codes, dial digits, and status are contained in the SMU memory for call processing.

Byte 0, bit 0: This bit is 0.

Byte 0, bit 1: Interrupt Generate—This bit is set to 1 by hardware when an interrupt code generates a level 3 interrupt.

Byte 0, bits 2–7: $M(t)B3, M(t)B2, M(t)B7, M(t)B6$ $M(t)B1$, and $M(t)B5$—These bits indicate the state of bits 3, 2, 7, 6, 1, and 5, respectively of the 8 bit 600 millisecond or 32 second timeout counter in the call processor. See Section 2 on call processing for a detailed description of the timer operation.

Byte 1, bits 0-3: Dial Digit—These bits are the binary representation of the dial digit.

Byte 1, bits 4-7: Interrupt Code—These bits define the cause for the level 3 CDQ interrupt. The encoding of these bits is the same as defined in instruction Input X '31'.

Input X '32'

This instruction provides direct access to the SMU memory. Timeout information, interrupt codes, dial digits, and status are stored in the SMU memory for call processing.

Byte 0, bit 0: One Second Resolution—This bit is set to 1 when the 8 bit SMU timer has a resolution of 1 second. This bit is set to 0 when the timer has a resolution of 4 milliseconds.

Byte 0, bit 1: Parity B0—This bit represents the parity for bits of the SMU memory.

Byte 0, bit 2: CSO—This bit is set to 1 by CCU requesting the CS line to be raised.

Byte 0, bit 3: Transmit—This bit is set to 1 when a call is originated by the NCU. This bit is set to 0 when a call is originated by the PBX.

Byte 0, bits 4, 5: S1, S2—These bits indicate the status of CDQ port. The bits are encoded as shown below.

| S1 | S2 | CDQ Status |
|----|----|------------|
| 0  | 0  | Idle |
| 0  | 1  | Off Hook |
| 1  | 0  | End of Dial Digit |
| 1  | 1  | Talking |

Byte 0, bit 6: CBS—This bit is set to 1 if the CBS line from the CDQ is up.

Byte 0, bit 7: CS1—This bit is set to 1 when the call processor has raised the CS line.

Byte 1, bit 0: M(t)B0—This is bit 0 of the call processor's 8 bit timer.

Byte 1, bit 1: Call Accepted Timeout Bit—This bit is set to 1 for 600 milliseconds after the end of dial digit transfer on the CBS line.

Byte 1, bit 2: M(t)B4—This is bit 4 of the call processor's 8 bit timer.

Byte 1, bit 3: MMT—In the receive mode, this bit is set to 1 for 120 milliseconds to 320 milliseconds. In the transmit mode, this bit is set to 1 at the end of a dial pulse break.

Byte 1, bit 4: Parity B1—This bit represents the parity for the remaining 19 bits of the SMU memory.

Byte 1, bit 5: M1 (Δ S)—This bit is set to 1 if the CBS line changed state in the last 4 ms cycle.

Byte 1 bit 6: M2 (Δ S)—This bit is set to 1 if the CBS line changed state 2 cycles ago.

Byte 1, bit 7: On Hook Timeout—This bit is set to 1 for 600 milliseconds after both parties go "on hook".

Input X '34'

This instruction obtains the ICM address contained in the ICM address register.

Byte 0, bits 0-7: These bits are 0.

Byte 1, bit 0: This bit is set to 1 when the LGOM half of the ICM is addressed. This bit is set to 0 when the TGOM half of the ICM is addressed.

Byte 1, bit 1-7: ICM Address—These bits contain the address of the ICM address register.

Input X '35'

This instruction obtains the data contained in the ICM input register.

Byte 0, bits 0, 1: These bits are the NCU ID that are used to address the SIM of the four NCU's.

Byte 0, bits 2-4: The control bits for data and voice processing are defined below:

| Control Bits | Definition |
|--------------|------------|
| 000 | voice |
| 001 | unused |
| 010 | busy |
| 011 | local call |
| 100 | transparent data mode |
| 101 | transparent native data mode |
| 110 | unused |
| 111 | unused |

Byte 0, bits 5-7: These bits are 0.

Byte 1, bit 0: This bit is set to 1 when the LGIM half of the SIM is addressed. This bit is set to 0 when the TGIM half of the SIM is addressed.

Byte 1, bits 1-7: SIM Address—These bits contan the SIM address stored in the ICM.

Input X '36'

This instruction obtains the data contained in the ICM output register. The bits are defined exactly like those in instruction input X '34'.

Input X '38'

This instruction obtains SIM address contained in the SIM address register.

Byte 0, bits 0-7: These bits are zero.

Byte 1, bit 0: This bit is set to 1 when the LGIM half of the SIM is addressed. This bit is set to 0 when the TGIM half of the SIM is addressed.

Byte 1, bits 1-7: SIM Address—These bits contain the bits of the SIM address register.

Input X '39'

This instruction obtains the raw VAC bit and the digitized voice or data contained in the SIM input register.

Byte 0, bit 0: Raw VAC Bit—This bit is set to 1 when the voice activity bit is active.

Byte 0, bit 1: Reserved—This bit is forced to one by the TGIM or LGIM when the machine is running and the TGIM or LGIM loads the SIM.

Byte 0, bits 2-7: These bits are 0.

Byte 1, bits 0-7: These bits contain the digitized voice or data bits for a 250 microsecond period.

Input X '3A'

This instruction obtains the raw VAC bit and the digitized voice or data contained in the SIM output register. The bits of this instruction are defined exactly like those of instruction X '39'.

Input X '3C'

This instruction obtains the address of the voice processor sequencer algorithm address register and the sequencer LGIM/LGOM address register.

Byte 0, bits 0-7: These bits contain the bits of the sequencer algorithm address register.

Byte 1, bits 0-7: These bits contain the bits of the sequencer LGIM/LGOM address register.

Input X '3D'

This instruction obtains the data stored in different voice processing memories. The data that is obtained is dependent upon the address sent to the NCU with instruction Output X '3C'.

Memory ID 0000 — LGIM/LGOM HI

Byte 0, bit 0: This bit is 0.

Byte 0, bit 1: Parity Data — I — Parity on LGIM Data Byte.
Byte 0, Bit 2: Parity on the LGIM VAC Bit.
Byte 0 Bit 3: LGIM VAC Bit— This bit is set to 1 when there is voice activity.
Byte 0, Bits 4–7: These Bits are 0.
Byte 1, Bit 0: This bit is 0.
Byte 1, Bit 1: Parity on LGOM Data Byte.
Byte 1, Bit 2: Parity on LGOM VAC Bit.
Byte 1, Bit 3: LGOM VAC Bit—This bit is a 1 when the byte transferred from the SIM to LGOM contains digitized voice bits.
Byte 1, Bit 4: This Bit is 0.
Byte 1, Bits 5–7: These bits are received from the ICM and specify different conditions about a port: Local call, Data port, Voice port, send Busy Signal.
Memory ID 0001 LGIM/LGOM L0
Byte 0, Bits 0–7: These are either Digitized Voice Bits generated by the modulator algorithm or Data bits when in Data mode.
Byte 1, Bits 0–7: Digitized Voice bits which have been received from the SIM.
Memory ID 0010 Mod/Demod HI
Byte 0, Bit 0: Parity on Modulator: Number of consecutive like bits, step size, and number of iterations with no step size change.
Byte 0, Bit 1: This bit is 0.
Byte 0, Bits 2–4: 3Bit Binary number representing the number of consecutive like bits received by the Modulator Algorithm.
Byte 0, Bits 5–7: Modulator Algorithm step size.
Byte 1, Bits 0–7: Same as Byte 0 except for the Demodulator Algorithm.
Memory ID 0011 Mod/Demod MID
Byte 0, Bits 0–3: 4 Bit Binary Number representing the number of iterations without a step size change in the Modulator Algorithm.
Byte 0, Bits 4–5: These bits are 0.
Byte 0, Bit 6: Parity bit of the Modulator Accumulated Value.
Byte 0, Bit 7: Modulator Accumulated value Bit 0, most significant Bit.
Byte 1, Bits 0–7: Same as byte 0 except for the Demodulator Algorithm.
Memory ID 0100 MOD/DEMOD LO
Byte 0, Bits 0–7: Modulator Accumulated value Bits 1–8.
Byte 1, Bits 0–7: Demodulator Accumulated value Bits 1–8.
Memory ID 0101 VAC HI
Byte 0, Bit 0: Parity of Bits 1–7 of this Byte.
Byte 0, Bit 1: Most recent bit received by the Modulator Algorithm Logic from the A/D converters.
Byte 0, Bit 2: Latest Vac bit received by the Modulator Algorithm Logic from the VAC Algorithm Logic.
Type 0, Bit 3: Next to latest vac bit received by the Modulator Algorithm.
Byte 0, Bit 4–7: 4-Bit Vac overhang count used by the VAC Algorithm.
Byte 1, Bit 0: Parity of Byte 1, Bit 1.
Byte 1, Bit 1: Most recent bit received by the demodulator Algorithm Logic from the LGOM.
Byte 1, Bits 2–7: These bits are 0.
Memory ID 0110 VAC MID
Byte 0, Bits 0–5: These Bits are 0.
Byte 0, Bit 6: Parity of R1 (ID 0111, Byte 0)
Byte 0, Bit 7: This bit is 0
Byte 1, Bits 0–5: These Bits are 0.
Byte 1, Bit 6: Parity of R2 (ID 0111, Byte 1)
Byte 1, Bit 7: This Bit is 0
Memory ID 0111 VAC LO
Byte 0, Bits 0–7: R1, the max of the modulator magnitude for the past 0–6 milliseconds.
Byte 1, Bits 0–7: R2, the max of the modulator magnitude for the past 6–12 milliseconds.

5.3.2 NCU Output Instructions

Output X '20'
This instruction is used to select an NCU or set the system bit in the NCU's.
Byte 0, bits 0, 1: NCU ID—These bits are used to select an NCU which is to receive the output instruction and those input and output instructions that follow.
These bits remain set in all NCU's until the NCU ID is changed by another output instruction that contains an NCU ID. These bits are encoded as shown in the table below.

| NCU | ID | | |
|---|---|---|---|
| 0.0 | 0.1 | NCU Selected | |
| 0 | 0 | NCU | 1 |
| 0 | 1 | NCU | 2 |
| 1 | 0 | NCU | 3 |
| 1 | 1 | NCU | 4 |

Byte 0, bit 2: System Bit—This bit is set by the control program when a group of NCU's are to receive an output X '23' instruction.
Byte 0, bits 3–7: These bits are unused.
Byte 1, bits 0–7: These bits are unused.
Output X '21'
This instruction is used to set and reset the error registers, disable checks and the panel AC triggers.
Byte 0, bit 0: Set—This bit is set to 1 by the control program in conjunction with either bits 0.2 or 0.3 to set errors in the errors in the error registers or set disable checks.
Byte 0, bit 1: Reset —This bit is set to 1 by the control program in conjunction with either bits 0.2, 0.3 or 0.5 to reset the errors in the error registers, reset disable checks or reset the panel AC triggers.
Byte 0, bit 2: Error Registers—This bit is set to 1 by the control program in conjunction with bits 0.0 or 0.1 to set or reset the error registers.
Byte 0, bit 3: Disable Checks—This bit is set to 1 by the control program in conjunction with bits 0.0 or 0.1 to set or reset disable checks. Level 1 interrupts are inhibited when disable checks is set to 1.
Byte 0, bit 4: Panel AC Triggers—This bit is set to 1 by the control program in conjunction with bit 0.1 to reset the panel AC triggers. The panel AC trigger that are reset are (1) stop on error, (2) inhibit write phase buffer, (3) inhibit voice phase buffer, (3) inhibit voice entry, (4) trunk disconnect, (5) system master clock, and (6) system entry/exit. These panel triggers can only be reset if the pushbutton panel enable is not set to 1. An operator at the panel must insure that this pushbutton is not in the "on" position.
Byte 0, bits 5–7: These bits are unused.
Byte 1, bits 0–7: These bits are unused.
Output X '23'
This instruction is used by the control program to simulate the panel pushbutton operation. The panel enable pushbutton must be in the "off" position for the control program to be able to simulate the panel pushbutton operations.

Byte 0, bit 0: Stop on Error—This bit is set to 1 to change the state of the Stop on Error Latch. The stop on error latch being set and a level 1 interrupt will cause the NCU clock to stop.

Byte 0, bit 1: Inhibit Write Phase Buffer—This bit is set to 1 to change the state of the inhibit write phase buffer latch. The inhibit write phase buffer latch being set inhibits writing into the phase buffer contained in the trunk buffer memory from writing. This function is used to keep the data in the TGIM constant.

Byte 0, bit 2: Inhibit Voice Entry—This bit is set to 1 to change the state of the inhibit voice entry latch. The inhibit voice entry being set inhibits the LGIM from writing.

Bit 0, bit 3: Trunk Disconnect—This bit is set to 1 to change the state of the trunk disconnect latch. The trunk disconnect latch being set disconnects the trunk from the NCU and inserts a pattern in place of the trunk input.

Byte 0, bits 4, 5: Telco Simulate—These bits provide for simulation of a bit pattern on the CBS lines. These bits are encoded as shown below.

| Telco Simulate | | |
|---|---|---|
| 0.4 | 0.5 | Definition |
| 0 | 0 | Allow CBS Bit Pattern |
| 0 | 1 | Allow CBS Bit Pattern |
| 1 | 0 | Enable 0 on CBS Line |
| 1 | 1 | Enable 1 on CBS Line |

Byte 0, bits 6, 7: Digitized Voice Simulate—These bits provide for simulation of a bit pattern at the input to the accumulator registers in the voice processor. These bits are encoded as shown below:

| Voice Simulate | | |
|---|---|---|
| 0.6 | 0.7 | Definition |
| 0 | 0 | Allow Voice from A/D Converters |
| 0 | 1 | Allow Voice from A/D Converters |
| 1 | 0 | Enable 0 into accumulator register |
| 1 | 1 | Enable 1 into accumulator register |

Byte 1, bit 0: System Master Clock—This bit is set to 1 to change the state of the system master clock latch. The system master clock latch being set selects the NCU that is the master clock. Only one NCU can be master at a time.

Byte 1, bit 1: Start—This bit is set to 1 to start the NCU clock.

Byte 1, bit 2: Stop—This bit is set to 1 to stop the NCU clock on a 6 milliseconds boundary. The programmer should wait 6 milliseconds before setting another bit with output X '23'.

Byte 1, bit 3: Reset—This bit is set to 1 to reset the NCU to a defined state and stop the NCU on a 336 millisecond superframe boundary.

Byte 1, bit 4: System Entry/Exit—This bit is set to 1 to change the state of the system entry/exit latch. The system entry/exit being set puts an NCU into a system of NCU's that are synchronize to the same T1 trunk.

Byte 1, bits 5–7: Scan Select—These bits are used to select the amount of time the NCU will run after the start bit is set. The bits are encoded as shown in the table below:

| Scan | Select | | Duration of clock |
|---|---|---|---|
| 1.5 | 1.6 | 1.7 | running |
| 0 | 0 | 0 | process |
| 0 | 0 | 1 | 54 nanoseconds |
| 0 | 1 | 0 | 324 nanoseconds |
| 0 | 1 | 1 | 5.184 nanoseconds |
| 1 | 0 | 0 | 31.25 microseconds |
| 1 | 0 | 1 | 125 microseconds |
| 1 | 1 | 0 | 6 milliseconds |
| 1 | 1 | 1 | 336 milliseconds |

Programmer Beware: If bits 0.4–07 and 1.5–1.7 are set with Output X '23' instruction and are to remain set after other Output X '23' instructions have been issued, then that particular bit must be set with each Output X '23' instruction.

Output X '24'

This instruction is used to select an NCU and send a Trunk Buffer memory address to the address register of the Trunk Buffer.

Byte 0, bits 0, 1: NCU ID—These bits select the NCU that is to receive the output instruction and those input and output instructions that follow. These bits remain set in all NCU's until the NCU ID is changed by another output instruction that contains an NCU ID.

Byte 0, bits 2–7: These bits are defined exactly as in Input X '24'.

Byte 1, bits 0–7: These bits are defined exactly as in Input X '24'.

Output X '25'

This instruction is used to send digitized voice or data to the Trunk Buffer Input Register. This information is also stored in the Trunk Buffer memory location designated by the address in the Address Register.

Byte 0, bits 0–7: These bits are unused.

Byte 1, bits 0–7: These bits are used to store digitized voice or data in the Trunk Buffer Input Register and the memory.

Output X '26'

This instruction is used to send a threshold count to the NCU designated by Output X '20'. When this number of voice or data ports is frozen out by the freezeout logic a level 3 interrupt is generated.

Byte 0, bits 0–7: These bits are unused.

Byte 1, bits 0–7: This is the 8 bit count that is sent to the freezeout logic.

Output X '30'

This instruction is used to select an NCU and send a SMU address to the SMU address register.

Byte 0, bits 0, 1: NCU ID—These bits select the NCU that is to receive the output instruction and those input and output instructions that follow. These bits remain set in all NCU's until the NCU ID is changed by another output instruction that contains an NCU ID.

Byte 0, bits 2–7: These bits are unused.

Byte 1, bits 0–6: These bits are the SMU address bits that are loaded into the CMU address register.

Byte 1, bit 7: This bit is unused.

Output X '31'

This instruction is used by the control program to send the call processor the interrupt code, status, and dial digits.

Byte 0, bits 0, 1: These bits are unused.

Byte 0, bit 2: CSO—This bit is set to 1 requesting the CS line to be raised. The CSO bit is set to 1 during call initiation, at the end of transmitting dial digits and while talking or while the busy tone occurs.

Byte 0, bit 3: Transmit—This bit is set to 1 when a call is originated by the NCU. This bit is set to 0 when a call is originated by the PBX.

Byte 0, bits 4, 5: S1, S2—These bits indicate the status of the CDQ port. The bits are encoded as shown below:

| Interrupt Code | Definition |
|---|---|
| 0000 | Unused |
| 0001 | On Hook |
| 0010 | Digit Transfer to CCU |
| 0011 | Call Initiation from PBX |
| 0100 | Maximum Bread Violation (~ 80 ms) |
| 0101 | CBS Raises Contention |
| 0110 | Digit Request from CCU |
| 0111 | Unused |
| 1000 | Information Overrun |
| 1001 | Acknowledge to Call Initiation |
| 1010 | Party Answer with CBS Up |
| 1011 | Unused |
| 1100 | Maximum Make Violation (100ms <T< 600ms) |
| 1101 | Maximum Interdigit Time Out Violation |
| 1110 | Unused |
| 1111 | Unused |

Byte 0, bits 6, 7: These bits are unused.

Byte 1, bits 0–3: Dial Digit—These bits are the binary representation of the dial digit that the control program sends to the call processor.

Byte 1, bit 4: Interrupt Generate—This bit is set to 0 by the control program to reset the interrupt code that generated a level 3 interrupt for the CDQ port. This bit is set to 1 to disable a CDQ line.

Byte 1, bits 5–7: These bits are unused.

Output X '32'

This instruction is used by the control program to send data directly to the SMU memory in the call processor. Time out information, interrupt codes, dial digits, and status are stored in the SMU memory. The definition of the bits of this word are exactly like those of instruction Input X '32'.

Output X '33'

This instruction is also used by the control program to send data directly to the SMU memory in the call processor. The definition of the bits of this word are exactly like those of instruction X '33'.

Output X '34'

This instruction is used by the control program to select an NCU and send an ICM address to the ICM address register.

Byte 0, bits 0, 1: NCU ID—These bits are used to select an NCU which is to receive the output instruction of those input and output instructions that follow. These bits remain set in all NCU's until the NCU ID is changed by another output instruction that contains an NCU ID.

Byte 0, bits 2–7: These bits are unused.

Byte 1, bit 0: This bit is set to 1 when the LGOM half of the ICM is addressed. This bit is set to 0 when the TGOM half of the ICM is addressed.

Byte 1, bits 1–7: These bits are the ICM address bits that are loaded into the ICM address register.

Output X '35'

This instruction is used by the control program to store information into the ICM input register and the ICM. The definitions of the bits are exactly like those of instruction input X '35'.

Output X '38'

This instruction is used by the control program to select an NCU and send a SIM address to the SIM address register.

Byte 0, bits 10, 1: NCU ID—These bits are used to select an NCU which is to receive the output instruction and those input and output instructions that follow. These bits remain set in all NCU's until the NCU ID is changed by another output instruction that contains an NCU ID.

Byte 0, bits 2–7: These bits are unused.

Byte 1, bit 0: This is set to 1 when the TGIM half of the SIM is addressed. This bit is set to 0 when the LGIM half of the SIM is addressed.

Byte 1, bits 1–7: SIM Address—These bits are the SIM address bits that are loaded into the SIM address register.

Output X '39'

This instruction is used by the control program to store information into the SIM input register and the ICM. The definitions of the bits are exactly like those of instruction input X '35'.

Output X '3C'

This instruction is used to select an NCU, a voice processing memory and a memory address.

Byte 0, bits 0, 1: NCU ID—These bits select the NCU that is to receive the output instruction and those input and output instruction that follow. These bits remain set in all NCU's until the NCU ID is changed by another output that contains an NCU ID.

Byte 0, bit 2, 3: These bits are unused.

Byte 0, bits 4–7: Memory ID—These bits are used to select a memory in the voice processor.

Byte 1, bits 0–6: Memory Address—These bits are the address bits used to address the voice processing memories.

Byte 1, bit 7: This bit is unused.

6.0 Summary of NCU Operation

6.1 Call Processing

The call states of the 96 ports are iteratively monitored in the CPF unit (FIG. 18). Off-hook transitions are recorded in the SMU and used to interrupt the CCU. The dial digits are cumulatively assembled by the CPF, from the port-in dial pulses and passed to the CCU.

The CCU determines the state of the called port (from information if the call is local or tandem; otherwise, by communication over the high speed trunks with other units of the system network) and called port is "rung" if available. Ringing or busy tones are generated digitally in the NCU and passed to the "voice" receiving lines (e.g. CR) of calling ports via the digital voice processing and digital switching circuit paths (modulator to LGOM to SIM to LGIM to demodulator to D/A converts).

6.2 Voice Processing/Activity Detection

Voice signals are converted to block multiplexed delta modulation digital functions (192 bit blocks per port-in) and multiplexed with data signals entered at designated ports for trunk transmission. A virtual channel VC (192 virtual bit transmission slots per trunk frame) is assigned to each port-in having call connection status in the system. Since there are 96 ports-in and only 46 real channels RC per high speed trunk per frame (for handling trunk traffic) activity compression is used to associate only VC's having activity outgoing on a given trunk with the available RC's (up to 46) of that trunk.

The port-in voice and data signals are processed by the VPU through the modulator, A/D memory, Activity (VAC) detection logic and LGIM paths. The port-out voice and data signals are processed by the VPU through LGOM and activity decompression/paths. Voice-in is pre-processed for A/D conversion and Voice-out is post-processed for D/A conversion.

Voice Activity is detected by measuring accumulated digital voice signal magnitudes associated with the modulation (port-in) paths and by comparing the measured levels with levels in corresponding demodulation paths. The latter operation distinguishes port-in echo from original speech and effects echo cancellation by setting inactivity indication in the modulation path.

6.3 Digital Switch

The digital switch effects local, toll and tandem connections for inter-port traffic between NCU's (and between ports of one NCU). The switch also controls assignment of real channels on the outgoing trunks to virtual channels of stored line information in each frame and processing of activity detection indications into transmissible Voice Activity Compression VAC Masks defining the assignments. The activity indication of a VC is set to 1 if there is any activity during the frame of its accumulation and if there are sufficient trunk RC's to accomodate all instantly accumulated active VC's. RC assignment is given to each active VC and the VAC mask corresponds to the VC activity indicators. If there are insufficient RC's in a frame the switch makes a prioritized "freeze out" selection of 46 VC's.

Voice and data are switched locally through path: LGIM — SIM — LGOM, and relative to high speed trunks via paths: LGIM — SIM — TGOM-Trunk and Trunk-TGIM — SIM — LGOM. Activity indications are handled through paths (FIGS. 10, 20): "ECHO/-VAC — MOdulator — VAC MEMORY — LGIM —SIM — VAC Bfr — Freeze Out — Trunk" and "Trunk — VAC FEC Decode — Vac Bfr — Echo Control and VAC memory in demodulation path."

Plural NCU's can have common 3705 CCU control, thereby providing modularity in multiples of 96 port capacity.

C. Network Access Unit (NAU)

1.0 Introduction

The NAU performs hierarchical switching of digital traffic between NCU's and R. F. apparatus which is linked to the satellite or a comparable ultra high speed facility. The NAU is designed to perform activity compression operations on down-link traffic and to regulate its own access to the space segment in a multiple access environment.

It can vary its traffic burst length assignments by following a signaling protocol based upon exchange of traffic demand information between all NAU's in the system network. It acquires and maintains synchronization on several levels (super frame, frame, bit) relative to the satellite and the other earth stations. It passes acquired time base intelligence to its terrestrially linked NCU modules via synch (193rd) bit and control channel (TCO) time slots in the terrestrial link.

In respect to traffic the NAU is equipped to decompress, re-group and re-compress down-link traffic in order to accomplish efficient use of terrestrial trunks.

The NAU is designed to communicate terrestrially with NCU's at 1.544 Mg/sec. However, any medium of communication can be used ($T_1$, coaxial cable, waveguide, etc.). The modular design of the NAU permits it to be physically situated at arbitrary distances from the terrestrially associated NCU's and even co-located. The functions performed by the NAU are arranged so that they can if desired be grafted physically onto the NCU circuit package. Indeed all NCU/3705 packages may be standardly structured to permit optional expansion to include a co-located NAU facility within any NCU housing.

Figure 62:
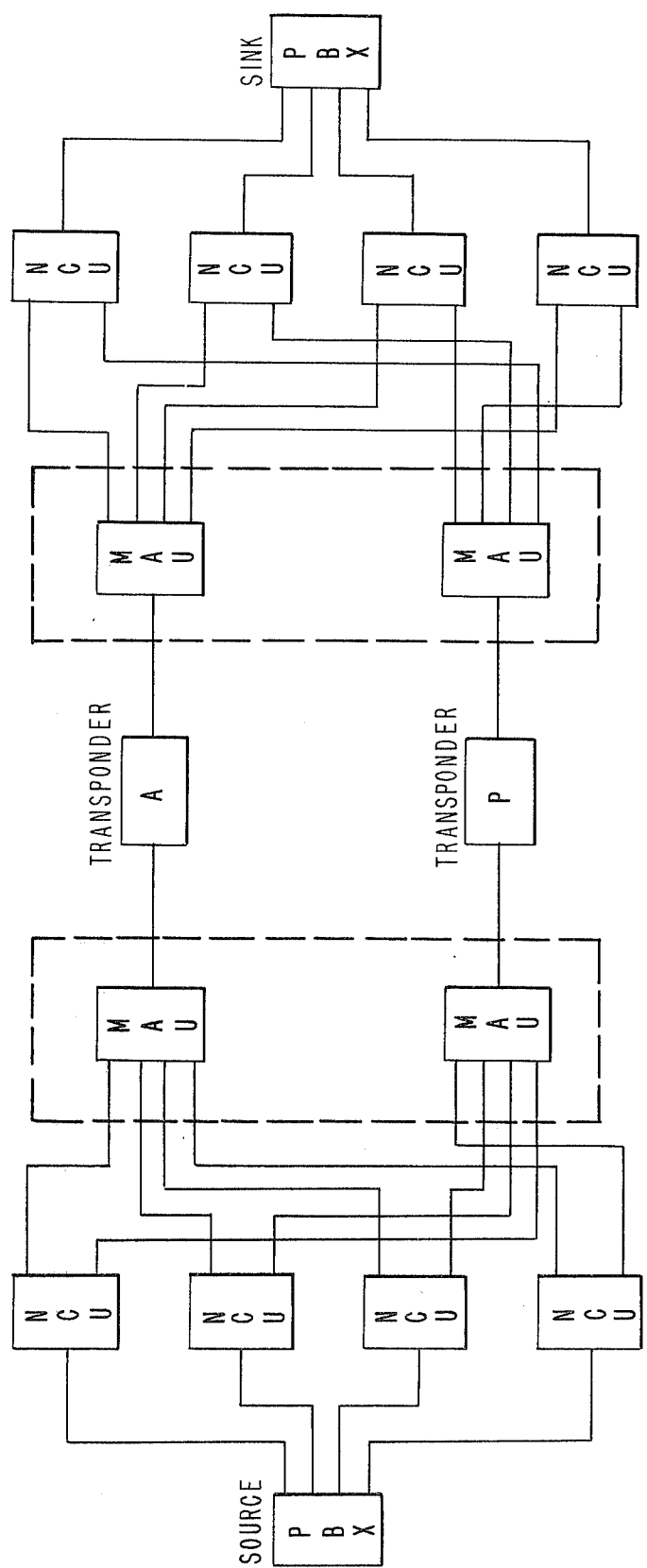
FIG. 62 indicates system multi-path routing via NCU and NAU modules.

The NAU is composed of from one to four Multiple Access Unit (MAU) switching modules sharing a common Base support Unit (BSU). Each MAU is terrestrially linkable to from one to four NCU's. FIG. 62 shows how the NAU and associated NCU's can be configured to provide multiple routing capability in time, space and even frequency domains relative to the satellite (transponder).

Figure 63:
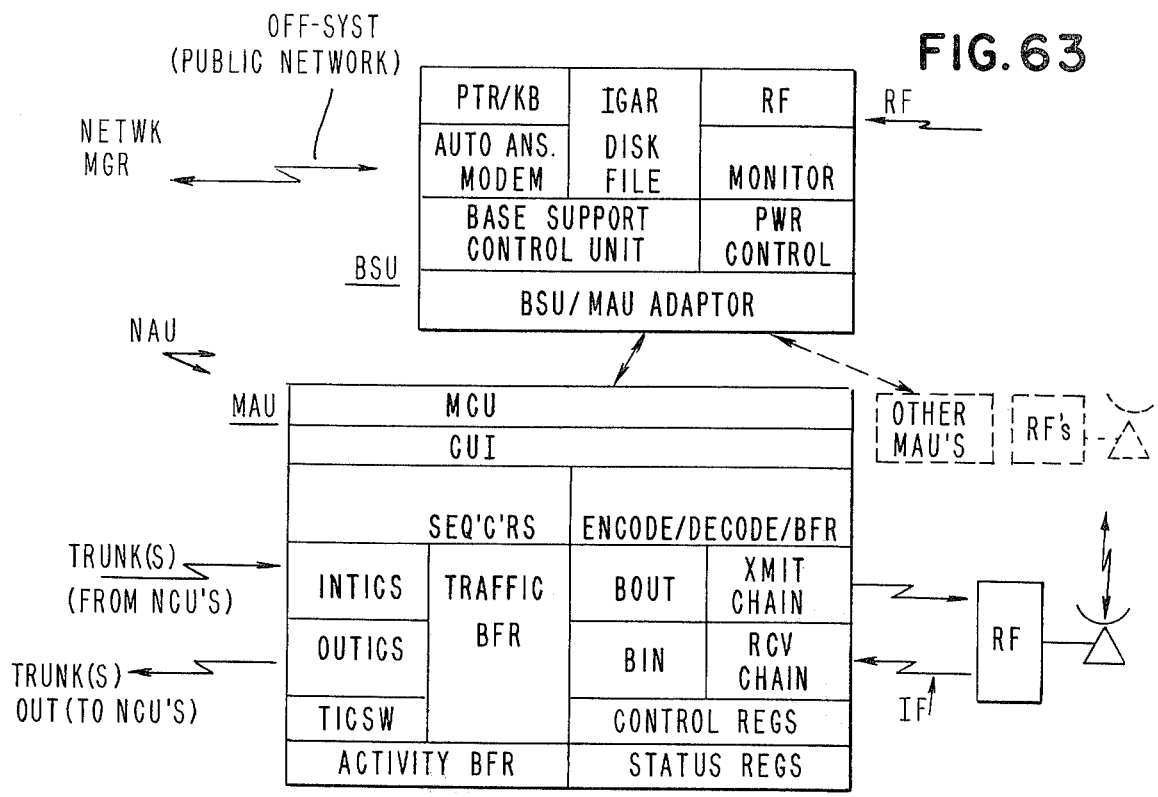
FIGS. 63-116 are utilized to explain the structure and operation of the NAU module.

1.1 NAU Organization (FIG. 63)

The NAU is composed of from one to four Multiple Access Unit (MAU) modules and a Base Support Unit (BSU), the latter containing a large capacity program store (IGAR disk file).

Figure 92A:
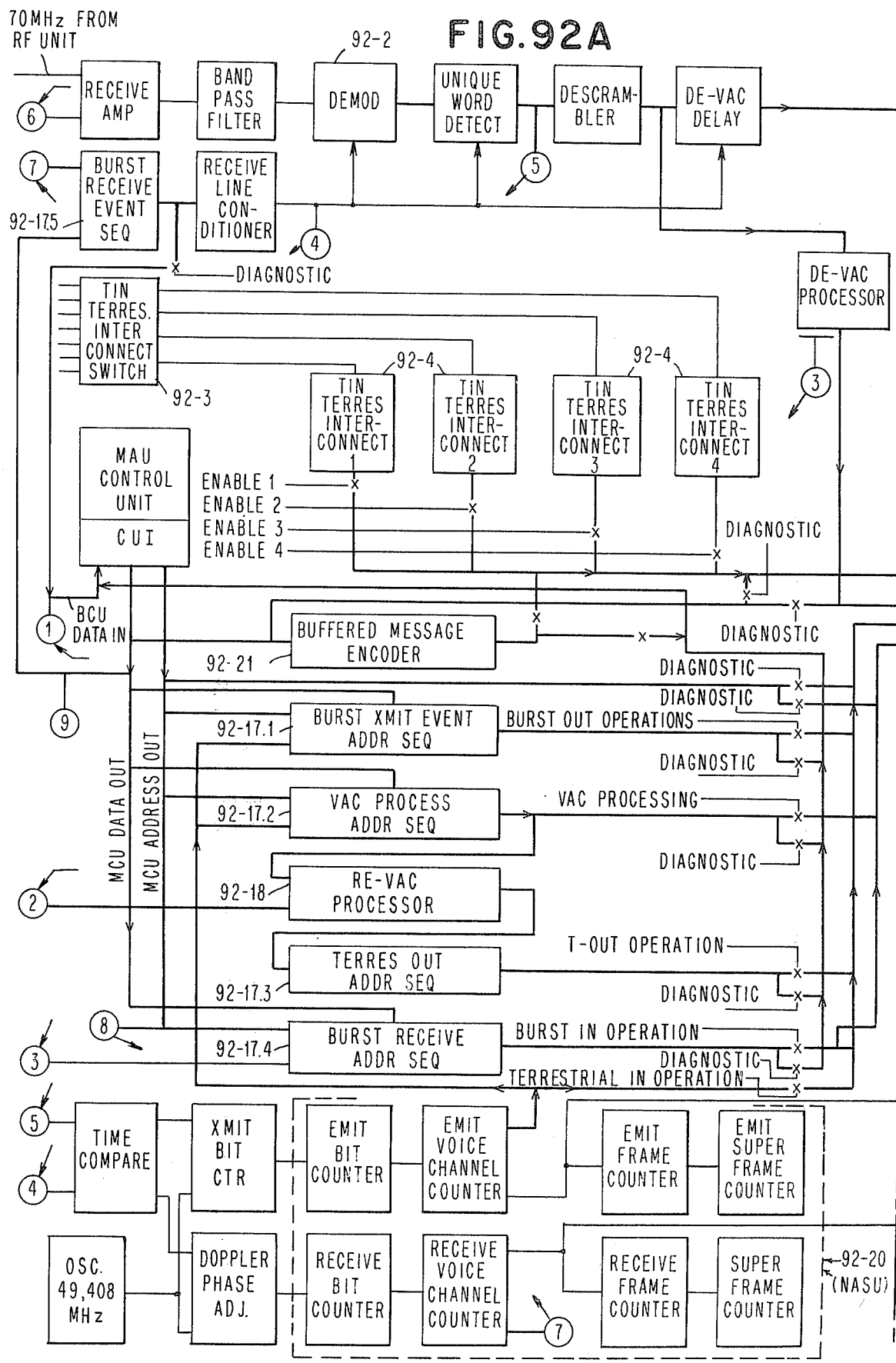
FIG. 92 (parts A and B) indicates MAU data flow details.
Figure 92B:
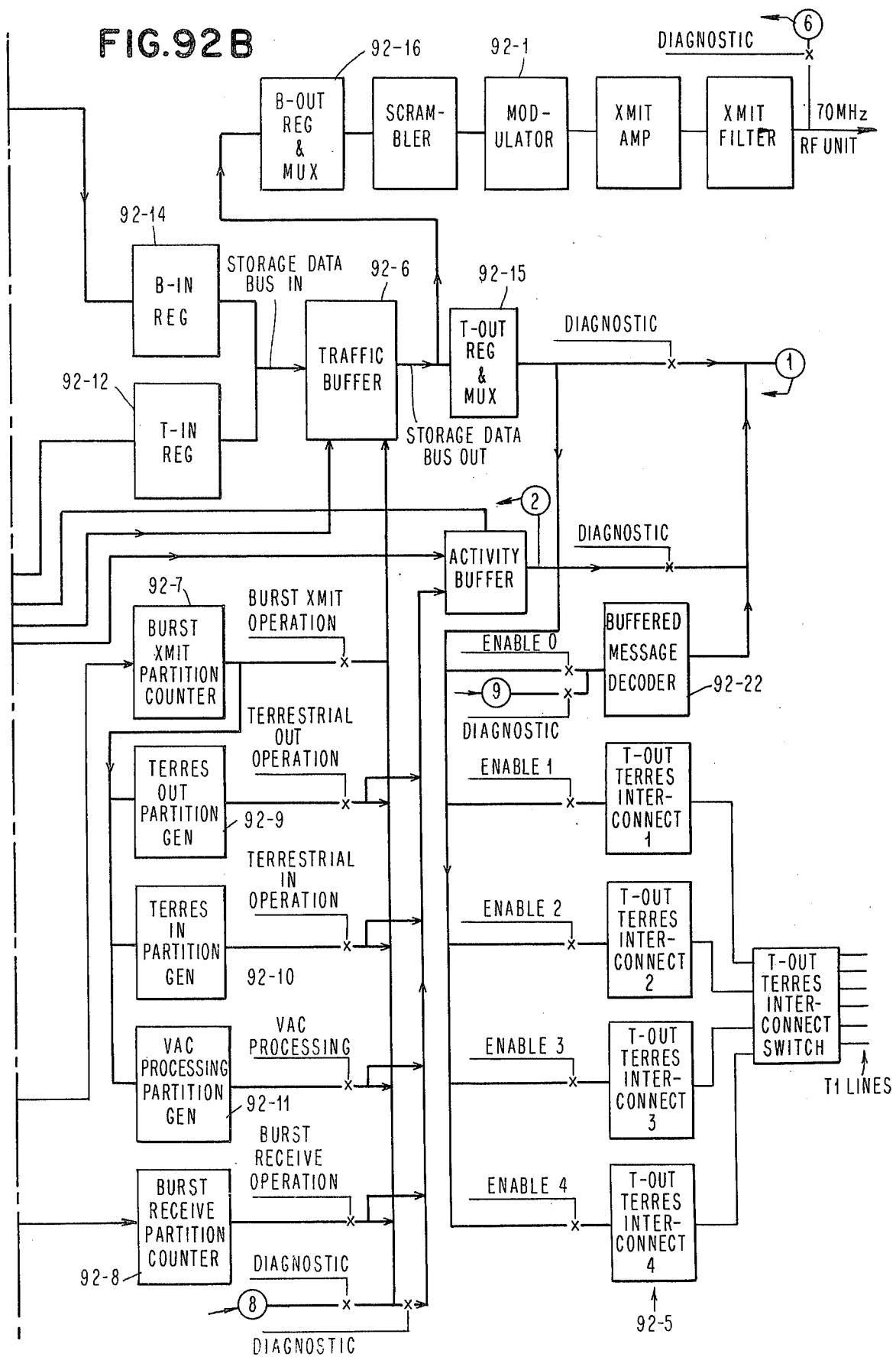

1.1.1 MAU Organization (FIGS. 63, 92)

The MAU contains the following major unit components.

- 1.1.1.1 MCU (MAU Control Unit) — buffers control programs for initialization, acquisition, demand assignment, activity re-compression and traffic switching. The control programs are received from the IGAR file in the BSU.
- 1.1.1.2 CUI (Control Unit Interface) — the MCU communicates with other MAU components via the CUI.
- 1.1.1.3 Traffic Buffer — serves as a temporary storage and central switching point for MAU traffic between the Terrestrial Interface and the Transmit and Receive Chains (space segment interface).
- 1.1.1.4 Terrestrial Interface — includes three basic modular parts:
    INTIC (Terrestrial-in Interconnect) — buffers up-link 1.544 Mb/sec. traffic from a terrestrial trunk line to the traffic buffer.
    OUTIC (Terrestrial-out Interconnect) — buffers down-link traffic for 1.544 Mb/sec. transfer to a terrestrial trunk.
    TICSW (Terrestrial Interconnect Switch) — provides spare terrestrial input/output circuits relative to INTIC and OUTIC as protection against trunk line circuit failures.
- 1.1.1.5 Space Segment Interface — includes Receive Transmit paths. The receive path includes:
    Receive Chain — receives down link (composited burst) signals from the R. F. apparatus, on a 70MHz QPSK IF carrier, converts the signals to digital form and passes them on to BIN.
    BIN (Burst in Register) — buffers digital signal flow from Receive Chain to Traffic Buffer (receives 16 bit + parity words and assembles into 64 + 4 parity bit units for entry into the Traffic Buffer).
    The Transmit Path includes:

BOUT (Burst Out Register) — buffers digital signal flow from traffic buffer to transmit chain (Reverse of BIN handling).

Transmit (Unit) Chain — receives 16 bit + parity words from BOUT and processes them to provide IF signal to the RF unit.

1.1.1.6 Sequencers — address the Traffic Buffer. The MCU loads the sequencers with address tables via CUI. There are the following sequencers:

BTEAS (Burst Transmit Event Address Sequencer)
BRAS (Burst Receive Address Sequencer)
BRES (Burst Receive Event Sequencer)
TOAS (TOUT Address Sequencer)
VPAS (VAC Process Address Sequencer)

1.1.1.7 Message Encode/Decode/Bfr — buffers the flow of signaling (order wire) information between MCU and traffic buffer and provides encoding and decoding handling relative to that information.

1.1.1.8 Activity Buffer — is used in activity recompression handling relative to OUTIC traffic.

1.1.1.9 Control and Status Registers — store control and status conditions.

1.1.2 BSU Organization (FIG. 63) — The BSU includes the principal parts:

1.1.2.1 An IGAR file used principally for storing NAU control programs.

1.1.2.2 An Auto Answer Modem — used principally for off-system communication with network manager facilities (for network initialization and status/diagnostic reportage).

1.1.2.3 Printer (PTR) and Keyboard (KB) for manual (CE) I/O relative to the NAU.

1.1.2.4 Power Control for altering power distribution to the MAU's on a manual or automatic (program controlled) basis.

1.1.2.5 Base Support Control Unit — for controlling communication between BSU and the MAU's and between the Auto Answer Modem and the MAU's.

1.1.2.6 An RF Monitor for monitoring RF unit operation.

1.1.2.7 BSU/MAU Adaptor for signal interfacing between the BSU and the MCU sections of the MAU.

2.0 MULTIPLE ACCESS UNIT (MAU)

The MAU (FIG. 92) is a traffic controller. It receives MCU traffic from terrestrial links, buffers it and transmits it to the satellite. Traffic received from the satellite is buffered and transmitted over terrestrial links to MCU's. Note: Throughout this description it is understood that the MAU uses 16 bit parity except where noted otherwise. The MAU has two basic functions. They are:

To allow a number of interconnecting ground stations to share a communications satellite transponder. (This is known as multiple access.)

To permit users of satellite communications to signal the network of ground stations to assign satellite transponder resources.

The MAU (FIG. 92) is a program controlled multiplexer terminal for digital communications with two major system interfaces:

An R.F. interface for communication with the satellite.

A terrestrial interface for terrestrial communication with NCU's.

The MAU can send and receive signalling information on both interfaces (R.F. and terrestrial), coordinating its operations with other units operating in the system network. The MAU's assign satellite resources based on relative traffic volume. Assignment changes require at least a masterframe of time.

2.1 I.F. INTERFACE (MODULATOR/DEMODULATOR)

The MAU employs a Modulator/Demodulator (MODEM) 92-1/92-2 (FIG. 92) to convert digital signals within the MAU to 70 MHz analog signals at the MAU I.F. port (and vice versa). The Modem is divided into two basic parts shown in FIG. 64, the receive chain and the transmit chain.

2.1.1 Receive Chain (Coherent Demodulator)

The Coherent Demodulator (FIG. 64) is divided into two parts, the analog unit and the digital unit.

2.1.1.1 Carrier Recovery (Analog)

The Carrier Recovery unit (FIG. 64) develops a carrier reference from the down-link 70 MHz PSK modulated IF data stream. This reference implements the demodulation process in the Vector Selector. The developed reference carrier compensates for both Doppler induced and noise induced corruptions experienced on the link. The recovery process operates throughout the burst duration.

2.1.1.2 Bit Timing Recovery (Analog)

Figure 64:
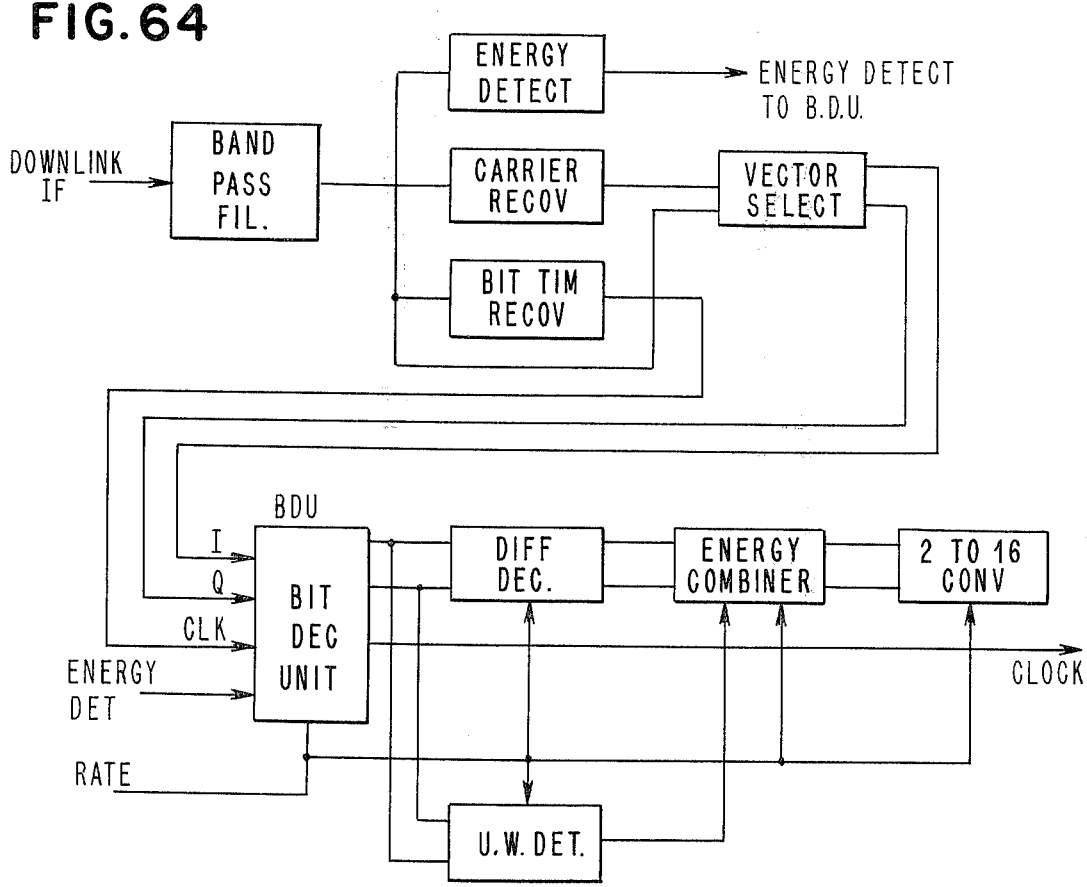
FIG. 64 indicates the NAU Receive Chain.

The Bit Timing Recovery (Bit Tim Recov) unit (FIG. 64) develops a clock used in the coherent demodulation process at the Bit Decision Unit (FIG. 64). The reference clock is developed by an envelope detection scheme that operates on the down-link IF waveform. The recovery process operates throughout the burst duration.

2.1.1.3 Energy Detector (Analog)

The Energy Detector unit indicates the presence of energy in the 36 MHz IF band centered on 70 MHz. It does not respond to noise in the band. If no energy is detected, the "I" and "Q" streams from the Bit Decision Unit are set equal to zero.

2.1.1.4 Vector Selector (Analog)

The Vector Selector unit performs a phase comparison between the downlink IF signal and the recovered carrier reference. It indicates continuously the quadrant in which the IF signal resides relative to the reference carrier. It is not a coherent demodulation process, since decisions are made at all time, not only at discrete symbol times.

2.1.1.5 Bit Decision Unit (Digital)

The Bit Decision unit BDU performs coherent demodulation by sampling the I and Q streams from the Vector Selector at times related to the recovered clock.

2.1.1.5 Differential Decoder (Digital)

The Differential Decoder performs a mapping which is the inverse of that provided in the transmit chain.

2.1.1.7 Energy Combiner (Digital)

The Energy Combiner recombines the baseband spectrum that was dispersed by the transmit chain's Energy Disperser.

2.1.1.8 UW Detector (Digital)

The UW Detector indicates the time of occurrence of specific bit patterns. (Unique Words)

2.1.1.9 2 to 16 + Parity (Digital)

The "2 to 16 + Parity" conversion unit groups the demodulated data at the output of the Energy Combiner into 16 bit bytes and attaches a 17th bit to the block to indicate parity. This unit is reset to its intial state by the detection of any of the Unique Words.

2.1.2 The Transmit Chain

The functions of the Transmit Chain are:
- to accept a 17 bit parallel data field.
- to check the data for parity.
- to disperse the baseband spectrum of the data.
- to convert the data format from 16 parallel data bits to 2 parallel data bith (I & Q streams).
- to process the I and Q bit streams for transmission at either 25 Mbps BPSK or 50 Mbps QPSK.
- to differentially encode the I and Q streams.
- to provide BPSK or QPSK modulation of a 70 Mhz carrier by the differentially encoded I and Q streams.
- to provide the IF signal to the RF unit at the appropriate power level, impedance level, and bandwidth occupancy.
- to provide the IF signal in the appropriate time slot relative to the satellite.

The Transmit Chain is driven by logic level signals developed within the MAU, and it drives the RF unit with an analog IF waveform.

The Transmit Chain is therefore structured into two main units: The Digital Section and the Analog Section which principally operate to perform the reverse of the Receive Chain process.

2.1.2.1 I.F. Modulator interface (FIG. 65) provides the IF carrier to the Transmit Chain. The interface parameters are:

The '24.707 MHz,' clock originating in the NAU, is the Transmit side clock. This clock is used by the traffic Buffer BOUT port; therefore, the data is frequency locked to the Symbol Clock. Regardless of the rate of the transmit chain (TC) the Symbol Clock nominally runs at 24.704 Mhz.

Burst Gate MOD

The Burst Gate MOD controls the generation of the I.F. signal. It is active 8 bit times after the first 16 bits of information of a burst, and initiates the digital logic to shift this data.

An internal logic network senses the change in state of the bit pattern from the pattern during the guard time to the pattern for carrier recovery. IF generation begins when "Burst Gate Mod" is active and this change has occurred. IF generation ceases as soon as Burst Gate Mod ceases to be active.

Half Rate to MOD

The rate of the transmit chain is determined by the state of the "Half Rate to Modulator" line. The Half Rate to Modulator can change states only on voice channel boundaries and only one change is allowed per burst. Multi-rate transmission within a burst is not permitted.

Bout Data Bus

Data from the Traffic Buffer BOUT port, is presented to the transmit chain in 16 bit parallel format. The data is loaded into the modulator input register.

Load MOD INREG

"Load MOD INREG", nominally one bit time wide, allows loading of the modulator input register and a parity check of the data.

24.704 MHz Clock

Disperse Enable

The baseband spectrum is dispersed (XORed with a pseudo random sequence) when "Disperse Enable" is active.

Transmit IF Enable

When "Transmit Enable" is active, PSK transmission may occur.

Digital Level Control Bus

"The Digital Level Cntrol Bus" is a six bit wide bus that specifies the amount, in Dbm, of RF signal needed to drive the RF unit.

70 MHz IF Out

The "70 MHz IF OUT" signal presents a modulated IF signal to the RF unit.

I and Q Signals

The I and Q are logic representations of the In-phase and Quadrature signals that drive the modulator.

Parity Check

The Parity Check is active for parity errors detected in the modulator.

UNMOD 70 MHz Carrier

The 70 MHz Carrier presents an unmodulated carrier for diagnostic use.

2.2 TERRESTRIAL INTERFACE

The Terrestrial Interface is composed of three basic parts.
- Terrestrial interconnect switch (TICSW)
- Terrestrial-in interconnect (INTIC)
- Terrestrial-out interconnect (OUTIC)

2.2.1 Terrestrial Interconnect Switch (TICSW)

The Terrestrial Interconnect Switch (FIGS. 66, 67) can logically replace a terrestrial line pair with another terrestrial line pair. This switching ability, under program control (via the TS Reg), provides line failure protection switching. The TICSW also provide bipolar-to-RZ (Return to Zero) conversion and terrestrial line clocking recovery. The switch provides a terrestrial wrap mode. The wrap mode allows an OUTIC to drive its INTIC counterpart directly for MAU diagnostics. The wrap mode is selected by the TS Reg indicating a "hex" 0 for the particular INTIC-OUTIC pair line number.

2.2.2 Terrestrial-in Interconnect (INTIC)

The INTICS (FIG. 68, 69) buffer data received at 1.544 Mb/sec from the terrestrial line. The INTICS are A/B buffered, with each half capable of holding one frame (6 milliseconds) of information. A/B buffering permits one half of an INTIC to receive data from a terrestrial line while the other half is being read out and loaded into the TIN Register. The functions of the two halves of the buffer are switched each TIN frame.

Each INTIC is polled 48 times during a frame. During each poll 12 read cycle requests are generated by the TIN port of the Traffic Buffer. These requests transfer 192 bits plus 12 parity bits to the Traffic Buffer. Each frame, 576 read cycles occur (48 × 12 = 576), transferring 48 TIN channels to the Traffic Buffer from each INTIC.

2.2.3 Terrestrial-out Interconnect (OUTICs)

Figure 70:
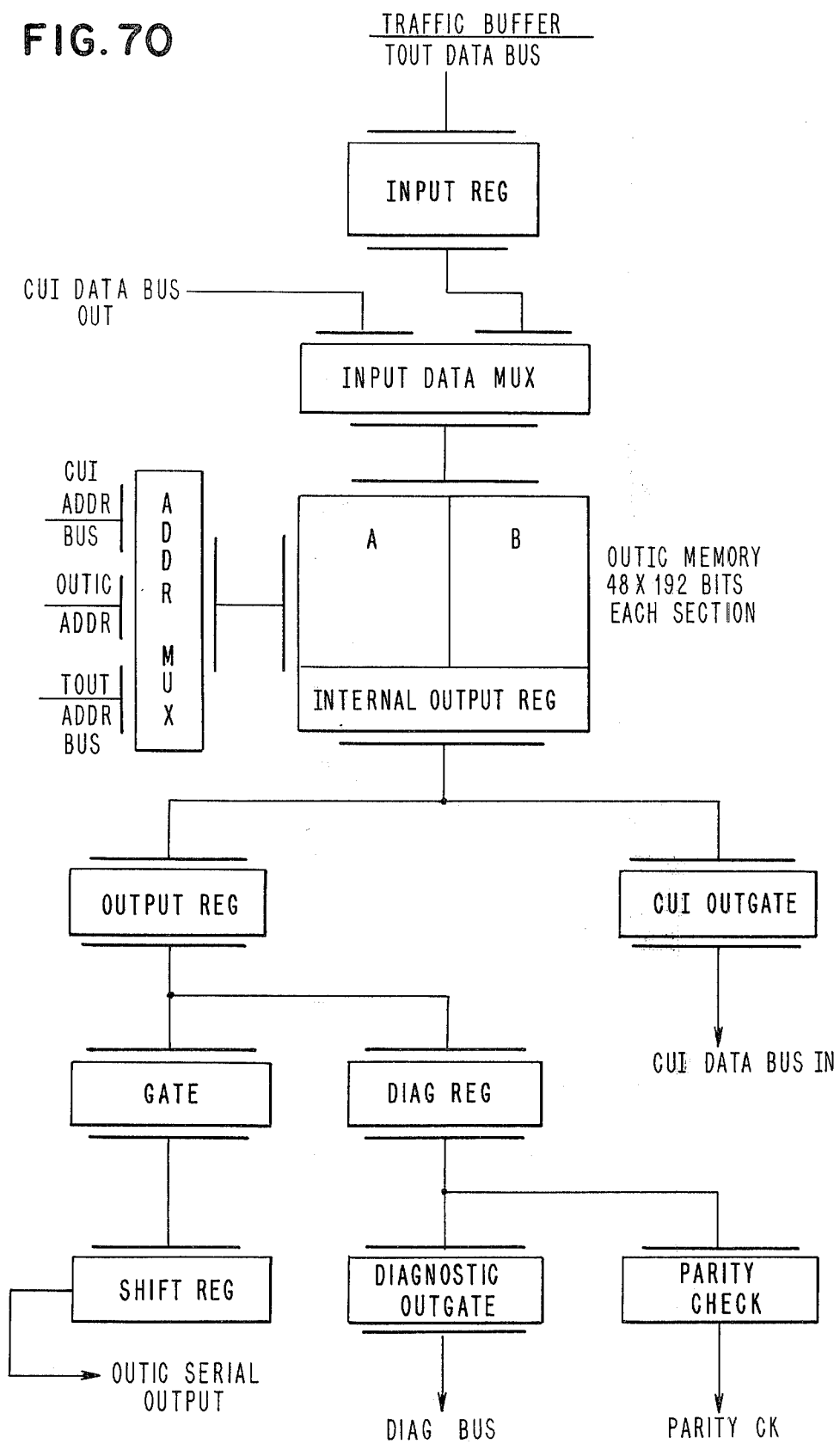
FIG. 70 indicates the OUTIC data flow.
Figure 71:
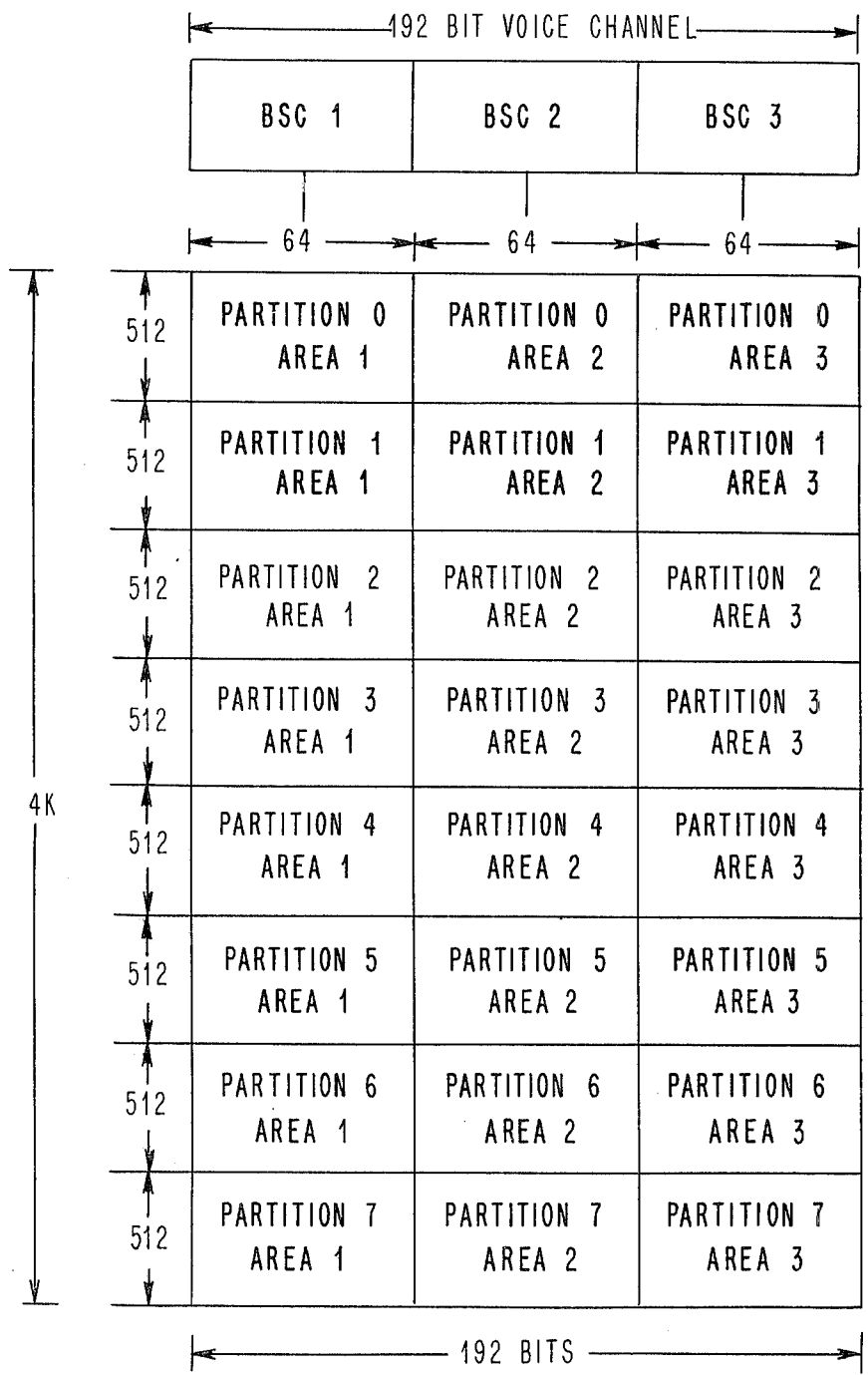
FIG. 71 indicates traffic buffer partitions.
Figure 72:
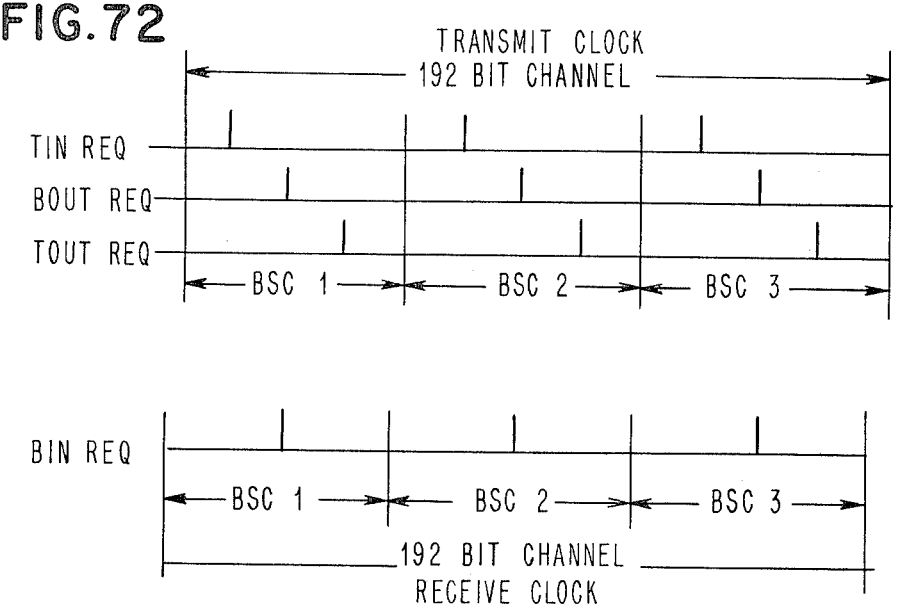

The OUTICs (FIG. 70) buffer data to be sent over the terrestrial lines. Each OUTIC sends traffic to a terrestrial line at a continuous rate of 1.544 Mb/sec. The OUTICs are A/B buffered with each half capable of holding one frame (6ms) of information. A/B buffering permits one-half of an OUTIC to send data to a terrestrial line while the other half of the OUTIC is being filled from the TOUT register. The function of the two halves are switched each TOUT frame. Each OUTIC is polled 48 times during a frame. For each poll, 12 write cycles are requested. Each request transfers 192 bits to the OUTIC. In each frame, 576 write cycles (12 write cycles × 48 polls) occur, transferring 48 TOUT channels to the OUTIC, from the Traffic Buffer.

2.3 TRAFFIC BUFFER

The Traffic Buffer (FIGS. 92, 71 and 79–81) handles all traffic into and out of the MAU. Four ports, 2 inbound (BIN, TIN), and 2 outbound (BOUT, TOUT), provide data paths in and out of the Traffic Buffer. The Traffic Buffer handles traffic in 64 bit words but traffic in the MAU generally is in 16 bit words. The ports perform the word size conversion (from 64 to 16 bits for read operations; from 16 to 64 bits for write operations). The Traffic Buffer includes a 4K × 192 bit random access solid state memory.

The Traffic Buffer Memory is divided into eight 512 word × 192 bit partitions. Five of the eight partitions provide space for BIN, TIN, BOUT, TOUT, and VAC Processing operations. The remaining three partitions are blank. Two clocks are used in the buffer, the receive side clock and the transmit side clock. The receive side clock provides clocking for the BIN partition and port; the transmit side clock provides clocking for TIN, TOUT, and BOUT partitions and ports and the VAC Processing partition. The two clocks are updated independently once each superframe. The three blank partitions are used on each side of the BIN partition, two on one side and one on the other. The blank partitions act as a time buffer between the partitions controlled by the two different clocks.

2.3.1 Partition Counters and Generators

Selection of Traffic Buffer partitions is by means of partitions generators or counters. BIN and BOUT partitions are selected by partition counters, while TIN, TOUT, and VAC Processing partitions are selected by partition generators.

The three partition generators are driven by the output of the Burst Transmit Partition Counter 92-7 (FIG. 92). Since TIN, TOUT, BOUT, and VAC Process increment simultaneously, and since the partition relationship between these functions is fixed, a single partition counter may be used for partition addressing these functions. Each generator is an adder, where one input contains the contents of the Burst Transmit Partition Counter and the other input contains a fixed offset. The offset represents the number of partitions that the particular function is offset from the Burst Transmit function in the Traffic Buffer. The sum of the Burst Transmit Partition Counter contents and the fixed offset is the partition address outputted by the partition generator.

2.3.1.1 Burst Transmit Partition Counter (BTPC)
the BTPC 92-7 indicates the Traffic Buffer partition which is to be used during the current servicing BOUT frame, for BOUT requests.

2.3.1.2 Burst Receive Partition Counter (BRPC)
the BRPC 92-8 indicates the Traffic Buffer partition to be used for servicing BIN requests during the current BIN frame.

2.3.1.3 Terrestrial-out Partition Generator (TOPG)
The TOPG 92-9 indicates the Traffic Buffer partition which is to be used for servicing TOUT requests during the current TOUT frame.

2.3.1.4 Terrestrial-in Partition Generator (TIPG)
The TIPG 92-10 indicates the Traffic Buffer partition which is to be used for servicing TIN requests during the current TIN frame.

2.3.1.5 VAC Processing Partition Generator (VPPG)
The VPPG 92-11 indicates the partition to be used during the current VP frame for down-link VAC processing (Re-VAC processor).

2.3.2 Traffic Buffer Ports

The Traffic Buffer has four ports: BIN, BOUT, TIN, and TOUT. Each port is designated an entry or an exit point between traffic and the Traffic Buffer. Each port is comprised of a 64 bit register and its associated controls. Individual ports generate three requests. All BOUT and TOUT port requests generate a Traffic Buffer read operation while BIN and TIN port requests generate a Traffic Buffer write operation.

The 64 bit port registers accomodate a 192 bit voice channel (VC) in three 64 bit buffer cycles (BSC), BSC1, 2, and 3. Each BSC corresponds to a particular port request, i.e., port request 1 coresponds to BSC1, etc. Three port requests are required to read or write a VC into or out of the Traffic Buffer. Each port request generates one memory (Traffic Buffer) cycle.

Two independent clocks provide the timing signals for the ports; the transmit side and the receive side clocks. The receive side clock is used by the BIN port only. TIN, TOUT, and BOUT are timed by the transmit side clock. BIN requests can occur earlier, later, or at the same time as any other request timed by the transmit side clock. A priority queue algorithm handles the possible contention between requests. It is as follows:

1. Service BIN, TIN, TOUT, BOUT, as they arrive, unless there is contention.
2. Service BIN first, and queue TIN BOUT and TOUT as necessary.

The ports buffer 64 bits and a BSC is 64 bits wide; therefore, the requests of a particular port are 64 bit times apart, i.e., TIN requests occur at bit time 16 in BSC1, at bit time 80 in BSC2 and at bit time 144 in BSC3. The port requests timed by the transmit clock are centered within each BSC, i.e., TIN, the first transmit clock port request, occurs 16 bit times after a boundary, TOUT, the last transmit clock port request, occurs 16 bit times before the next BSC boundary. BIN request is centered at bit time 32 as it is only request timed by the receive side clock. Centering gives each request the greatest amount of time in a BSC. Moving it within a BSC would result in one request being moved closer to a BSC boundary.

In the event a BIN request occurs at the same time as any other request, the BIN Request is given priority and the other request is queued. The length of time a request is queued varies, depending on the amount of time overlap between requests. The amount of time required to service a queued request is 220 ns, or 30 ns less than is required to service a non-queued request. The queued request is serviced as soon as the BIN request service is completed. (Time required for a non-queued request is 250 ns).

Figure 73:
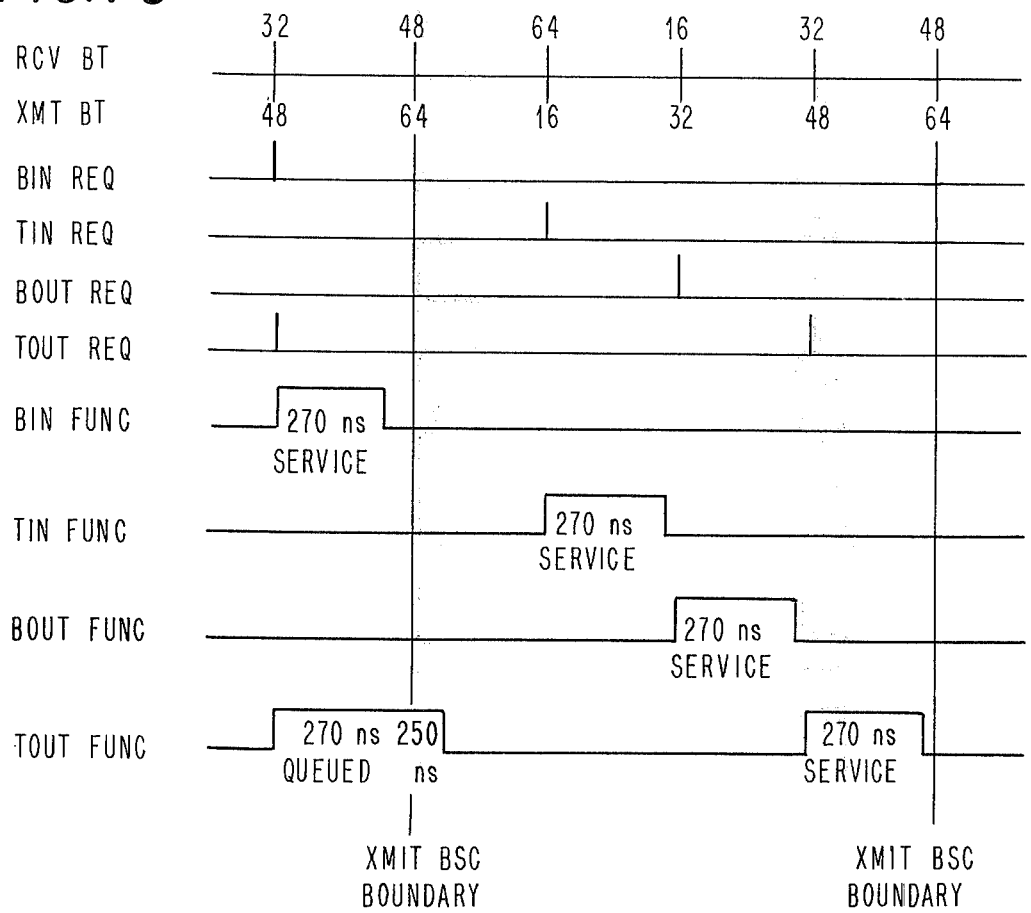

In FIG. 73 coincident TOUT and BIN Requests are handled as follows:
1. Queue TOUT Request for the length of time required to service BIN (BIN is serviced first as a result of the priority queue algorithm.)
2. Service BIN Request (270 ns are required to service a non-queued port request.)
3. Service Tout Request (250 ns is required to service a queued request. Notice the Tout service crosses a BSC Boundary and that the next TIN REQ may begin on time).

2.3.2.1 TIN Port

The TIN port consists of all the timing and information buffering required to form an interface between the Traffic Buffer and the TIN Data Bus. (The INTICS and BME are on the TIN Data Bus.)

2.3.2.1.1 TIN Data Bus and Register

The TIN Register 92-12 (FIG. 92) is an A/B buffered 64 bit register. It is loaded from the INTICs, 16 bits at a time. When 64 bits are assembled, the data is written into the Traffic Buffer via the Traffic Buffer storage data bus in.

2.3.2.2 BIN Port

The BIN Port consists of all the timing and information buffering required to form an interface between the Traffic Buffer and the BIN Data Bus.

2.3.2.2.1 BIN Data Bus and Register

The BIN Register 92-14 (FIG. 92) is an A/B buffered 64 bit register. It is loaded from the elastic buffer 16 bits at a time. When 64 bits are assembled, the data is written into the Traffic Buffer via the Traffic Buffer storage data bus in (SDBI).

2.3.2.3 TOUT Port

The TOUT Port consists of the timing (FIG. 74) and information buffering required to form an interface between the Traffic Buffer and the TOUT Data Bus. (The OUTICS and Buffered Message Decoder are connected to the TOUT Data Bus.)

2.3.2.3.1 TOUT Data Bus and Register

The TOUT Register 92-15 (FIG. 92) is an A/B buffered 64 bit register. It is loaded from the Traffic Buffer via the Traffic Buffer Storage Data Bus Out and is multiplexed out from the register to the OUTICS in 16 bit words.

2.3.2.3.2 TOUT Poll Generator

The TOUT Poll Generator provides an 8 position poll (FIG. 74) that advances one position per XMIT CLK VC. Only five of the eight polls are used (OUTICS 1-4 and the BMD). The poll cycles 384 times per frame (channels 0-383).

2.3.2.3.3 TOUT Address Bus

The TOUT Address Bus Generator is a 10 bit address generator which generates a Modulo 12 (4 bit) address which changes for each 16 bit transfer and a 6 bit Modulo 16 poll address which changes each poll pass (28.088 us).

2.3.2.3.4 TOUT Write Register

The TOUT Write Request occurs once for each 16 bit data transfer. The request directs the polled device to take a write cycle and store information on the TOUT Data Bus.

VAC Mask insertion on re-VAC (recompression) handling is through this interface.

2.3.2.4 BOUT Port

The BOUT Port consists of all the timing and information buffering required to form an interface between the Traffic Buffer and the BOUT Data Bus.

2.3.2.4.1 BOUT Data Bus and Register

The "BOUT Data Bus" provides a 16 bit path out of the BOUT port to the Modulator. The BOUT Register 92-16 is an A/B buffered 64 bit register. It is loaded from the Traffic Buffer via the Traffic Buffer Storage Data Bus Out and is multiplexed out to the Modulator Input Register in 16 bit words.

Figure 76:
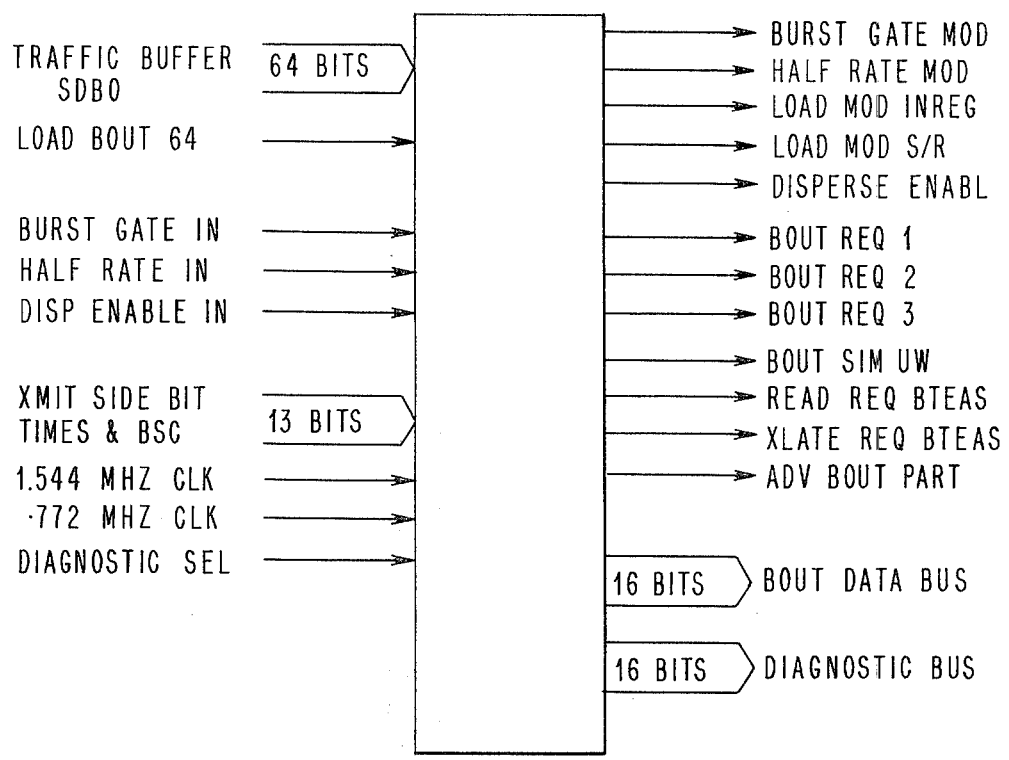
FIG. 76 indicates BOUT interface.

2.3.2.4.2 BOUT Interface Lines (FIG. 76)

Load 16 Bits to Modulator

The Modulator Input Register is loaded via the BOUT Data Bus when "Load 16 Bits to Modulator" is active. The line is active for one bit time.

Symbol Clock

The "Symbol Clock" (24.704 Mhz) is the transmit side clock. It originates in the transmit side NASU and is frequency locked to the BOUT Data Bus, but the phase relationship to the bus is arbitrary.

Burst Gate to Modulator

The "Burst Gate to Modulator" enables the serializer to shift at the Symbol Clock rate. The line may change only once per channel.

Load Modulator S/R (Shift Register)

"Load Modulator S/R" allows parallel loading of the Modulator S/R from the Modulator Input Register. Load Modulator S/R is active 8 symbol times later than the Load 16 bits to Modulator line and is active for only one bit time.

Half Rate to Modulator

"Half Rate to Modulator" changes the modulator rate from 49.408 Mb/sec QPSK to 24.704 Mb/sec BPSK.

Baseband Disperse Enable

"Baseband Disperse Enable," when active, allows the modulator to combine its serial output with a pseudorandom sequence to disperse the baseband spectrum.

Load 16 Bits to Modulator, Burst Gate to Modulator, Load Modulator S/R, Half Rate to Modulator, and need only be delayed for fine tuning at the Modulator.

Figure 77:
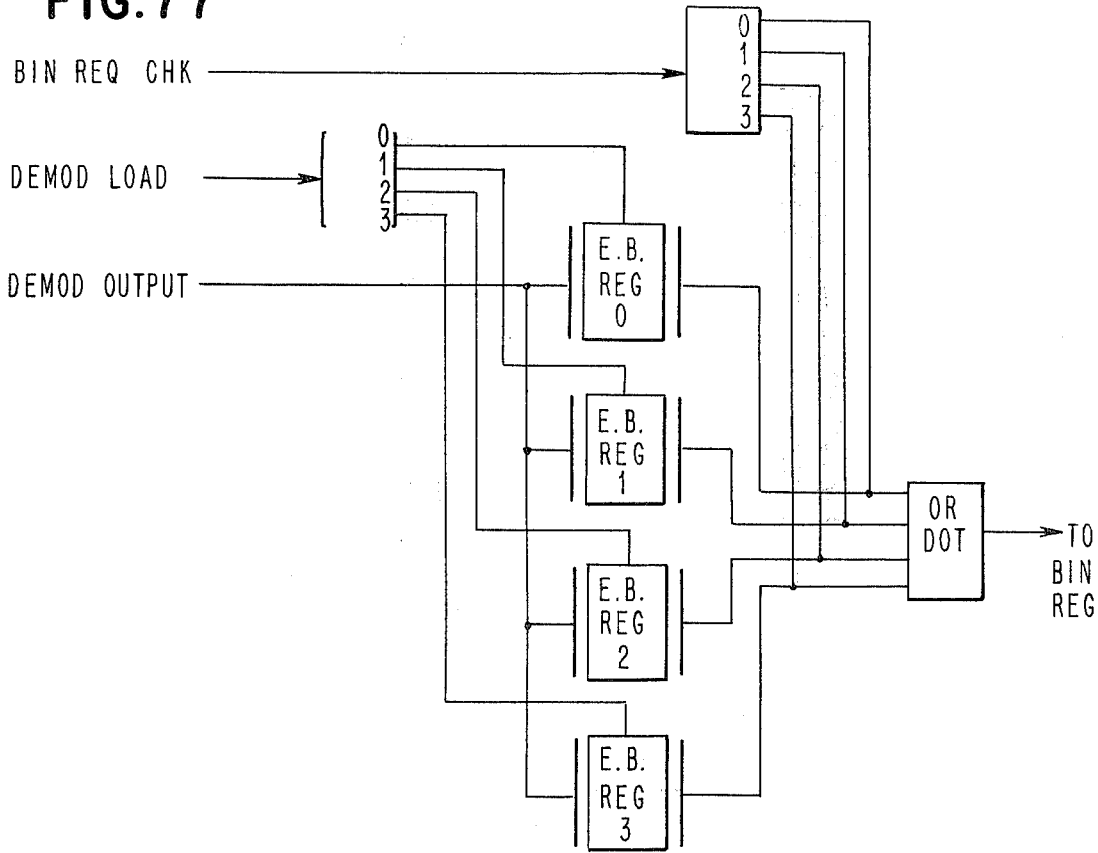
Figure 88A:
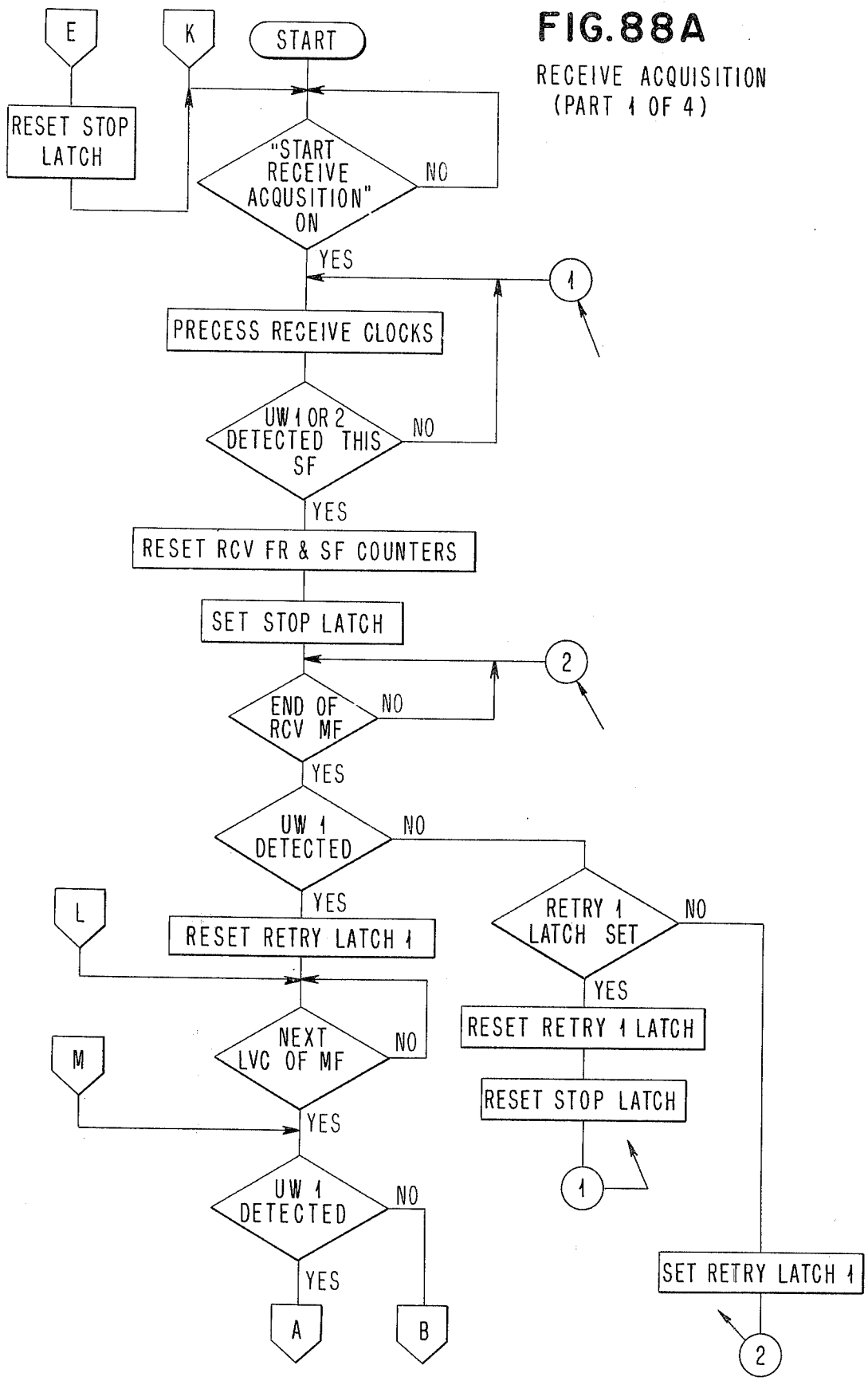
FIG. 88 (parts A, B, C and D) indicates receive acquisition.

2.3.2.5 Elastic Buffer (FIGS. 77, 78)

Received traffic passes through the elastic buffer on its way to the BIN port of the Traffic Buffer. Elastic buffer data is read and written by two separate clocks: the receiving station's downlink clock and the local receive side clock respectively. The downlink clock, recovered from the received burst, is not necessarily at the same frequency as the local receive side clock; therefore, the elastic buffer is necessary to absorb the short term (burst length) frequency differences (clock frequency differences). VAC information in the received signal is separated out at the Elastic Buffer interface.

The elastic buffer consists of 4 registers (0–3). On each 'Unique Word Detect' the elastic buffer counters are initialized. One counter controls which elastic buffer register is loaded from the receive chain and the other counter controls which elastic buffer register is to be read out of the buffer into BIN Register. The counters are initially set to zero for input and two for output (i.e., initially, traffic is loaded into register 0 and read out of register 2, the next cycle traffic is loaded into register 1 and read out of register 3, etc.). The input counter is advanced by the downlink clock and the output counter is advanced by the receive side clock. Since they are not frequency locked, the advancing of the two counters is not synchronous. As long as the two counters are not equal, the elastic buffer is absorbing the frequency differences. The buffer can absorb approximately ±16 bit times of clock difference (jitter, short term differential doppler, and clock frequency differences).

2.3.2.6 Traffic Buffer Interface Lines

2.3.3 Sequencers

All sequencers 92–17.1, .2, .3, .4, .5 (event and address translation tables) in the MAU have certain basic characteristics which are similar. They:
- are A/B buffered
- are read/written by the CUI
- gate their outputs onto the Diagnostic Bus
- take internal MAU read memory cycles in response to a "Read RegXXX"
- have time synchronous outputs which are loaded at the time 'XLATE RegXXX' occurs
- check parity at their outputs and generate a 'Sequencer Parity Check' when errors occur
- generate a 'Sequence Swap Error' if the A/B swap occurs during a CUI read/write cycle

2.3.3.1 A/B Buffering

All the sequencers are A/B buffered and, except for the TOAS, swap every superframe. The superframe swap time depends upon the function in question, i.e., BTEAS and BRAS do not swap on the same superframe boundary. See specific sequencers for the exact superframe swap time definitions.

The TOAS swaps every TOUT frame as a result of a Re-Vac processing. Since the activity (see Re-Vac Processor) changes every frame, it is necessary to change the table each frame.

2.3.3.2 Sequencer Updating

Every sequencer responds to the following CUI commands.
"−CUI Select XXX Seq"
"−CUI Read Reg"
"−CUI Write Req"

For all but TOAS, the normal mode is for one sequencer half to be translating addresses or generating events for MAU functions, while the other half is being read or written by the CUI. Normally, the TOAS is updated by the Re-Vac Processor, not the CUI; however, when "−Direct Access" bit is active, all sequencers remove their A/B boundary and allow the CUI direct access to the entire sequencer. TOAS may be read/written by the CUI only by using Direct Access. It is still necessary to have a −CUI Select XXX Seq in conjunction with the −Direct Access line. The sequencers gate their internal memory register outputs onto the CUI Data-Bus-In, in response to a −CUI Select XXX Seq and will also perform a read or write accordingly.

2.3.3.3 Basic Sequencer Interface (FIG. 83)

Diagnostic Select XXX Seq
When "−DIAG Select XXX Seq" is active, the addressed sequencer will gate its time synchronous output the DIAG Data Bus.
Read Reg XXX
When "+Read Request XXX" occurs, the addressed sequencer will take a read memory cycle at the address on the Special Address Bus. The data will be loaded into the primary register at this time. +Read Reg XXX is one bit time wide.
XLATE Reg XXX
When "+XLATE Reg XXX" occurs the addressed sequencers will load the secondary register (time synchronous register) with the contents of the primary register. +XLATE Reg XXX is one bit time wide.
Sequencer XXX Parity Check
All sequencers generate a "+Sequencer XXX Parity Check" when even parity is detected in the primary register at +XLATE Reg time. This tests for parity errors at a specific time as the contents of the secondary register are being updated. The parity check is positive and one bit time wide.
Sequencer XXX Swap Error
All sequencers generate a "+Sequencer XXX Swap Error" whenever the −CUI Select XXX Seq is active and the A/B swap occurs. The error is positive and one bit time wide.
Notes:
1. The "XXX" refers to a specific sequencer (BTEAS 92-17.1, BRAS 92-17.4, BRES 92-17.5, TOAS 92-17.3, and VPAS 92-17.2).
2. Some sequencers have special outputs which are a result of comparing their outputs with some special function "YYY." See specific sequencer for details.

2.3.3.4 BRES Interface Lines (FIG. 84)

Local Station Coming
"−Local Station Coming" is a result of comparing the RCV side frame counter with the 1st byte of the ID Register. When they match, the line is active. −Local Station Coming is one frame wide.
Reference Station Coming
"−Reference Station Coming" is a result of comparing the RCV side frame counter with the 2nd byte of the ID Register. When they match, the line is active. −Reference Station Coming is one frame wide.
NOTE:
These two functions really do not have anything to do with the BRES directly, but their function resides there physically.
Virtual Channel
"−Virtual Channel" occurs whenever BRES translates a downlink channel, which is the result of the VAC process, whose identity can only be found by decoding the downlink VAC mask.
VAC Mask Channel
"−VAC Mask Channel" occurs whenever BRES translates a downlink channel which is a VAC. This allows the De-VAC processor to strip the VAC mask off and decode it so that subsequent channels may be recognized.

Real Channel

"—Real Channel" occurs whenever BRES translates a downlink channel which is real, its identity is absolute and is not a result of a VAC function.

BIN Port Enable

"—BIN Port Enable" occurs on the first downlink channel after the end of the preamble of a received burst and stays active until the last downlink channel of that received burst.

BIN Half Rate

"—BIN Half Rate" occurs for all downlink channels that are at half rate. If the UW and preamble are at half rate, then they must be included in the channels that are "half-rate." The —BIN Half Rate must change state one channel earlier than the channel(s) of interest except for the preamble. For the preamble it changes state at the beginning of that channel.

RCV Event Code

"RCV Event Code," these (3) three bits supply the RCLC with the code necessary for it to generate its apertures and strobes. (See RCLC for codes.)

2.3.3.5 TOUT Address Sequencer (TOAS)

TOAS 92-17.3 is a 4K × 16 bit storage, used to provide Traffic Buffer addresses for traffic to be sent out to the OUTICS via the TOUT port. THE A/B swap occurs once each TOUT frame.

2.3.3.6 Burst Receive Address Sequencer (BRAS)

The Burst Receive Address Sequencer (8K × 32) provides traffic buffer addresses for traffic as it is received downlink.

2.3.3.7 VAC Process Address Sequencer (VPAS)

VPAS (FIG. 85) contains all possible Traffic Buffer Storage addresses which might be included on a particular terrestrial line. VPAS provides the RE-Vac Processor 92-18 with the Activity Buffer locations to be processed. The processing reduces these addresses into a subset of addresses which meet the Re-VAC criterion and as a result maps these addresses into the TOAS.

2.5 NETWORK ACQUISITION AND SYNCHRONIZATION UNIT (NASU)

The NASU 92-20 (FIG. 92) has three basic functions:

To provide receive and transmit clocks.
To provide the intelligence to acquire, maintain and synchronize the network.
To provide all clocking for the MAU.

The NASU generates all the clocks for the MAU. The NASU is divided into two functional parts, the Receive Clock and the Transmit Clock. Both the Transmit and Receive Clocks contain the following:

| Bit Counter | 8 bits | 0-8F or 0-11F |
|---|---|---|
| VC Counter | 11 bits | 0-607 |
| Frame Counter | 6 bits | 0-3C |
| Superframe Counter | 4 bits | 0-8 |
| Bit Time (BT) Generator | | |
| Phase Adjuster | | |

The Receive Clock also contains:
 Unique Work Front End
 Clock Offset Match
 Receive Acquisition
 RCLC The Transmit Clock also contains:
 CE Sync Clock Match
 Diagnostic Clock Match
 Clock Controls (for both Transmit and Receive)
 System Reset
 Transmit Acquisition The basic clock generations are shown in FIGS. 86 and 87, and are as follows:

The phase corrected 49.408 MHz clock (discussed under phase adjusters) is divided by 2, to 24.704 MHz and then the symmetry is corrected. The symmetrical 24.704 MHz clock is further divided by an eight bit counter (BIT COUNTER). When not in acquisition the bit count, and therefore the time base, is not precessing, and the 24.704 MHz clock is divided by 192 (X'BF'). When precessing, during acquisition, the 24.704 MHz clock is divided by 288 (X'11F'). These additional 96 bit times, in effect, stop the local time base and allow real time to continue, causing a time shift of 96 bit times. The precession rate during acquisition is 96 BT per superframe or about 5.714 us per second.

Receive Acquisition procedure is given in FIGS. 88A–88D and Transmit Acquisition procedure is given in FIGS. 89A–89C.

The 8 bit BIT COUNTER Provides the Bit Decoder with its inputs as well as providing clocks from 24.704 MHz to 0.193 MHz to the rest of the MAU.

The Bit Decoder is comprised of two decoders, a modulo 64 decoder which generates the bit times, and a modulo 3 decoder which generates the Buffer Sub-cycles.

$$1 BT = \frac{1}{49.408 \text{ MHz}} = 20.2 \text{ ns}$$

For the purposes of this description a bit time is rounded to 20 ns. Pulses are available from the Bit Decoder at Bit times 4, 12, 16, 28, 32, 36, 44, 48, 52, and 60. The modulo 3 decoder generates the 3 Buffer Sub-cycles, each 64 bit times wide, or 1.208 us.

The Bit Decoder provides all the clocking for the Traffic Buffer ports. Each 192 BT the bit counter carries and the VC counter is advanced.

$$1 \text{ VC} = 192 \text{ BT} = 3.886 \text{ us}$$

After 1544 Virtual C channels, the VC counter carries and the frame counter is incremented.

$$1 \text{ Frame} = 1544 \text{ VC} = 6 \text{ ms}$$

When 56 frames have occurred the frame counter carries and the superframe (SF) counter is incremented. Masterframe (MF) are related to superframe by:

$$1 \text{ MF} = 9 \text{ SF} = 3.024 \text{ seconds}$$

In review:
 1 MF = 9 SF = 504 FR = 778,176 VC = 149,409,792 bits and 149,409,792 bits each 3.024 seconds = 49.408 Mb/sec. 149,409,792 bits/3.024 sec = 49.408 Mb/sec.

2.5 MAU Registers

The MAU has 26 16-bit registers (17 control registers and 9 status registers).

2.5.1. MAU Status Registers

The status registers (FIG. 90) are program read only registers and will, therefore, only accept "Select Register" from the CUI. When the select is present, the register will gate the data onto the CUI Data Bus In. The active state for the status register bits is plus for logical one.

2.5.1.1 MAU Status Register Bit Assignments

| Bit No. | I REG<br>Bit Name |
|---|---|
| 0 | MF Boundary |
| 1 | SF Boundary |
| 2 | Frame Boundary |
| 3 | Forced EOC in CUI |
| 4 | Rcv not 6 to 1 |
| 5 | Rcv No MF or SF Uw |
| 6 | Xmit not Sunk |
| 7 | Wide Aperture Request |
| 8 | Ter. Line 1 out of Sync |
| 9 | Ter. Line 2 out of Sync |
| 10 | Ter. Line 3 out of Sync |
| 11 | Ter. Line 4 out of Sync |
| 12 | Error Still On |
| 13 | Offset Out of Limits |
| 14 | Offset Not Complete |
| 15 | Partitioning No Comp. |

| Bit No. | E REG 1<br>Bit Name |
|---|---|
| 0 | Partitioning Error |
| 1 | Actv Buff Parity Ck |
| 2 | BME Parity Ck |
| 3 | BMD Parity Ck |
| 4 | VPAS Parity Ck |
| 5 | TOAS Parity Ck |
| 6 | BTEAS Parity Ck |
| 7 | BRES Parity Ck |
| 8 | BRAS Parity Ck |
| 9 | Elastic Buf Parity Ck |
| 10 | BOUT Bus Parity Ck |
| 11 | TOUT Bus Parity Ck |
| 12 | EB Timing Error |
| 13 | RCV Burst Lost |
| 14 | XMIT Burst Cw |
| 15 | Spare |

| Bit No. | E REG 2<br>Bit Name |
|---|---|
| 0 | Ter Line 1 In Par Ck |
| 1 | Ter Line 2 In Par Ck |
| 2 | Ter Line 3 In Par Ck |
| 3 | Ter Line 4 In Par Ck |
| 4 | Ter Line 1 Out Par Ck |
| 5 | Ter Line 2 Out Par Ck |
| 6 | Ter Line 3 Out Par Ck |
| 7 | Ter Line 4 Out Par Ck |
| 8 | BRAS Swap Error |
| 9 | BTEAS Swap Error |
| 10 | VPAS Swap Error |
| 11 | BRES Swap Error |
| 12 | Diagnostic Comp Error |
| 13 | Diagnostic Parity Er |
| 14 | Spare |
| 15 | Spare |

| Bit No. | ET REG 1<br>Bit Name |
|---|---|
| 0 | SF Cntr Bit 0 |
| 1 | SF Cntr Bit 1 |
| 2 | SF Cntr Bit 2 |
| 3 | SF Cntr Bit 3 |
| 4 | Not Used |
| 5 | Not Used |
| 6 | Frame Cntr Bit 0 |
| 7 | Frame Cntr Bit 1 |
| 8 | Frame Cntr Bit 2 |
| 9 | Frame Cntr Bit 3 |
| 10 | Frame Cntr Bit 4 |
| 11 | Frame Cntr Bit 5 |
| 12 | Not Used |
| 13 | VC Cntr Bit 0 |
| 14 | VC Cntr Bit 1 |
| 15 | VC Cntr Bit 2 |

| Bit No. | ER REG 2<br>Bit Name |
|---|---|
| 0 | VC Cntr Bit 3 |
| 1 | VC Cntr Bit 4 |
| 2 | VC Cntr Bit 5 |
| 3 | VC Cntr Bit 6 |
| 4 | VC Cntr Bit 7 |
| 5 | VC Cntr Bit 8 |
| 6 | VC Cntr Bit 9 |
| 7 | VC Cntr Bit 10 |
| 8 | Bit Cntr Bit 0 |
| 9 | Bit Cntr Bit 1 |
| 10 | Bit Cntr Bit 2 |
| 11 | Bit Cntr Bit 3 |
| 12 | Bit Cntr Bit 4 |
| 13 | Bit Cntr Bit 5 |
| 14 | Bit Cntr Bit 6 |
| 15 | Bit Cntr Bit 7 |

| Bit No. | MO REG 1<br>Bit Name |
|---|---|
| 0 | SF Cntr Bit 0 |
| 1 | SF Cntr Bit 1 |
| 2 | SF Cntr Bit 2 |
| 3 | SF Cntr Bit 3 |
| 4 | Not Used |
| 5 | Not Used |
| 6 | Frame Cntr Bit 0 |
| 7 | Frame Cntr Bit 1 |
| 8 | Frame Cntr Bit 2 |
| 9 | Frame Cntr Bit 3 |
| 10 | Frame Cntr Bit 4 |
| 11 | Frame Cntr Bit 5 |
| 12 | Not Used |
| 13 | VC Cntr Bit 0 |
| 14 | VC Cntr Bit 1 |
| 15 | VC Cntr Bit 2 |

| Bit No. | MS REG<br>Bit Name |
|---|---|
| 0 | RCV Diag Intr Occurred |
| 1 | XMIT Diag Intr Occurred |
| 2 | DIAG Compare Error |
| 3 | DIAG Parity Error |
| 4 | Spare |
| 5 | Spare |
| 6 | Check Ereg 1 |
| 7 | Check Ereg2 |
| 8 | SM Chan A Trapped |
| 8 | SM Chan B Trapped |
| 10 | BIN P Code Bit 0 |
| 11 | BIN P Code Bit 1 |
| 12 | BIN P Code Bit 2 |
| 13 | BOUT P Code Bit 0 |
| 14 | BOUT P Code Bit 1 |
| 15 | BOUT P Code Bit 2 |

2.5.2 MAU Control Registers

The control registers (FIG. 91) are both program readable and writable. A control line —Select Register from the CUI must gate each control register read and write operation. A second gate, —CUI Write, is required to write the data from the CUI into the register. The active state of any control register bit is minus. That is to say that a function, i.e., "Start Acquisition" is active (will start the acquisition) when the bit is minus. The registers are reset to a positive state by a general "Power On Reset" or by "System Reset." The outputs of the control registers are gated onto the CUI Data Bus when —Select Register is present. These gated outputs are plus when they are active.

2.5.2.1 Control Registers

| Bit No. | MC REG<br>Bit Name |
|---|---|
| 0 | Start RCV Aquisition |
| 1 | Start XMIT Aquisition |
| 2 | Define New Offset |
| 3 | Force Offset |

-continued

| | |
|---|---|
| 4 | Partition Traffic Buffer |
| 5 | Reference Station |
| 6 | Wide Offset Limit |
| 7 | Spare |
| 8 | Spare |
| 9 | Spare |
| 10 | Spare |
| 11 | Spare |
| 12 | Start Clock |
| 13 | Enable Xmit |
| 14 | Spare |
| 15 | System Reset |

CC REG

| Bit No. | Bit Name |
|---|---|
| 0 | Sync Clocks |
| 1 | Reset Clocks |
| 2 | Enable RCV CLK |
| 3 | Enable XMIT CLK |
| 4 | Enable RCV Dia IRPT |
| 5 | Enable XMIT Diag IRPT |
| 6 | Spare |
| 7 | Stop/IRPT On Any Error |
| 8 | Stop/IRPT On Diag Error |
| 9 | Stop/IRPT On Diag Match |
| 10 | Stop/IRPT On CLK Match |
| 11 | Enable Single Cycle |
| 12 | Stop Mode Bit 0 |
| 13 | Stop Mode Bit 1 |
| 14 | Single CY Mode Bit 0 |
| 15 | Single CY Mode Bit 1 |

TC REG

| Bit No. | Bit Name |
|---|---|
| 0 | Acquire SYNC TIN 1 |
| 1 | Acquire SYNC TIN 2 |
| 2 | Acquire SYNC TIN 3 |
| 3 | Acquire SYNC TIN 4 |
| 4 | Allow TIN Traffic 1 |
| 5 | Allow TIN Traffic 2 |
| 6 | Allow TIN Traffic 3 |
| 7 | Allow TIN Traffic 4 |
| 8 | Allow TOUT Traffic 1 |
| 9 | Allow TOUT Traffic 2 |
| 10 | Allow TOUT Traffic 3 |
| 11 | Allow TOUT Traffic 4 |
| 12 | Spare |
| 13 | Spare |
| 14 | Spare |
| 15 | Spare |

AC REG

| Bit No. | Bit Name |
|---|---|
| 0 | Direct Access Mode |
| 1 | Enable TIN to TB |
| 2 | Enable TOUT from TB |
| 3 | Enable Diag Trap |
| 4 | Enable Diag Parity Error |
| 5 | Enable Diag Compare Error |
| 6 | Modem Wrap Bit 0 |
| 7 | Modem Wrap Bit 1 |
| 8 | Modem Wrap Bit 2 |
| 9 | Not Used |
| 10 | Diag Addr Bit 0 |
| 11 | Diag Addr Bit 1 |
| 12 | Diag Addr Bit 2 |
| 13 | Diag Addr Bit 3 |
| 14 | Diag Addr Bit 4 |
| 15 | Diag Addr Bit 5 |

ID REG-Cont

| Bit No. | Bit Name |
|---|---|
| 0 | Not Used |
| 1 | Not Used |
| 2 | Local STA ID Bit 0 |
| 3 | Local STA ID Bit 1 |
| 4 | Local STA ID Bit 2 |
| 5 | Local STA ID Bit 3 |
| 6 | Local STA ID Bit 4 |
| 7 | Local STA ID Bit 5 |
| 8 | Not Used |
| 9 | Not Used |
| 10 | REF STA ID Bit 0 |
| 11 | REF STA ID Bit 1 |
| 12 | REF STA ID Bit 2 |
| 13 | REF STA ID Bit 3 |
| 14 | REF STA ID Bit 4 |
| 15 | REF STA ID Bit 5 |

TS REG

-continued

| Bit No. | Bit Name |
|---|---|
| 0 | TIC 1 Line Nos Bit 0 |
| 1 | TIC 1 Line Nos Bit 1 |
| 2 | TIC 1 Line Nos Bit 2 |
| 3 | TIC 1 Line Nos Bit 3 |
| 4 | TIC 2 Line Nos Bit 0 |
| 5 | TIC 2 Line Nos Bit 1 |
| 6 | TIC 2 Line Nos Bit 2 |
| 7 | TIC 2 Line Nos Bit 3 |
| 8 | TIC 3 Line Nos Bit 0 |
| 9 | TIC 3 Line Nos Bit 1 |
| 10 | TIC 3 Line Nos Bit 2 |
| 11 | TIC 3 Line Nos Bit 3 |
| 12 | TIC 4 Line Nos Bit 0 |
| 13 | TIC 4 Line Nos Bit 1 |
| 14 | TIC 4 Line Nos Bit 2 |
| 15 | TIC 4 Line Nos Bit 3 |

FO REG 1

| Bit No. | Bit Name |
|---|---|
| 0 | SF Cntr Bit 0 |
| 1 | SF Cntr Bit 1 |
| 2 | SF Cntr Bit 2 |
| 3 | SF Cntr Bit 3 |
| 4 | Not Used |
| 5 | Not Used |
| 6 | Frame Bit 0 |
| 7 | Frame Bit 1 |
| 8 | Frame Bit 2 |
| 9 | Frame Bit 3 |
| 10 | Frame Bit 4 |
| 11 | Frame Bit 5 |
| 12 | Not used |
| 13 | VC Bit 0 |
| 14 | VC Bit 1 |
| 15 | VC Bit 2 |

FO REG

| Bit No. | Bit Name |
|---|---|
| 0 | VC Cntr Bit 3 |
| 1 | VC Cntr Bit 4 |
| 2 | VC Cntr Bit 5 |
| 3 | VC Cntr Bit 6 |
| 4 | VC Cntr Bit 7 |
| 5 | VC Cntr Bit 8 |
| 6 | VC Cntr Bit 9 |
| 7 | VC Cntr Bit 10 |
| 8 | Bit Cntr Bit 0 |
| 9 | Bit Cntr Bit 1 |
| 10 | Bit Cntr Bit 2 |
| 11 | Bit Cntr Bit 3 |
| 12 | Bit Cntr Bit 4 |
| 13 | Bit Cntr Bit 5 |
| 14 | Bit Cntr Bit 6 |
| 15 | Bit Cntr Bit 7 |

DT Reg 1

| Bit No. | Bit Name |
|---|---|
| 0 | SF Bit 0 |
| 1 | SF Bit 1 |
| 2 | SF Bit 2 |
| 3 | SF Bit 3 |
| 4 | Not Used |
| 5 | Not Used |
| 6 | Frame Bit 0 |
| 7 | Frame Bit 1 |
| 8 | Frame Bit 2 |
| 9 | Frame Bit 3 |
| 10 | Frame Bit 4 |
| 11 | Frame Bit 5 |
| 12 | Not Used |
| 13 | VC Bit 0 |
| 14 | VC Bit 1 |
| 15 | VC Bit 2 |

DT REG 2

| Bit No. | Bit Name |
|---|---|
| 0 | VC Cntr Bit 3 |
| 1 | VC Cntr Bit 4 |
| 2 | VC Cntr Bit 5 |
| 3 | VC Cntr Bit 6 |
| 4 | VC Cntr Bit 7 |
| 5 | VC Cntr Bit 8 |
| 6 | VC Cntr Bit 9 |
| 7 | VC Cntr Bit 10 |
| 8 | Bit Cntr Bit 0 |
| 9 | Bit Cntr Bit 1 |
| 10 | Bit Cntr Bit 2 |
| 11 | Bit Cntr Bit 3 |

-continued

| Bit No. | Bit Name |
|---|---|
| 12 | Bit Cntr Bit 4 |
| 13 | Bit Cntr Bit 5 |
| 14 | Bit Cntr Bit 6 |
| 15 | Bit Cntr Bit 7 |

CM REG 1

| Bit No. | Bit Name |
|---|---|
| 0 | SR Cntr Bit 0 |
| 1 | SF Cntr Bit 1 |
| 2 | SF Cntr Bit 2 |
| 3 | SF Cntr Bit 3 |
| 4 | Not Used |
| 5 | Not Used |
| 6 | Frame Cntr Bit 0 |
| 7 | Frame Cntr Bit 1 |
| 8 | Frame Cntr Bit 2 |
| 9 | Frame Cntr Bit 3 |
| 10 | Frame Cntr Bit 4 |
| 11 | Frame Cntr Bit 5 |
| 12 | Not Used |
| 13 | VC Cntr Bit 0 |
| 14 | VC Cntr Bit 1 |
| 15 | VC Cntr Bit 2 |

CM REG 2

| Bit No. | Bit Name |
|---|---|
| 0 | VC Cntr Bit 3 |
| 1 | VC Cntr Bit 4 |
| 2 | VC Cntr Bit 5 |
| 3 | VC Cntr Bit 6 |
| 4 | VC Cntr Bit 7 |
| 5 | VC Cntr Bit 8 |
| 6 | VC Cntr Bit 9 |
| 7 | VC Cntr Bit 10 |
| 8 | Bit Cntr Bit 0 |
| 9 | Bit Cntr Bit 1 |
| 10 | Bit Cntr Bit 2 |
| 11 | Bit Cntr Bit 3 |
| 12 | Bit Cntr Bit 4 |
| 13 | Bit Cntr Bit 5 |
| 14 | Bit Cntr Bit 6 |
| 15 | Bit Cntr Bit 7 |

DC REG

| Bit No. | Bit Name |
|---|---|
| 0 | Diagnostic Compare Bit 0 |
| 1 | Diagnostic Compare Bit 1 |
| 2 | Diagnostic Compare Bit 2 |
| 3 | Diagnostic Compare Bit 3 |
| 4 | Diagnostic Compare Bit 4 |
| 5 | Diagnostic Compare Bit 5 |
| 6 | Diagnostic Compare Bit 6 |
| 7 | Diagnostic Compare Bit 7 |
| 8 | Diagnostic Compare Bit 8 |
| 9 | Diagnostic Compare Bit 9 |
| 10 | Diagnostic Compare Bit 10 |
| 11 | Diagnostic Compare Bit 11 |
| 12 | Diagnostic Compare Bit 12 |
| 13 | Diagnostic Compare Bit 13 |
| 14 | Diagnostic Compare Bit 14 |
| 15 | Diagnostic Compare Bit 14 |

SM REG

| Bit No. | Bit Name |
|---|---|
| 0 | Not Used |
| 1 | Not Used |
| 2 | SM Chan A Address Bit 0 |
| 3 | SM Chan A Address Bit 1 |
| 4 | SM Chan A Address Bit 2 |
| 5 | SM Chan A Address Bit 3 |
| 6 | SM Chan A Address Bit 4 |
| 7 | SM Chan A Address Bit 5 |
| 8 | Not Used |
| 9 | Not Used |
| 10 | SM Chan B Address Bit 0 |
| 11 | SM Chan B Address Bit 1 |
| 12 | SM Chan B Address Bit 2 |
| 13 | SM Chan B Address Bit 3 |
| 14 | SM Chan B Address Bit 4 |
| 15 | SM Chan B Address Bit 5 |

UW REG 1

| Bit No. | Bit Name |
|---|---|
| 0 | UW 1 Or 2 Bit 0 |
| 1 | UW 1 Or 2 Bit 1 |
| 2 | UW 1 Or 2 Bit 2 |
| 3 | UW 1 Or 2 Bit 3 |
| 4 | UW 1 Or 2 Bit 4 |
| 5 | UW 1 Or 2 Bit 5 |
| 6 | UW 1 Or 2 Bit 6 |
| 7 | UW 1 Or 2 Bit 7 |
| 8 | UW 1 Or 2 Bit 8 |
| 9 | UW 1 Or 2 Bit 9 |
| 10 | UW 1 Or 2 Bit 10 |
| 11 | UW 1 Or 2 Bit 11 |
| 12 | UW 1 Or 2 Bit 12 |
| 13 | UW 1 Or 2 Bit 13 |
| 14 | UW 1 Or 2 Bit 14 |
| 15 | UW 1 Or 2 Bit 15 |

UW REG 2

| Bit No. | Bit Name |
|---|---|
| 1 | UW 1 Or 2 Bit 17 |
| 2 | UW 1 OR 2 Bit 18 |
| 3 | UW 1 Or 2 Bit 19 |
| 4 | UW 1 Or 2 Bit 20 |
| 5 | UW 1 Or 2 Bit 21 |
| 6 | UW 1 Or 2 Bit 22 |
| 7 | UW 1 Or 2 Bit 23 |
| 8 | UW 1 Or 2 Bit 24 |
| 9 | UW 1 Or 2 Bit 25 |
| 10 | UW 1 Or 2 Bit 26 |
| 11 | UW 1 Or 2 Bit 27 |
| 12 | UW3 Bit 16 |
| 13 | UW3 Bit 17 |
| 14 | UW3 Bit 18 |
| 15 | UW3 Bit 19 |

UW REG 3

| Bit No. | Bit Name |
|---|---|
| 0 | UW3 Bit 0 |
| 1 | UW3 Bit 1 |
| 2 | UW3 Bit 2 |
| 3 | UW3 Bit 3 |
| 4 | UW3 Bit 4 |
| 5 | UW3 Bit 5 |
| 6 | UW3 Bit 6 |
| 7 | UW3 Bit 7 |
| 8 | UW3 Bit 8 |
| 9 | UW3 Bit 9 |
| 10 | UW3 Bit 10 |
| 11 | UW3 Bit 11 |
| 12 | UW3 Bit 12 |
| 13 | UW3 Bit 13 |
| 14 | UW3 Bit 14 |
| 15 | UW3 Bit 15 |

Notes:
CC Reg Bits 12-13
  00 No stops except forced
  01 Xmit stops both
  10 Rcv stops both
  11 Independent stops
Bits 14-15
  00 Single Voice channel
  01 Single frame
  10 Single SF
  11 Single MF
DAC Reg Bits 7-9
  000 No Wrap
  001 Reg wrap
  010 SCR/Wrap
  011 IF wrap
  100 I/Q
Bits 10-14 Value 0-36 are valid addresses
ID Reg Bits 0-7 Value 0-36 Hex are valid IDs.
  8-15 Value 0-36 Hex are valid IDs.
TS Reg Bits 0-3 TIC 1 Line Nos.
  4-7 TIC 2 Line Nos.
  8-11 TIC 3 Line Nos.
  12-15 TIC 4 Line Nos.
FO Reg 1 Bits 0-3 Valid value 0
  6-11 Valid values 0-36
  13-15 Valid values 0-607
FO Reg 2 Bits 0-7 Valid values 0-607
  8-15 Valid values 0-BF
SM Reg Bits 0-7 Channel A Monitor Address valid values 0-3F
  8-15 Channel B Monitor Address valid

2.6 MESSAGE PROCESSOR

2.6.1 Buffered Message Encoder

The Buffered Message Encoder 92-21 (BME) encodes the "to-network" messages which are sent from the control unit to the network for forward error correction. The BME holds the messages for one frame until they are directed into the Traffic Buffer via the TIN Data Bus. Data from the BME via the TIN data bus is presented to the Traffic Buffer in the same manner as data from an INTIC.

2.6.2 Buffered Message Decoder

The Buffered Message Decoder 92-22 (BMD) receives "from-network" messages, via the TOUT Data Bus, decodes them, and, on a frame boundary, passes them to the CU via the CUI. The BMD operates on the TOUT Data Bus as if it were an OUTIC.

2.7 BASE SUPPORT UNIT (BSU)

The Base Support Unit (BSU) contains the logic and equipment necessary to initiate and maintain operation of the ground station. The MAU controls normal traffic operations, but the BSU contains the permanent MAU program, for use when IPL (Initial Program Load) or Re-IPL, or diagnostic programs are required. Major units in the BSU include:
- The IGAR File
- The Auto Answer Modem
- The C.E. Printer
- C.E. Keyboard
- The Base Power Control
- The Base Support Control Unit

2.7.1 The IGAR File

The diskette for the IGAR file contains the control programs used by the MAU Control Unit (MCU) to control MAU traffic operations. Also contained on the diskette are Base Support Monitor Programs used to make decisions and alterations based on the error (incident) messages. Other diskettes contain CE diagnostic programs.

2.7.2 The Auto Answer Modem

The Auto Answer Modem provides a path, via conventional terrestrial links, for communications between the Base Support Unit of each station and the Network Manager. The BSU can inform the Network Manager with status information, about station conditions. The network manager, in turn, can issue certain control instructions to the BSU.

2.7.3 The C.E Printer

The C.E. Printer is used as an output device by CE's performing on-site diagnostic activities.

2.7.4 The C.E. Keyboard

The C.E. Keyboard is used as an input device by CE's performing on-site diagnostic activity. The CE Keyboard can be an input to both the registers and the control program.

2.7.5 Power Control

The Power Control alters the power status of the MAU either via manual intervention or program control.

2.7.6 The Base Support Control Unit

The Base Support Control Unit provides the controls for communications between the BSU's and the MAU. The BSU also receives status information from the MAU and transfers it to the Network Manager.

3.0 FUNCTIONAL PRINCIPLES

3.1 PRINCIPLES OF TIMING STRUCTURE

3.1.1 Bursts

Bursts are divided into three different types:
- o Traffic Bursts
- o Order Wire Message Bursts
- o Order Wire Initial Transmission Bursts

3.1.1.1 Traffic Bursts

The traffic bursts contain information that is to be transmitted to one or more other stations. The length of the traffic burst for each station is determined at the beginning of each masterframe and is a function of the total traffic load to be transmitted from that station.

The traffic portion of the burst consists of time slots called "traffic channels", reserved for transmitting information to other ground stations. The length of each traffic channel is fixed, but the number of traffic channels assigned to that receiving station is a function of the amount of traffic to be sent to each receiving station. Assignment of the number of traffic channels for information transfer may be changed at the beginning of each superframe, providing that the changes do not cause the overall burst length to change. Burst length changes may be made only on master-frame boundaries.

A traffic burst interval includes:
- Guard Time — To protect against burst overlap at the satellite transponder, no R.F. is transmitted during this time.
- Clock Recovery — Pattern used to allow receiving stations to acquire the frequency and phase of the transmitting station's clock. The pattern used is a bit pattern designed to provide maximum energy to clock recovery circuits.
- Unique Word No. 3 — Used to indicate the 1st bit time of the traffic within a given Traffic Burst.
- Traffic Channels — The traffic is carried in time slots called traffic channels. At least one traffic channel exists for each station that is to receive traffic. The number of traffic channels assigned to each station is a function of the amount of traffic that is destined for the other stations in the network. Traffic channels are divided into two types:
- Active Traffic Channels — actively carrying traffic.
- Inactive Traffic Channels — reserved for use by the transmitting station, but having no traffic.

3.11.2 Order Wire Message Burst

The order wire message burst is used by acquired stations to establish call connections or disconnections, transmit network status and other commands, or to provide information for the reallocation of the satellite resource as time allocation demands change from frame to frame.

The Order Wire Message Burst includes:
- Guard Time — To protect against burst overlap at the satellite transponder; no R.F. is transmitted during this time.
- Clock Recovery — Pattern used to allow receiving stations to determine the frequency and phase of the transmitting station's clocks. To assist the station in acquisition of the network, the symbol timing recovery period is longer in the order wire message burst than in other bursts. The pattern is designed to provide maximum energy to clock recovery circuits.
- Unique Word No. 1 or 2 — Unique Word 1 is transmitted by the reference station during its time slot in superframe 0; unique word 2 is transmitted by the reference station during its time slots in the other superframes. Non-reference stations transmit unique word 2 during their time slots in all superframes. Both UW 1 and 2 are used to indicate the 1st bit of the OW message. UW 1 and 2 from reference station is used at other stations to update the local receive clock. The local received UW 2 is used to update the local transient clock.

Station Identification — is used for initial acquisition by a station. An acquiring station creates a table of active stations by noting the identity of each active station in the network. Concurrently, the acquiring station notes its own position in the order wire.

Transponder Range Data — consists of a station's range (distance in terms of transmission time) to the satellite. The range is used to assist other stations acquiring the network to determine their distance (hence, transmission time delay) to the satellite transponder.

Message Traffic — consists of requests for connection or disconnection, network status, or network comments.

3.1.1.3 Initial Transmission Order Wire Burst

The initial transmission order wire burst format is used by a station first acquiring the network, with the exception of the Reference Station which always uses the Order Wire Message Burst format. The station uses this burst to adjust its transmission timing relative to the network. The initial transmission burst is shorter than the order wire message burst. Both have fixed predetermined lengths.

The initial transmission burst includes:

Guard Time — to protect against burst overlap at the satellite transponder, no R.F. is transmitted during this time.

Clock Recovery — pattern used to allow receiving stations to determine the frequency and phase of the transmitting station's clock. The pattern used is a bit pattern designed to provide maximum energy to clock recovery circuits.

Unique Word No. 2 — is used to update the local transient clock.

Disuasion Message — ensures that no station mistakes the initial transmission burst for a valid message burst.

3.1.2.1 Frames

A frame consists of a fixed time period allocated for transmission of Network Control information (order wire) by one station in the network and for transmission of traffic bursts from each active station, directed to the other stations network. The time assigned a complete frame is called the frame period. Each frame period is 6 milliseconds long and is divided into two portions: An order wire segment used for network control, and the traffic segment, used for transmission of traffic.

The initial (order wire) segment of the frame is associated with a single station in the network and allows transmission of an order wire burst. It is combined with the order wire message bursts from all other stations in the network, to form the Order Wire. All ground stations have space allocated on the order wire for use in directing traffic to other stations in the network. A frame number in each superframe is associated with each ground station for the purpose of permanently reserving an order wire time slot for the station. The order wire portion of the frame for an inactive ground station is quiet. That is, nothing is transmitted during that station's order wire period. Note that order wire time slots are fixed assigned. The order wire has two purposes:

1. to distribute signals used to establish and maintain the network time base.
2. to distribute messages used for demand assignment.

Order wire information consists of commands concerning connects and disconnects and statistical information about traffic loads. All ground stations monitor the order wire and react to requests directed over it to them. All ground stations also receive, and react to, statistical information used to adjust satellite transponder occupancy to meet changing network traffic load conditions.

In addition to the order wire, each frame contains discrete traffic bursts. A transmission time for a traffic burst is assigned to each active ground station that has traffic to transmit, in proportion to the amount of traffic awaiting transmission. Since traffic burst length depends on the volume of traffic at each station, the traffic bursts of the active (acquired) stations may be different lengths. All bursts are timed to interleave at the satellite without overlap.

3.1.2.1 Superframes

Since a superframe is comprised of 56 frames, up to 56 ground stations can be assigned unique order wire slots and can participate in the network.

If less than the maximum number of ground stations are used on the system, the superframe will still consist of 56 frames, but the order wire positions for the non-participating stations will be quiet.

3.1.2.3 Master frame

Nine superframes comprise a masterframe. The order wire time slot used by the eference station in the first superframe of the masterframe contains unique word No. 1 and is used by all stations in the network to control transmission power levels and synchronize to (recover) network timing generated by the reference station. It is used by stations acquiring the network to identify the first superframe of a masterframe.

During the first superframe of a masterframe, network status information is transmitted to the satellite by each ground station. In the remaining portion of the masterframe the information is analyzed at all stations. At the beginning of the next masterframe, the network is reconfigured to meet the new traffic requirements of the network, as defined by the status analysis. The reconfiguration establishes new start times (and durations) for traffic bursts in the next masterframe.

4.0 INPUT OUTPUT CHARACTERISTICS

This describes the physical interfaces to the terminal which are:
70MHz Intermediate Frequency
Tl Carrier
Telephone Line
Power
Customer Engineering

4.1 70MHZ INTERMEDIATE FREQUENCY (IF)

This interface connects the 70 MHz I.F. to the RF equipment. The connector is a type N. The impedance is 75 ohms. The power level is 0 dbm (1 milliwatt) at the connector.

4.2 TERRESTRIAL CARRIER INTERFACE

This interface connects the MAU to the terrestrial environment. The connector is a Serpent-type connector.

A 3 meter (10 foot) cable is provided at this interface; terminated in the Serpent connector.

The waveforms and impedances at this interface conform to the requirements of T1 carrier.

4.3 TELEPHONE DIAL-UP DATA SET INTERFACE

This interface connects the MAU to a remote control point and allows power sequencing, remote control-program changes, remote diagnostic activity, and remote usage report collection.

A 3 meter (10 foot) cable is provided at this interface.

The waveforms and impedances at this interface conform to the requirements of the telephone dial-up data set.

4.4 POWER INTERFACE

This interface is to provide primary power to the MAU unit. A cable is provided at this interface the primary power requirements are: 208 volts ±10%, 3 phase.

4.5 CUSTOMER ENGINEERING INTERFACE

This interface is to provide assists for on-site customer engineering activities.

4.5.1 Keyboard and Printer

The keyboard and printer provide means of setting and reading registers and controlling and modifying the stored control program.

4.5.2 Switches, Indicators, and Adjustable Potentiometers

Switches
  Primary Power Circuit Breaker
  Power Up/Down
  Supply Voltage Test Point/Power Level Test Point Selection
  Partial Power Sequence Enable
  Reset
Indicators
  Power Sequence Complete
  Supply Sequenced (one for each supply)
  Supply Fault Detection on Unit
  Supply Fault Detected on Supply (one for each supply)
  Marginal Overheat
  Overheat
  Digital Voltmeter/Power Level Meter
Adjustable Potentiometers
  Supply Sequence up to Blower Start Delay Time
  Power Up Sequence Start to Sequence Complete Time Out Delay Time
  Power Down Sequence Start to Blower off Delay Time
  Supply Voltage Output (one for each supply)
  Receiver Amplifier
  Transmit Amplifier Gain

5.0 Programming

5.1 OVERVIEW

The Network Access Unit contains two distinct sets of microprograms:
  o The Base Support Unit Microprogram (BSUM) which resides in the BSU.
  o The Multiple Access Unit Microprogram (MAUM) which resides in the MAU.

5.1.1 Base Support Unit Microprogram

The Base Support Unit Microprogram (BSUM) contains the logic necessary to initiate and maintain the operation of the ground station. The BSUM has the responsibility of loading the permanent MAUM programs when IPL or re-IPL is required. The BSUM reacts to commands issued by the Network Manager. The BSUM also communicates its status to the Network Manager as a result of these commands.

5.1.2 Multiple Access Unit Microprogram

The MAUM provides the necessary functional controls over the allocation of resources which enables traffic paths between the terrestrial facilities and the satellite to be established. The MAUM has three major interfaces:
  o The terrestrial interface (TI) which controls the transfer of signalling and digital traffic between the NCU and the MAU.
  o The radio frequency (RF) interface which controls the transfer of signalling and digital traffic between the MAU and the RF transmitter.
  o The earth station interface with the Base Support Unit.

More information on these interfaces is provided in later sections.

The MAUM consists of a group of program functions which control the connect status of the network. The MAUM controls the allocation and distribution of the satellite resources.

The following are the subcomponents of the MAUM Control Program:
  o Supervisor
    1. Interrupt Handler
    2. Main Storage Allocation
    3. Timer
    4. Task Controller
    5. Auxiliary Services
      a. IPL
      b. Acquisition
      c. Restart
      d. Trace Control Table
      e. Diagnostic Monitor
  o Scheduler (Task Queue Manager)
    1. Priority
    2. Sequential
  o Input/Output Supervisor
    1. I/O Operations
    2. I/O Queues
  o Signal Processor
    1. Terrestrial
    2. Satellite
    3. BSU
    4. Resource Control Tables
      a. LSXM — 320 Bytes
      b. TICME — 3800 Bytes
      c. ASTM — 2280 Bytes
      d. Dynamic Net Map — 112 Bytes
      e. LUPL — 48 Bytes
      f. TB — 384 Bytes
  o Status Monitor 1. Clock Offset
2. Error Accounting
o Sequencer Processor
  1. BTEAS — 96 × 4
  2. VPAS — 96 × 4 × 2 A/B
  3. BRES — 56 × 3 × 4 × 2 A/B
  4. BRAS — 1544 × 2 A/B
  5. Sequencer Control Tables
o Path Controller
  1. Transmission Headers
  2. Message Routing
  3. Error Recovery
  4. Buffers and Control Tables
o Demand Allocation
  1. Bidding (Calculation/Transmission)
  2. Reassignment (Calculation/Broadcast)
  3. Evaluation (Rejection/Sequencer Realignment)
  4. Bidding Control Buffers — 56 × 12 × 2
o Patch Area

5.2 FUNCTIONAL CHARACTERISTICS SUMMARY

The Network Access Unit is responsible for:
o Self-initialization in response to an IPL sequence.
o Loading of the BSUM and the MAUM(s).
o Providing traffic connectivity and continuity.
o Providing the command and status interface between the NMF and the MAUM.
o Initiating diagnostic and fault isolation actions in response to system and component outages.

5.3 MAU COMMANDS

5.3.1 Vary

The vary command changes the status of a T1 or MAU to either ON or OFF line. This command may have a modifier of IMMEDIATE/QUIESCE. The command will be decoded and sent to the MAUM via the BSU/MAU interface. The MAUCB will be masked to show that action on a command is pending. Return from the MAUM via the MAU/BSU interface will be encoded to show compliance/non-compliance with the command. The MAUCB will have its status updated by the command.

5.3.2 IPL

The IPL command reloads the MAUM control program.

The MAU will not be re-loaded if the MAU has been quiesced or varied offline by the NMF. This is determined by examining the status flags in the MAUCB.

The status of the MAU is checked, and if necessary, the power-on sequence is initiated and the power-on sequence counter is incremented. If the threshold count is exceeded, the BSUM indicates to the NMF that IPL is not possible.

If the power-on sequence is already on or the sequence has completed successfully, the MAUM loader is invoked.

Multiple MAU support is provided. For example, the BSUM will recognize more than a single MAU as being attached and will initialize each attached MAU under the constraints previously stated.

5.3.3 Status

The status command is issued to the BSUM by the NMF to obtain the status of the operating MAUM(s). A message is formatted defining the availability of the logical and physical units contained within the NAU. This message includes all error counts accumulated to that point in time. After status is transmitted to the NMF, the error counters are reset.

5.3.4 Quiesce

The quiesce command is passed to the MAUM and a command pending flag is set in the MAUCB. Upon receipt of an action code from the MAUM indicating compliance, the MAUCB command pending flag is reset, and the MAUCB is marked as in quiesced state. The MAUM remains quiesced until a vary or IPL command is received.

5.4 FUNCTIONAL DETAILS

5.4.1 General Overview

The microprograms in the NAU's operational units provide the control to accomplish the following functions:
o Configuration
  Installation Definition
  Dynamic Reconfiguration
o Initialization
  Power-On IPL
  Self Loading
o Network Acquisition (Reference/Local)
  Synchronization
  Time Division Multiplexing/Demand Assignment
o Connectivity Control
  Signal Message processing
  Traffic Channel Tracking
o Network Timing and Tracking
  Frame Structuring
  Voice Channel Allocation
  Bit Timing
  Relative Time-of-Day
o Online Error Recovery
o Online/Offline Fault Isolation
o Status Monitoring

5.4.1.1 Configuration

The MAU(s) are configured as follows:
o At installation of the system.
  This is done on site by a CE. Configuration commands are provided to describe the installation in terms of:
  a. Number of MAUs
  b. The role of the MAU (primary or spare)
  c. The logical ID of the MAU in reference to the network.
  d. The number and status of the T1 lines attached to the individual MAU(s).
  e. The transponder number assigned to the MAU(s).
  f. Satellite range approximation.
  g. Acquisition data.
o Dynamically
  This is performed by either the NMF (off-line) via the VARY command, or by the MAU or BSU in response to error conditions detected within the MAU. Dynamic reconfiguration will be performed by the MAU only when continued operation of the failing component may cause network failure.

5.4.1.2 BSU Initialization

Refer to FIG. 93.

Self-initialization IPL occurs at the completion of a power-on sequence, initiated by pressing the SVP/IMPL/POWER ON control on the BSU indicator panel. The pushbutton is connected to the control unit system card to provide a means of initial program load (IMPL). The wiring is provided by logic interface. Self-initialization consists of:
- o Basic circuit Test
- o 4K Random Access Memory (RAM) Test
- o IGAR Path Establishment
- o Bootstrap From IGAR
- o Full Circuit Test
- o Full IGAR Test
- o Full RAM Test
- o BSUM Loaded From IGAR
- o Control Passed to BSUM

5.4.1.3 MAU Initialization

The MAUs power-on sequence is initiated under control of the BSU. The power-on sequence is described in detail in a later section. This sequence results in the following:
- o System Reset
- o Instruction Set Checkout
- o Storage Checkout
- o Control Unit Interface Checkout
- o MAU Diagnostic Checkout
- o MAUM Control Program Loaded
- o Control Passed to Acquisition Supervisor FIG. 94 shows the MAU initialization.

5.4.1.4 Acquisition (Refer to FIG. 95)

5.4.1.5 Connectivity Control (Outlined in FIG. 96)

5.4.2 BSUM Components

The BSUM is interrupt driven. The interrupts cause control to be passed to the different components of the BSUM, as shown in FIGS. 97 and 98. Some interrupts occur as a result of I/O operations, while others occur as a result of program control.

There are eight levels of interrupt priority:
- o Level 0 — Machine Check/Program Check (MC/PC). This level analyzes interrupts from I/O and program error conditions and passes control to the proper diagnostic function to perform corrective action.
- o Levels 1–4 — MAU interruption handlers. These levels handle MAU(s) interrupts that request BSUM services.
- o Level 5 — I/O Interrupt Processor. This level analyzes the status of completed I/O operations and passes control to the proper routines.
- o Level 6 — Signal processor and path controller. This level decodes inputs from the MAU(S) and NMF and passes control to the various command processing routines.
- o Level 7 — The diagnostic monitor. This level receives control in order to schedule diagnostic program execution, or to check returns from diagnostic program execution.

5.4.2.1 BSUM Nucleus

The BSUM nucleus is given control immediately after the IPL sequence is completed. Its basic functions are:
- o Establish an operating environment (PSWs, register spaces, etc.)
- o Check for MAU power-up sequence complete, reissue power on, if necessary, and count the number of times the power-up was issued to a particular MAU. If the number of power-up trials issued to a particular MAU exceeds a threshold value, the MAU is labeled not operational. The status of that MAU is sent to the NMF when the BSUM presents status to the NMF.
- o Load the remainder of the BSUM and transfer control to the BSUM system controller.

5.4.2.2 BSUM Controller

The BSUM Controller is that part of the BSUM which directs the actions taken by the BSUM in response to the examination of internal tables and switches or in response to the interrupt mechanisms. It is responsible for establishing linkages to:
- o The MAUM Loader
- o The MAUM Interface(s)
- o The NMF Interface
- o The Diagnostic Monitor
- o The Command Processor When the controller is loaded, it is put into enabled wait state. Interruption causes invocation of the controller and routing of requests to the proper service routine.

5.4.2.2.1 MAUM Loader

The MAUM loader is responsible for:
- o Deciding on MAU Status:
    - a. Not Operational (Power-on threshold reached)
    - b. Ready Status, Not Operating
    - c. Quiesced by NMF.
- o Validation of BSU/MAU Interface.
- o Transmission of MAU diagnotics
- o Interpretation of Diagnostic Return Codes
- o Updating MAU Status as a Result of Diagnostic Return Codes
- o Transmission of the MAU Control Program

5.4.2.2.1 MAUM Interface Program

The MAUM interface program controls the flow of data across the BSU/MAU hardware interface. The program accepts data from the MAU and passes it to the controller program in the BSU for interpretation and routing. The program also passes action codes representing NMF commands requiring action from the MAUM to the MAU. In general, the MAUM interface program processes the following:
- o Commands from the NMF
- o Action Codes For the MAUM
- o Status Changes in the MAU

5.4.2.2.3 Network Manager Interface

The NMF interface performs the following functions:
- o Decodes NMF Commands
- o Routes Commands
- o Waits For Response
- o Posts Status as a result of the Command
- o Presents status to the NMF (On demand, at timed intervals, or in response to status changes initiated by the MAUM).

5.4.3 MAUM Control Program

The MAUM consists of a group of intercommunication functions. These functions supervise the resources, manage network synchronization and timing, and control I/O data.

The MAUM gains control after the IPL and the diagnostic sequence is complete. The MAUM control program is responsible to:
- o Initialize an operating environment for its subcomponents.

o Acquire timing synchronization with the network.
o Establish priority function processing.
Control current processing of functions.
o Synchronize the allocation of resources.
o Provide message routing and transmission control.
Perform error recovery and isolation.

5.4.3.1 System Supervisor

Supervisor activity begins with an interruption. The Processing Unit causes control to be passed from the program which is in control to a predetermined location in main storage. Control is passed by replacing the current Program Status Word (PSW) with a new PSW for the new interrupt level. The old PSW is stored in the PSW save area. The new PSW contains the entry point address of the supervisor routine that processes the interruptions (Interrupt Handler).

There are eight levels, 0 through 7, with 0 having the highest priority. The MAUM processes the following levels (FIG. 98):
- o Level 0 — Machine Check/Program Check (MC/PC): I/O and program error conditions generate interruptions which the MC/PC handler analyzes and gives control to the proper diagnostic function to attempt corrective action.
- o Level 1 — Time: The interval timer grants an interrupt every 6 milliseconds.
- o Level 2 — Data Link Controller: The satellite and terrestrial order wires are read and written at this level.
- o Level 3 — MAU Bid Calculation and Reassignment Verification.
- o Level 4 — Sequence Processor.
- o Level 5 — I/O Processor.
- o Level 6 — Signal Processor and Path Controller.
- o Level 7 — Diagnostic: Interrupts are generated at designated test points in the MAUM when this level is enabled.

5.4.3.1 Interrupt Handler

When control is given to the Interrupt Handler the following functions are performed:
1. The status is obtained from the "I-register" for interrupt analysis. The following are the I-register status indicator descriptions:
   - o Bit 0 — Master Frame Reference
   - o Bit 1 — Superframe Reference
   - o Bit 2 — Frame Reference
   - o Bit 3 — Force End of Chain
   - o Bit 4 — Sink has Input Data
   - o Bit 5 — Partitioning Complete
   - o Bit 6 — Narrow Aperture Request
   - o Bit 7 — Receiver in Sync (Unique word reference not found. Either a 1–8 ratio of unique word 1 to unique word 2 exists or one unique word 2 found in last 6 superframes.)
   - o Bit 8 — Receiver Out of Sync (Unique word reference lost. No unique words found in last masterframe.)
   - o Bit 9 — Unassigned.
   - o Bit 10 — Transmit Not In Sync (Local unique word reference lost. Six of nine word 2's not detected.)
   - o Bit 11 — Clocks out of limits. (Read offset and load new value in offset register and define the new offset.)
   - o Bit 12 — Trunk Line 0 Not In Sync (Statistical Accounting. Offset not completed.)
   - o Bit 13 — Trunk Line 1 Not In Sync (Statistical Accounting)
   - o Bit 14 — Trunk Line 2 Not In Sync (Statistical Accounting)
   - o Bit 15 — Trunk Line 3 Not In Sync (Statistical Accounting)

When the status bits indicate that a masterframe or superframe boundary has occurred:
- o A task control block schedules the task scheduler and the write/read order wire task are enqueued (LIFO) on the ready task queue.
- o The required control program action is determined.
- o Control is passed to the appropriate routines. When status bits other than time demarcation (bits 0, 1 and 2) are on, an Interrupted Task Request Block (ITRB) is constructed and queued on the Ready Task Queue (LIFO). The register space and the interrupt information (OLD PSW) are saved in the ITRB and control is passed to the interruption analyzer.

5.4.3.2 Task Scheduler

The time demarcation for both transmit and receive side accounting result in scheduling of the following on the Ready Task Queue (FIFO) at the defined time markers:
- o Masterframe — Status monitor
- o Superframes 1–9
  a. BRAS Processor (Updates scheduled based on receive time accounting (RTA).)
  b. VPAS Processor (Updates scheduled based on RTA.)
- o Superframe 1
  a. BRES Processor (Calculate new "A" side start times schedule based on RTA.)
  b. BRAS Processor (Calculate new A side start times schedule based on RTA.)
  c. BTEAS Processor (Calculate new "B" side start times schedule based on TTA.)
  d. Demand Assignment Controller (Network requirements bid calculation scheduled based on RTA.)
- o Superframe 2
  a. BRES Processor (Calculate new B side start times schedule based on RTA.)
  b. BRAS Processor (Calculate new B side start times schedule based on RTA.)
- o Superframe 4 — Demand Assignment Controller (Network allocation calculation schedule based on RTA.)
- o Superframe 7 — Demand Assignment Controller (Network reallocation computation comparison scheduled based on TTA.)
- o Superframe 9
  a. Network Reconfiguration Allocation schedule based on TTA.
  b. BTEAS Processor (Calculate new A side start times based on TTA.)

5.4.3.4 Acquisition Supervisor

The acquisition supervisor calls the necessary functions required to checkout the MAU, synchronizes the various elements of the MAU with the network, and puts the MAU into a signal/traffic handling state. The acquisition supervisor accomplishes functions by:
- o Initializing the system registers and forward error correction area
- o Initializing sequences with null patterns o Partitioning the traffic buffer
o Starting the timer interrupts
o Synchronizing the receiver, transmitter and Trunk
o Passing control to the connectivity supervisor

5.4.3.5 Timer Supervisor

The timer supervisor provides the time demarcation accounting. Time accounting is based on the transmit time based interrupts. A receive side time base is also maintained and is based on the receive side offset. This ofset is equal to the round trip delay incurred when data is transmitted up-link and received down-link. As a result of this delay, the receive side time accounting trails the transmit side time accounting by the delay factor (rounded up to the nearest frame integer). All references to frame, superframe and masterframe are based on the transmit time base unless specified. At frame boundaries, the frame (FR) count is incremented. When the superframe (SFR) demarcation occurs, the frame counter is reset to one and the superframe counter is incremented. When the masterframe (MFR) demarcation occurs, the frame and superframe counters are reset to one and the masterframe count is incremented and checked to determine if the 24-hour count has been exceeded. (The 24-hour count occurs every 14,400,000 frames-600,000 frames/hour-10,000 frames/minute).

5.4.3.6 Task Controller

The task controller examines the ready task queue and effects a task switch (level change) via manipulation of the master and common masks, in conjunction with the PIRR.

5.4.3.7 Main Storage Allocation/Deallocation Routines

The main storage allocation/deallocation routines provide centralized enqueue/dequeue controls as follows:
o Dequeue
  a. First-in First-out (FIFO) — The first element on the queue is removed and the queue element pointed is returned to the caller with a return code of:
    0 — if the task was successfully completed.
    4 — if an error occurred while processing the task.
  b. Remove From List (REMFL) — The queue is searched for a defined element and removes the element from the list. The queue element pointer is returned to the caller with a return code of:
    0 — if the task was successfully completed.
    2 — if the queue was searched and the defined element was not found.
    4 — if an error occurred while processing the task.
o Enqueue
  a. First-in First-out (FIFO) — The element to be queued is added to the queue chain as the last element. The queue element pointed is returned to the caller with a return code of:
    0 — if the task was successfully completed.
    4 — if an error occurred while processing the task.
  b. Last-in First out (LIFO) — The element to be queued is added to the queue chain as the first element of the queue chain. The queue element pointer is returned to the caller with a return code of:
    0 — if the task was successfully completed.
    4 — if an error occurred while processing the task.

5.4.3.8 Satellite/Terrestrial Order Wire Supervisor

The order wire supervisor controls the construction of the satellite order wire, and interfaces with the data link controller to process outbound and inbound order wires.

5.4.3.8.1 Outbound Processing

The satellite order wire is constructed three frames prior to transmit time. The bid flag is examined to determine if the bid order wire message is to be transmitted. If the flag is not set, the validation flag is checked to determine if the "start time" is to be transmitted. If the validation flag is on, the calculated start time of the transmitting MAU is inserted in a "satellite control information record" and is placed in the satellite order wire message buffer. The remaining satellite transmission units are filed with "connectivity" SCIR's.

If neither the order wire bid flag nor the validation flag is on, the acknowledge validation flag is checked and if on, this message type is inserted in the OW buffer. The remaining STU's are filled with available connectivity SCIR's. All broadcast SCIR's are inserted into the high order position of the satellite order wire.

The format of the satellite order wire is shown in FIG. 99.

The preamble is used to identify the beginning of the order wire burst, provide clock synchronization, and the unique identifier for the first bit is the burst. The preamble is shown in FIG. 100.

The transmission information unit is shown in FIG. 101.

The unit is as follows:
o Station State Indicator:
  00 Location Station
  01 Reference Station
  11 Master Station
o Station ID — A unique station number from 0 through 55.
o Range Information — Consists of a station's range to the satellite in terms of transmission time.

The satellite transmission unit contains all the necessary information to perform routing, connection services, and transmission control. The satellite transmission unit is shown in FIG. 102.

Description of the satellite transmission units are as follows:
o Format 4 Transmission Header — see FIG. 103.
Field descriptions of the header are as follows:
  a. Format ID:

--- o    Format 4 Transmission Header - see FIG. 103.
Field descriptions of the header are as follows:
| a. | Format ID: | |
|---|---|---|
| BITS | Definition | |
| 0–3 | Designation of a Format 4 header (0100). | |
| 4,5 | 11 | |
| 6 | Flow type indicator - | |
| | 1 - Asynchronous | |
| | 0 - Synchronous | |
| 7 | Flow direction indicator - | |
| | 1 - Primary to secondary | |
| | 0 - Secondary to primary | |
| b. | DAF - Destination address field (MAU ID) | |
| c. | OAF - Origin address field. | | o    Request Handler
    REQUEST CODE MODIFIER

-continued (2 bytes)

b. DAF - Destination address field (MAU ID)
c. OAF - Origin address field.
o Request Handler
Table 5.4.3.8.1.7 below shows the request code and modifiers.

Table 5.4.3.8.1-7
Request Codes and Modifiers

| REQUEST CODE | MODIFIER | IDENTIFICATION |
|---|---|---|
| Connect (x'8000') | 00 | Voice |
| | 01 | Modem |
| | 02 | Data |
| | 03 | IPL |
| Connected (x'4000') | 00 | Voice |
| | 01 | Modem |
| | 02 | Data |
| | 03 | IPL |
| Disconnect | 00 | Voice |
| | 01 | Modem |
| | 02 | Data |
| | 03 | IPL |
| Disconnected (x'1000') | 00 | Voice |
| | 01 | Modem |
| | 02 | Data |
| | 03 | IPL |
| MAU Control (x'0800') | 00 | Not handling traffic |
| | 01 | Bid |
| | 02 | Network Start times map |
| | 03 | Acknowledge network map |
| | 04 | Exception to network map |
| System Control (x'0400') | 00 | Start ICS |
| | 01 | Started ICS |
| | 02 | Not started ICS |
| | 03 | Stop ICS |
| | 04 | Stopped ICS |
| Connection Exception (x'0200') | 00 | Invalid TH |
| | 01 | No response |
| | 02 | Blocked link |
| | 40 | Invalid TH |
| | 41 | No response |
| | 42 | Blocked link |
| | 80 | Invalid TH |
| | 81 | No response |
| | 82 | Blocked port |
| | 83 | Blocked terrestrial |
| | 84 | CS inactive |
| | 85 | Inactive exchange |
| Disconnect Exception (x'0100') | 00 | Invalid TH |
| | 01 | No response |
| | 40 | Invalid TH |
| | 41 | No response |
| | 80 | Invalid TH |
| | 81 | No response | o Alternate Route Field includes:
  Destination MAU ID
  Origin MAU ID
  Alternate NCU ID
o Source/Sink Connection Information Unit is a six byte field that identifies the physical resources allocated to support a connection. These include:
  MAU ID
  NCU ID
  Line Group
  Port
  T1 (Trunk)
  Virtual Channel
o Dial Information Unit:
  Reserved (1 byte)
  Exchange (2 bytes)
  Extension (2 bytes)

o Link Message Control Unit includes:
  SNF (1 byte)
  BCC (2 bytes)
Descriptions of these fields are as follows:
  a. SNF — Sequence number field. This field shows the number of STU's sent to and received from the destination MAU at the transmitting MAU. This value is obtained from the sequence number table (see section on Sequence Number Table).
  b. BCC — Block check count, generated by the MAU hardware.
o NAU Sequence Number Table (FIG. 104) — This table contains the number of sequenced STU's received and transmitted for this MAU. The number sent field is updated by the data link control function and the number received field is updated by the path controller.
The maximum number of STU's in the table is 2 times the number of MAU's ($2 \times 56 = 112$).
o Terrestrial order wire (FIG. 105).
o Terrestrial Line Sequencer Number Table
o Data link controller compares the order wire transmit frame of the local MAU (unique NAU ID) to the current frame count. When the offset indicates that there are two frame periods before the transmit time, the satellite order wire is written into the encoder. When this operation is completed, the terrestrial line status bits (TBD) are checked to determine if they can accept order wires (TOW's).
Terrestrial order wires (TOW's) are written into the encoder until the status bits indicate that no more TOW's can be written.

5.4.3.8.2 Inbound Processing (FIG. 106)

When the data indicator (I-register, bit 4) is on in the decoder, an input buffer is obtained and the order wire is written into the buffer.

Hardware in the MAU examines the DAF field to determine if one of the following conditions exist:
o A Director STU — Contains an invalid MAU ID (a unique ID number from 0 through 55). When the ID is equal to the ID of the local MAU, the bit position corresponding to the directed STU is sent on in the identity field.
o A Broadcast STU — Contains an ID that is recognized by all MAU's. The bit in the identity field corresponding to this STU is set on if this condition exists.
o A Null STU — Contains an invalid MAU ID.

5.4.3.9 Addressing the Encoder

The path controller selects the encoder and uses the following I/O addressing scheme to transfer output satellite order wires and basic transmission units.

| | | | | | | | | | | | | | | | |
|---|---|---|---|---|---|---|---|---|---|---|---|---|---|---|---|
| – | – | – | – | X | X | Y | Y | Z Z | Z | Z | Z | z | Z | | |
| BIT | 0 | 1 | 2 | 3 | 4 | 5 | 6 | 8 | 9 | 10 | 11 | 12 | 13 | 14 | 15 |

Where:
XX The program controlled function Code:

| CODE | DEFINITION |
|---|---|
| 01 | Terrestrial Out |
| 10 | Burst Out |
| 11 | Forward Error Correction Table |

| CODE | DEFINITION |
|------|------------|
| 00 | Used by Diagnostics Only |

YY Line number identification. This field is applicable to the TOUT function code only:
Where:

$$XX = 10, YY = 00$$

Where:
XX = 01
YY = 00, Line 0
YY = 01, Line 1
YY = 10, Line 2
YY = 11, Line 3
ZZZZZZZZ The write start address field If the function code is 01, the address field must be zero.

If the function code is either 10 or 11, the address field is 0 through 255.

This allows the updating of specifically addressed locations.

When under diagnostic control, the encoder addressing structure is:

```
     - - - - F C Z Z Z Z Z Z Z Z Z Z
BIT  0 1 2 3 4 5 6 7 8 9 10 11 12 13 14 15
```

Where: FC = 00, and ZZZZZZZZZZ = 0 through 4095.

Where: FC = 00, and ZZZZZZZZZZ = 0 through 4095.

5.4.3.10 Demand Assignment

5.4.3.10.1 Demand Assignment Controller

The demand assignment controller provides the means of controlling the algorithms that apportion the assigned MAU burst times. This enables the network manager to maximize the efficient use of the satellite transponder.

The demand assignment controller examines the superframe count to determine which of the following functions is to be executed and passes control to that function:
  o Local MAU requirements bid computation (superframe 1).
  o Network allocation computation (superframe 4).
  o Network computation comparison (superframe 7).

The requirements bid function formulates the demand bid message which describes the availability, the activity status, and the number of assigned channels on the active terrestrial lines attached to the MAU. The total control information record is described in the Control Information Record section.
  o Order wire message type — demand bid.
  o Terrestrial line configuration — available trunk lines/active lines.
  o Number of trunk channels required — T1 # 1/T1 # 2/T1 # 3/T1 # 4

5.4.3.10.2 Allocation Algorithm

The allocation algorithm computes the absolute start transmit/receive time of each NAU that is carrying traffic in the network. The allocation algorithm attempts to distribute the transponder bandwidth across all active MAU's. When the new start times have been calculated, the values, designated by the new offset contained in the absolute start times map (refer to Absolute Start Times Map) are updated.

The following variables are computed from the information transmitted by all active MAU's in the network:
N1 The number of active MAU's.
N2 The number of full traffic carrying terrestrial lines.
N3 The number of terrestrial lines below maximum traffic channel capacity.
N4 The number of online, but inactive, terrestrial lines.
N5 The number of traffic channels to allocate.

The number of available traffic channels (ATC) is computed as follows:

$$ATC = TC1 - (TC2 \times N1)$$

Where: TC1 is the number of traffic channels in the transponder; and TC2 is the number of traffic channels used for the MAU preamble.

This factor is then used to calculate the number of allowable full terrestrial links:

$$AFL = ATC \div 47$$

This factor (AFL) is compared to the number of traffic carrying terrestrial lines (N2):
  o If N2 + N3 = AFL
    The number of full traffic channels (47) is distributed to all active terrestrial lines.
  o If N2 + N3 < AFL
    All active terrestrial lines are allocated 47 traffic channels. The remaining traffic channels (RTC) are computed for distribution across the inactive terrestrial links:

$$RTC = ATC - ((N2 + N3) \times 47)$$

The remaining traffic channels are distributed using one of the two procedures that follow:

$$DTC = RTC > N4$$

1. If DTC ≥ 47, all available inactive terrestrial lines are allocated 47 traffic channels.
1. If DTC < 47, available inactive terrestrial lines are allocated the number of traffic channels equal to DTC.
3. If DTC < 2, two traffic channels are sequentially allocated per terrestrial line until this quantity cannot be allocated.
4. If N2 + N3 > AFL
    A check is made to ensure that the full terrestrial line request can be satisfied.
    If N2 × 47 < ATC, 47 traffic channels are distributed to all full terrestrial links. The remaining traffic channels are distributed across the remaining active terrestrial links:

$$RTC = ATC - (N2 \times 47)$$

a. The RTC N5, distribution is calculated as follows:

$$DEC = (RTC - N5) \div N3$$

The requested traffic channel allocation is satisfied and the integer DEC is added. If the result exceeds 47 traffic channels, the excess is accumulated (AEC). If the result is less than 47, an attempt is made to bring the allocation up to 47 by extracting the needed amount from the accumulated access.

When the distribution is satisfied, an attempt is made to distribute the remaining excess across the inactive trunk (T1) lines as previously defined.

b. If RTC = N5, all channel requests are satisfied.

c. If RTC < N5, an average channel distribution value is computed:

DV = RTC ÷ N3

This value is used to distribute the traffic channel allocation to the remaining terrestrial links. When the distribution value exceeds the requested traffic channel allocation, the excess is accumulated (ALC). If the DV is less than the requested traffic channel allocation, an attempt is made to satisfy the request by extracting the needed amount from the accumulated excess (AEC).

o If N2 × 47 ≥ ATC: An average channel distribution value is computed:

DV = ATC ÷ (N2 + N3)

This value (DV) is used to distribute the traffic channels across all active terrestrial lines as previously described.

5.4.3.10.3 Absolute Start Times Map

The absolute start times map provides the ability to track the active state and the validity of the MAU's, their terrestrial line states, the location of the traffic preambles, the relative location of the VAC masks, and the current and newly calculated start times.

The offset fields are used as displacement factors for accessing either the current start time or the newly computed start time. If calculation of the new start time occurs in superframe 8, the new offset reverts back to the old offset.

The start times map is updated at the following times:
o Superframe 1 — The value in the new offset field is written in the old offset field.
o Superframe 4 — The value in the new offset field is updated. There are only two eligible values in this field: 0 and 8. The new offset is set to the value that is different from the old offset.

FIG. 107 shows the layout of the absolute start times map.

5.4.3.11 MC/PC Error Handling

The normal flow of microprograms in the NAU will be interrupted when one of the following errors occur:
o I/O error which occurs during an I/O operation.
o A control processor unit error.
o A microprogramming error.

When an error is detected, some recovery is attempted, and the error occurrence is logged. Some errors result in the system being unable to continue. In this situation, an attempt is made to notify the network manager, an error indication is set up in the panel, and the system is shut down.

If the error condition is temporary, error recovery functions retry the interrupted operation. If the retry is successful, processing continues and the error is logged. If the retry attempts are not successful, the impact of the error is assessed. If the impact may affect the whole network, the network manager is notified and the system is shut down. If the error effect is only local, the failing function is quiesced, the condition is logged and operation continues.

Functions used in the error handling are:
o I/O-MC/PC Handler
o Non I/O-MC/PC Handler
o Error Recorder
o Error Logger

5.4.3.12 Sequencer Processing

The sequencer controller and the four sequencer processors serve to update and/or rewrite the BTEA, BRE, BRA, and VPA sequencers. These sequencers identify and direct the flow of digital traffic into and out of the traffic buffer.

5.4.3.12.1 Traffic Buffer

The traffic buffer is used as temporary storage for all traffic flowing through the NAU. This data enters and leaves the traffic buffer through four ports:
o Terrestrial IN (TIN)
o Burst Out (BOUT)
o Burst In (BIN)
o Terrestrial Out (TOUT)

Traffic flow through these ports is controlled by a receive side clock and a transmit side clock. The two clocks drive five sequencers, two partition counters, and two partition generators.

The traffic buffer is divided into eight partitions. The partition counters and generators each identify a unique partition. The sequencers identify the different types of traffic and their location within the partitions. During a single 6 millisecond time frame, four of the eight partitions serve as the traffic buffer ports. A fifth partition is subjected to VAC processing. FIG. 108 shows how the processing of the traffic in the partition changes in subsequent time frames.

5.4.3.12.2 Sequencers

The five sequencers (BTEAS, BRAS, BRES, VPAS and TOAS), the partition counters, and the partition generators provide traffic buffer addresses and control the data flow through the traffic buffer. The sequencers are storage devices and are divided into two halves (side A and side B). Side A is updated during one superframe as side B is used to address the traffic buffer, and side B is updated the next superframe while side A is used to address the traffic buffer.

Both halves of the sequencers are divided into a fixed number of slots, each slot corresponds to a transponder channel. Traffic control data (e.g. a traffic buffer address) is written into the slots for each transponder channel allocated to carry traffic. The sequence of the slots within the sequencer controls the order in which traffic is written into or read from the traffic buffer.

The characteristics of the sequencers are:

| SEQUENCER | USED TO ADDRESS TRAFFIC BUFFER PARTITION | SEQUENCER SIZE |
|---|---|---|
| BTEAS | BOUT | 4K X 16 BITS |

-continued

| SEQUENCER | USED TO ADDRESS TRAFFIC BUFFER PARTITION | SEQUENCER SIZE |
|---|---|---|
| BRES |  | 4K X 16 BITS |
| BRAS | BIN | 8K XX 32 BITS |
| VPAS | VAC | 4K X 16 BITS |
| TOAS | TOUT | 4K X 16 BITS |

5.4.3.12.3 Sequencer Controller

The sequencer controller performs program switching and passes control to one or more of the four sequencer processors. The processor(s) selected is controlled by parameters passed from the task scheduler. The controller is invoked by the task controller. The sequencer controller operates as shown in FIG. 109.

5.4.3.12.4 BTEAS Processor

The burst transmit event address sequencer (BTEAS) provides the traffic buffer address locations of data to be transmitted to the satellite. The BTEAS processor updates the sequencer every masterframe to reflect traffic load changes.

During initial acquisition, the sequencer is initialized for the first burst start time and trunk (T1) channel allocations. There is a sequencer time slot containing a traffic buffer address for each allocated channel. The sequencer is updated each masterframe to reflect changed channel allocations and new burst start times. In superframe 9, one half (side A) of the BTEAS is updated, and in superframe 1 of the next masterframe the other half (side B) is updated.

The demand assignment routines distribute 1544 transponder channels across the active trunk lines during a masterframe. In addition, these routines determine new burst start times for each MAU. If, on a masterframe boundary, the channel allocations for a trunk line have increased, then a corresponding number of sequencer time slots are allocated. Traffic buffer addresses are then written into these slots.

If the channel allocation decreases, then the corresponding time slots are deallocated. The actual allocation and deallocation of time slots occurs when the sequencer is rewritten to reflect the new burst start time.

The operation of the BTEAS processor is shown in FIG. 110.

5.4.3.12.5 BRES Processor

The burst receive event sequencer (BRES) identifies the traffic received from the satellite as to channel attributes and the events which are to occur to these channels. The BRES processor updates the sequencer every masterframe to reflect changed traffic conditions change.

During initial acquisition, the sequencer is initialized for the initial burst start times for each MAU and the initial trunk channel allocations. There is a sequencer time slot for each transponder channel. These slots contain the following information:

1. Unique Word Aperture — Designates the real channel containing the unique word.
2. VAC Mask — Designates the real channel which contains the VAC mask.
3. Real Channel — Designates a channel with an absolute identity; i.e. a channel which is not a result of VAC processing.
4. Virtual Channel — Designates a channel that resulted from VAC processing and whose identity is found by decoding the VAC mask.
5. Half-rate Traffic — Designates channels transmitted at half-rate.
o Burst Traffic — Designates channels carrying traffic (those not inactive or deallocated).

The sequencer is updated each masterframe to reflect new burst start times for each MAU and new channel allocations. In superframe 1, one half (side A) of BRES is updated, and in superframe 2, the other half (side B) is updated.

Figure 111:
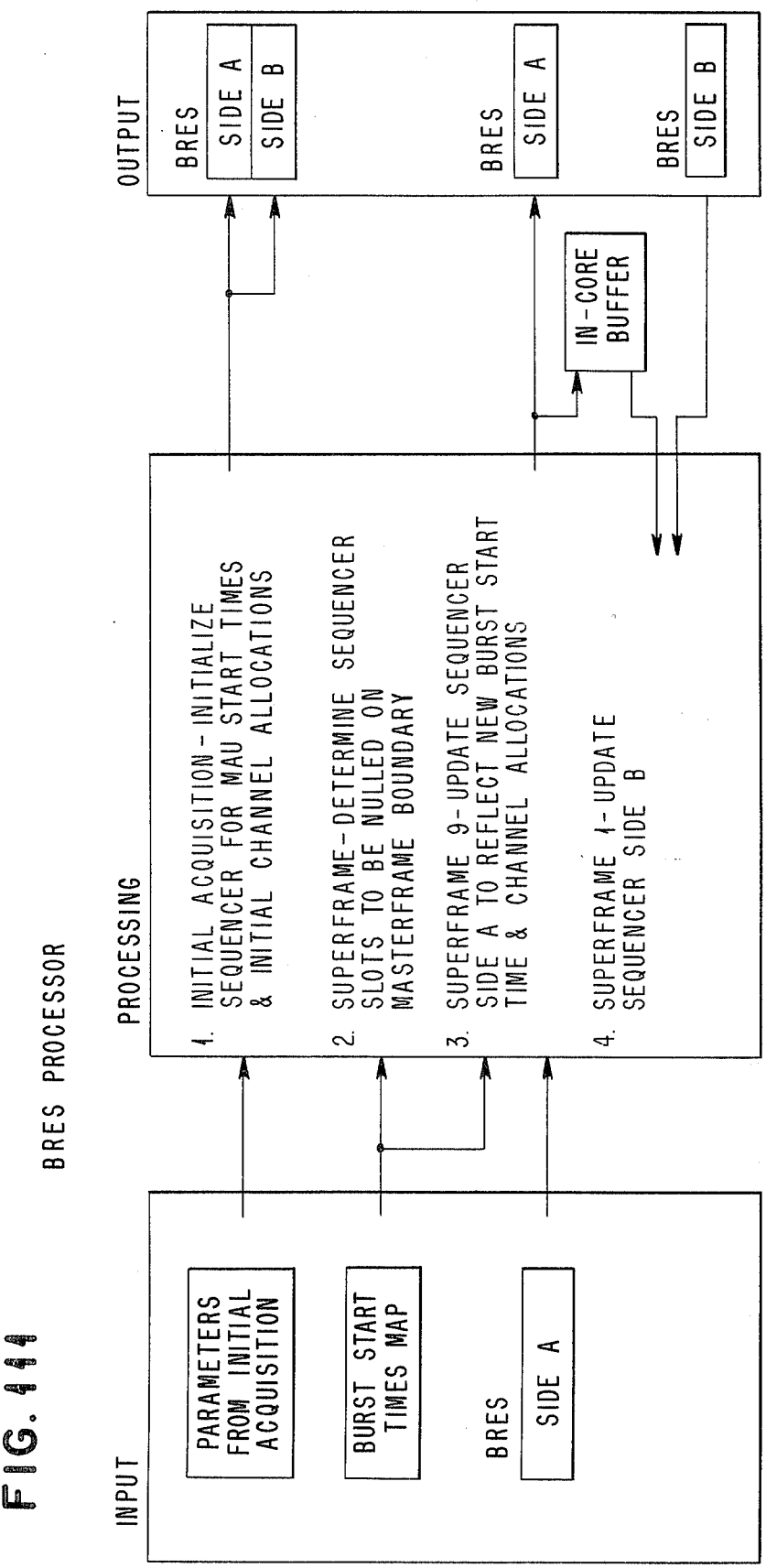

FIG. 111 shows the operation of the BRES processor.

5.4.3.12.6 BRAS Processor

Figure 112:
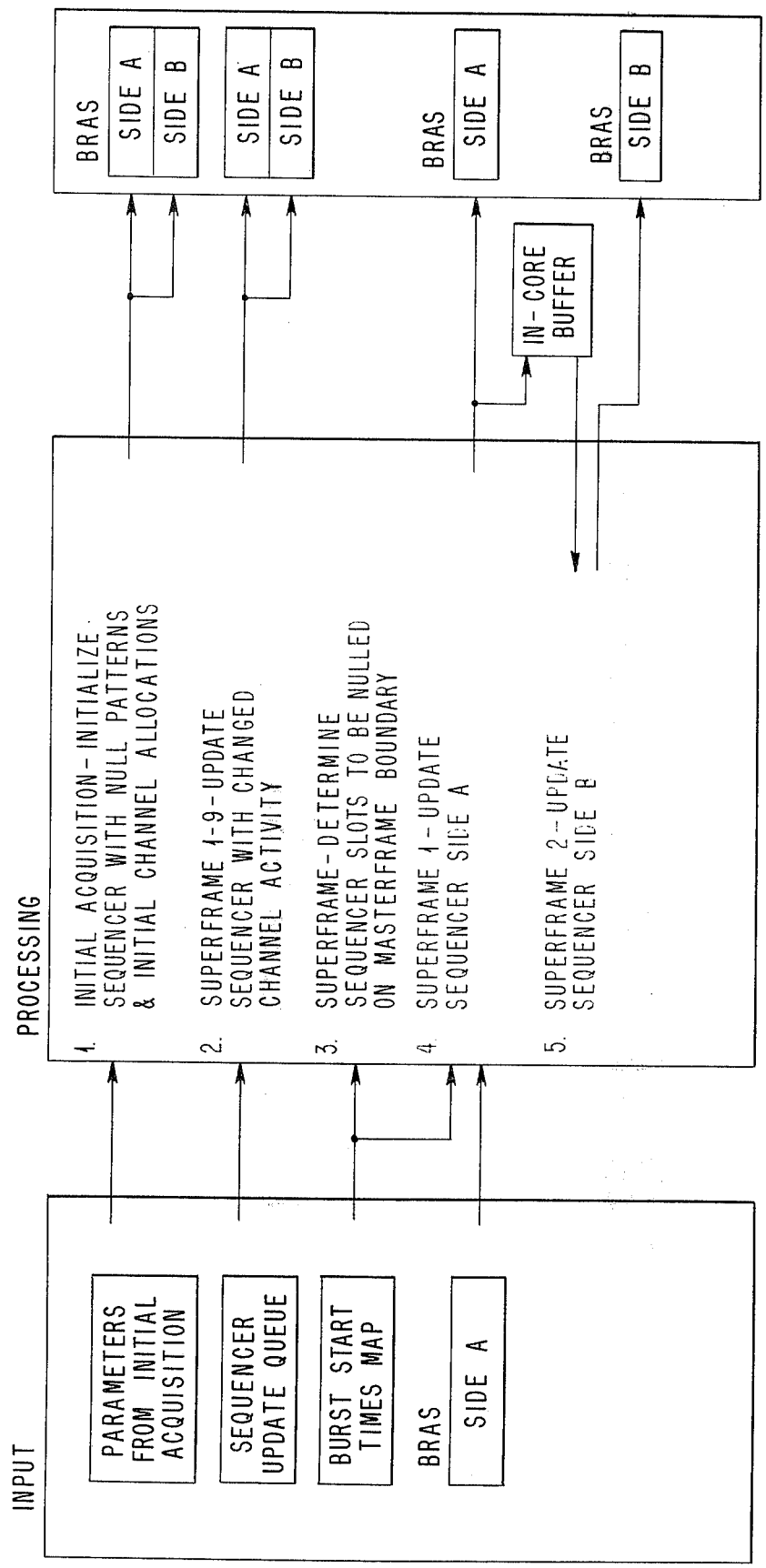

The burst receive address sequencer (BRAS) provides the traffic buffer address locations for traffic being received from the satellite. The BRAS processor updates the sequencer to reflect changed traffic conditions (refer to FIG. 112).

During initial acquisition, the sequencer is initialized for the first burst start time and trunk channel allocations. A sequencer time slot containing a traffic buffer address is assigned for each REAL and VIRTUAL channel allocated to this MAU. As new traffic connections occur, traffic buffer addresses are written into unused time slots. As connections terminate, null patterns are written into the corresponding time slots.

The signal processor builds a queue containing traffic updates during a superframe. On a superframe boundary, the BRAS processor uses this queue and updates one half (side A) of the sequencer; on the next superframe boundary, the BRAS processor updates the other half (side B) of the sequencer.

The demand assignment routines reallocate the transponder channels across the active trunk lines and determine new burst start times during a masterframe. On the masterframe boundary, the BRAS processor rewrites the sequencer to reflect the new channel assignments and burst time. One half of BRAS is reorganized in superframe 1. The other half is reorganized in superframe 2.

5.4.3.12.7 VPAS Processor

The VAC process address sequencer (VPAS) provides the traffic buffer address location for traffic which can be subjected to VAC processing. A control bit within each sequencer slot indicates whether the traffic at the specified location is to be processed. The VPAS processor turns these control bits on or off every superframe to reflect existing connections.

During initial acquisition, the sequencer is written with a set of traffic buffer addresses. The organization of these addresses within the sequencer determines the routing of the virtual channels to the TOUT lines. VAC processing enables a collection of up to 96 virtual channels to be transmitted in 46 real trunk channels. The control bit within the sequencer slot designates the associated virtual channel as active and to be included in VAC processing.

Since VPAS describes traffic being routed out of the trunk lines, it does not reflect MAU burst start times. Therefore, it need not be reorganized. The only updating done to VPAS is the setting of control bits at superframe boundaries.

5.4.3.13 I/O Supervisor

The I/O supervisor (IOS) is responsible for all input-/output operations across the control unit interface (CUI) to the internal devices of the MAU. In addition, IOS is responsible for error retries and forced-end-of-chain restarts. I/O across the adapter interface to the BSU is handled by the MAUM interface routine.

5.4.3.13.1 Read/Write Processing

The I/O supervisor is a reentrant routine servicing the I/O requests of the MAU programs. Operating on the same level as the calling routine, the supervisor receives control via a BALR. Input data is obtained from an input/output block (IOB). The IOB address must be put in secondary page registers (FIG. 113).

Each user must supply IOS with a register page. This becomes the IOS primary register page. Any registers within that page that are to be preserved across the I/O operation must be saved by the user. The linkage registers in the users secondary page are preserved.

Figure 114:
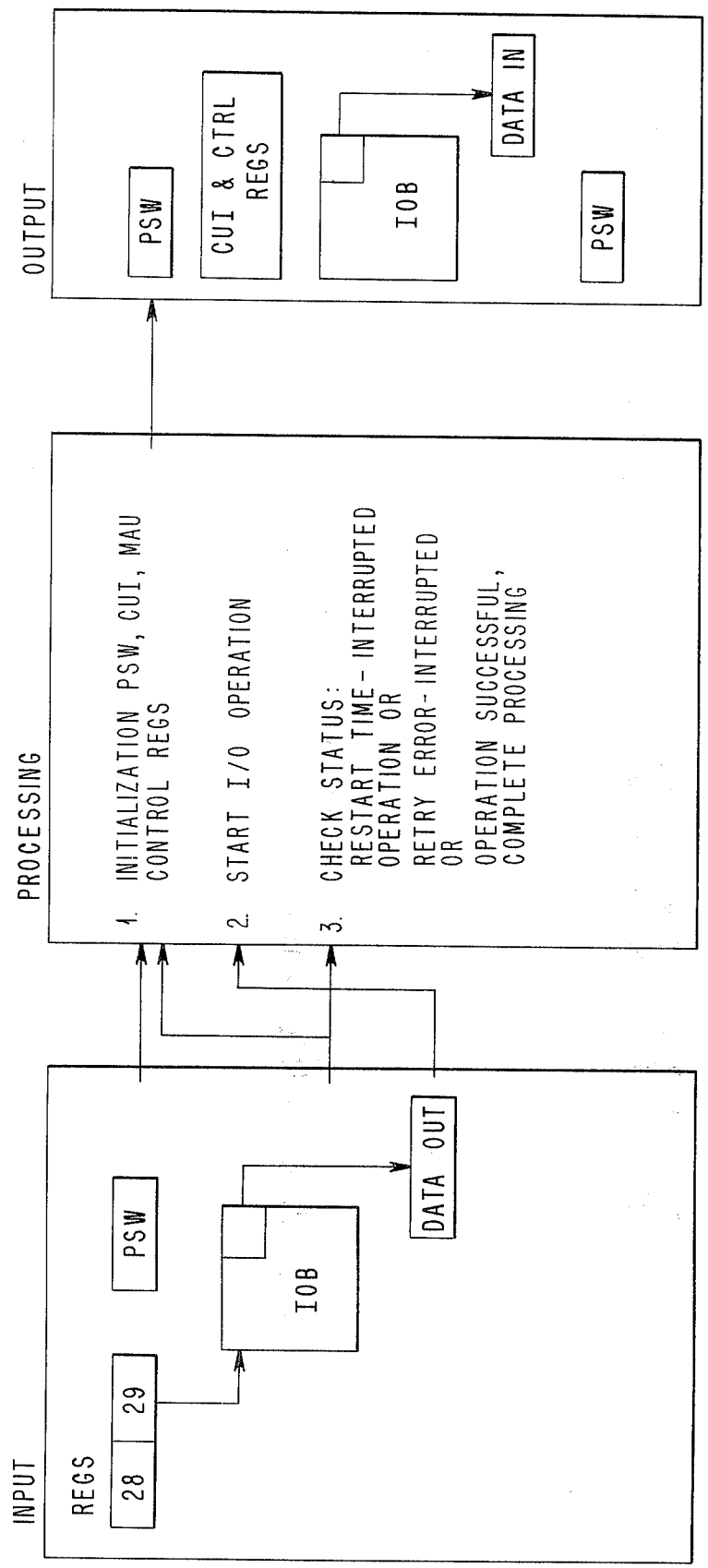

FIG. 114 shows the IOS process.

5.4.3.13.2. Interrupt Processing

An I/O operation can be interrupted either by the 6-milli-second timer or by a machine or program check. For a level 1 interrupt, the interrupt handler gains control. For level 0, the MC/PC handler gains control. In both cases, the IOB is modified to reflect the status of the operation. When control is returned to IOS, the I/O operation may be restored, retried, or terminated. If an I/O operation was not in progress when the interrupt occurred, then IOS resumes normal processing.

The tasks that are invoked as a result of either a level 0 or a level 1 interrupt may themselves request I/O services. Since IOS is reentrant, this does not affect the interrupted operation.

5.4.3.14 Path Controller

Figure 115:
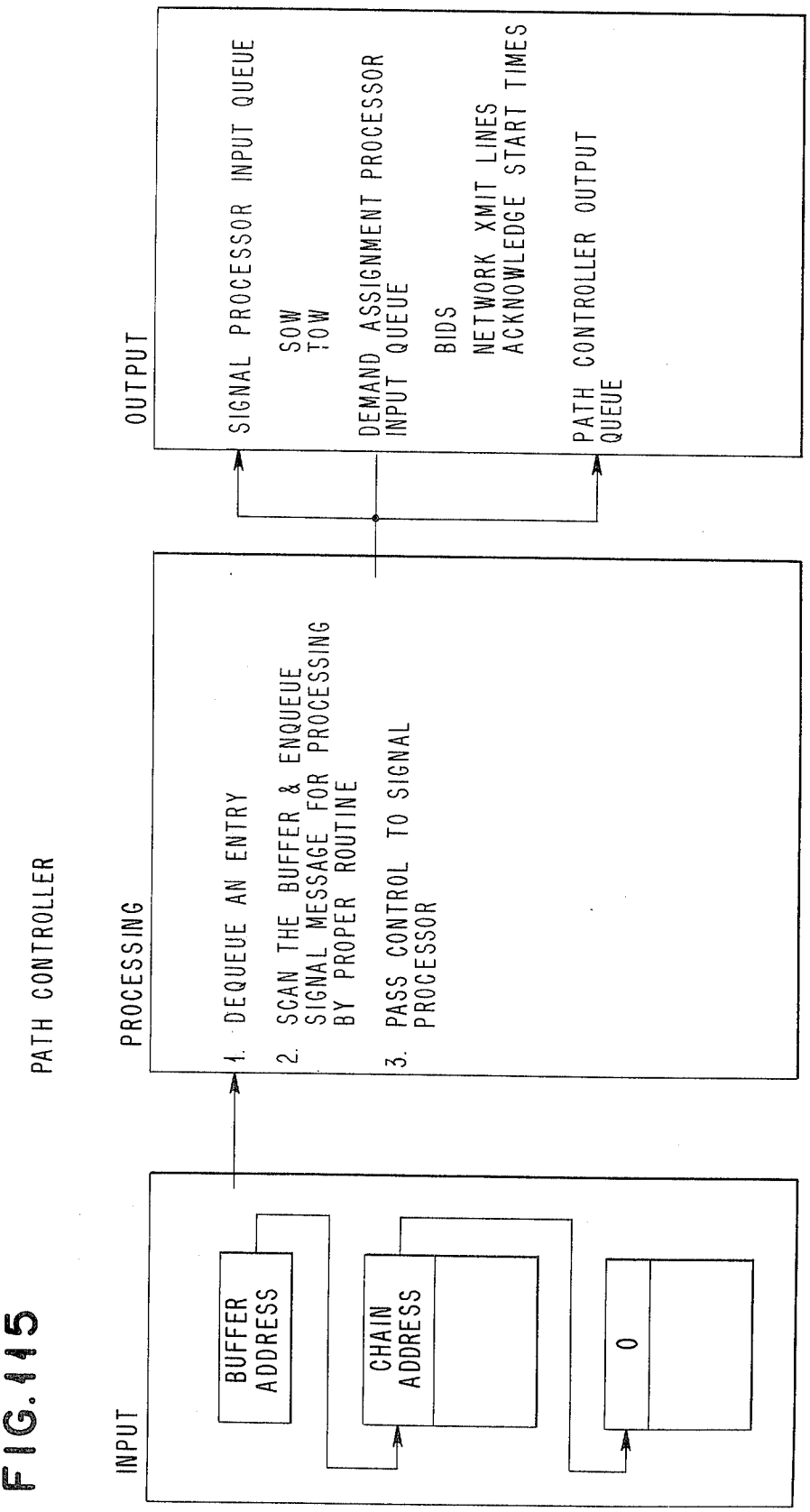

The path controller is responsible for routing the STUs and BTUs to the proper processing queues. The operation of the path controller is shown in FIG. 115.

5.4.3.15 Signal Processor

Figure 116:
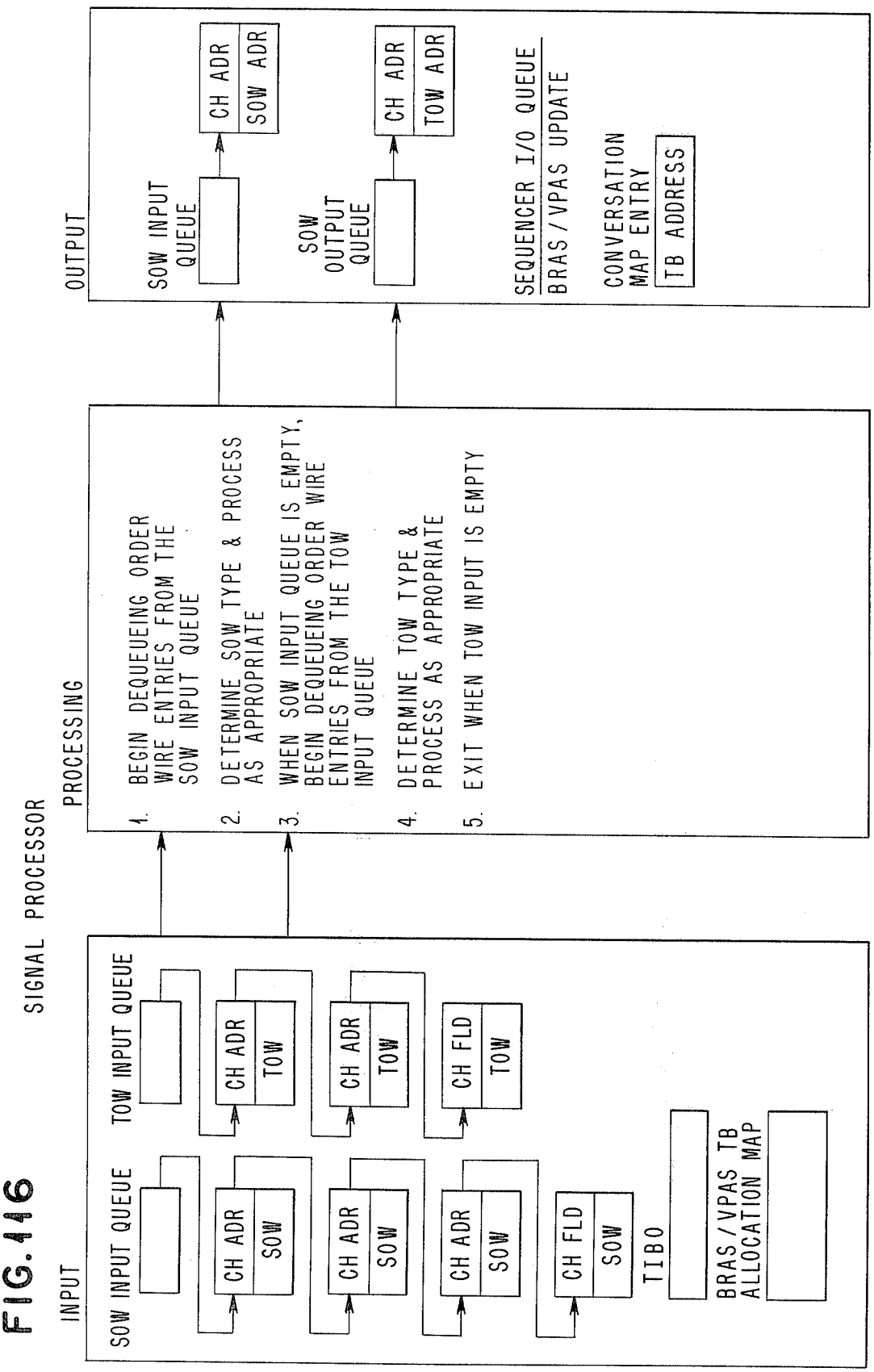

The signal processor controls the allocation of satellite resources and the setup of connectivity. The operation of the signal processor is shown in FIGS. 116.1 and 116.2.

5.4.3.15.3 Terrestrial In/Burst Out (TIBO) Table

The terrestrial in/burst out table below contains four entries, one for each terrestrial line. This table is used by the status monitor, demand assignment, signal processor, and BTEAS routines.

TIBO TABLE

| T-LINE 0 | | | | |
|---|---|---|---|---|
| STATUS | ACCESS ALLOCATION | BURST ALLOCATION | STATUS | BURST ALLOCATION |
| (1 byte) | (1 byte) | (1 byte) | (1 byte) | (1 byte) |

If bit 0 in the status field is set to 1, the line is available. If bit 1 of the status field is set to 1, the line is in use.

The ACCESS allocation field indicates the number of voice channels allocated by demand assignment. The assignable range for this field is 0 or 2 through 47.

The BURST ALLOCATION field indicates the number of voice channels assigned to connected calls. When the burst allocation is less than the DEMAND ALLOCATION, an idle pattern is transmitted in the unassigned channels (UAC).

5.5 PROGRAM STRUCTURE

5.5.1 System Definition

The following definitions identify functional structure and packaging organization.

BASE SUPPORT UNIT — Unit that contains the logic and equipment necessary to initiate and maintain operation of a ground station. The BSU contains the permanent Multiple Access Unit program that is used for IPL and re-IPL purposes.

BURST MODEM

CLOCK — A device that generates periodic signals used for synchronization.

FRAME — A fixed time period allocated for the tranmission of Network Control information (order wire) by one station in the network, and for transmission of traffic bursts by each active station in the network. The time assigned a complete frame is called the frame period. Each frame is 6 milliseconds long and is divided into two portions: an order wire segment used for network control, and a traffic segment, used for transmission of traffic.

FUNCTIONAL UNIT

MASTERFRAME — Consists of 9 superframes or 9 × 56 frames.

MODULE — A program unit that is discrete and identifiable with respect to compiling, combining with other units, and loading, for example, the input to, or output from, an assembler, compiler, linkage editor, or executive routine.

MULTIPLE ACCESS UNIT — A component of the Network Access Unit. This unit establishes and controls the traffic flow between the terrestrial communications systems and the satellite.

NETWORK — A group of stations sharing a common satellite transponder in communication system.

OBJECT MODULE — A module that is the output of an assembler or compiler and is the input to a linkage editor.

ORDER WIRE — That portion of a collection of communications channels reserved for passing signals to control the communications process.

PROGRAM — A series of actions proposed in order to achieve a certain result.

REENTERABLE — The attribute of a load module that allows the same copy of the load module to be used concurrently by two or more tasks.

REUSABLE — The attribute of a routine that allows the same copy of the routine to be used by two or more tasks.

REAL CHANNEL — The one-way path between a transmitter and a receiver.

SATELLITE TELECOMMUNICATIONS — The transmission of signals over long distances via the use of a satellite as a repeater.

SATELLITE TRANSPONDER — The basic partition of the satellite radio repeater for communications purposes. Conventionally each 500 MHz band allocated for satellite communications is divided into 12 frequency divisions on 40 MHz centers. Each of these frequency divisions is serviced by a transponder—basically a frequency shifter and power amplifier. Each transponder operates independently of the others on the satellite and so is expected to be the commodity marketed by the satellite proprietor.

SOURCE MODULE — The source statements that constitute the input to a language translator for a particular translation.

STATION — One part of a network having multiple input/output ports and means for switchably connecting them to the satellite transponder.

SUPER FRAME — 56 frames.

TRAFFIC — That information which is communicated from one point to another in a network whether it is data, voice, or non-coded (e.g. video) information.

TRAFFIC BUFFER — A storage device used in a MAU as temporary storage for uplink and downlink traffic. This traffic is distributed to various physical points in the system at precise times. The buffer is an A/B/C type buffer and is 4K words by 240 bits, and is divided into eight 512 word partitions.

DIGITAL TRUNK — A digital signal communication facility.

T1 LINE — A digital wire communication facility used in North America. It is a 1.544 Mbit/second digital line which is effected by removing the loading coils from conventional telephone lines and replacing them with digital repeaters. The resultant digital line can transport 24 digitized phone channels instead of one analog circuit. The digitized phone channels are time division multiplexed.

VAC MASK — A pattern of characters that is used by the receiving NCU in assigning the 46 Trunk-out channels available for traffic to one of the 96 terrestrial channels.

VIRTUAL CHANNEL — A channel of communication virtually capable of connection to a real channel.

5.2.2 Naming Conventions

This section contains a list of component codes and the standard naming methods for modules, programs, control sections, symbols, system control elements, component control blocks, service routines and serially reusable resources. The objective is to provide uniform naming.

A system component name is used for distribution and maintenance purposes. It is used to name an associated set of modules which together perform a major function in the network. Component names are unique; each component is assigned a three character code. The same code is used as part of a module, control section, etc.

The components of a network are:
o NMF (Network Management Facility)
o STATIONS
o NCU/3705 (Network Control Unit and Associated Common Controls)
o MAU (Multiple Access Unit)
o BSU (Base Support Unit)
The form of a module name is:

CCCMM

Where CCC is the component code, and MM is the module code. The module code may be alphanumeric.

Program names are used for access by the program fetch function. They appear in programs as arguments of the supervisor call instruction. They also appear in the system control statements as arguments of the execute statement.

Control section names and external symbols consist of up to eight alphanumeric characters, of which the first six are the characters forming the name of the module within which the control section name or external symbol is defined. These names are of the form:

CCCMMMNN

Where CCC is the component code, MMM is the module code, and NN identifies the control section name or external symbol within the module.

Internal symbols, must be unique only within a module. The suggested format is:

MMMAAAAAA

Where MMM is the module code, and AAAAAA is alphanumeric. References to system control blocks are made through the facilities of a control section. This allows changes to be made in the control block by simple reassembly procedures.

The names of the data set libraries for the Network Access Unit are:
o MAU,IPL
o NAU,BSU (Base Support Unit Modules)
o NAU,MAU (Multiple Access Unit Modules)

IV. HIGH LEVEL NETWORK CONTROL

A. Initialization

The MAU's are initialized from the IGAR diskette in the BSU, allowing for off-network (e.g. dial up public network) communications with a host data processing facility. The host is usually the Network Manager Facility (NMF). One (and only one) of the MAU's is "primed" as the reference station. It must acquire the satellite first and provide the reference for superframe/masterframe timing which is needed for coordination of the distributed demand assignment process.

The first superframe of each masterframe is distinguished by the reference station transmission of unique word 1 in its OW frame slot. In other superframes unique word 2 is sent by the reference station. All other stations must send unique word 2 in each respective OW frame slot.

Each MAU is assigned a unique frame per superframe (corresponding to its ID number) for OW transmissions. The assignment is established at MAU initialization. As the station MAU's acquire the satellite their respective station time bases are established and communicated to respective NCU's. This is used to synchronize all local clocks which drive all local memory address sequencers so that memory sequencing is at all times in coordination with the range to the satellite (including doppler correction).

As the MAU's acquire the satellite, the NMF (e.g. an IBM System/370 processor) operates through a 3705 controller interface to a system data port in an NCU to establish switched connections from that NCU to all other NCU's associated with acquired NAU's (or MAU's). Typically such connections extend (FIG. 117) from the NCU (or NCU's if several are terrestrially linked to the NMF) uplink to MAU's (e.g. via terrestrial digital trunks) and over the satellite downlink to NAU's and remote NCU's. At remote NCU's the NMF traffic passes via the TGIM, SIM and LGOM decomposition path into the assigned virtual channel for NMF communications from which it connects through a "bootstrap" connection (FIG. 117) with the 3705 controls of that NCU. When the communication is intended for a remote MAU, the remote NCU/3705 routes the extracted information back to that MAU via the control signalling channel (TC0) of a digital link.

B. IPL

With in-network communication paths thereby established the NMF proceeds to load programs and tables for NCU and MAU control and system connectivity (connection configuration) through the network. The loaded information includes the freezeout rate threshold of the individual NCU/3705 complexes.

C. NMF "Control" In Traffic Processing

The network of NCU/NAU stations operates autonomously to process calls and switch traffic. The NMF assumes a passive/receptive role in the absence of unusual circumstance. The NCU/3705 modules of the network normally maintain statistics of call timing, blocking and signal freezeout rate which are intermittently sent to the NMF for "global" processing (billing, analysis, etc.). When these reports indicate unusual operation or traffic conditions the NMF may initiate diagnostic communication and reconfigure the network modules (e.g. to isolate an improperly operating module) by reloading the module tables defining permissible call paths.

With reported freezeout rate over-run information the NMF can determine the effectiveness of the demand assignment process. An unusually persistent high freezeout rate on one trunk of an NCU could be indicative of a poorly constructed configuration table or of an ineffective use of satellite demand assignment.

Another interesting observation may be made here concerning the effectiveness of activity compression at low traffic stations. Stations which never experience uplink freezeout at their NCU's may in a sense be viewed as not operating at peak efficiency. However, from a network point of view this may be irrelevant. The important factor is whether the resources of the network, considered in aggregate, are being used effectively. With demand assignment (conditioned by activity compression reduction factors) the low traffic station has tightly restricted access to the space segment and its VAC mask transmissions permit efficient downlink re-VAC'ing (rearrangement and recompression) of traffic. This means that inefficiency if it exists at the NCU level is isolated and short term.

While the invention has been particularly shown and described with reference to a preferred embodiment thereof, it will be understood by those skilled in the art that various changes in form and detail may be made therein without departing from the spirit and scope of the invention.

What is claimed is:

1. In a network of multiplex switching stations linked via cyclically recurrent channels of communication facilities, each said station having multiple ports attachable to separate telephone and data line circuits external to said network and providing varied time division connection links between said line circuits and said facilities, representing segments of virtual connections relative to ports of other stations, station apparatus comprising:

means for coupling communicatively with an ordered group of said recurrent channels;

random access storage means containing a group of storage locations accessible in ordered association with said group of channels;

means coupled to said storage means and channel coupling means for operating in each said recurrence cycle to assign selected said storage locations to successive said channels for ordered communicative coupling with said channels;

multiplex switch means operating cyclically in coordination with said recurrence cycles and in cooperation with apparatus at other said stations for providing variable call connection links between said ports and storage locations;

means for monitoring activity context of voice and data signals being handled between said line circuits and said switch means; and means supplying indications of said monitored activity to said channel assignment means in ordered association with locations receiving respective traffic for controlling selection of said locations by said channel assignment means.

2. Apparatus in accordance with claim 1 wherein the number of said part-to-storage-location connection links maintainable concurrently by said switch means exceeds the number of channels in said group of channels; and said channel assignment means includes means responsive to said activity indications to compressively assign said locations by eliminating all locations containing inactivity.

3. Apparatus in accordance with claim 2 including means for cyclically generating information indicating the compressive assignments of said locations to said channels; and means for transmitting said assignment indicating information to other stations via said facilities.

4. Apparatus in accordance with claim 3 wherein at least a portion of said assignment indicating information is communicated over said channels.

5. Apparatus in accordance with claim 3 including means for communicating variations in said part-to-storage-location connection links to other stations as said variations occur, enabling said other stations to associate said transmitted assignment indicating information correctly with origin and destination ports paired in said virtual connections.

6. Apparatus in accordance with claim 3 wherein each said channel contains multi bit sub-channels, whereby a substantial efficiency may be realized in respect to the proportion of traffic information to assignment indicating information carried over said channels.

7. Apparatus in accordance with claim 3 wherein activity contained in selected ones of said locations being processed for assignment to said channels may be blocked from assignment to said channels upon occurrence of a traffic over-run condition in which the number of locations coincidentally active during a given said cycle exceeds the number of said channels; and wherein said assignment indicating information is arranged to indicate said blocking.

8. A method of using $m$ recurrent channels of a multiplex communication facility to convey information from $n$ (greater than $m$) input source telephone and data trunk line circuits associated transmissively with one access node of said facility to $n$ respective destination lines associated receivably with other access nodes of said facility comprising:
- recurrently transferring information from said input line circuits into $n$ randomly accessible stores switchably paired with said source lines;
- varying the pairings of said line circuits and stores relative to the accessibility of said stores and said facility;
- recurrently detecting the presence of activity and inactivity in said line circuits;
- storing indications of said activity and inactivity in ordered association with said respectively paired stores;
- recurrently assigning up to $m$ of said stores for transmissive coupling, via up to $m$ of said channels, with respective said destination lines; and
- conditioning the selection of said up to $m$ stores for said channel assignments upon said respective stored activity indications.

9. A method of communication according to claim 8 including:
- using said stored activity and inactivity indications to distinguish between data activity, transitional telephone voice activity and continuing telephone voice activity contained in said stores;
- detecting an over-run condition of concurrent activity in $k$ (greater than $m$) of said stores; and
- further conditioning said selections for channel assignments to block assignments to $k-m$ of said active stores, giving preference for assignment to stores containing data activity over stores containing telephone voice activity and to stores containing continuing telephone activity over stores containing transitional telephone activity.

10. A method of communication according to claim 8 including:
- generating information indicating said channel assignments; and
- transmitting said channel assignment information over a channel of said facility separate from said $m$ channels in ordered association with said $n$ stores and up to $m$ channels.

11. A method of communication according to claim 10 wherein:
- said channels are digital information channels, each conveying multiple bits of information in each cycle of recurrence; and
- said assignment indicating information comprises one bit for each of said $n$ stores indicating the assignment or blocking of the respective store in each said cycle of recurrence.

12. A method of communicating according to claim 10 including:
- receiving information originated at $m$ remote input line circuits via $m$ other recurrent channels of said facility for selective distribution to up to $m$ out of $n$ output line circuits paired in duplex associations with said $n$ input lines
- receiving channel assignment information useful to relate the information in said $m$ other channels to said $m$ output line circuits; and
- distributing said remotely originated information to said $m$ output line circuits in accordance with said received assignment information.

13. A method of communication according to claim 9 including:
- cumulatively developing statistical information relative to occurrences of said blocking of channel assignments to stores containing activity; and
- using said statistical information to restrict the said pairings of line circuits and stores.

* * * * *